US012704101B2

(12) United States Patent
Venkatesh et al.

(10) Patent No.: US 12,704,101 B2
(45) Date of Patent: Aug. 11, 2026

(54) SYSTEMS AND METHODS FOR DESIGN, MANUFACTURE, AND TEST OF SPACE THRUSTER PROPULSION SYSTEMS

(71) Applicant: Agile Space Industries, Inc., Durango, CO (US)

(72) Inventors: Prashanth Bangalore Venkatesh, Durango, CO (US); Daudi Barnes, Durango, CO (US); Hans Boenish, Boulder, CO (US); Charles Campbell, Durango, CO (US); Shane Cullen, Durango, CO (US); Evan Daniel, Durango, CO (US); Michael Fitzpatrick, Durango, CO (US); Carlos Rafael Garcia, Durango, CO (US); Benjamin Graybill, Durango, CO (US); Mesa Hollinbeck, Durango, CO (US); Daniel Kolano, Durango, CO (US); Lawrence Kyle Metsger, Greensburg, PA (US); Drew Daniel Nemeth, Las Vegas, NV (US); Lars Osborne, Durango, CO (US); Patrick Riley, Superior, CO (US); Tucker James Smith, Durango, CO (US); Gabriel Hall Sylvester, Durango, CO (US); Ryan Good, Durango, CO (US); Alexander Michael Kohut, Huntingdon, PA (US); Nicholas Anthony Gabrielli, Apollo, PA (US); Katherine Mulry, Dallas, TX (US); Mary Ellen Phillips, Durango, CO (US); John Costello, Durango, CO (US); Curtis Foster, Wasilla, AK (US); Margaret Lea, Salt Lake City, UT (US); Benjamin Updike, Durango, CO (US); Clayton Birchenough, Durango, CO (US); Graham Knight Dudley, Durango, CO (US); Jamie M. Nollet, Bayfield, CO (US); Robin E. Hormann, Durango, CO (US); Samuel A. Harrison, Durango, CO (US); Steven Torres, Durango, CO (US); Teva Wiese, Durango, CO (US)

(73) Assignee: Agile Space Industries, Inc., Durango, CO (US)

( * ) Notice: Subject to any disclaimer, the term of this patent is extended or adjusted under 35 U.S.C. 154(b) by 0 days.

(21) Appl. No.: 18/590,109

(22) Filed: Feb. 28, 2024

(65) Prior Publication Data

US 2024/0401547 A1 Dec. 5, 2024

Related U.S. Application Data

(63) Continuation of application No. PCT/US2022/042024, filed on Aug. 30, 2022.

(Continued)

(51) Int. Cl.
*F02K 9/64* (2006.01)
*B33Y 80/00* (2015.01)

(Continued)

(52) U.S. Cl.
CPC ................ *F02K 9/64* (2013.01); *B33Y 80/00* (2014.12); *B64G 1/401* (2013.01); *F02K 9/52* (2013.01); *F02K 9/972* (2013.01)

(58) Field of Classification Search
CPC ... B64G 1/401; F02K 9/42; F02K 9/52; F02K 9/62; F02K 9/64; F02K 9/68; F02K 9/972
See application file for complete search history.

(56) References Cited

U.S. PATENT DOCUMENTS 2,569,887 A * 10/1951 Goddard .................. F02K 9/52 60/915
3,154,914 A * 11/1964 Stockel .................... F02K 9/64 60/260

(Continued)

FOREIGN PATENT DOCUMENTS

CN 203053637 7/2013
CN 110005547 7/2019

(Continued)

OTHER PUBLICATIONS

Allison, Jared, A Test Part for Evaluating the Accuracy and Resolution of a Polymer Powder Bed Fusion Process, Oct. 2017, ASME (Year: 2017).*

(Continued)

*Primary Examiner* — Kyle Robert Thomas
(74) *Attorney, Agent, or Firm* — Wilson Patent Law, LLC

(57) ABSTRACT

The disclosed methods, systems, and kits provide the ability to deliver entire clean sheet designs from concept to first hot fire in under six weeks with instant specific impulses above 330 seconds in some of our engines. In examples, thrusters can be delivered that are at less than half of the mass budget allowable for them and they can be delivered in weeks.

30 Claims, 59 Drawing Sheets

Related U.S. Application Data

(60) Provisional application No. 63/401,337, filed on Aug. 26, 2022, provisional application No. 63/350,056, filed on Jun. 8, 2022, provisional application No. 63/325,832, filed on Mar. 31, 2022, provisional application No. 63/316,709, filed on Mar. 4, 2022, provisional application No. 63/316,134, filed on Mar. 3, 2022, provisional application No. 63/307,716, filed on Feb. 8, 2022, provisional application No. 63/278,796, filed on Nov. 12, 2021, provisional application No. 63/278,331, filed on Nov. 11, 2021, provisional application No. 63/248,745, filed on Sep. 27, 2021, provisional application No. 63/238,436, filed on Aug. 30, 2021.

(51) Int. Cl.

| | |
|---|---|
| ***B64G 1/40*** | (2006.01) |
| ***F02K 9/52*** | (2006.01) |
| ***F02K 9/97*** | (2006.01) |

(56) References Cited

U.S. PATENT DOCUMENTS

| | | | | |
|---|---|---|---|---|
| 3,318,073 | A | 5/1967 | Adkins | |
| 3,847,309 | A | 11/1974 | Grossman | |
| 4,566,609 | A | 1/1986 | Hoffmeister | |
| 4,621,492 | A * | 11/1986 | von Pragenau | F02K 9/52 239/132.5 |
| 4,723,736 | A | 2/1988 | Rider | |
| 5,042,365 | A | 8/1991 | Rosman | |
| 6,151,887 | A * | 11/2000 | Haidn | F02K 9/972 60/257 |
| 6,199,370 | B1 | 3/2001 | Kessaev | |
| 6,351,939 | B1 * | 3/2002 | Buddenbohm | F02K 9/52 60/204 |
| 6,446,909 | B1 * | 9/2002 | Michelson | F02K 9/68 244/72 |
| 6,637,188 | B2 * | 10/2003 | Bichler | F02K 9/64 239/127.1 |
| 7,592,073 | B2 * | 9/2009 | Brockmeyer | C22C 1/1084 420/433 |
| 7,900,435 | B1 * | 3/2011 | Greason | F02K 9/52 60/211 |
| 10,072,612 | B2 * | 9/2018 | Bostwick | F02K 9/52 |
| D869,373 | S | 12/2019 | Wei | |
| 10,527,003 | B1 * | 1/2020 | Beck | B33Y 10/00 |
| D892,708 | S | 8/2020 | Chen | |
| 11,077,964 | B1 * | 8/2021 | Grubisic | B64G 1/415 |
| 11,137,214 | B2 * | 10/2021 | Mayberry | B22F 10/66 |
| D945,352 | S | 3/2022 | Naylor | |
| D981,321 | S | 3/2023 | Qin | |
| D984,952 | S | 5/2023 | Qiao | |
| D1,052,510 | S | 11/2024 | Barnes | |
| 2004/0219079 | A1 * | 11/2004 | Hagen | F23C 6/02 422/607 |
| 2008/0236140 | A1 | 10/2008 | Brady | |
| 2009/0288390 | A1 * | 11/2009 | Pavia | F02K 9/64 60/267 |
| 2012/0060468 | A1 | 3/2012 | Dushku | |
| 2013/0205751 | A1 | 8/2013 | Joshi | |
| 2013/0255223 | A1 | 10/2013 | Brady | |
| 2015/0298213 | A1 | 10/2015 | Beyer | |
| 2016/0010863 | A1 * | 1/2016 | Ott | B22F 10/25 428/141 |
| 2016/0325620 | A1 | 11/2016 | Ballinger | |
| 2017/0137099 | A1 | 5/2017 | Smith | |
| 2017/0226362 | A1 * | 8/2017 | Fratello | G01L 1/2287 |
| 2018/0087443 | A1 | 3/2018 | Adriany | |
| 2018/0087683 | A1 | 3/2018 | Raven | |
| 2020/0240365 | A1 | 7/2020 | Elzein | |
| 2020/0338639 | A1 | 10/2020 | Friesth | |
| 2021/0197989 | A1 | 7/2021 | Sercel | |
| 2022/0307450 | A1 * | 9/2022 | Yarnot | F02K 9/68 |
| 2023/0348114 | A1 | 11/2023 | Horozoglou | |

FOREIGN PATENT DOCUMENTS

| | | |
|---|---|---|
| CN | 110552828 | 12/2019 |
| CN | 110749448 | 2/2020 |
| CN | 212130634 | 12/2020 |
| CN | 112253334 | 1/2021 |
| CN | 112302830 | 2/2021 |
| CN | 112377331 | 2/2021 |
| CN | 212716929 | 3/2021 |
| CN | 112983683 | 6/2021 |
| CN | 113217229 | 8/2021 |
| WO | WO9405546 | 3/1994 |
| WO | WO0144050 | 6/2001 |
| WO | WO2014189451 | 11/2014 |
| WO | WO2023034291 | 3/2023 |

OTHER PUBLICATIONS

International Search Report and Written Opinion, Int'l Appl. No. PCT/US22/042024, Mar. 23, 2023, USPTO-ISA.

Venkatesh P.B. et al. Pulse Performance Analysis of a 45 Newton Additively Manufactured Bipropellant Thruster, Journal of Propulsion and Power, vol. 37, No. 6, 2021, pp. 832-841.

Venkatesh, P.B. et al. Design and Performance of a 110-N Attitude Control Thruster for Lunar Missions, 8th Space Propulsion Conference, SP2022 #175, May 9-13, 2022, Estoril, Portugal.

Boenish, H. et al. LE111 N Hydrazine Bipropellant Engine (HBE) with Gas-Gas Injection, 8th Space Propulsion Conference, SP2022 #173, May 9-13, 2022, Estoril, Portugal.

Garcia, C. et al. LE111 Hydrazine Additively Manufactured High Performance 111N Engine with Gas-Gas Injection, 69th Joint Army-Navy-NASA-Air Force Propulsion Meeting, 2022-0002AP, Jun. 6-10, 2022, Newport News, Virginia.

Osborne, L. et al. Design and Performance of a 110N Additively Manufactured Attitude Control Thruster, 69th Joint Army-Navy-NASA-Air Force Propulsion Meeting, 2022-002AQ, Jun. 6-10, 2022, Newport News, VA.

Venkatesh, P.B. et al. Design and Performance of a 110-N Attitude Control Thruster for Lunar Missions, International Journal of Energetic Materials and Chemical Propulsion, Vo. 22, No. 4, 2023, pp. 1-13.

Boenish, H. et al. 111 N Hydrazine Bipropellant Engine (HBE) with Gas-Gas Injection, International Journal of Energetic Materials and Chemical Propulsion, vol. 22, No. 2, 2023, pp. 61-72.

"Agile Space Industries Qualifies A110 Lunar RCS Thruster" [online] [retrieved on Apr. 12, 2023] Retrieved from the Internet :<URL:https://agilespaceindustries.com/press/u3ags920s8c3puzf65lpr0vkvu7pie>.

"200 N Bipropellant Thruster" [online] [retrieved on Jan. 23, 2024] Retrieved from the Internet :<URL: https://www.space-propulsion.com/spacecraft-propulsion/bipropellant-thrusters/200n-bipropellant-thrusters.html>.

Venkatesh, P.B. et al. Qualification Testing of a 110-N Attitude Control Thruster, AIAA SciTech Forum, Jan. 8-12, 2024, Orlando, Florida.

* cited by examiner

Fluid flow modeling approaches system for space propulsion systems 1000

Model fluid geometries separate from solid in injector design 1002

Fluid-flow optimized design methods 1004

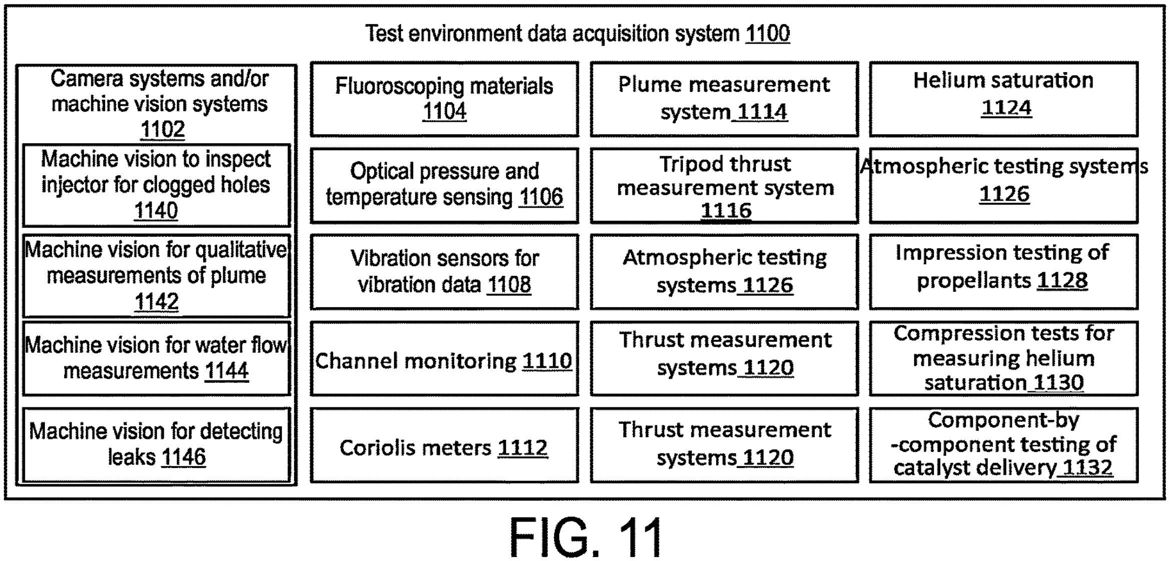

FIG. 11

Test stand software systems and subsystems 1200

Vacuum management system 1202

System for maintaining vacuum for engine outgassing 1204

Test data processing 1206

Test stand configuration guidance 1208

Parameter file 1210

Calibration system 1212

Automated calibration 1214

Diagnostics system 1216

Safety system 1218

Initiate shutdown sequence 1220

FFT viewer 1222

FFT algorithm 1224

Post-processing data scripts 1226

Propellant management 1228

Control system 1230

Command center 1232

Test campaign 1234

Redlines 1236

Bluelines 1238

Test sequence 1240

Transient test phase 1242

Steady state test phase 1244

Correlate pyrometers and IR cameras 1246

Correlate thermocouples 1248

Time alignment of data 1250

Regulator skid system 1252

Self-ID of sensors 1254

Valve driver 1256

Disaster recovery system 1258

Algorithm/application suite to stream low quality data from test environment 1260

Reactor health monitoring system 1262

Ejector system analytics 1264

Individual pulse characterization 1266

Test data processing suite 1268

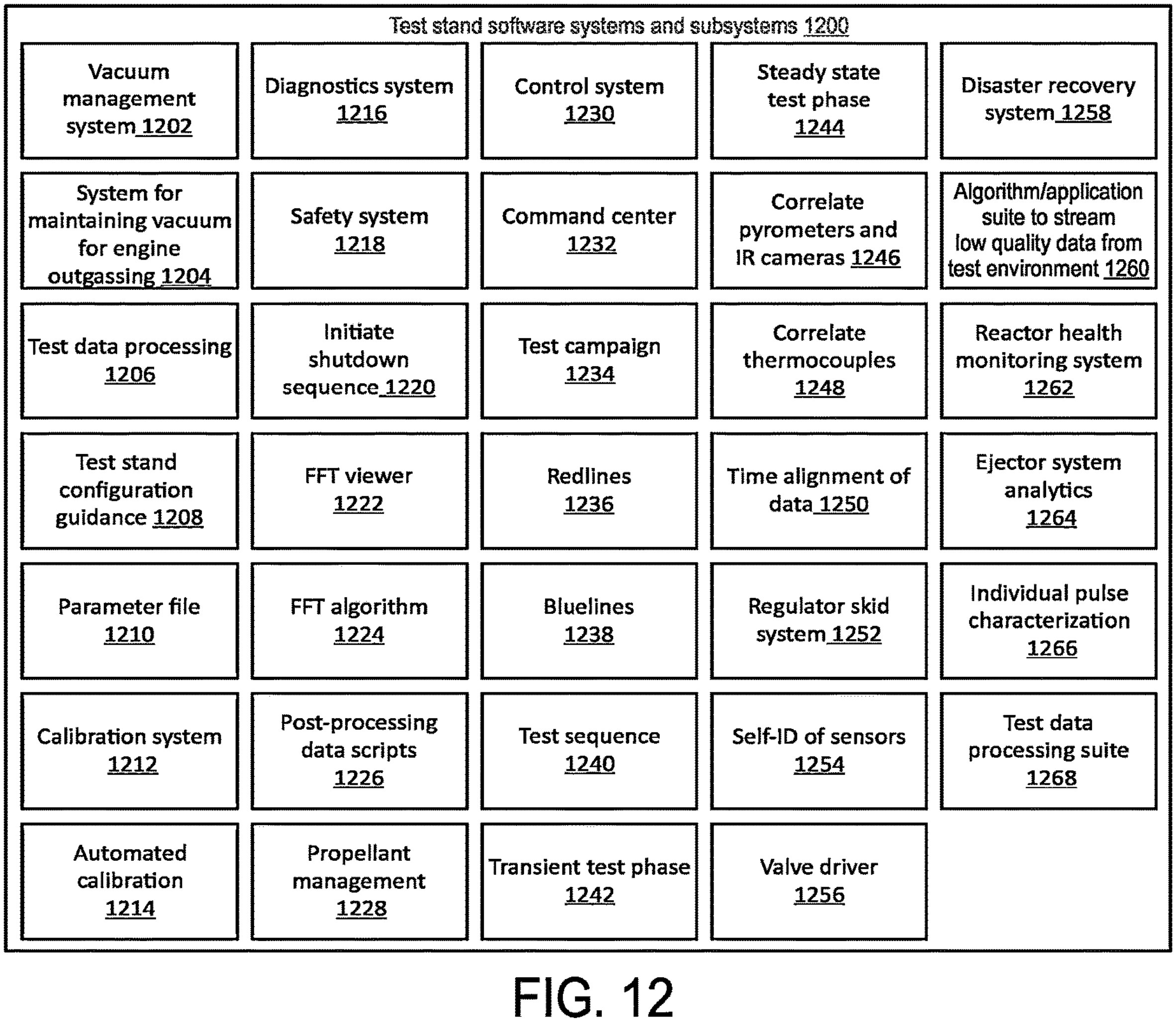

FIG. 12

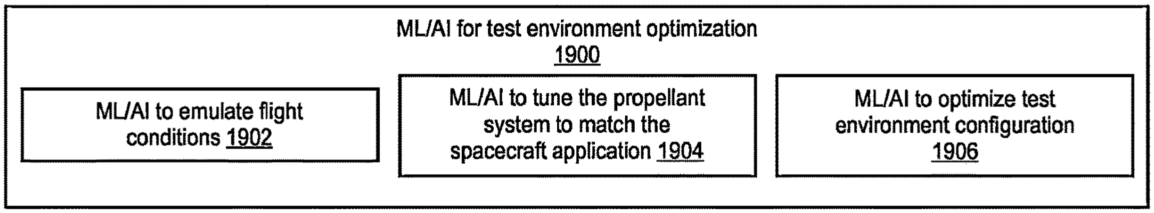

FIG. 19

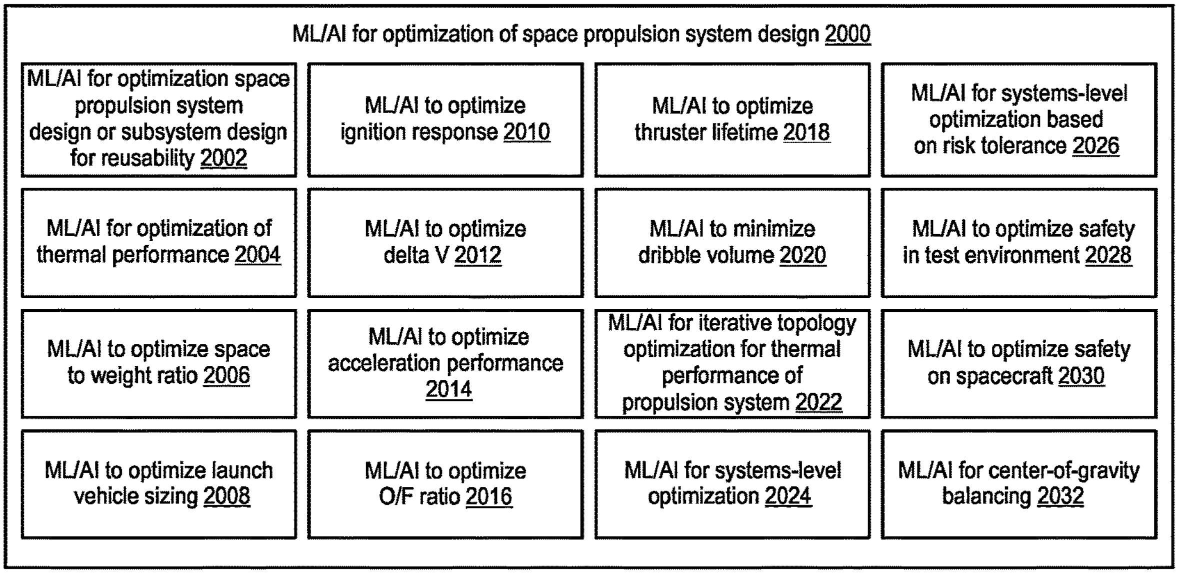

FIG. 20

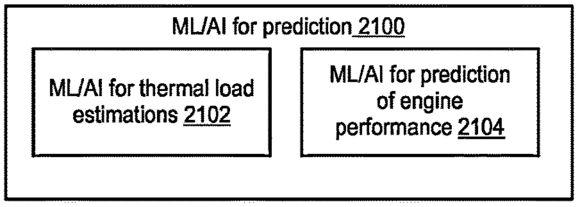

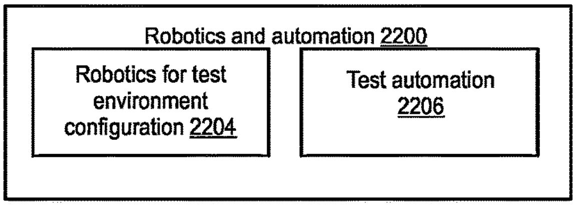

ML/AI for test environment optimization 1900

ML/AI to emulate flight conditions 1902

ML/AI to tune the propellant system to match the spacecraft application 1904

ML/AI to optimize test environment configuration 1906

ML/AI for optimization of space propulsion system design 2000

ML/AI for optimization space propulsion system design or subsystem design for reusability 2002

ML/AI to optimize ignition response 2010

ML/AI to optimize thruster lifetime 2018

ML/AI for systems-level optimization based on risk tolerance 2026

ML/AI for optimization of thermal performance 2004

ML/AI to optimize delta V 2012

ML/AI to minimize dribble volume 2020

ML/AI to optimize safety in test environment 2028

ML/AI to optimize space to weight ratio 2006

ML/AI to optimize acceleration performance 2014

ML/AI for iterative topology optimization for thermal performance of propulsion system 2022

ML/AI to optimize safety on spacecraft 2030

ML/AI to optimize launch vehicle sizing 2008

ML/AI to optimize O/F ratio 2016

ML/AI for systems-level optimization 2024

ML/AI for center-of-gravity balancing 2032

ML/AI for prediction 2100

ML/AI for thermal load estimations 2102

ML/AI for prediction of engine performance 2104

Robotics and automation 2200

Robotics for test environment configuration 2204

Test automation 2206

High performance computing for test environment optimization 2300

Quantum computing to minimize catalyst contamination 2302

Quantum computing to tune the propellant system to match the spacecraft application 2306

Quantum computing to emulate flight condition 2304

Quantum computing to tune the propellant system to match the spacecraft application 2306

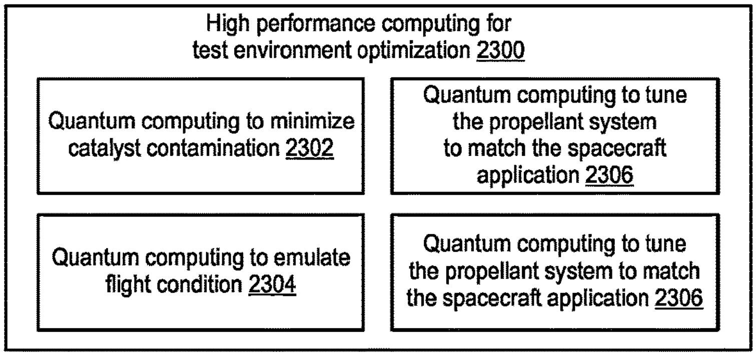

FIG. 23

High performance computing for optimization of space propulsion system design 2400

Quantum computing for iterative topology optimization for thermal performance of propulsion system 2414

Quantum optimization of space propulsion system design 2402

Quantum computing for launch vehicle sizing 2408

Quantum computing for systems-level optimization 2416

Quantum optimization of thermal performance 2404

Quantum computing to optimize O/F ratio 2410

Quantum computing for systems-level optimization based on risk tolerance 2418

Quantum computing to optimize space to weight ratio 2406

Quantum computing to minimize dribble volume 2412

Quantum computing for optimizing space propulsion system and subsystem design for reusability 2420

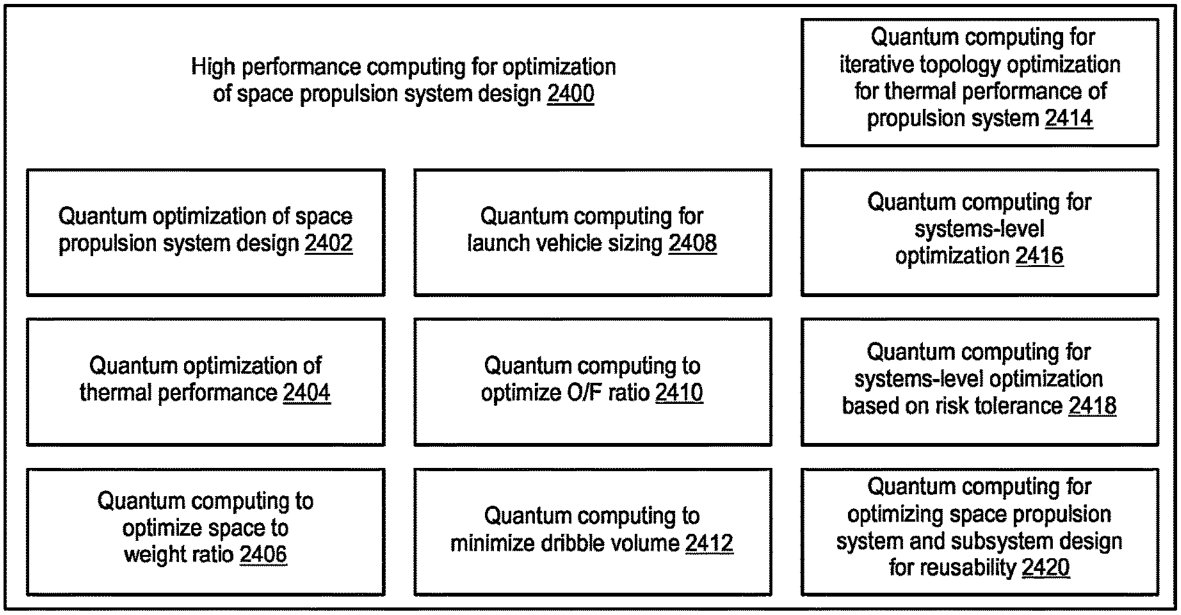

FIG. 24

Test platform as a digital/physical twin of spacecraft 2500

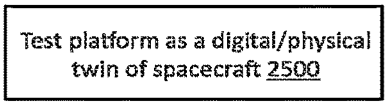

FIG. 25

3D printed propulsion system 2600

Smart 3D printed propulsion system 2602

Smart 3D printed propulsion system 2602

Smart propellant system 2610

Smart engine 2604

Smart tank 2608

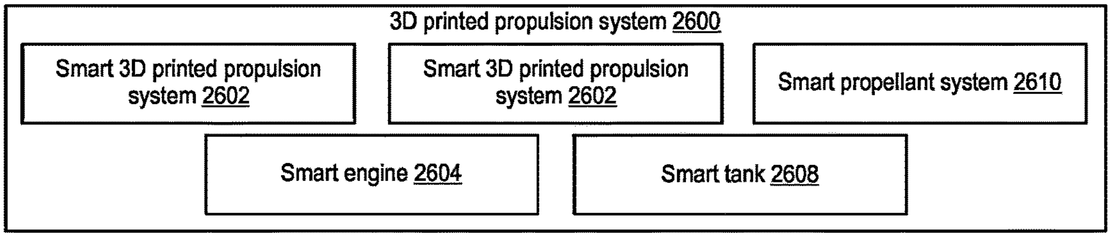

FIG. 26

Facilitation of ignition for space propulsion systems 3100

- Pre-heating fuel to reduce energy required for ignition 3104
- Smooth start engine 3106

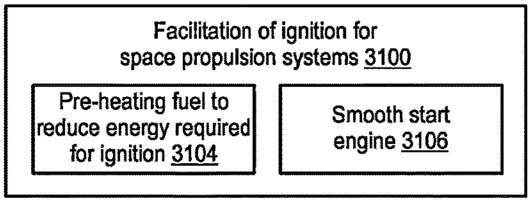

FIG. 31

Improved seals for space propulsion systems 3200

- Additive manufacturing of metal seals between alloys/metals 3202
- Gas turbine static seals 3206
- Integrated seals 3210
- Eliminating seals 3204
- Gas turbine dynamic seals 3208
- Soft compliant material for interfaces 3212

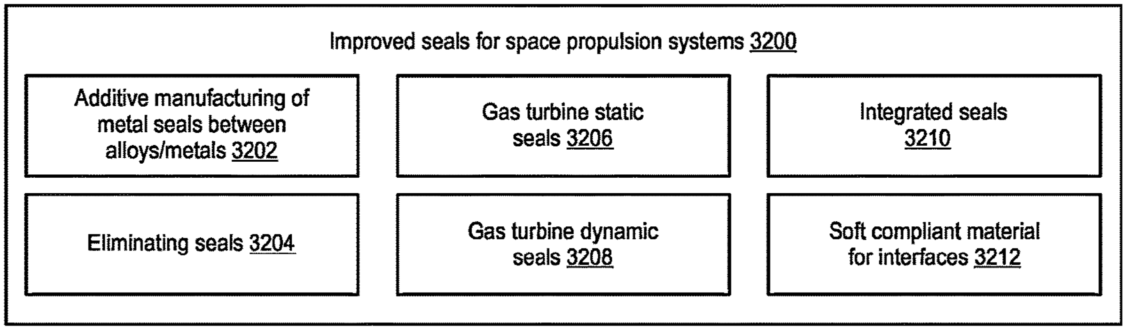

FIG. 32

Injector design features 3300

- Longer thermal break paths with lower mass materials 3332
- Gas-gas injection process using 3D printed nickel chambers 3344
- Long, thin 3D printed channels for fluid flow into the combustion chamber 3302
- Injector cross section with complex heat exchanger geometry 3312
- Domed injectors 3322
- 3D printed normal faces for injection elements 3334
- Multi-point manifolding of the fuel manifold 3346
- Interior design elements as small as .006" 3304
- Oxidizer and fuel flow system exchange heat before hey are injected 3314
- Single piece injectors 3324
- Vorticity generators in injector elements for gases/liquids 3336
- High element density on a small face 3348
- Unlike-double injector 3306
- Reactor and bipropellant chamber 3316
- Constant velocity volute stood off from nozzle 3326
- Coaxial swirling elements 3338
- Multiple vector propulsion integrated in a monolithic design 3350
- Soft-start injection system 3308
- Priming elements 3318
- Radiative heat fins external to chambers 3328
- 3D printed baffles with exits normal to face 3340
- Low dribble volume injectors used to preheat propellant 3352
- Low volume combustion chamber for rapid priming and quick-start in cycling space thruster 3310
- Multiple layers of injector elements 3320
- Limit heat back into spacecraft 3330
- Cooling around the injector face 3342
- Injector with embedded cartridge heaters 3354

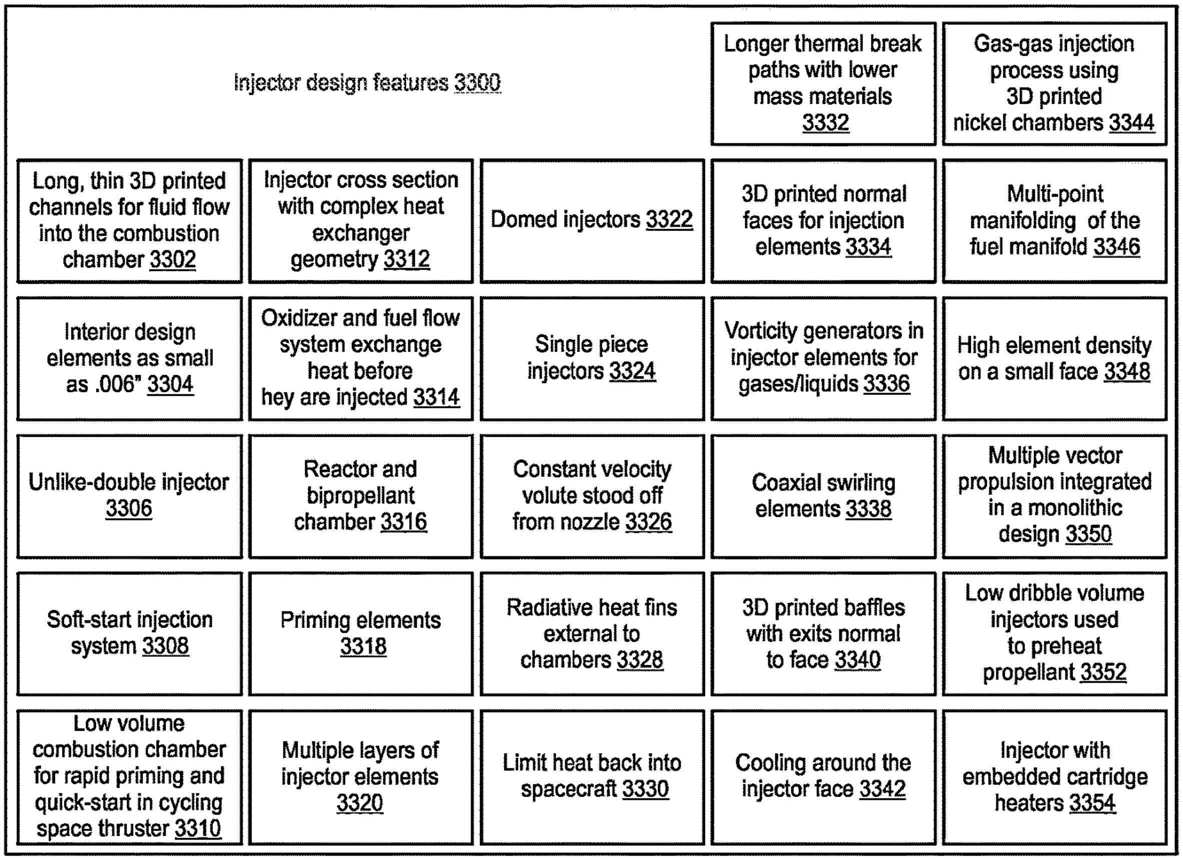

FIG. 33

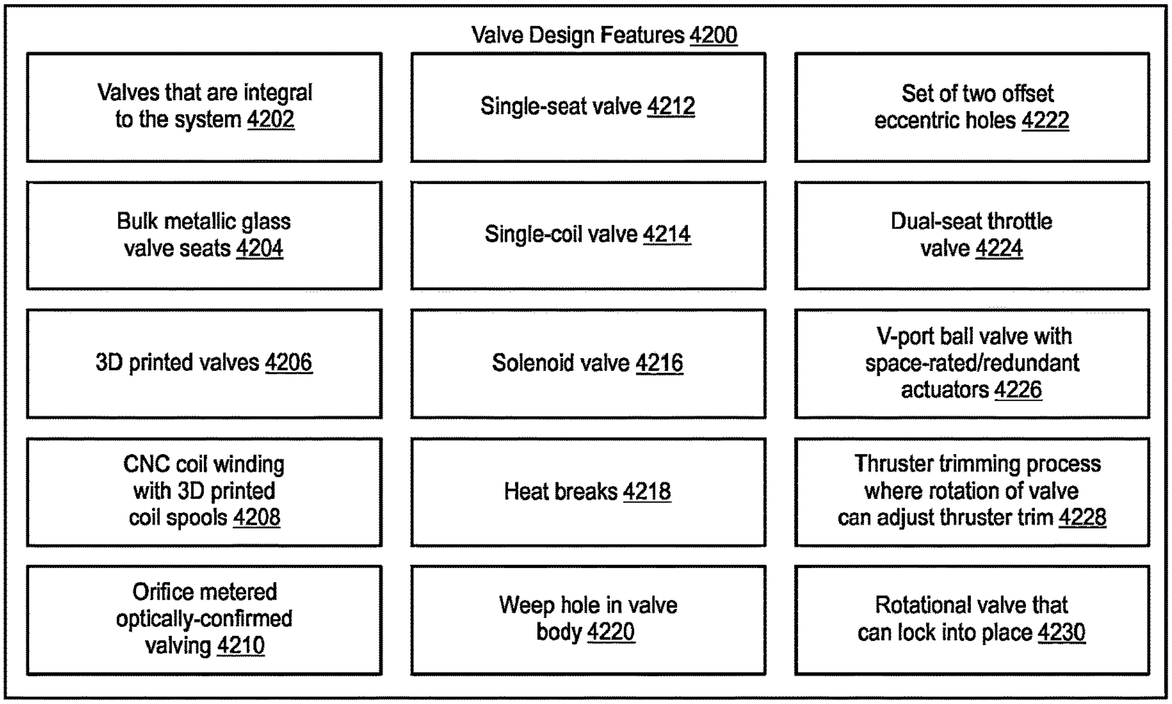

FIG. 42

Tank Design Features 4300

Stretchable propulsion tanks 4302

PDP tanks with orifice metered optically-confirmed valving 4306

Systems for balancing and/or unbalancing multiple independent tanks 4310

Positive displacement piston (PDP) tanks 4304

PDP tanks with flow meter 4308

Reusable PDP tank 4312

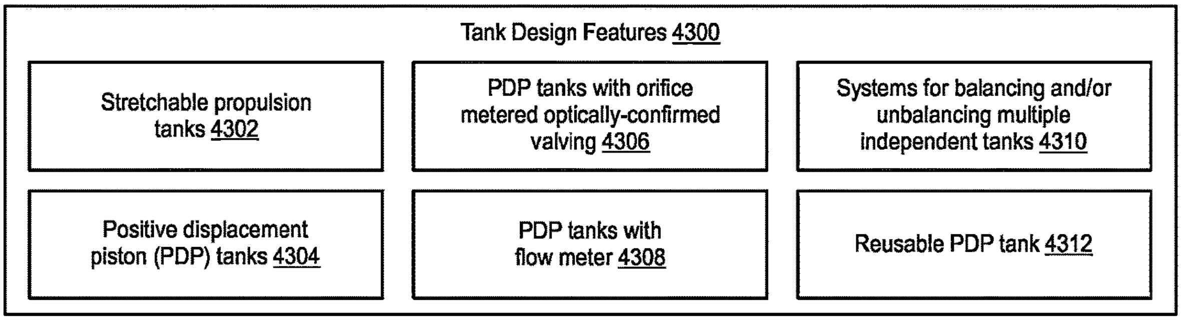

FIG. 43

Combustion acoustics – damping/management features (including for the LE111) 4400

Acoustic quarter wave resonator in a single piece print 4402

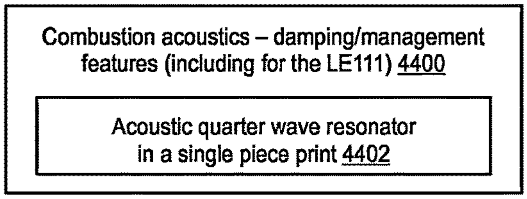

FIG. 44

Hypergolic Propulsion Design Features 4500

Storable chemicals 4502

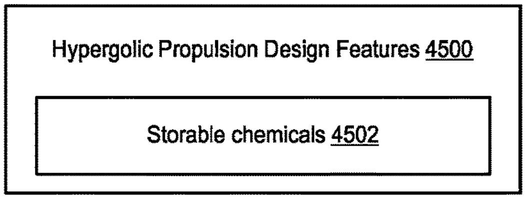

FIG. 45

Le111 Design Features 5000

- Without PMD 5002
- Shark fin 5004
- Birdcage 5006
- Stiffness-enhancing pattern geometry to exit nozzle 5008
- Snap-off supports 5010
- Combine mixture-ratio control and FFC together 5012
- Manifolding 5014
- Injector manifold 5016
- Pressure management across face 5018
- Propellant distributed to elements in tree structure 5020
- Fractal injector 5022
- Bipropellant thruster 5024
- Dual-mode propellant 5026
- Dual-mode propellant with MMH/MON3 bipropellant 5028
- Dual-mode propellant with MMH/MON25 bipropellant 5030
- Dual-mode propellant with hydrazine/MON3 bipropellant 5032
- Hydrazine reactor catalytic preburner 5034
- Oxidizer cool regeneration cooling jacket 5036
- Reactor 5038
- Pebble-bed iridium coated alumina catalyst bed 5040
- Injector face with 3D printed self-supporting features 5042
- Combustion chamber, injector, and reactor in single part 5044
- Turbulent mixing of oxidizer and fuel 5046
- Co-axial, bi-propellant, hypergol injector 5048
- Throttling engine 5050
- Throttle by controlling flow of propellants 5052
- Deep throttling by absence of pumps 5054
- Center-of-gravity balancing 5056
- Sensitive payloads 5058
- Four pack of thrusters 5060
- Swirling fins to reduce heat transfer to spacecraft 5062
- Even heating 5064
- Orifice control of film cooling 5066

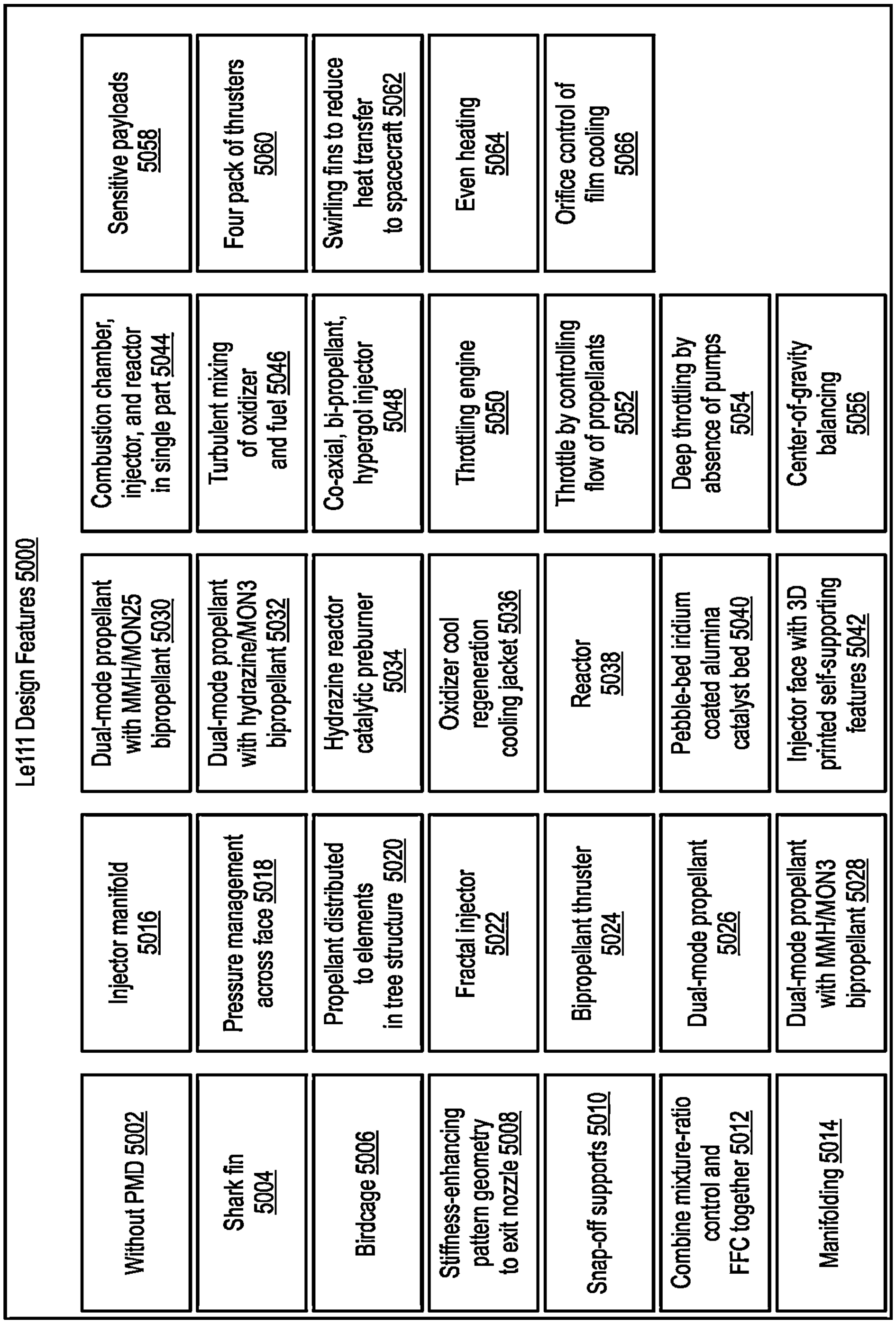

FIG. 50

Other Design Features 5500

Hydrazine monopropellant thruste having an iridium on alumina oxide pebble bed reactor and having a dual-seat hydrazine solenoid valve 5502

Thruster with integrated electric heaters to warm catalyst 5504

Bipropellant thruster that reaches 90% of thrust within 5ms of receipt of electrical command 5506

Chamber/nozzle with ceramic silicide coating 5508 ridium-lined rhenium combustion chamber/nozzle 5510

Heavyweight molybdenum TMZ alloy chambers 5512

Axially paired divert module thruster orientation 5514

Persistent maneuver capability 5516

Dual mode propellant MON3/M20 5518

All internal features self-supporting 5520

Delta-V Module 5522

Gold-plated Inconel hot-gas seal 5524

High resistance thermal conduction pathways integrated into additively manufactured components 5526

Floating injector 5528

Turbulence generators to enhance gas-heat transfer 5530

On spacecraft active propellant utilization 5532

Full authority digital engine controller (FADEC) 5534

Thrust level, thrust vector – and the engine figures out how to do that on its own 5536

Printed integral instrumentation ports 5538

Printed and integral Instrumentation ports with impression fittings 5540

3D printed hot wall welded thermocouple port 5542

Compliant hot wall structure 5544

Multiple phases of heat transfer 5546

Printed integral thrust take-up structures on the engine 5548

Using power supply from electrical system as the power supply for a chemical thruster 5550

Chemical as an anode for an electric propulsion system 5552

Control base charge of space Vehicle and do frequency suppression of the power supply 5554

Add silicon oil to propellant 5556

Add siloxane to propellants 5558

Add tetrathyl orthosilicate to propellants 5560

Propellant pressurization 5562

Oxidation-resistant layer printed in chamber 5564

Valves with electrically insulating material and thermally conducting material 5566

Pressure vessels with impermeable material wrapped in high tensile modulus material 5568

Multi-phase ejectors 5570

Nitrous ejector 5572

IR camera 5574

Vibrational mode interruption with additively printed support structures in nozzle 5576

Dual seal piston tank 5578

Triple seal 5580

Moonroof on thruster 5582

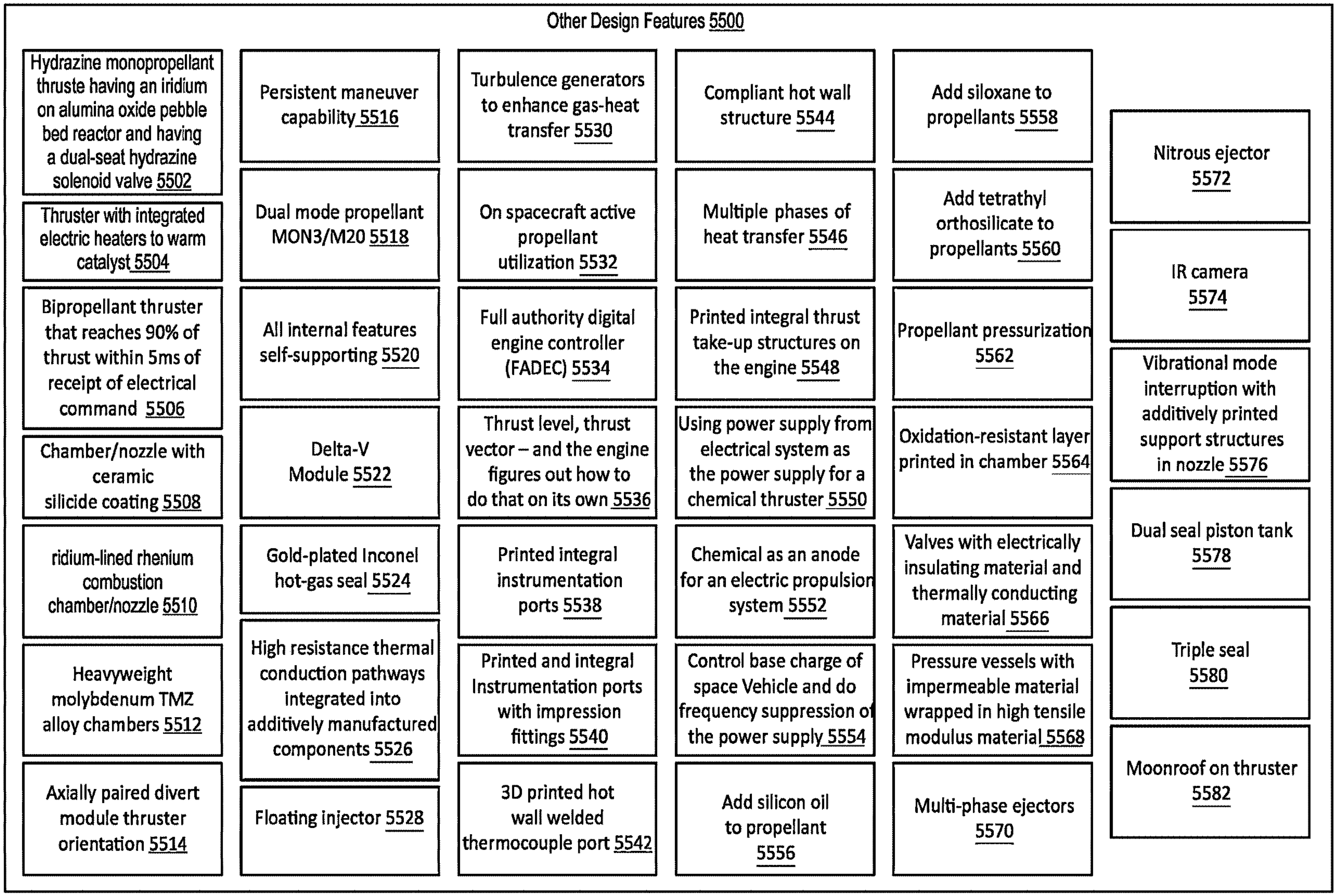

FIG. 55

Setting profile tolerances 8100

Integrated instrumentation 8200

Embedding instrumentation in system as it is being printed 8202

Printing around the instrumentation 8204

Other Enabled Mission Types 9300

Commercial 9302
On-orbit servicing 9304
Small geosynchronous satellite 9306
Smaller spacecraft design 9308
On-orbit logistics 9310
In-orbit modifications/upgrades 9312
Orbital MRO 9314
Debris removal 9316
Jetpack 9318
Dead space vehicles 9320
Resource mining 9322

SYSTEMS AND METHODS FOR DESIGN, MANUFACTURE, AND TEST OF SPACE THRUSTER PROPULSION SYSTEMS

CROSS-REFERENCE TO RELATED APPLICATIONS

This application claims the benefit of priority to the following U.S. Provisional Patent Applications: Ser. No. 63/238,436, filed Aug. 30, 2021; Ser. No. 63/248,745, filed Sep. 27, 2021; Ser. No. 63/278,331, filed Nov. 11, 2021; Ser. No. 63/278,796, filed Nov. 12, 2021; Ser. No. 63/307,716, filed Feb. 8, 2022, Ser. No. 63/316,134, filed Mar. 3, 2022; Ser. No. 63/316,709, filed Mar. 4, 2022; Ser. No. 63/325,832, filed Mar. 31, 2022; Ser. No. 63/350,056, filed Jun. 8, 2022; and Ser. No. 63/401,337, filed Aug. 26, 2022. Each of the above applications is hereby incorporated by reference in its entirety as if fully set forth herein.

FIELD

The present disclosure relates to space propulsion for space vehicles, and more particularly to space vehicles with additively manufactured hypergolic rocket engines.

BACKGROUND

Conventional space engine design and development may take years to complete. A new space age is underway in which space missions of unprecedented diversity are proliferating across defense, research, and commercial use cases. This proliferation is driving a need for greater speed and agility in the development of mission-specific propulsion systems.

SUMMARY

The disclosed methods, systems, and kits provide the ability to deliver entire clean sheet designs from concept to first hot fire in under six weeks with instant specific impulses above 330 seconds in some of our engines. In examples, thrusters can be delivered that are at less than half of the mass budget allowable for them and the can be delivered in weeks.

It will be appreciated in light of the disclosure that there are extraordinary benefits in the ability to tightly integrate many designs, their manufacture, and the respective test capabilities. In these examples, it can be shown possible to design, manufacture, test, analyze, and iterate again, in a matter of days, not weeks or months. And the yield is lower mass, higher performance, lower cost.

It will be appreciated in light of the disclosure that the design space that opens up with additive manufacturing is orders of magnitude more than what is available with conventional machining. The overriding goal is propulsion efficiency.

In examples, additive manufacturing can be deployed with powders as fine as 10 microns providing the ability to create passageways, water flow channels, propelled flow channels, recirculation regenerative cooling capabilities and jackets that were not possible with conventional manufacturing techniques.

In many examples, the test stand enables perform flight like environments testing on integrated propulsion systems. By way of these examples, the test stand provides the platform to analyze not just the thrusters, but also the tanks, valves, isolation systems, the entire stack of components that will be going on spacecraft to be tested in a space like environment here on earth. In examples, the test stand provides the ability to do vacuum testing, to do incredibly fast data rates and incredibly precise data collection and the ability to change the temperatures of the propellants currently being used. It will be appreciated in light of the disclosure that the test stand's ability to measure the specific impulse of a thruster pulse, which is only five milliseconds long, is something that no other conventional test stands can offer.

It will be appreciated in light of the disclosure that such teachings enable never before seen missions in that thrusters can be deployed that have impulse bits sufficient to do rendezvous and proximity operations on small satellites, with the performance to do repeated geostationary transfers and cis lunar maneuvers, and that can accommodate thermal environments that would previously have destroyed thrusters of a lesser make. This extends to qualification and production because of its accuracy accelerating the development cycle and then move very quickly into qualifying the design while providing mission directors repeatable, bankable, quality and procedures that lead to completed timelines, quality products, and lower cost.

To achieve mission success, all aspects of the propulsion design cycle are accelerated. The acceleration applies to topological and material design, rapid part production through proprietary additive manufacturing methods; testing and simulation in large-scale systems that simulate all aspects of mission conditions; and design iteration involving intelligence and analytic capabilities driven by an unprecedented granularity of sensing.

The resulting systems deliver higher performance, reduced mass, lower cost-of-flight, and precise tuning to mission requirements for the full space of mission types.

Additive Manufacturing Summary

According to some aspects of the present disclosure, a method of manufacturing a rocket is disclosed including additively manufacturing a combustion chamber, additively manufacturing an injector that is integrally coupled with the combustion chamber; and additively manufacturing propellant management structures that are integrally coupled with the injector and the combustion chamber.

In some embodiments, the method further includes additively manufacturing a nozzle that is integrally coupled with the combustion chamber. In some embodiments, the method further includes additively manufacturing a catalyst that is integrally coupled with a wall of the combustion chamber. In some embodiments, additively manufacturing the catalyst in the method includes additively manufacturing the catalyst based on maximizing a surface area of the catalyst based on a substantially smooth wall and a feature resolution of a machine used to additively manufacture the catalyst. In some embodiments, additively manufacturing the catalyst in the method includes additively manufacturing the catalyst as a feature with a dimension of about 10 nanometers.

In some embodiments, additively manufacturing at least one of the combustion chamber, the injector, and the propellant management structures in the method includes additively manufacturing using a nickel alloy. In some embodiments, additively manufacturing at least one of the combustion chamber, the injector, and the propellant management structures in the method includes additively manufacturing using niobium C103. In some embodiments, additively manufacturing at least one of the combustion chamber, the injector, and the propellant management structures include additively manufacturing using a cobalt chrome alloy. In some embodiments, additively manufacturing at least one of the combustion chamber, the injector, and the propellant management structures include additively manufacturing the combustion chamber using a molybdenum alloy. In some embodiments, additively manufacturing at least one of the combustion chamber, the injector, and the propellant management structures include additively manufacturing the combustion chamber using a rhenium alloy, the method further comprising lining the combustion chamber with at least one layer of iridium.

In some embodiments, the method further includes additively manufacturing seals between components of the rocket. In some embodiments, the method further includes additively manufacturing seal glands for the seals. In some embodiments, the method further includes additively manufacturing a hot-gas metal seal between the combustion chamber and injector.

In some embodiments, the additively manufacturing at least one of the combustion chamber, the injector, and the propellant management structures include forming fine features having dimensions configured to cause the propellant to transition from a liquid phase to a gas phase prior to combustion to promote propellant mixing under a predetermined standard operation of the rocket. In some embodiments, the method further includes forming fine features for a rocket fuel and forming fine features for an oxidizer, where forming fine features for the rocket fuel is based on a phase transition requirement of the rocket fuel and forming fine features for the oxidizer is based on a phase transition requirement of the oxidizer. In some embodiments, forming fine features includes forming injector elements having an aperture dimension of less than one-hundredth of an inch to improve propellant atomization, reduce local bed loading, restrict quenching in an induction zone, and limit hot spots between the injector elements to lower injector face maximum temperatures.

In some embodiments, additively manufacturing the propellant management structures includes forming propellant tubing in a honeycomb shape disposed proximate the combustion chamber to transfer heat from the combustion chamber to the propellant during propellant flow in a predetermined standard operation of the rocket. In some embodiments, additively manufacturing the propellant management structures includes forming propellant tubing using materials selected to have a thermal effusivity that heats the propellant and cools the combustion chamber to promote transition of the propellant to a gas phase during a predetermined standard operation of the rocket. In some embodiments, the method further includes dispersing ceramic particles in a metal matrix for high temperature strength while additively manufacturing. In some embodiments, additively manufacturing further includes additively manufacturing with refractory metals.

In some embodiments, the method further includes adjusting a porosity of the rocket based on a proximity to a chamber wall of the combustion chamber. In some embodiments, the method further includes additively manufacturing disfavored thermal conduction pathways within at least one of the combustion chamber, the injector, and the propellant management structures, where the disfavored thermal conduction pathways have a thermal resistance that is higher than a thermal resistance of a remainder of the at least one of the combustion chamber, the injector, and the propellant management structures that is not part of the disfavored thermal conduction pathways for directing heat transfer in the rocket.

In some embodiments, the method further includes additively manufacturing embedded instrumentation that is integrally coupled with the rocket. In some embodiments, additively manufacturing at least one of the combustion chamber, the injector, and the propellant management structures include integrally forming instrument ports configured to receive instrumentation components. In some embodiments, additively manufacturing at least one of the combustion chamber, the injector, and the propellant management structures include integrally forming tube stubs configured to receive at least one of Ground Support Equipment (GSE) components and thruster components.

In some embodiments, additively manufacturing at least one of the combustion chamber, the injector, and the propellant management structures include additively manufacturing the injector. In some embodiments, additively manufacturing the injector includes forming injection elements normal to a face of the injector. In some embodiments, additively manufacturing the injector includes forming baffles with exits normal to a face of the injector, wherein the baffles are configured to dampen acoustics in the rocket. In some embodiments, additively manufacturing the injector includes forming injector elements with integral vorticity generators.

In some embodiments, additively manufacturing at least one of the combustion chamber, the injector, and the propellant management structures include additively manufacturing the injector and additively manufacturing the combustion chamber, where additively manufacturing the injector includes forming the injector in a dome shape, and where additively manufacturing the combustion chamber includes forming the combustion chamber in a spherical shape and forming baffles on walls of the combustion chamber.

High Performance Hypergolic Summary

According to some aspects of the present disclosure, a hypergolic rocket engine is disclosed comprising: an injector defining a set of early igniter elements and a set of sequenced igniter elements; and a propellant management structure integrally coupled with the injector and defining a sequenced ignition flow path and an early ignition flow path, where the sequenced ignition flow path is configured to direct propellant from a propellant source to the sequenced igniter elements, and where the early ignition flow path is configured to direct the propellant from the propellant source to reach the early igniter elements before the propellant reaches the set of sequenced igniter elements through the sequenced ignition flow path to create an early ignition from the set of early igniter elements. In some embodiments, the propellant management structure biases the propellant to move through the sequenced ignition flow path and the early ignition flow path at least in part using a surface tension of the propellant.

In some embodiments, the hypergolic rocket engine is configured to operate in either of a two propellant mode and a single propellant mode. In some embodiments, the rocket engine is configured for stable combustion with monelmythelhydrazine as a propellant at a temperature of about −40 degrees Celsius.

In some embodiments, the hypergolic rocket engine further includes a heat exchanger and a combustion chamber, where the heat exchanger is thermally coupled to the combustion chamber and the propellant management structure to pre-heat the propellant. In some embodiments, the propellant management structure defines fins configured to induce turbulent flow of the propellant for promoting heat exchange between the combustion chamber and the propellant. In some embodiments, the heat exchanger is integrally coupled with the propellant management structure. In some embodiments, the heat exchanger defines at least one of the early ignition flow path and the sequenced ignition flow path in a honeycomb shape. In some embodiments, the heat exchanger and the propellant management structure are configured to cause a phase transition from a liquid to a gas of the propellant. In some embodiments, the propellant includes an oxidizer and a fuel, and where the heat exchanger and the propellant management structure are configured to cause the phase transition for both the oxidizer and the fuel.

In some embodiments, the hypergolic rocket engine further includes a combustion chamber and a nozzle each including a Niobium C103 material. In some embodiments, the chamber and the nozzle each include a ceramic silicide coating. In some embodiments, the hypergolic rocket engine is configured to achieve a specific impulse greater than 330 seconds. In some embodiments, the hypergolic rocket engine is configured to achieve an impulse bit repeatability of less than 5% variation.

In some embodiments, the injector has an injector face and the injector further defines a plurality of baffles extending from the injector face to form resonance cavities that interrupt longitudinal acoustic modes, radial acoustic modes, and tangential acoustic modes of the hypergolic rocket engine.

In some embodiments, the hypergolic rocket engine further includes a combustion chamber and a set of redundant pressure transducers installed on the combustion chamber to facilitate closed loop throttle control and engine health monitoring. In some embodiments, the injector has a coaxial injection structure for injecting a fuel and an oxidizer of the propellant. In some embodiments, the hypergolic rocket engine further includes a combustion chamber and a gold-plated nickel chromium alloy hot-gas seal disposed between the injector and the combustion chamber. In some embodiments, the hypergolic rocket engine further includes a combustion chamber, where the combustion chamber defines radiative heat fins extending away from the combustion chamber. In some embodiments, the hypergolic rocket engine further includes a first combustion chamber and a second combustion chamber, where the first combustion chamber is configured to direct combusted propellant into the second combustion chamber.

In some embodiments, the hypergolic rocket engine further includes a combustion chamber and a twist and cam assembly configured to couple the combustion chamber to the injector. In some embodiments, the combustion chamber is further coupled to the injector with a tack weld. In some embodiments, the injector has a branching structure with fractal injector elements. In some embodiments, the branching structure is configured to resist instability from low-frequency feed system coupling. In some embodiments, the branching structure is configured to minimize dead volume for a predetermined propellant flow rate by increasing manifold velocities. In some embodiments, the hypergolic rocket engine has a minimum impulse bit of less than 0.2 N-s. In some embodiments, the hypergolic rocket engine is sized to produce about 111N of thrust with over 300 seconds specific impulse.

In some embodiments, the hypergolic rocket engine has a minimum impulse bit of less than 0.1 N-s. In some embodiments, the hypergolic rocket engine is sized to produce about 22N of thrust with over 290 second specific impulse. In some embodiments, the hypergolic rocket engine is configured for throttling from about 25% to about 130% of a predetermined design thrust.

In some embodiments, the propellant management structure and the injector are configured to operate the hypergolic rocket engine using two propellants in a dual propellant mode and using one propellant in a single propellant mode.

Design Platform and Post Processing Summary

According to some aspects of the present disclosure, a method of manufacturing a rocket is disclosed comprising: modeling a thin wall feature of an additively manufactured rocket component; modeling a pressure vessel defining a pressure port and having pressure walls based on the thin wall feature; additively, manufacturing a pressure vessel using machine settings, pressure testing the pressure vessel until at least one of leakage from or failure of the pressure vessel; and adjusting at least one of the thin wall feature or the machine settings based on the pressure testing.

In some embodiments, pressure testing the pressure vessel includes pressurizing the pressure vessel with helium and monitoring for helium leakage with a helium sniffer. In some embodiments, monitoring for helium leakage includes estimating a helium leak rate. In some embodiments, the method further includes measuring flow through the rocket and adjusting the pressure vessel as modeled based on the flow through the rocket.

In some embodiments, the method further includes additively manufacturing a sacrificial part for testing, where adjusting the at least one of the thin wall feature or the machine setting is further based on testing of the sacrificial part. In some embodiments, the method further includes testing the sacrificial part for chemical composition compliance with a material specification. In some embodiments, the method further includes scanning the sacrificial part using a computerized tomography (CT) process where adjusting the at least one of the thin wall feature or the machine setting is further based on scanning the sacrificial part.

In some embodiments, the method further includes additively manufacturing the additively manufactured rocket component. In some embodiments, the method further includes removing residual powder using an ultrasonic bath. In some embodiments, the method further includes heat treating the additively manufactured rocket component for stress relief. In some embodiments, the method further includes wire electrical discharge machining the additively manufactured rocket component. In some embodiments, the method further includes hot isostatic pressing (HIP) the additively manufactured rocket component. In some embodiments, the method further includes polishing the additively manufactured rocket component.

According to some aspects of the present disclosure, a test platform for a rocket engine is disclosed comprising: a vacuum test cell configured to evacuate air from an interior of the vacuum test cell; a test stand configured to move into and out of the vacuum test cell for at least one of cold-fire or environmental testing; an injector coupled with the test stand; a modular throat selectively coupled with the injector; a modular nozzle selectively coupled with the modular throat; a plurality of sensors operably coupled with at least one of the vacuum test cell, the test stand, the injector, the modular throat, or the modular nozzle; and a data acquisition and control system operably coupled with the plurality of sensors to capture data during operation of the test platform.

In some embodiments, the test platform further includes at least one vacuum reservoir configured to maintain a vacuum in the vacuum test cell during a predetermined outgassing of the rocket engine. In some embodiments, the at least one vacuum reservoir includes a first vacuum bank and a second vacuum bank each selectively pneumatically coupled with the vacuum test cell, where the first vacuum bank encloses a first volume at a first pressure and the second vacuum bank encloses a second volume at a second pressure, and where the first pressure is lower than an atmospheric pressure and the second pressure is lower than the first pressure. In some embodiments, the test platform further includes a vacuum control system having pressure valves disposed between the vacuum test cell and at least one of the first vacuum bank or the second vacuum bank, where the vacuum control system is configured to operate the pressure valves to maintain a predetermined test pressure in the vacuum test cell with a predetermined precision.

In some embodiments, the test platform further includes a propellant delivery system configured to be coupled to the test stand within the vacuum test cell to closely couple the propellant delivery system to the rocket engine during testing. In some embodiments, the propellant delivery system is configured to deliver customized propellant compositions based on a predetermined test requirement.

In some embodiments, the test platform further includes a propellant temperature control system configured to at least one of heat or cool a propellant for testing. In some embodiments, the propellant temperature control system is configured to control a temperature of the propellant to be as low as −50° F. and as high as 160° F. during testing. In some embodiments, the test platform further includes a digital twin system having at least one processor programmed to generate a set of digital twins based on data collected by the data acquisition and control system.

In some embodiments, the injector has a domed face to evaluate shapes for containing acoustics. In some embodiments, the data acquisition and control system has at least one processor programmed to measure thrust and impulse from the plurality of sensor during system hot fire. In some embodiments, the processor of the data acquisition and control system is programmed to collect real time propellant mass flow measurement and coupled structural and feed system response from the plurality of sensors. In some embodiments, the processor of the data acquisition and control system is programmed to gather a profile of random combustion vibration inputs from the thrusters at a vehicle level. In some embodiments, the processor of the data acquisition and control system is programmed to simulate the profile of random vibration inputs during subsequent cold-fire system tests of navigational and sensor systems.

In some embodiments, the plurality of sensors is configured to measure a specific impulse of a thruster pulse at 5 ms length. In some embodiments, the data acquisition and control system includes a set of inputs with over 200 analog data acquisition channels. In some embodiments, the set of inputs supports 2 MHz simultaneous sampling.

In some embodiments, the test platform further includes a feed system configured for 0.05% flow accuracy for stringent performance evaluation. In some embodiments, the feed system is configured for transient & pulse mode flow measurement of about 1 ms. In some embodiments, the test platform further includes a propellant feed line with a direct path of about 35" length.

In some embodiments, the plurality of sensors is configured to resolve flow measurements to 0.15 μL. In some embodiments, the plurality of sensors includes an accelerometer configured to be mounted on a valve body.

Mission Agility Summary

According to some aspects of the present disclosure, a space vehicle is disclosed comprising: a load securement component to at least one of receive or release objects in space; a hypergolic rocket engine having a minimum thrust, a responsiveness, and a pulse repeatability configured for in-space transfers and orbit manipulation of the objects. In some embodiments, the minimum thrust, the responsiveness, and the pulse repeatability are suitable for at least one of orbit transfers, last space mile delivery, lunar delivery, space manufacturing logistics, space debris management, sample return from space, satellite servicing, space hazard avoidance, or space maneuvering for sustainable energy.

In some embodiments, the space vehicle further includes a propellant tank with refill features configured to facilitate in-space loading of a propellant into the propellant tank. In some embodiments, the hypergolic rocket engine includes a plurality of components and at least one integrated seal between adjacent components of the plurality of components.

In some embodiments, the space vehicle further includes a mission control system including a processor programmed to command the rocket engine to push the space vehicle into a destruction path in which the space vehicle will be destroyed to facilitate end of life management of the space vehicle. In some embodiments, the processor is programmed to command the rocket engine to push the space vehicle into an atmosphere on the destruction path.

In some embodiments, the space vehicle further includes a mission control system including a processor programmed to: command the rocket engine to bring the space vehicle within an operating range of an in-space low gravity manufacturing facility; and operate the load securement component to transfer the object between the space vehicle and the in-space low gravity manufacturing facility.

In some embodiments, the space vehicle further includes a mission control system including a processor programmed to: command the rocket engine to bring the space vehicle within an operating range of a resupply source facility in orbit; operate the load securement component to load the object to the space vehicle as a resupply object; command the rocket engine to bring the space vehicle within an operating range of a resupply destination facility in space; and operate the load securement component to load the resupply object to the resupply destination facility to resupply the resupply destination facility. In some embodiments, the processor is further programmed to deliver satellites from low orbit to higher altitude orbit. In some embodiments, the processor is further programmed to perform at least one of in-orbit modifications or in-orbit upgrades. In some embodiments, the processor is further programmed to actively remove space debris. In some embodiments, the processor is further programmed to deliver fuel in orbit. In some embodiments, the processor is further programmed to execute a kick stage for range extension of launch vehicles after the launch vehicle executes a third stage. In some embodiments, the processor is further programmed to propel non-Earth material samples into low energy return trajectory. In some embodiments, the space vehicle further includes ablative shielding and the processor is further programmed to use litho-braking.

Positive Displacement Tank Summary

According to some aspects of the present disclosure, a positive displacement propellant tank for a space vehicle is disclosed comprising: a barrel having a first end and a second end: a first dome coupled with the barrel at the first end; a second dome coupled with the barrel at the second end; a piston disposed within the barrel and translatable between the first dome and the second dome to define a propellant cavity and a displacement cavity; a first polytetrafluoroethylene (PTFE) seal slidingly sealing the piston to the barrel to restrict propellant leakage from the propellant cavity to the displacement cavity; and a second PTFE seal slidingly sealing the piston to the barrel to restrict propellant leakage from the propellant cavity to the displacement cavity, wherein the second PTFE seal is in a series sealing arrangement with the first PTFE seal.

In some embodiments, the positive displacement propellant tank further includes a refueling port configured to receive propellant into the propellant cavity while in space after at least partial exhaustion of the propellant for propelling the space vehicle.

In some embodiments, the barrel is a machined wrought titanium pipe. In some embodiments, the barrel includes ribs and stringers topologically optimized to control tank stiffness based on a highly dynamic predetermined operational environment. In some embodiments, an interior is honed without heat and welding variations by being honed after the first barrel-dome weld to achieve fine surface finishes and run-out control. In some embodiments, the piston is a machined plate and includes two seal glands and an optimized geometry for minimizing propellant residuals. In some embodiments, the second dome is a closeout dome welded in in an inverted direction to reduce the amount of tank ullage and conserve pressurant gas.

In some embodiments, the first dome and the second dome have integral tube stubs. In some embodiments, the positive displacement propellant tank further includes a propulsion feed system, where the integral tube stubs are welded directly into the propulsion feed system.

In some embodiments, at least one of the first dome, the second dome, or the barrel includes directly machined mechanical interface features to provide lightweight and high reliability mechanical connections with low added labor. In some embodiments, the barrel, the piston, the first dome, and the second dome are configured to interact to eliminate propellant slosh.

In some embodiments, the positive displacement propellant tank further includes reusability features for promoting reuse of the propellant tank. In some embodiments, the first PTFE seal and the second PTFE seal are spring energized in a doubly redundant arrangement. In some embodiments, at least one of the first PTFE seal and the second PTFE seal is seal tempered to control crystallinity and to improve sealing performance and strength over untampered seals.

In some embodiments, the piston is a contoured piston with 98% expulsion efficiency. In some embodiments, the positive displacement propellant tank has no more than a 2 psi pressure drop across the piston. In some embodiments, the positive displacement propellant tank further includes piston rotation restriction features. In some embodiments, the piston rotation restriction features are part of at least one of the first PTFE seal and the second PTFE seal.

In some embodiments, at least one of the barrel, the first dome, or the second dome is a Ti-6Al-4V titanium material. In some embodiments, the Ti-6Al-4V titanium material of the at least one of the barrel, the first dome, or the second dome is E-beam welded to another of the least one of the barrel, the first dome, or the second dome.

BRIEF DESCRIPTION OF THE DRAWINGS

The present disclosure will become more fully understood from the detailed description and the accompanying drawings.

FIG. 11 is a schematic illustrating an example environment of a test environment data acquisition system according to some embodiments of the present disclosure.

FIG. 12 is a schematic illustrating an example environment of test stand software systems and subsystems according to some embodiments of the present disclosure.

FIG. 19 is a schematic illustrating an example environment of an ML/AI system for test environment optimization according to some embodiments of the present disclosure.

FIG. 20 is a schematic illustrating an example environment of an ML/AI system for optimization of space propulsion system design according to some embodiments of the present disclosure.

FIG. 21 is a schematic illustrating an example environment of a system of ML/AI for prediction according to some embodiments of the present disclosure.

FIG. 22 is a schematic illustrating an example environment of a system of robotics and automation according to some embodiments of the present disclosure.

FIG. 23 is a schematic illustrating an example environment of a system of high-performance computing for test environment optimization according to some embodiments of the present disclosure.

FIG. 24 is a schematic illustrating an example environment of a system of high-performance computing for optimization of space propulsion system design according to some embodiments of the present disclosure.

FIG. 25 is a schematic illustrating an example environment of a test platform as a digital/physical twin of spacecraft according to some embodiments of the present disclosure.

FIG. 26 is a schematic illustrating an example environment of a 3D printed propulsion system according to some embodiments of the present disclosure.

FIG. 31 is a schematic illustrating an example environment of a system of facilitation of ignition for space propulsion according to some embodiments of the present disclosure.

FIG. 32 is a schematic illustrating an example environment of a system of improved seals for space propulsion according to some embodiments of the present disclosure.

FIG. 33 is a schematic illustrating an example environment of a system of injector design features according to some embodiments of the present disclosure.

FIG. 42 is a schematic illustrating an example environment of a system of valve design features according to some embodiments of the present disclosure.

FIG. 43 is a schematic illustrating an example environment of a system of tank design features according to some embodiments of the present disclosure.

FIG. 44 is a schematic illustrating an example environment of a system of combustion acoustics-damping/management features according to some embodiments of the present disclosure.

FIG. 45 is a schematic illustrating an example environment of a system of hypergolic propulsion design features according to some embodiments of the present disclosure.

FIG. 50 is a schematic illustrating an example environment of a system of LE111 design feature according to some embodiments of the present disclosure.

FIG. 55 is a schematic illustrating an example environment of a system of other design features according to some embodiments of the present disclosure.

FIG. 6O is a schematic illustrating an example environment of a system of FADEC integration according to some embodiments of the present disclosure.

FIG. 126 is a cross-section view of an example of a 111 Newton thruster according to some embodiments of the present disclosure.

FIG. 127 is a perspective view of an example of a 333 Newton thruster according to some embodiments of the present disclosure.

FIG. 128 is a perspective view of an example of a 445 Newton thruster according to some embodiments of the present disclosure.

FIG. 129 is a perspective view of an example of a 2224 Newton thruster according to some embodiments of the present disclosure.

FIG. 130 is a perspective view of an example of a 4003 Newton thruster according to some embodiments of the present disclosure.

FIG. 131 is a perspective view of an example of a thruster tri-pack according to some embodiments of the present disclosure.

FIG. 132 is a perspective view of an example of a thruster four pack according to some embodiments of the present disclosure.

FIG. 133 is a perspective view of an example of a lunar sample return vehicle according to some embodiments of the present disclosure.

FIG. 134 is a schematic of an example of a plumbing and instrumentation diagram for the lunar sample return vehicle of FIG. 133 according to some embodiments of the present disclosure.

FIG. 135 is a cutaway view of an example of a 3 U sized propulsion system according to some embodiments of the present disclosure.

FIG. 136 is a schematic of an example of a plumbing and instrumentation diagram for the 3 U sized propulsion system of FIG. 135 according to some embodiments of the present disclosure.

DETAILED DESCRIPTION

Introduction

In the various embodiments disclosed and in accordance with numerous examples provided herein, it can be shown that capabilities described herein can support entire clean sheet designs from concept to first hot fire in under six weeks. In these examples, there can be instant specific impulses above 330 seconds. In these examples, thrusters can be additively manufactured that are at less than half of the mass budget allowance. It will be appreciated in light of the disclosure that tremendous benefit can be obtained from the ability to tightly integrate the design, manufacture, and test capabilities so that it is possible to design, manufacture, test, analyze, and iterate again, in a matter of days, not weeks or months. And the yield is lower mass, higher performance, lower cost. It will be appreciated in light of the disclosure that the design space that opens up with additive is orders of magnitude more than what is available with conventional machining. With that in mind, one of the overriding goals in the design is propulsion efficiency.

System for Space Propulsion Design, Manufacturing, and Testing

Figure 1:
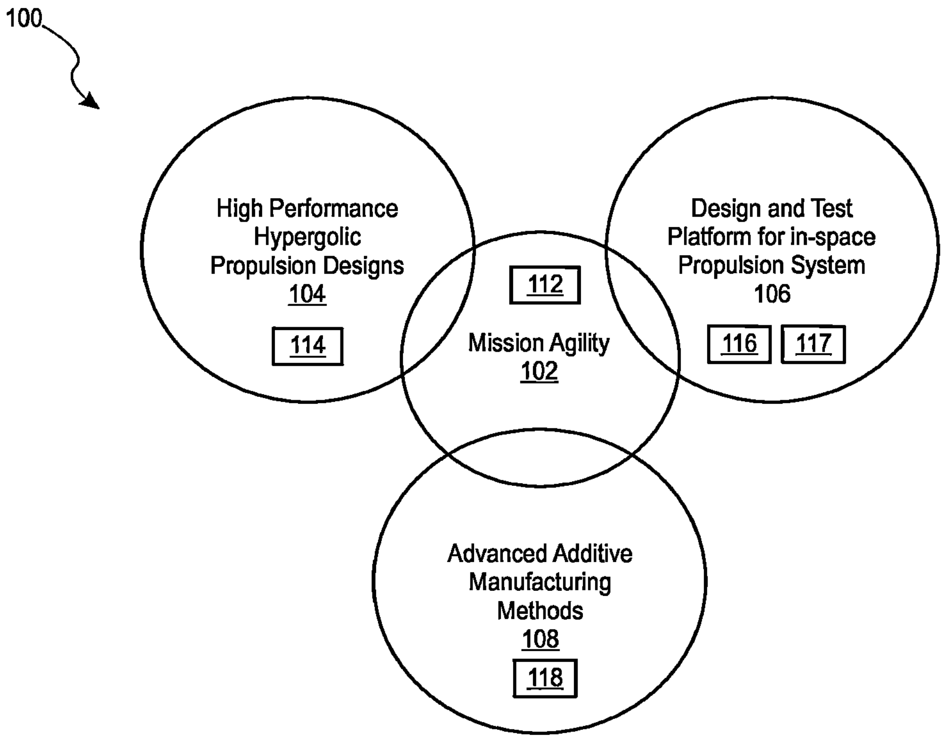
FIG. 1 is a schematic illustrating an example environment of a space thruster propulsion system according to some embodiments of the present disclosure.

FIG. 1 is a schematic illustrating an example environment of a space thruster propulsion system 100 according to some embodiments of the present disclosure. The space thruster propulsion system 100 includes a mission agility system 102, a high-performance hypergolic propulsion system 104, a design and test platform 106 for in-space propulsion, and an advanced additive manufacturing methods system 108. The cooperation and combination of the three work to provide myriad benefits all of which can be in the form of mission agility system at 102. In providing the mission agility system at 102, the cooperation and combination of the high-performance hypergolic propulsion designs 104, the design and test platform for in-space propulsion systems 103, and the advanced additive manufacturing methods 108 can be organized into multiple offerings and components thereof, as shown with reference to FIG. 2 at 200, including platforms and components 202, design and function 206, additive manufacturing and materials 204, and mission agility and high-level spacecraft systems 208.

Mission Agile Space Vehicle Example

In some embodiments, the mission agility system 102 includes a mission agile space vehicle 112. The mission agile space vehicle 112 includes a load securement component and a hypergolic rocket engine. The load securement component has features to at least one of receive or release objects in space. For example, the load securement components may include a robotic arm, a cargo hold, a retractable clamp, or other suitable features to secure objects in space.

The hypergolic rocket engine has a minimum thrust, a responsiveness, and a pulse repeatability configured for in-space transfers and orbit manipulation of the objects. In some embodiments, the minimum thrust, the responsiveness, and the pulse repeatability are suitable for at least one of orbit transfers, last space mile delivery, lunar delivery, space manufacturing logistics, space debris management, sample return from space, satellite servicing, space hazard avoidance, or space maneuvering for sustainable energy.

In some embodiments, the mission agile space vehicle 112 includes a propellant tank with refill features configured to facilitate in-space loading of a propellant into the propellant tank. For example, the refill features may be a propellant intake port and a reusable piston feature.

In some embodiments, the hypergolic rocket engine includes a plurality of components and at least one integrated seal between adjacent components of the plurality of components. For example, the integrated seal may be integrally formed or enclosed during an additive printing process.

In some embodiments, the mission agile space vehicle 122 includes a mission control system including a processor programmed to command the rocket engine to push the space vehicle into a destruction path in which the space vehicle will be destroyed to facilitate end of life management of the space vehicle. For example, the processor may be programmed to command the rocket engine to push the space vehicle into an atmosphere on the destruction path.

In some embodiments, the mission agile space vehicle 112 includes a mission control system including a processor programmed to command the rocket engine to bring the space vehicle within an operating range of an in-space low gravity manufacturing facility and to operate the load securement component to transfer the object between the space vehicle and the in-space low gravity manufacturing facility. For example, the mission agile space vehicle 112 may deliver raw materials or energy (e.g., fuel, charged batteries, etc.) and/or may retrieve the product manufactured by the low gravity manufacturing facility.

In some embodiments, the mission agile space vehicle 112 includes a mission control system including a processor programmed to command the rocket engine to bring the space vehicle within an operating range of a resupply source facility in orbit: operate the load securement component to load the object to the space vehicle as a resupply object; command the rocket engine to bring the space vehicle within an operating range of a resupply destination facility in space; and operate the load securement component to load the resupply object to the resupply destination facility to resupply the resupply destination facility.

In some embodiments, the processor is further programmed to deliver satellites from low orbit to higher altitude orbit. In some embodiments, the processor is further programmed to perform at least one of in-orbit modifications or in-orbit upgrades. In some embodiments, the processor is further programmed to actively remove space debris. In some embodiments, processor is further programmed to deliver fuel in orbit. In some embodiments, the processor is further programmed to execute a kick stage for range extension of launch vehicles after the launch vehicle executes a third stage. In some embodiments, the processor is further programmed to propel non-Earth material samples into low energy return trajectory. For example, the mission agile space vehicle 112 may include ablative shielding and the processor may be further programmed to use lithobraking.

Hypergolic Rocket Engine Example

In some embodiments, the high-performance hypergolic propulsion system 104 includes a hypergolic rocket engine 114. The hypergolic rocket engine includes an injector and a propellant management structure. The injector defines a set of early igniter elements and a set of sequenced igniter elements. The propellant management structure is integrally coupled with the injector and defines a sequenced ignition flow path and an early ignition flow path. The sequenced ignition flow path is configured to direct propellant from a propellant source to the sequenced igniter elements. The early ignition flow path is configured to direct the propellant from the propellant source to reach the early igniter elements before the propellant reaches the set of sequenced igniter elements through the sequenced ignition flow path to create an early ignition from the set of early igniter elements.

In some embodiments, the propellant management structure biases the propellant to move through the sequenced ignition flow path and the early ignition flow path at least in part using a surface tension of the propellant. For example, the propellant management structure may have a capillary action design in which the surface tension and adhesive forces between the propellant and walls of the propellant management structure urge the propellant along the flow path.

In some embodiments, the hypergolic rocket engine 114 is configured to operate in either of a two propellant mode and a single propellant mode. For example, the hypergolic rocket engine may operate in the two propellant mode while two propellants are present or when mission requirements indicate two propellants should be used. In another example, the hypergolic rocket engine 114 may operate in the single propellant mode when one propellant is exhausted or when one propellant may become exhausted and the mission requirements do not indicate the two propellant mode is required. In some embodiments, the propellant management structure and the injector are configured to operate the hypergolic rocket engine using two propellants in a dual propellant mode and using one propellant in a single propellant mode.

In some embodiments, the hypergolic rocket engine is configured for stable combustion with MMH monomethylhydrazine as a propellant at a temperature of about −40 degrees Celsius.

In some embodiments, the hypergolic rocket engine 114 further includes a heat exchanger and a combustion chamber. The heat exchanger is thermally coupled to the combustion chamber and the propellant management structure to pre-heat the propellant.

In some embodiments, the propellant management structure defines fins configured to induce turbulent flow of the propellant for promoting heat exchange between the combustion chamber and the propellant. In some embodiments, the heat exchanger is integrally coupled with the propellant management structure.

In some embodiments, the heat exchanger defines at least one of the early ignition flow path and the sequenced ignition flow path in a honeycomb shape. For example, a cross sectional shape of a passageway through which the propellant flows may be a hexagonal shape. In some embodiments, the cross sectional shape may be pentagonal, heptagonal, octagonal, nonagonal, or decagonal.

In some embodiments, the heat exchanger and the propellant management structure are configured to cause a phase transition from a liquid to a gas of the propellant. In some embodiments, the propellant includes an oxidizer and a fuel and the heat exchanger and the propellant management structure are configured to cause the phase transition for both the oxidizer and the fuel.

In some embodiments, the hypergolic rocket engine 114 further includes a combustion chamber and a nozzle each including a Niobium C 103 material. In some embodiments, the chamber and the nozzle each include a ceramic silicide coating.

In some embodiments, the hypergolic rocket engine 114 is configured to achieve a specific impulse greater than 330 seconds. In some embodiments, the hypergolic rocket engine is configured to achieve an impulse bit repeatability of less than 5% variation.

In some embodiments, the injector has an injector face and the injector further defines a plurality of baffles extending from the injector face to form resonance cavities that interrupt longitudinal acoustic modes, radial acoustic modes, and tangential acoustic modes of the hypergolic rocket engine.

In some embodiments, the hypergolic rocket engine 114 includes a combustion chamber and a set of redundant pressure transducers installed on the combustion chamber to facilitate closed loop throttle control and engine health monitoring.

In some embodiments, the injector has a coaxial injection structure for injecting a fuel and an oxidizer of the propellant.

In some embodiments, the hypergolic rocket engine 114 includes a combustion chamber and a gold-plated nickel chromium alloy hot-gas seal disposed between the injector and the combustion chamber. In some embodiments, the hypergolic rocket engine 114 includes a combustion chamber and the combustion chamber defines radiative heat fins extending away from the combustion chamber.

In some embodiments, hypergolic rocket engine 114 includes a first combustion chamber and a second combustion chamber. The first combustion chamber is configured to direct combusted propellant into the second combustion chamber. For example, the hypergolic rocket engine 114 may have a design that may be described as a rocket firing into another rocket.

In some embodiments, the hypergolic rocket engine 114 includes a combustion chamber and a twist and cam assembly configured to couple the combustion chamber to the injector. In some embodiments, the combustion chamber is further coupled to the injector with a tack weld.

In some embodiments, the injector of the hypergolic rocket engine 114 has a branching structure with fractal injector elements. For example, the branching stricture may be configured to resist instability from low-frequency feed system coupling. In another example, the branching structure may be configured to minimize dead volume for a predetermined propellant flow rate by increasing manifold velocities.

In some embodiments, the hypergolic rocket engine 114 has a minimum impulse bit of less than 0.2 N-s. In some embodiments, the hypergolic rocket engine 114 is sized to produce about 111N of thrust with over 300 seconds specific impulse.

In some embodiments, the hypergolic rocket engine 114 has a minimum impulse bit of less than 0.1 N-s. In some embodiments, the hypergolic rocket engine is sized to produce about 22N of thrust with over 290 second specific impulse.

In some embodiments, the hypergolic rocket engine 114 is configured for throttling from about 25% to about 130% of a predetermined design thrust. For example, the predetermined design thrust may be an expected typical operating point.

Design Platform Method Example

In some embodiments, the design and test platform 106 for in-space propulsion includes a design platform method 116 and a test platform 117.

In some embodiments, the design platform method 116 includes modeling a thin wall feature of an additively manufactured rocket component, modeling a pressure vessel defining a pressure port and having pressure walls based on the thin wall feature, additively manufacturing a pressure vessel using machine settings, pressure testing the pressure vessel until at least on of leakage from or failure of the pressure vessel, and adjusting at least one of the thin wall feature or the machine settings based on the pressure testing.

In some embodiments, the method 116 includes pressurizing the pressure vessel with helium and monitoring for helium leakage with a helium sniffer. In some embodiments, monitoring for helium leakage includes estimating a helium leak rate.

In some embodiments, the method 116 includes measuring flow through the rocket and adjusting the pressure vessel as modeled based on the flow through the rocket. For example, differences between predicted and measured values may serve as the basis for the adjustment.

In some embodiments, the method 116 includes additively manufacturing a sacrificial part for testing. In some embodiments, adjusting the at least one of the thin wall feature or the machine setting is further based on testing of the sacrificial part. In some embodiments, the method 116 further includes testing the sacrificial part for chemical composition compliance with a material specification. In some embodiments, the method 116 further includes scanning the sacrificial part using a computerized tomography (CT) process. For example, adjusting the at least one of the thin wall features or the machine setting may be further based on scanning the sacrificial part.

In some embodiments, the method 116 includes additively manufacturing the additively manufactured rocket component and removing residual powder using an ultrasonic bath. In some embodiments, the method 116 includes heat treating the additively manufactured rocket component for stress relief. In some embodiments, the method 116 includes wire electrical discharge machining the additively manufactured rocket component. In some embodiments, the method 116 includes hot isostatic pressing (HIP) the additively manufactured rocket component. In some embodiments, the method 116 includes polishing the additively manufactured rocket component.

Test Platform Example

In some embodiments, the test platform 117 for a rocket engine includes a vacuum test cell, a test stand, an injector, a modular throat, a modular nozzle, a plurality of sensors, and a data acquisition and control system. The vacuum test cell is configured to evacuate air from an interior of the vacuum test cell. For example, the vacuum test cell may be a pressure vessel operatively coupled with a vacuum pump.

The test stand is configured to move into and out of the vacuum test cell for at least one of cold-fire or environmental testing. The injector is coupled with the test stand. The modular throat is selectively coupled with the injector. The modular nozzle is selectively coupled with the modular throat.

The plurality of sensors is operably coupled with at least one of the vacuum test cell, the test stand, the injector, the modular throat, or the modular nozzle. The data acquisition and control system is operably coupled with the plurality of sensors to capture data during operation of the test platform.

In some embodiments, the test platform 117 includes at least one vacuum reservoir configured to maintain a vacuum in the vacuum test cell during a predetermined outgassing of the rocket engine. For example, the predetermined outgassing may be based on a predicted or previously measured outgassing during testing. In some embodiments, the at least one vacuum reservoir includes a first vacuum bank and a second vacuum bank that are each selectively pneumatically coupled with the vacuum test cell. The first vacuum bank encloses a first volume at a first pressure and the second vacuum bank encloses a second volume at a second pressure. The first pressure is lower than an atmospheric pressure and the second pressure is lower than the first pressure.

In some embodiments, a vacuum control system has pressure valves disposed between the vacuum test cell and at least one of the first vacuum bank or the second vacuum bank. The vacuum control system is configured to operate the pressure valves to maintain a predetermined test pressure in the vacuum test cell with a predetermined precision. For example, the vacuum control system may control a valve between the first vacuum bank and the test cell to maintain the predetermined test pressure during a slow outgassing event. In another example, the vacuum control system may control a valve between the second vacuum bank and the test cell to maintain the predetermined test pressure during a fast outgassing event.

In some embodiments, the test platform 117 includes a propellant delivery system configured to be coupled to the test stand within the vacuum test cell to closely couple the propellant delivery system to the rocket engine during testing. In some embodiments, the propellant delivery system is configured to deliver customized propellant compositions based on a predetermined test requirement. For example, different tests for different designs may require varying compositions and/or different ratios and flow rates to be provided by the propellant delivery system.

In some embodiments, the test platform 117 further includes a propellant temperature control system or propellant conditioning system configured to at least one of heat or cool a propellant for testing. In some embodiments, the propellant temperature control system is configured to control a temperature of the propellant to be as low as −50° F. and as high as 160° F. during testing. For example, the propellant temperature control system may include heaters, heat pumps, and/or refrigeration systems to control the temperature. In an example, the propellant temperature control system conditions the propellant between 60° F. and 90° F.

In some embodiments, the test platform 117 includes a digital twin system having at least one processor programmed to generate a set of digital tins based on data collected by the data acquisition and control system. For example, the digital twins may be digital representations of the rocket engine, the test platform, the sensors, the data acquisition and control system, the propellant delivery system, or any other physical system or digital combination of systems associated with the test platform 117.

In some embodiments, the injector of the test platform 117 has a domed face to evaluate shapes for containing acoustics.

In some embodiments, the data acquisition and control system of the test platform 117 has at least one processor programmed to measure thrust and impulse from the plurality of sensors during system hot fire. In some embodiments, the processor of the data acquisition and control system is programmed to collect real time propellant mass flow measurement and coupled structural and feed system response from the plurality of sensors. In some embodiments, the processor of the data acquisition and control system is programmed to gather a profile of random combustion vibration inputs from the thrusters at a vehicle level. In some embodiments, the processor of the data acquisition and control system is programmed to simulate the profile of random vibration inputs during subsequent cold-fire system tests of navigational and sensor systems. For example, the processor of the data acquisition and control system may command a vibration device to simulate the profile of random vibration inputs to more closely approximate hot fire testing during cold fire testing.

In some embodiments, the plurality of sensors of the test platform 117 is configured to measure a specific impulse of a thruster pulse at 5 ms length. In some embodiments, the data acquisition and control system of the test platform 117 includes a set of inputs with over 200 analog data acquisition channels. In some embodiments, the set of inputs supports 2 MHz simultaneous sampling.

In some embodiments, the test system 117 further includes a feed system configured for 0.05% flow accuracy for stringent performance evaluation. In some embodiments, the feed system is configured for transient & pulse mode flow measurement of about 1 ms (millisecond).

In some embodiments, the test platform 117 includes a propellant feed line with a direct path of about 35" length. For example, the direct path and relatively short length result in a closely coupled propellant system. The bounds of "about" the length may be determined based on the implementation details. For example, larger rocket engine accommodation may require increasing the length on the order of several inches, while smaller rocket engine accommodation may permit decreasing the length on the order of several inches.

In some embodiments, the plurality of sensors of the test platform 117 is configured to resolve flow measurements to 0.15 μL. In some embodiments, the plurality of sensors includes an accelerometer configured to be mounted on a valve body.

In embodiments, the test system 117 accommodates simple and comprehensive access to test articles for efficient test development capability. For example, the test stand allows easy thruster and propulsion system access in the Test Cell for 360 degree accessibility. The Test Cell lid is the interface between the test article and the supporting systems and allows all instrumentation and provisions for temperature conditioning to be consolidated in one compact assembly.

In embodiments, each thruster can be paired with a custom diffuser to establish required altitude levels and ensure there is no exhaust gas backflow or crosstalk during any combination of Divert or ACS firing. Altitude levels will be maintained using a gas blocker design which ensures positive inert gas flow out of the test cell and thereby eliminates the risk for exhaust backflow into the test cell. This design prevents damage to the test article and optical instruments while also cooling to the altitude system.

In embodiments, a high density data acquisition and control systems are co-located with the test article support structure, providing very close coupled connection to instrumentation. This close coupling ensures short cable runs and the capacity for high bandwidth up to ten megahertz (10 MHz) per channel, as needed. Economy of instrumentation setup and maintenance is also achieved through test cell interface where multiple hundreds of channel counts are provided for system level performance measurements of temperature, pressure, thrust, acceleration, and vehicle inertial response. The test cell accommodates high speed video coverage of each thruster along with high-speed infrared coverage of the full test article at 45-degree increments. In embodiments, special diagnostic systems are incorporated, such as autocollimators, vehicle gyro taps, radiometers, and/or point pyrometry.

In embodiments, thrust and impulse measurement during system hotfire are based on real time propellant mass flow measurement and actual coupled structural and feed system responses. Impulse and steady-state inputs from Divert translational firings are captured with a thrust system that allows sufficient motion to capture the changing vehicle inertial effects through the mission duty cycle. Within a specific frequency range, the thrust gathers the profile of random combustion vibration inputs from the thrusters at the vehicle level. These inputs can be used to program simulated random vibration inputs during subsequent cold-fire (non-hot-fire) system tests of navigational and sensor systems.

In embodiments, the integrated system has the ability to transition from hot-fire testing to environmental and cold-fire testing without breaking the configuration of instrumentation and fixturing. This is accomplished by sending the assembled test fixture to an environmental test cell that accepts the fully fixtured vehicle. In an example, an LDACS test stand utilizes mature hypergol technologies and is capable of sea level testing of up to 5000 lbf and altitude capability for engines up to 1000 lbf and can support propellant and thruster temperature conditioning from −50° F. to 160° F.

Rocket Manufacturing Method Example

In some embodiments, the additive manufacturing methods 108 include a method 118 of manufacturing a rocket. The method 118 includes additively manufacturing a combustion chamber; additively manufacturing an injector that is integrally coupled with the combustion chamber, and additively manufacturing propellant management structures that are integrally coupled with the injector and the combustion chamber.

In some embodiments, the method 118 further includes additively manufacturing a nozzle that is integrally coupled with the combustion chamber. In some embodiments, the method 118 further includes additively manufacturing a catalyst that is integrally coupled with a wall of the combustion chamber. For example, additively manufacturing the catalyst may include additively manufacturing the catalyst based on maximizing a surface area of the catalyst based on a substantially smooth wall and a feature resolution of a machine used to additively manufacture the catalyst. In some embodiments, additively manufacturing the catalyst includes additively manufacturing the catalyst as a feature with a dimension of about 10 nanometers.

In some embodiments, additively manufacturing at least one of the combustion chamber, the injector, and the propellant management structures include additively manufacturing using a nickel alloy in method 118. In some embodiments, additively manufacturing at least one of the combustion chamber, the injector, and the propellant management structures include additively manufacturing using niobium C 103. In some embodiments, additively manufacturing at least one of the combustion chamber, the injector, and the propellant management structures include additively manufacturing using a cobalt chrome alloy. In some embodiments, additively manufacturing at least one of the combustion chamber, the injector, and the propellant management structures include additively manufacturing the combustion chamber using a molybdenum alloy.

In some embodiments, additively manufacturing at least one of the combustion chamber, the injector, and the propellant management structures include additively manufacturing the combustion chamber using a rhenium alloy. In some embodiments, the method 118 further includes lining the combustion chamber with at least one layer of iridium.

In some embodiments, the method 118 includes additively manufacturing seals between components of the rocket. In some embodiments, the method 118 includes additively manufacturing seal glands for the seals. In some embodiments, the method 118 includes additively manufacturing a hot-gas metal seal between the combustion chamber and injector.

In some embodiments, additively manufacturing at least one of the combustion chamber, the injector, and the propellant management structures include forming fine features having dimensions configured to cause the propellant to transition from a liquid phase to a gas phase prior to combustion to promote propellant mixing under a predetermined standard operation of the rocket. In some embodiments, forming fine features further includes forming fine features for a rocket fuel and forming fine features for an oxidizer. For example, forming fine features for the rocket fuel may be based on a phase transition requirement of the rocket fuel and forming fine features for the oxidizer may be based on a phase transition requirement of the oxidizer.

In some embodiments, forming fine features includes forming injector elements having an aperture dimension of less than one-hundredth of an inch to improve propellant atomization, reduce local bed loading, restrict quenching in an induction zone, and limit hot spots between the injector elements to lower injector face maximum temperatures.

In some embodiments, additively manufacturing the propellant management structures includes forming propellant tubing in a honeycomb shape disposed proximate the combustion chamber to transfer heat from the combustion chamber to the propellant during propellant flow in a predetermined standard operation of the rocket. For example, the predetermined standard operation of the rocket may include any operations for which the rocket is designed to operate based on a mission requirement of the rocket.

In some embodiments, additively manufacturing the propellant management structures includes forming propellant tubing using materials selected to have a thermal effusivity that heats the propellant and cools the combustion chamber to promote transition of the propellant to a gas phase during a predetermined standard operation of the rocket.

In some embodiments, the method 118 includes dispersing ceramic particles in a metal matrix for high temperature strength while additively manufacturing. In some embodiments, additively manufacturing further includes additively manufacturing with refractory metals.

In some embodiments, the method 118 includes adjusting a porosity of the rocket based on a proximity to a chamber wall of the combustion chamber. For example, the method 118 may include additively manufacturing disfavored thermal conduction pathways within at least one of the combustion chamber, the injector, and the propellant management structures. The disfavored thermal conduction pathways have a thermal resistance that is higher than a thermal resistance of a remainder of the at least one of the combustion chamber, the injector, and the propellant management structures that is not part of the disfavored thermal conduction pathways for directing heat transfer in the rocket.

In some embodiments, the method 118 includes additively manufacturing embedded instrumentation that is integrally coupled with the rocket. In some embodiments, additively manufacturing at least one of the combustion chamber, the injector, and the propellant management structures include integrally forming instrument ports configured to receive instrumentation components. In some embodiments, additively manufacturing at least one of the combustion chamber, the injector, and the propellant management structures include integrally forming tube stubs configured to receive at least one of Ground Support Equipment (GSE) components and thruster components.

In some embodiments, additively manufacturing at least one of the combustion chamber, the injector, and the propellant management structures include additively manufacturing the injector. In some embodiments, additively manufacturing the injector includes forming injection elements normal to a face of the injector. In some embodiments, additively manufacturing the injector includes forming baffles with exits normal to a face of the injector. For example, the baffles may be configured to dampen acoustics in the rocket. In some embodiments, additively manufacturing the injector includes forming injector elements with integral vorticity generators.

In some embodiments, additively manufacturing at least one of the combustion chamber, the injector, and the propellant management structures include additively manufacturing the injector and additively manufacturing the combustion chamber. In some embodiments, additively manufacturing the injector includes forming the injector in a dome shape and additively manufacturing the combustion chamber includes forming the combustion chamber in a spherical shape and forming baffles on walls of the combustion chamber.

Figure 2:
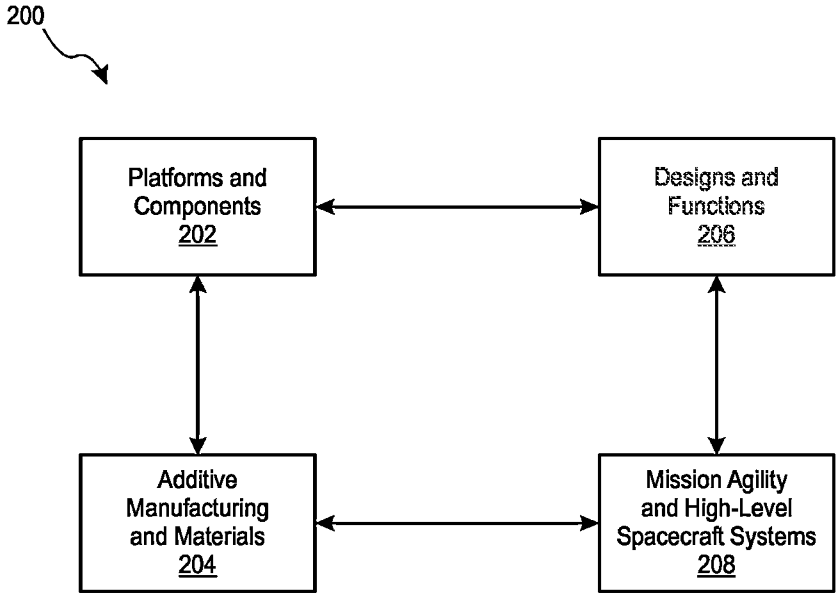
FIG. 2 is a schematic illustrating an example environment of system groups of the space thruster propulsion system of FIG. 1 according to some embodiments of the present disclosure.

Referring now to FIG. 2, and with continued reference to FIG. 1, a schematic illustrates an example environment of system groups 200 of the space thruster propulsion system of FIG. 1 according to some embodiments of the present disclosure. The system groups 200 include a platforms and components group 202, an additive manufacturing and materials group 206, a designs and functions group 204 for core propulsion systems, and a mission agility and high-level spacecraft systems group 208. Each of the groups includes a collection of various systems that are described below, but the various systems may be included in more than one group or in groups other than those described in FIG. 2 without departing from the scope of the present disclosure.

Platforms and Components System Group

Figure 3:
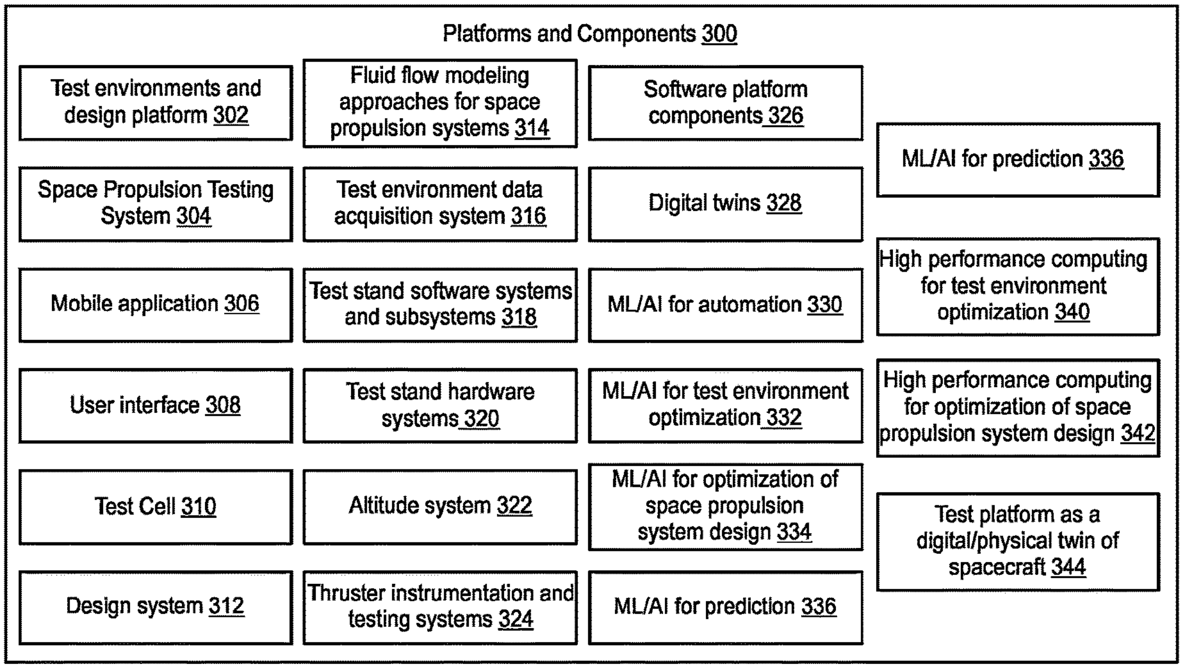
FIG. 3 is a schematic illustrating an example environment of a platform and components system group according to some embodiments of the present disclosure.

Referring now to FIG. 3, and with continued reference to FIGS. 1-2, a schematic illustrates an example of a platform and components system group 300 according to some embodiments of the present disclosure. The platform and components system group 300 is an example of the platform and components group 202. In the example illustrated, the platform components system group 300 includes a test environment and design platform 302, a space propulsion testing system 304, a mobile application 306, a user interface 308, a test cell 310, a design system 312, a fluid flow modeling approaches system 314 for space propulsion systems, a test environment data acquisition system 316, a test stand software system 318, a test stand hardware system 320, an altitude system 322, a thruster instrumentation and testing system 324, a software platform components system 326, a digital twin system 328, a machine learning and artificial intelligence (ML/AI) for automation system 330, an ML/AI system 332 for test environment optimization, an ML/AI system 334 for optimization of space propulsion system design, an ML/AI system 336 for prediction, a robotics and automation system 338, a high performance computing system 340 for test environment optimization, a high performance computing system 342 for optimization of space propulsion system design, and a test platform as a digital and physical twin of a spacecraft system 344.

Figure 4:
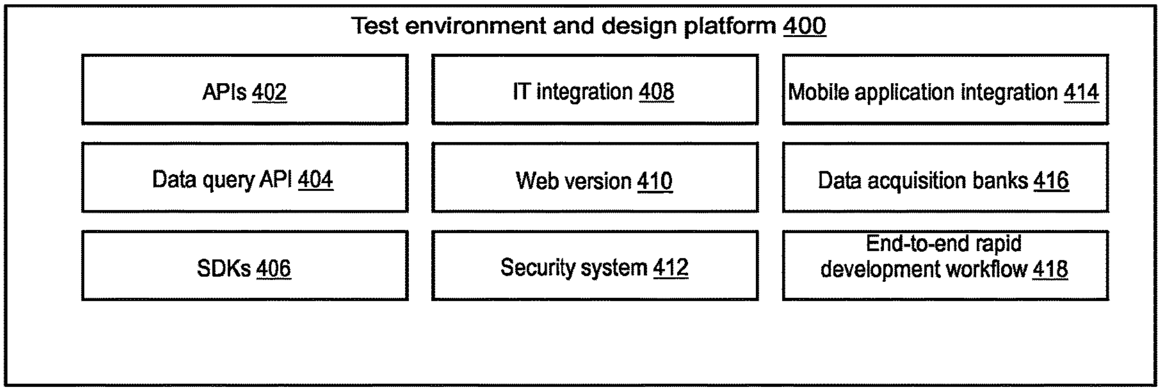
FIG. 4 is a schematic illustrating an example environment of a test environment and design platform according to some embodiments of the present disclosure.

Referring now to FIG. 4, and with continued reference to FIGS. 1-3, a schematic illustrates an example environment of a test environment and design platform 400 according to some embodiments of the present disclosure. The test environment and design platform 400 is an example of the test environment and design platform 302. In the example illustrated, the test environment and design platform 400 includes application programming interfaces (APIs) 402, a data query API 404, a software development kit (SDK) 406, an information technology (IT) system 408, a web version system 410, a security system 412, a mobile application integration system 414, a data acquisition bank 416, and an end-to-end rapid development workflow system 418.

Figure 5:
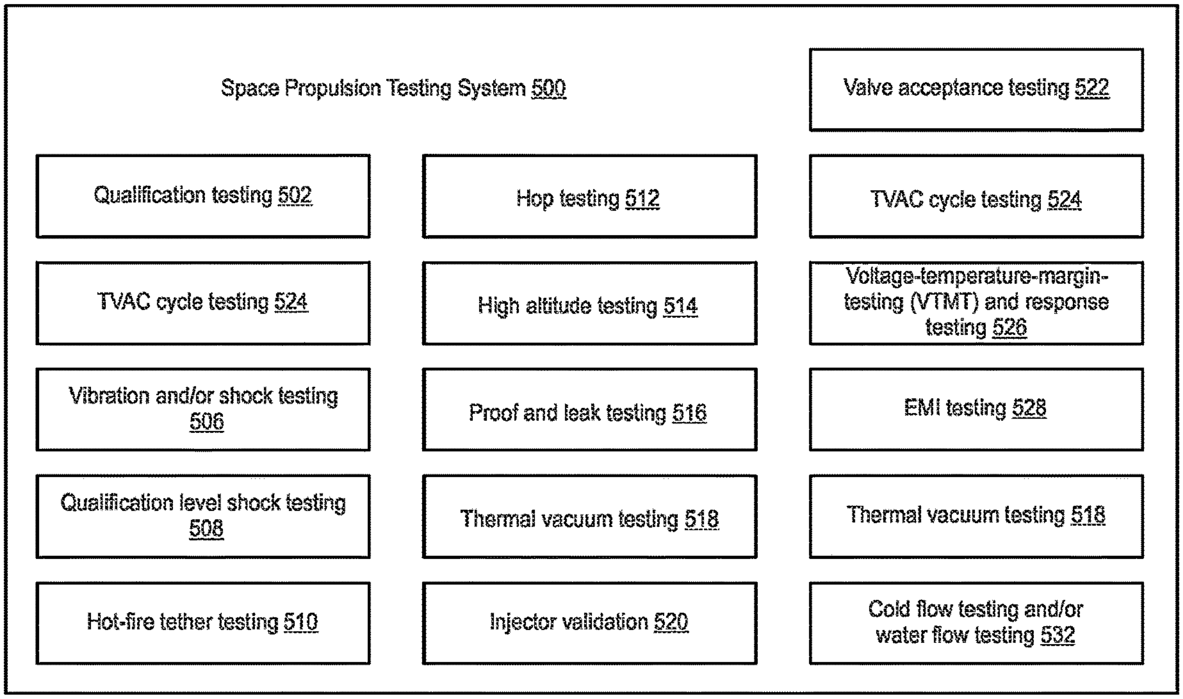
FIG. 5 is a schematic illustrating an example environment of a space propulsion testing system according to some embodiments of the present disclosure.

Referring now to FIG. 5, and with continued reference to FIGS. 1-4, a schematic illustrates an example environment of a space propulsion testing system 500 according to some embodiments of the present disclosure. The space propulsion testing system 500 is an example of the space propulsion testing system 304. The space propulsion testing system 500 includes systems for qualification testing 502, acceptance testing 504, vibration and/or shock testing 506, qualification level shock testing 509, hot-fire tether testing 510, hop testing 512, high altitude testing 514, proof and leak testing 516, thermal vacuum (TVAC) testing 518, injector validation 520, value acceptance testing 522. TVAC cycle testing 524, voltage-temperature-margin testing (VTMT) and response testing 526, electromagnetic interference (EMI) testing 528, cycle testing 530, and cold flow and/or water flow testing 532. The space propulsion testing system 500 includes systems for DVT testing, risk reduction testing, trim testing, and the like.

Figure 6:
FIG. 6 is a schematic illustrating an example environment of a mobile application according to some embodiments of the present disclosure.

Referring now to FIG. 6, and with continued reference to FIGS. 1-5, a schematic illustrates an example environment of a mobile application 600 according to some embodiments of the present disclosure. The mobile application 600 is an example of the mobile application 306.

Figure 7:
FIG. 7 is a schematic illustrating an example environment of a user interface according to some embodiments of the present disclosure.

Referring now to FIG. 7, and with continued reference to FIGS. 1-6, a schematic illustrates an example environment of a user interface 700 according to some embodiments of the present disclosure. The user interface 700 is an example of the user interface 308.

Figure 8:
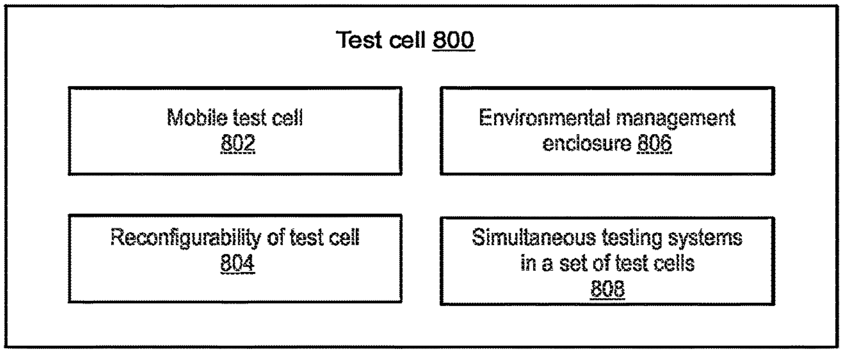
FIG. 8 is a schematic illustrating an example environment of a test cell according to some embodiments of the present disclosure.

Referring now to FIG. 8, and with continued reference to FIGS. 1-7, a schematic illustrates an example environment of a test cell according to some embodiments of the present disclosure. The test cell 800 is an example of the test cell 310. The test cell 800 includes systems for a mobile test cell 802, reconfigurability of the test cell 804, environmental management enclosures 806, and simultaneous testing systems in a set of test cells 808.

Figure 9:
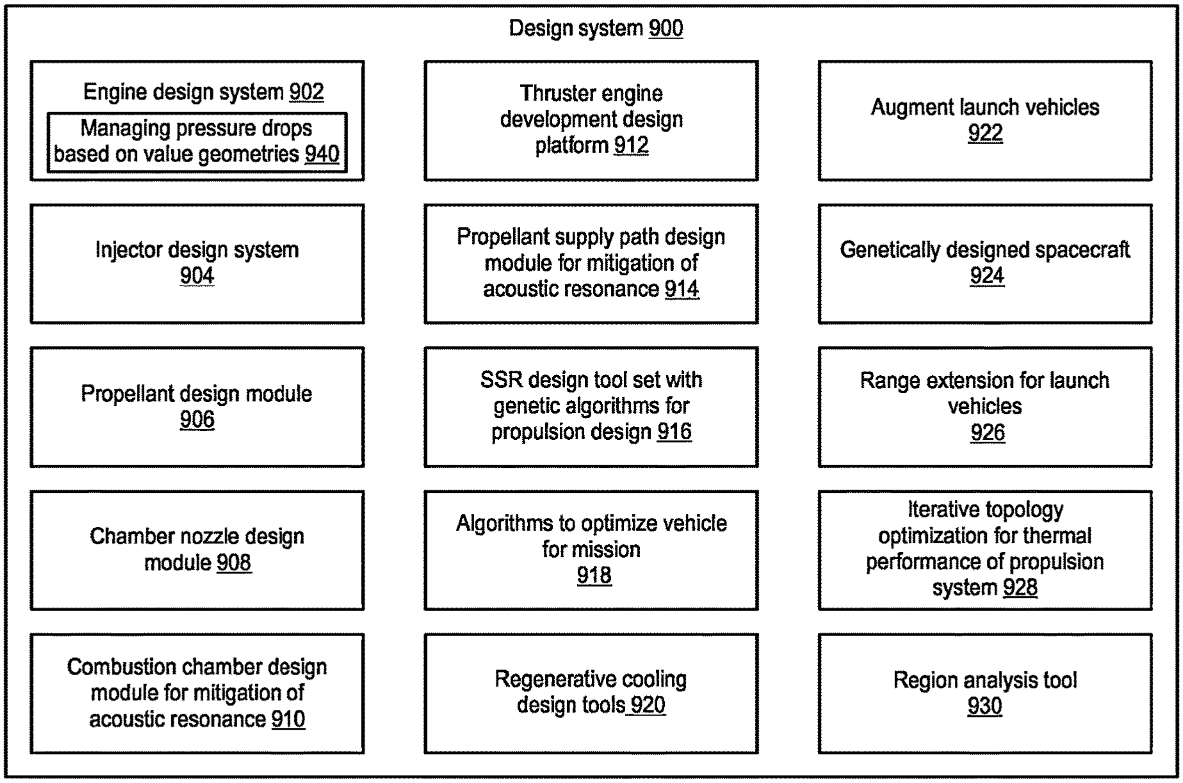
FIG. 9 is a schematic illustrating an example environment of a design system according to some embodiments of the present disclosure.

Referring now to FIG. 9, and with continued reference to FIGS. 1-8, a schematic illustrates an example environment of a design system 900 according to some embodiments of the present disclosure. The design system 900 is an example of the design system 312. The design system 900 includes an engine design system 902, an injector design system 904, a propellant design module 906, a chamber nozzle design module 908, a combustion chamber design module for mitigation of acoustic resonance 910, a thruster engine development workflow management 912, a propellant supply path design module 914 for mitigation of acoustic resonance, a simple sample return (SSR) design tool set 916 with genetic algorithms for propulsion design, algorithms 918 to optimize the vehicle for mission, regenerative cooling design tools 920, augment launch vehicles 922, genetically designed spacecraft 924, range extension for launch vehicles 926, iterative topology optimization for thermal performance of propulsion system 928, and a region analysis tool 930.

The engine design system 902 includes a system for managing pressure drops based on value geometries 940.

Figure 10:
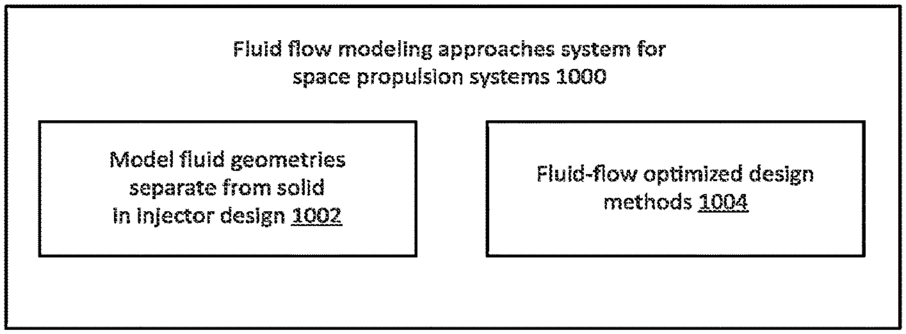
FIG. 10 is a schematic illustrating an example environment of a fluid flow modeling approaches system for space propulsion systems according to some embodiments of the present disclosure.

Referring now to FIG. 10, and with continued reference to FIGS. 1-9, a schematic illustrates an example environment of a fluid flow modeling approaches system 1000 for space propulsion according to some embodiments of the present disclosure. The fluid flow modeling approaches system 1000 is an example of the fluid flow modeling approaches system 314 for space propulsion systems. The fluid flow modeling approaches system 1000 includes a module to separately model fluid and solid geometries in injector design 1002 and a module for fluid-flow optimized design methods 1004.

Referring now to FIG. 11, and with continued reference to FIGS. 1-10, a schematic illustrates an example environment of a test environment data acquisition system 1100 according to some embodiments of the present disclosure. The test environment data acquisition system 1100 is an example of the test environment data acquisition system 316. The test environment data acquisition system 110) includes camera and/or machine vision systems 1102, fluoroscopic materials 1104, optical pressure and temperature sensing 1106, vibration sensors 1108 for vibration data, channel monitoring 1110, Coriolis meters 1112, a plume measurement system 1114, a tripod thrust measurement system 1116, a portable doppler flow meter (PDFM) instrument 1118, thrust measuring systems 1120, casement fixtures 1122, helium saturation 1124, atmospheric testing systems 1126, compression testing of propellants 1128, compression tests for measuring helium saturation 1130, and component-by-component testing of catalyst delivery 1132.

In the example illustrated, the camera and/or machine vision systems 1102 include modules for machine vision to inspect injectors for clogged holes 1140, machine vision for qualitative measurements of plume 1142, machine vision for water flow measurements 1144, and machine vision for detecting leaks 1146.

Referring now to FIG. 12, and with continued reference to FIGS. 1-11, a schematic illustrates an example environment of test stand software systems and subsystems 1200 according to some embodiments of the present disclosure. The test stand software systems and subsystems 1200 are examples of the test stand software system 318. The test stand software systems and subsystems 1200 include a vacuum management system 1202, a system for maintaining vacuum for engine outgassing 1204, a test data processing system 1206, a test stand configuration guidance system 1208, a parameter file system 1210, a calibration system 1212, an automated calibration system 1214, a diagnostics system 1216, a safety system 1218, a system to initiate shutdown sequence 1220, a fast Fourier transform (FFT) viewer 1222, an FFT algorithm system 1224, post-processing data scripts 1226, a system for propellant management 1228, a control system 1230, a command center 1232, a test campaign 1234, a system for redlines 1236, a system for bluelines 1238, a test sequence system 1240, a transient test phase system 1242, a steady state test phase system 1244, a system to correlate pyrometers and infrared (IR) cameras 1246, a system to correlate thermocouples 1248, a time alignment of data system 1250, a regulator skid system 1252, a system for self-ID of sensors 1254, a valve driver 1256, a disaster recovery system 1258, an algorithm/application suite 1260 to stream low quality data from a test environment, a reactor health monitoring system 1262, a system for ejector system analytics 1264, a system for individual pulse characterization 1266, and a test data processing suite 1268.

Figure 13:
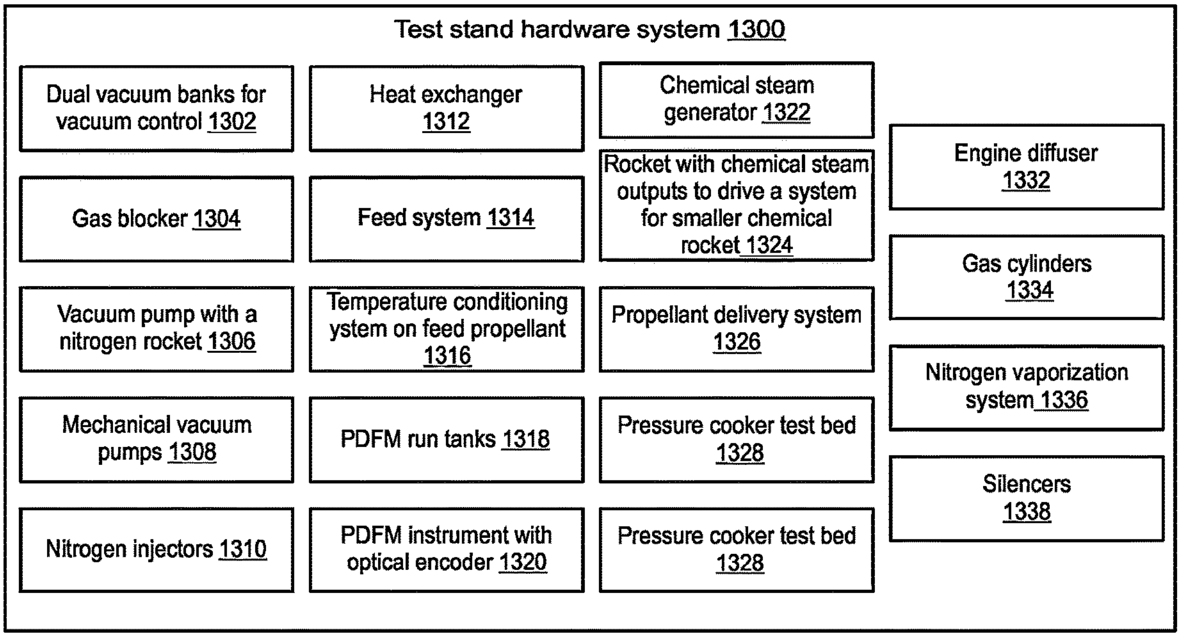
FIG. 13 is a schematic illustrating an example environment of a test stand hardware system according to some embodiments of the present disclosure.

Referring now to FIG. 13, and with continued reference to FIGS. 1-12, a schematic illustrates an example environment of a test stand hardware system 1300 according to some embodiments of the present disclosure. The test stand hardware system 1300 is an example of the test stand hardware system 320. The test stand hardware system 1300 includes dual vacuum banks 1302 for vacuum control, a gas blocker 1304, a vacuum pump with a nitrogen rocket 1306, mechanical vacuum pumps 1308, nitrogen injectors 1310, a heat exchanger 1312, a feed system 1314, a temperature conditioning system for feed propellant 1316, portable doppler flow meter (PDFM) run tanks 1318. PDFM instruments with optical encoders 1320, a chemical steam generator 1322, a rocket 1324 with chemical steam outputs to drive a system for smaller chemical rockets, a propellant delivery system 1326, a pressure cooker test bed 1328, propellant systems 1330, an engine diffuser 1332, gas cylinders 1334, a nitrogen vaporization system 1336, and silencers 1338.

Figure 14:
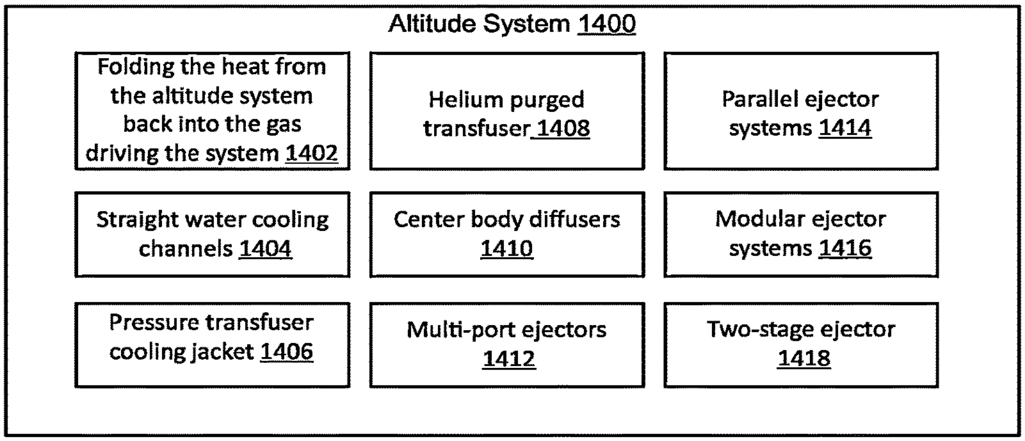
FIG. 14 is a schematic illustrating an example environment of an altitude system according to some embodiments of the present disclosure.

Referring now to FIG. 14, and with continued reference to FIGS. 1-13, a schematic illustrates an example environment of an altitude system 1400 according to some embodiments of the present disclosure. The altitude system 1400 is an example of the altitude system 322. The altitude system 1400 includes systems 1402 for folding heat from the altitude system back into the gas driving the system, straight water-cooling channels 1404, a pressure transducer cooling jacket 1406, a helium purged transducer 1408, center body diffusers 1410, multi-port ejectors 1412, parallel ejector systems 1414, modular ejector systems 1416, and a two-stage ejector 1418. The altitude system 1400 includes gas blocker with center body diffuser features, diffuser heat exchangers, diffuser spray injection water cooling features, adjustable position diffusers, parallel diffusers, diffusers for testing multi engine spacecraft systems, second throat diffusers with gas blocker features, diffuser valves, parallel ejectors with tuned load capabilities, parallel multi stage ejectors, and the like.

Figure 15:
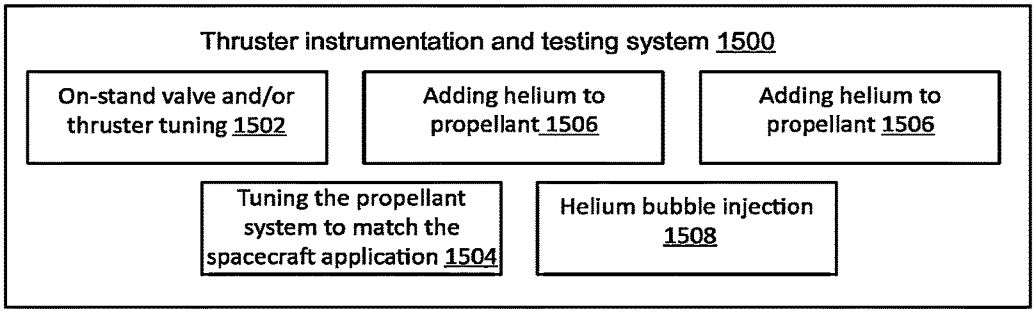
FIG. 15 is a schematic illustrating an example environment of a thruster instrumentation and testing system according to some embodiments of the present disclosure.

Referring now to FIG. 15, and with continued reference to FIGS. 1-14, a schematic illustrates an example environment of a thruster instrumentation and testing system 1500 according to some embodiments of the present disclosure. The thruster instrumentation and testing system 1500 is an example of the thruster instrumentation and testing system 324. The thruster instrumentation and testing system 1500 includes systems for on-stand valve and/or thruster tuning 1502, tuning the propellant system to match the spacecraft application 1504, adding helium to propellants 1506, helium bubble injection 1508, and temperature conditioning of fluids 1510.

Figure 16:
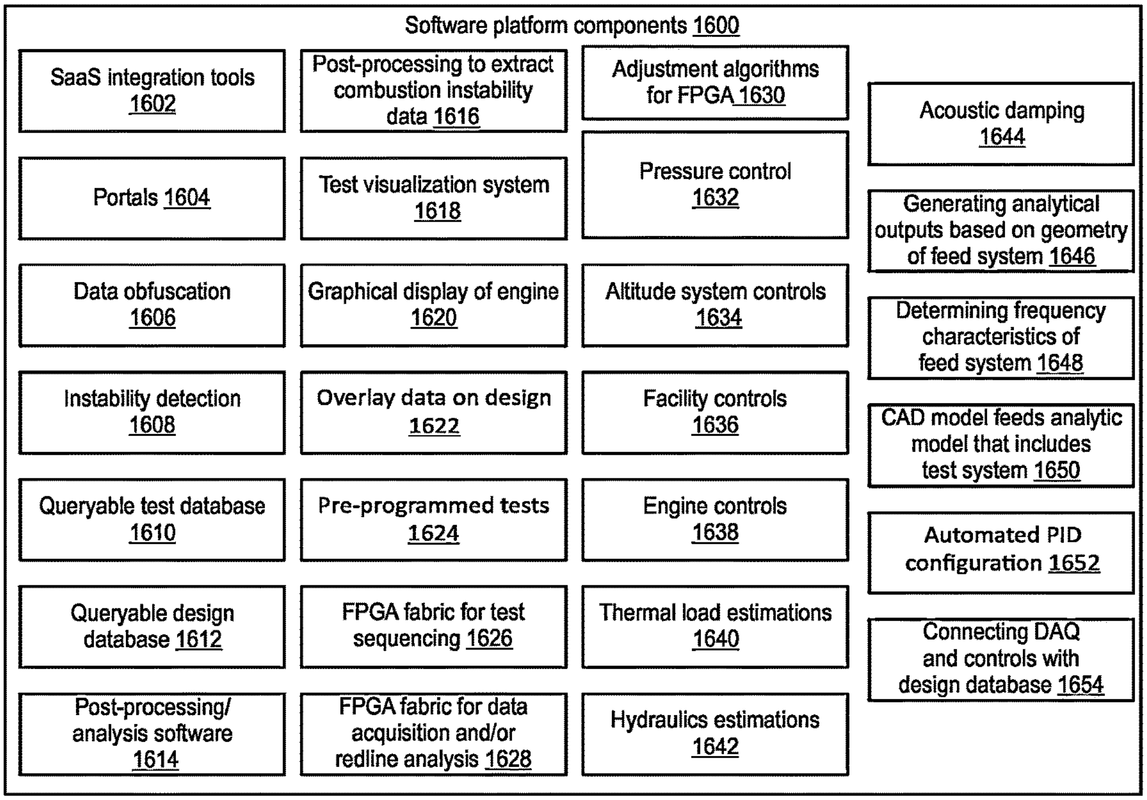
FIG. 16 is a schematic illustrating an example environment of software platform components according to some embodiments of the present disclosure.

Referring now to FIG. 16, and with continued reference to FIGS. 1-15, a schematic illustrates an example environment of software platform components 1600 according to some embodiments of the present disclosure. The software platform components 1600 are examples of components of the software platform components system 326. The software platform components 1600 include modules for software as a service (SaaS) integration tools 1602, portals 1604, data obfuscation 1606, instability detection 1608, query able test database 1610, query able design database 1612, post-processing/analysis software 1614, post-processing to extract combustion instability data 1616, test visualization system 1618, graphical display of engine 1620, overlay data on design 1622, pre-programmed tests 1624, field programmable gate array (FPGA) fabric for test sequencing 1626, FPGA fabric for data acquisition and/or redline analysis 1628, adjustment algorithms for FPGA 1630, pressure control 1632, altitude system controls 1634, facility controls 1636, engine controls 1638, thermal load estimations 1640, hydraulics estimations 1642, acoustic damping 1644, generating analytical outputs based on geometry of feed system 1646, determining frequency characteristics of feed system 1648, CAD model feeding analytic model that includes a test system 1650, automated proportional-integral-derivative (PID) configuration 1652, and connecting data acquisition systems (DAQ) and controls with design database 1654.

Figure 17:
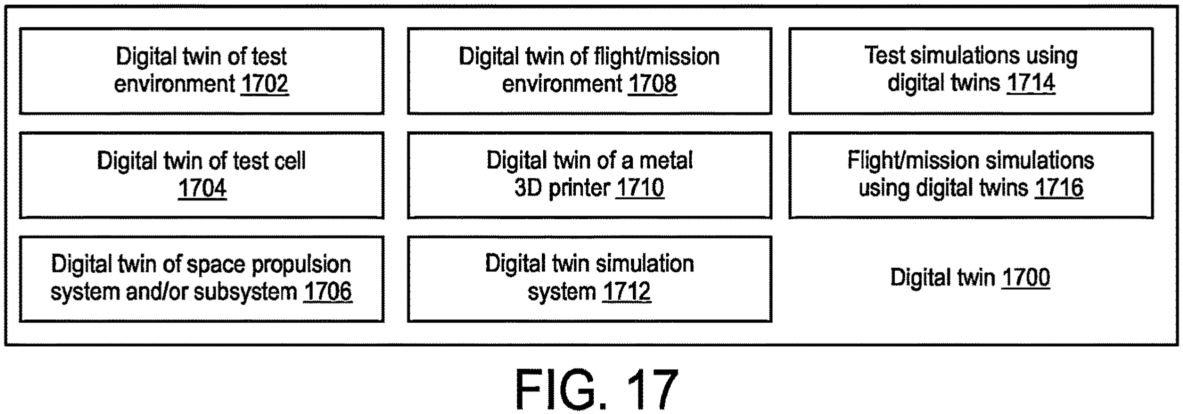
FIG. 17 is a schematic illustrating an example environment of digital twins according to some embodiments of the present disclosure.

Referring now to FIG. 17, and with continued reference to FIGS. 1-16, a schematic illustrates an example environment of digital twins 1700 according to some embodiments of the present disclosure. The digital twins 1700 are examples from the digital twin system 328. The digital twins 1700 include a digital twin of a test environment 1702, a digital twin of a test cell 1704, a digital twin of a space propulsion system and/or subsystem 1706, a digital twin of flight/mission environment 1708, a digital twin of a metal 3D printer 1710, a digital twin simulation system 1712, test simulations using digital twins 1714, and flight/mission simulations using digital twins 1716.

Figure 18:
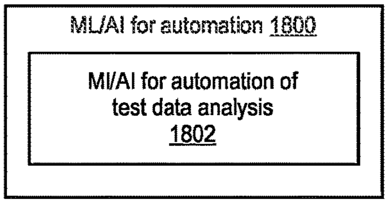
FIG. 18 is a schematic illustrating an example environment of a system for machine learning (ML)/artificial intelligence (AI) for automation according to some embodiments of the present disclosure.

Referring now to FIG. 18, and with continued reference to FIGS. 1-17, a schematic illustrates an example environment of a system for ML/AI for automation 1800 according to some embodiments of the present disclosure. The system for ML/AI for automation 1800 is an example of the machine learning and artificial intelligence (ML/AI) for automation system 330. The system for ML/AI for automation 1800 includes ML/AI for automation of test data analysis 1802.

Referring now to FIG. 19, and with continued reference to FIGS. 1-18, a schematic illustrates an example environment of a system for ML/AI for test environment optimization 1900 according to some embodiments of the present disclosure. The system for ML/AI for test environment optimization 1900 is an example of the ML/AI system 332 for test environment optimization. The system for ML/AI for test environment optimization 1900 includes ML/AI to emulate flight conditions 1902, ML/AI to tune the propellant system to match the spacecraft application 1904, and ML/AI to optimize test environment configuration 1906.

Referring now to FIG. 20, and with continued reference to FIGS. 1-19, a schematic illustrates an example environment of a system for ML/AI for optimization of space propulsion system design 2000 according to some embodiments of the present disclosure. The system for ML/AI for optimization of space propulsion system design 2000 is an example of the ML/AI system 334 for optimization of space propulsion system design. The system for ML/AI for optimization of space propulsion system design 2000 includes ML/AI for optimizing space propulsion system design or subsystem design for reusability 2002. ML/AI for optimization of thermal performance 2004, ML/AI to optimize space to weight ratio 2006, ML/AI to optimize launch vehicle sizing 2008. ML/AI to optimize ignition response 2010, ML/AI to optimize delta V 2012, ML/AI to optimize acceleration performance 2014, ML/AI to optimize O/F ratio 2016, ML/AI to optimize thruster lifetime 2018, ML/AI to minimize dribble volume 2020, ML/AI for iterative topology optimization for thermal performance of propulsion system 2022. ML/AI for systems-level optimization 2024, ML/AI for systems-level optimization based on risk tolerance 2026, ML/AI to optimize safety in test environment 2028, ML/AI to optimize safety on spacecraft 2030, and ML/AI for center-of-gravity balancing 2032.

Referring now to FIG. 21, and with continued reference to FIGS. 1-20, a schematic illustrates an example environment of a system of ML/AI for prediction 2100 according to some embodiments of the present disclosure. The system of ML/AI for prediction 2100 is an example of the MUM system 336 for prediction. The system of ML/AI for prediction 2100 includes systems for ML/AI for thermal load estimations 2102 and ML/AI for prediction of engine performance 2104.

Referring now to FIG. 22, and with continued reference to FIGS. 1-21, a schematic illustrates an example environment of a system of Robotics and automation 2200 according to some embodiments of the present disclosure. The system of Robotics and automation 2200 is an example of the robotics and automation system 338. The system of Robotics and automation 2200 includes systems for robotics for test environment configuration 2202 and for test automation 2204.

Referring now to FIG. 23, and with continued reference to FIGS. 1-22, a schematic illustrates an example environment of a system of high-performance computing for test environment optimization 2300 according to some embodiments of the present disclosure. The system of high-performance computing for test environment optimization 2300 is an example of the high-performance computing system 340 for test environment optimization. The system of high-performance computing for test environment optimization 2300 includes systems for quantum computing to minimize catalyst contamination 2302, quantum computing to emulate flight condition 2304, quantum computing to tune the propellant system to match the spacecraft application 2306, and quantum computing to optimize test environment configuration 2308.

Referring now to FIG. 24, and with continued reference to FIGS. 1-23, a schematic illustrates an example environment of a system of high-performance computing for optimization of space propulsion system design 2400 according to some embodiments of the present disclosure. The system of high-performance computing for optimization of space propulsion system design 2400 is an example of the high-performance computing system 342 for optimization of space propulsion system design. The system of high-performance computing for optimization of space propulsion system design 2400 includes systems for quantum optimization of space propulsion system design 2402, quantum optimization of thermal performance 2404, quantum computing to optimize space to weight ratio 2406, quantum computing for launch vehicle sizing 2408, quantum computing to optimize O/F ratio. 2410, quantum computing to minimize dribble volume 2412, quantum computing for iterative topology optimization for thermal performance of propulsion system 2414, quantum computing for systems-level optimization 2416, quantum computing for systems-level optimization based on risk tolerance 2418, and quantum computing for optimizing space propulsion system and subsystem design for reusability 2420.

Referring now to FIG. 25, and with continued reference to FIGS. 1-24, a schematic illustrates an example environment of a system of test platform as a digital/physical twin of spacecraft 2500 according to some embodiments of the present disclosure. The test platform as a digital/physical twin of spacecraft 2500 is an example of the test platform as the digital and physical twin of the spacecraft system 344.

Designs and Functions for Core Propulsion Systems

Referring now to FIG. 26, and with continued reference to FIGS. 1-25, a schematic illustrates an example environment of a 3D printed propulsion system 2600 according to some embodiments of the present disclosure. The 3D printed propulsion system 2600 includes a smart 3D printed propulsion system 2602, a smart engine 2604, a smart injector 2606, a smart tank 2608, and a smart propellant system 2610.

Figure 27:
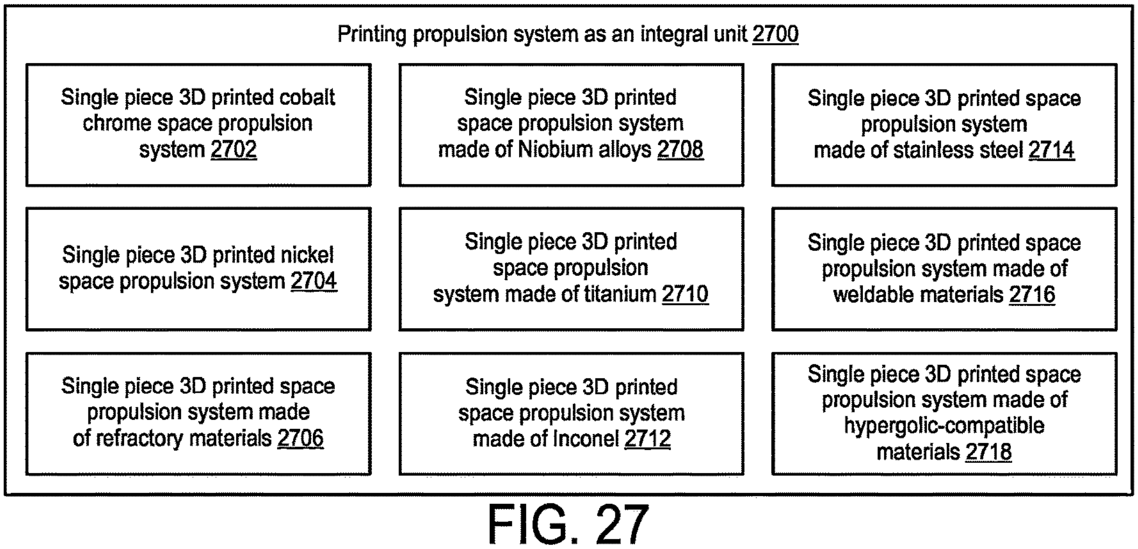
FIG. 27 is a schematic illustrating an example environment of a single piece 3D printed space propulsion system according to some embodiments of the present disclosure.

Referring now to FIG. 27, and with continued reference to FIGS. 1-26, a schematic illustrates an example environment of a single piece 3D printed space propulsion system 2700 according to some embodiments of the present disclosure. The single piece 3D printed space propulsion system 2700 includes a single piece 3D printed cobalt chrome space propulsion system 2702, a single piece 3D printed nickel space propulsion system 2704, a single piece 3D printed space propulsion system made of refractory materials 2706, a single piece 3D printed space propulsion system made of Niobium alloys 2708, a single piece 3D printed space propulsion system made of titanium 2710, a single piece 3D printed space propulsion system made of Inconel 2712, a single piece 3D printed space propulsion system made of stainless steel 2714, a 3D printed space propulsion system made of weldable materials 2716, and a 3D printed space propulsion system made of hypergolic-compatible materials 2718.

Figure 28:
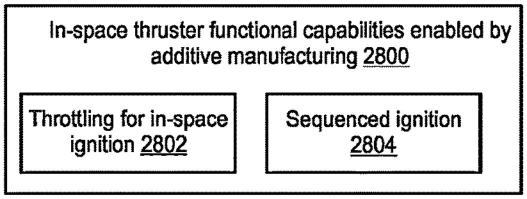
FIG. 28 is a schematic illustrating an example environment of a system of in-space thruster functional capabilities enabled by additive manufacturing according to some embodiments of the present disclosure.

Referring now to FIG. 28, and with continued reference to FIGS. 1-27, a schematic illustrates an example environment of a system of in-space thruster functional capabilities enabled by additive manufacturing 2800 according to some embodiments of the present disclosure. The system of in-space thruster functional capabilities enabled by additive manufacturing 2800 includes systems for throttling for in-space ignition 2802 and for sequenced ignition 2804.

Figure 29:
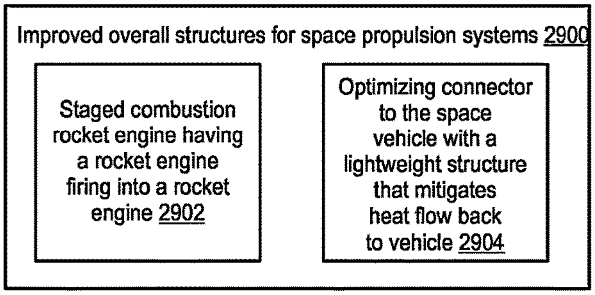
FIG. 29 is a schematic illustrating an example environment of improved overall structures for space propulsion systems according to some embodiments of the present disclosure.

Referring now to FIG. 29, and with continued reference to FIGS. 1-28, a schematic illustrates an example environment of a system of improved overall structures for space propulsion systems 2900 according to some embodiments of the present disclosure. The system of improved overall structures for space propulsion systems 2900 includes a staged combustion rocket engine having a rocket engine firing into a rocket engine 2902 and systems for optimizing a connector to the space vehicle with a lightweight structure that mitigates heat flow back to vehicle 2904.

Figure 30:
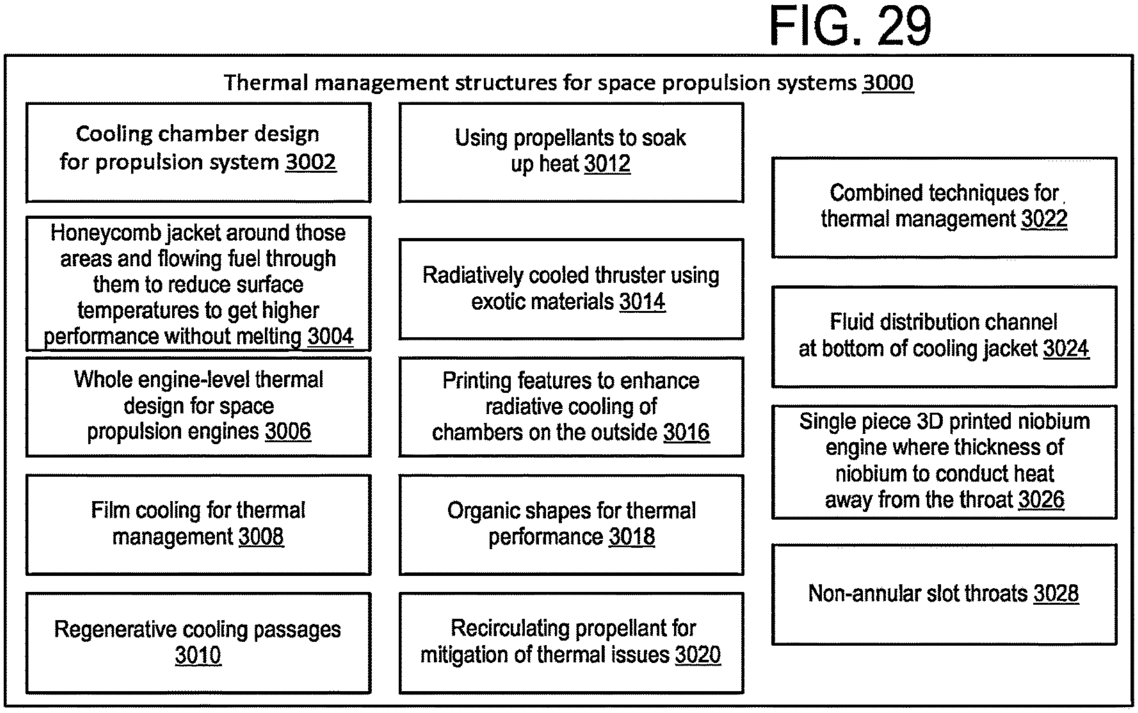
FIG. 30 is a schematic illustrating an example environment of a system of thermal management structures for space propulsion according to some embodiments of the present disclosure.

Referring now to FIG. 30, and with continued reference to FIGS. 1-29, a schematic illustrates an example environment of a system of thermal management structures for space propulsion systems 3000 according to some embodiments of the present disclosure. The system of thermal management structures for space propulsion systems 3000 includes systems for a cooling chamber design for propulsion system 3002, a honeycomb jacket around hot areas and flowing fuel through the hot areas to reduce surface temperatures to get higher performance without melting 3004, a whole engine-level thermal design for space propulsion engines 3006, film cooling for thermal management 3008, regenerative cooling passages 3010, using propellants to soak up heat 3012, a radiative) cooled thruster using exotic materials 3014, printing features to enhance radiative cooling of chambers on the outside 3016, organic shapes for thermal performance 3018, recirculating propellant for mitigation of thermal issues 3020, combined techniques for thermal management 3022, fluid distribution channel at bottom of cooling jacket 3024, a single piece 3D printed niobium engine with thickness of niobium to conduct heat away from the throat 3026, and non-annular slot throats 3028.

Referring now to FIG. 31, and with continued reference to FIGS. 1-30, a schematic illustrates an example environment of a system of facilitation of ignition for space propulsion systems 3100 according to some embodiments of the present disclosure. The system of facilitation of ignition for space propulsion systems 3104) includes systems for pre-heating fuel to reduce the energy required for ignition 3102 and for a smooth start engine 3104. The system of facilitation of ignition for space propulsion systems 3100 includes systems for combustion chamber designs, spherical combustion chambers, toroidal combustion chambers, reverse flow combustion chambers, combustion chambers with transpiration cooling, combustion chambers with staggered film cooling, annular combustion chambers, combustion chambers within other combustion chambers, combustion chambers embedded in other pressure vessels, combustion chambers printed as part of spacecraft structure, priming elements, and the like.

Referring now to FIG. 32, and with continued reference to FIGS. 1-31, a schematic illustrates an example environment of a system of improved seals for space propulsion systems 3200 according to some embodiments of the present disclosure. The system of improved seals for space propulsion systems 3200 includes systems for additive manufacturing of metal seals between alloys/metals 3202, eliminating seals 3204, gas turbine static seals 3206, gas turbine dynamic seals 3208, integrated seals 3210, and soft compliant material for interfaces 3212. The system of improved seals for space propulsion systems 3200 includes systems for 3D printed seals to eliminate leak paths for modular hardware.

Referring now to FIG. 33, and with continued reference to FIGS. 1-32, a schematic illustrates an example environment of a system of injector design features 3300 according to some embodiments of the present disclosure. The system of injector design features 3300 includes systems for long and thin 3D printed channels for fluid flow into the combustion chamber 3300, injector design elements as small as 0.006" (inches) 3302, unlike-doublet injector 3304, soft-start injection system 3306, low volume combustion chamber for rapid priming and quick-start in cycling space thruster 3308, injector cross section with complex heat exchanger geometry 3310, oxidizer and fuel flow system exchange heat before they are injected 3312, reactor and bipropellant chamber 3314, priming elements 3316, multiple layers of injector elements 3318, domed injectors 3320, single piece injectors 3322, constant velocity volute stood off from nozzle 3324, radiative heat fins external to chambers 3326, limit heat back into spacecraft 3328, longer thermal break paths with lower mass materials 3330, 3D printed normal faces for injection elements 3332, vorticity generators in injector elements for gases/liquids 3334, coaxial swirling elements 3336, 3D printed baffles with exits normal to face 3338, cooling around the injector face 3340, gas-gas injection process using 3D printed nickel chambers 3342, multipoint manifolding of the fuel manifold 3344, high element density on a small face 3346, multiple vector propulsion integrated in a monolithic design 3348, low dribble volume injectors used to preheat propellant 3350, and injectors with embedded cartridge heaters 3352.

Figure 34:
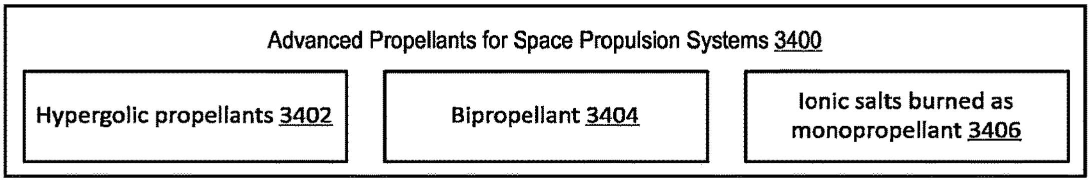
FIG. 34 is a schematic illustrating an example environment of a system of advanced propellants according to some embodiments of the present disclosure.

Referring now to FIG. 34, and with continued reference to FIGS. 1-33, a schematic illustrates an example environment of a system of advanced propellants 3400 according to some embodiments of the present disclosure. The system of advanced propellants 3400 includes systems for hypergolic propellants 3402, bipropellant 3404, and ionic salts burned as monopropellant 3406. The system of advanced propellants 3400 also includes pentad impinging features with O-O-F-O-O arrangement meaning the fuel emitter is in a central location with four oxidizer feeds symmetrically arranged around the fuel feed, a tri element with O-F-O arrangement meaning the fuel emitter is in a central location with two oxidizer feeds symmetrically arranged around the fuel feed, an to element with F-O-F arrangement meaning the oxide emitter is in a central location with two fuel feeds symmetrically arranged around the oxidizer feed, like-on-like doublet fans, unlike doublet fans, oval injector elements, slotted injector elements, Ox-centered counter swirl coaxial features, fuel centered counter swirl coaxial features, an opposing impingement injector, canted fuel film injector elements, acoustic cavity element designs, and the like.

Figure 35:
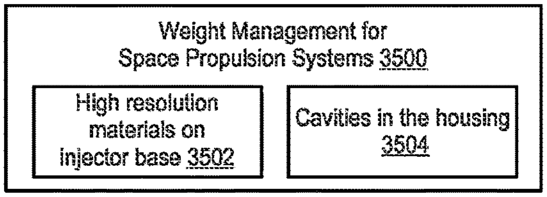
FIG. 35 is a schematic illustrating an example environment of a system of weight management according to some embodiments of the present disclosure.

Referring now to FIG. 35, and with continued reference to FIGS. 1-34, a schematic illustrates an example environment of a weight management system 3500 according to some embodiments of the present disclosure. The weight management system 35(*k*) includes systems for high resolution materials on injector base 3502 and cavities in the housing 3504.

Figure 36:
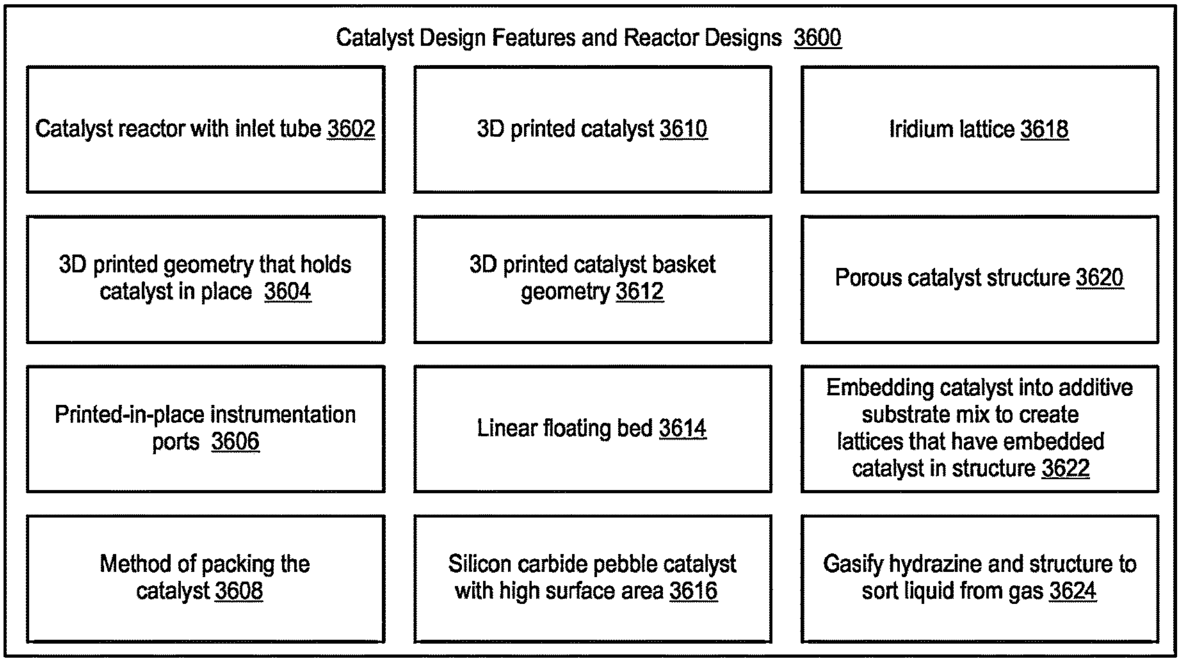
FIG. 36 is a schematic illustrating an example environment of a system of catalyst design features and reactor designs according to some embodiments of the present disclosure.

Referring now to FIG. 36, and with continued reference to FIGS. 1-35, a schematic illustrates an example environment of a system of catalyst design features and reactor designs 3600 according to some embodiments of the present disclosure. The system of catalyst design features and reactor designs 3600 includes systems for a catalyst reactor with inlet tube 3600, 3D printed geometry that holds catalyst in place 3602, printed-in-place instrumentation ports 3604, methods of packing the catalyst 3606, 3D printed catalyst 3608, 3D printed catalyst basket geometry 3610, a linear floating bed 3612, a silicon carbide pebble catalyst with high surface area 3614, iridium lattice 3616, porous catalyst structure 3618, embedding catalyst into additive substrate mix to create lattices that have embedded catalyst in structure 3620, and to gasify hydrazine and a structure to sort liquid from gas 3622.

Figure 37:
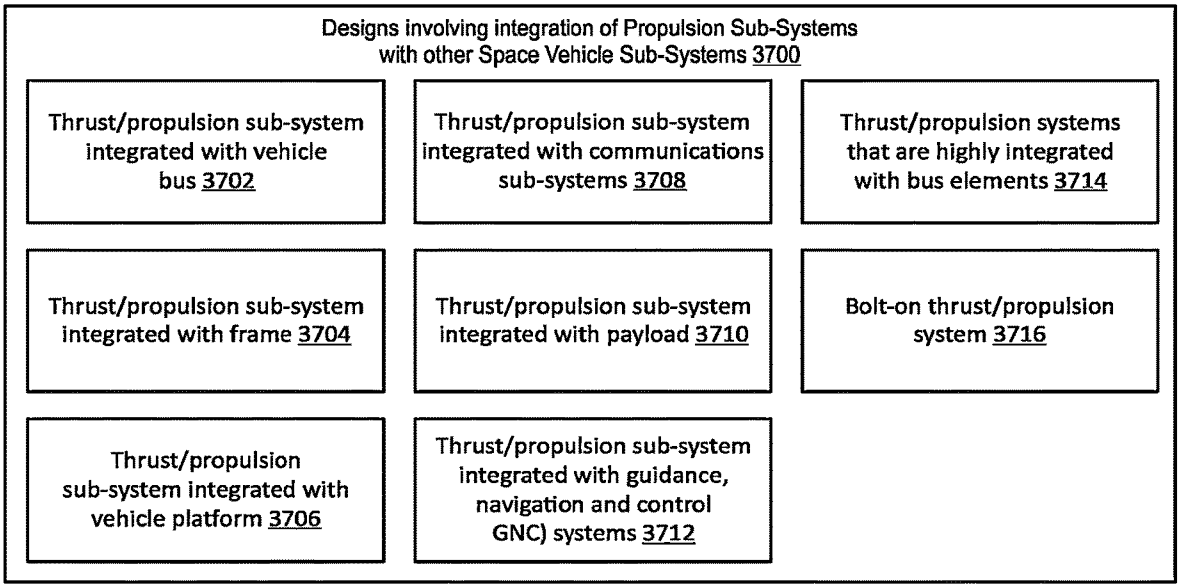
FIG. 37 is a schematic illustrating an example environment of a thrust/propulsion sub system integrated with other sub-systems according to some embodiments of the present disclosure.

Referring now to FIG. 37, and with continued reference to FIGS. 1-36, a schematic illustrates an example environment of a thrust/propulsion sub-system integrated with other sub-systems 3700 according to some embodiments of the present disclosure. The thrust/propulsion sub-system integrated with other sub-systems 3700 includes a thrust/propulsion sub-system integrated with vehicle bus 3702, thrust/propulsion sub-system integrated with frame 3704, thrust/propulsion sub-system integrated with vehicle platform 3706, thrust/propulsion sub-system integrated with communications sub-systems 3708, thrust/propulsion sub-system integrated with payload 3710, thrust/propulsion sub-system integrated with guidance, navigation and control (GNC) systems. 3712, thrust/propulsion systems that are highly integrated with bus elements 3714, and bolt-on thrust/propulsion system 3716.

Figure 38:
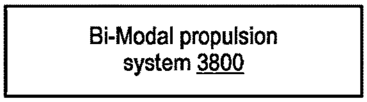
FIG. 38 is a schematic illustrating an example environment of a system of bi-modal propulsion system according to some embodiments of the present disclosure.

Referring now to FIG. 38, and with continued reference to FIGS. 1-37, a schematic illustrates an example environment of a bi-modal propulsion system 3800 according to some embodiments of the present disclosure.

Figure 39:
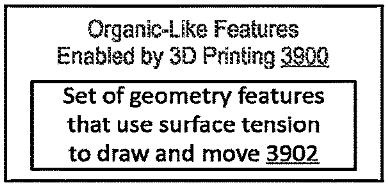
FIG. 39 is a schematic illustrating an example environment of a system of organic-like features enabled by 3D printing according to some embodiments of the present disclosure.

Referring now to FIG. 39, and with continued reference to FIGS. 1-38, a schematic illustrates an example environment of a system of organic-like features enabled by 3D printing 3900 according to some embodiments of the present disclosure. The system of organic-like features enabled by 3D printing 3900 includes a set of geometry features 3902 that use surface tension to draw and move.

Figure 40:
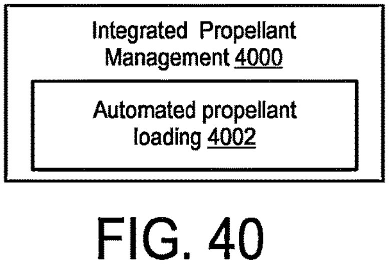
FIG. 40 is a schematic illustrating an example environment of a system of integrated propellant management according to some embodiments of the present disclosure.

Referring now to FIG. 40, and with continued reference to FIGS. 1-39, a schematic illustrates an example environment of a system of integrated propellant management 4000 according to some embodiments of the present disclosure. The system of integrated propellant management 4000 includes systems for automated propellant loading 4002.

Figure 41:
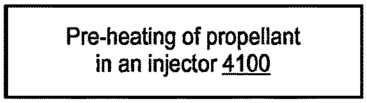
FIG. 41 is a schematic illustrating an example environment of a system of pre-heating of propellant in an injector according to some embodiments of the present disclosure.

Referring now to FIG. 41, and with continued reference to FIGS. 1-40, a schematic illustrates an example environment of a system of pre-heating of propellant in an injector 4100 according to some embodiments of the present disclosure.

Referring now to FIG. 42, and with continued reference to FIGS. 1-41, a schematic illustrates an example environment of a system of valve design features 4200 according to some embodiments of the present disclosure. The system of valve design features 4200 includes systems for valves that are integral to the system 4202, bulk metallic glass valve seats 4204, 3D printed valves 4206, CNC coil winding with 3D printed coil spools 4208, orifice metered optically confirmed valuing 4210, single-seat valve 4212, single-coil valve 4214, solenoid valve 4216, heat-breaks 4218, weep hole in valve body 4220, set of two offset eccentric holes 4222, dual-seat throttle valve 4224, v-port ball valve with space-rated/redundant actuators 4226, thruster trimming process where rotation of valve can adjust thruster trim 4228, and rotational valve that can lock into place 4230.

Referring now to FIG. 43, and with continued reference to FIGS. 1-42, a schematic illustrates an example environment of a system of tank design features 4300 according to some embodiments of the present disclosure. The system of tank design features 4300 includes systems for stretchable propulsion tanks 4302, positive displacement piston (PDP) tanks 4304, PDP tanks with orifice metered optically-confirmed valving 4306, PDP tanks with flow meter 4308, balancing and/or unbalancing multiple independent tanks 4310, and Reusable PDP tanks 4312.

Positive Displacement Tank Example

In some embodiments, the PDP tank 4304 for a space vehicle includes a barrel, a first dome, a second dome, a piston, a first polytetrafluoroethylene (PTFE) seal, and a second PTFE seal. The barrel has a first end and a second end. The first dome is coupled with the barrel at the first end. The second dome is coupled with the barrel at the second end. The piston is disposed within the barrel and is translatable between the first dome and the second dome to define a propellant cavity and a displacement cavity.

The first PTFE seal seals the piston in a sliding seal arrangement to the barrel to restrict propellant leakage from the propellant cavity to the displacement cavity. The second PTFE seal seals the piston to the barrel in a sliding arrangement to restrict propellant leakage from the propellant cavity to the displacement cavity. In the example provided, the second PTFE seal is in a series sealing arrangement with the first PTFE seal.

In some embodiments, the PDP tank 4304 includes a refueling port configured to receive propellant into the propellant cavity while in space after at least partial exhaustion of the propellant for propelling the space vehicle.

In some embodiments, the barrel is a machined wrought titanium pipe. In some embodiments, the barrel includes ribs and stringers topologically optimized to control tank stiffness based on a highly dynamic predetermined operational environment.

In some embodiments, an interior of the PDP tank 4304 is honed without heat and welding variations by being honed after the first barrel-dome weld to achieve fine surface finishes and run-out control. For example, by honing after welding, any heat distortion or welding artifacts may be addressed by the honing.

In some embodiments, the piston is a machined plate and includes two seal glands and an optimized geometry for minimizing propellant residuals. In some embodiments, the second dome is a closeout dome welded in in an inverted direction to reduce the amount of tank ullage and conserve pressurant gas.

In some embodiments, the first dome and the second dome have integral tube stubs. In some embodiments, the PDP tank 4304 includes a propulsion feed system and the integral tube stubs are welded directly into the propulsion feed system.

In some embodiments, at least one of the first dome, the second dome, or the barrel includes directly machined mechanical interface features to provide lightweight and high reliability mechanical connections with low added labor. In some embodiments, the barrel, the piston, the first dome, and the second dome are configured to interact to eliminate propellant slosh. In some embodiments, the PDP tank 4304 includes reusability features for promoting reuse of the propellant tank.

In some embodiments, the first PTFE seal and the second PTFE seal are spring energized in a doubly redundant arrangement. In some embodiments, at least one of the first PTFE seal and the second PTFE seal is seal tempered to control crystallinity and to improve sealing performance and strength over untampered seals.

In some embodiments, the piston is a contoured piston with 98% expulsion efficiency. In some embodiments, the positive displacement propellant tank has no more than a 2 psi pressure drop across the piston. In some embodiments, the PDP tank 4304 further includes piston rotation restriction features. In some embodiments, the piston rotation restriction features are part of at least one of the first PTFE seal and the second PTFE seal.

In some embodiments, at least one of the barrel, the first dome, or the second dome is a Ti-6Al-4V titanium material. In some embodiments, the Ti-6Al-4V titanium material of the at least one of the barrel, the first dome, or the second dome is E-beam welded to another of the least one of the barrel, the first dome, or the second dome.

In embodiments, the positive displacement propellant tank is utilized in an LDACS propulsion system. The propellant slosh elimination ensures that propellant is immediately available to the engine during dynamic flight operations and reduces undesirable weight shifting.

In an example, the positive displacement tank is compatible with Hydrazine/MON3 propellants, has a tank volume of 4.5 gallons, has dimensions of eight by 30 inches, has a dry weight of 3.26 lbs, has a max operating pressure of 350 psi, has a pressure drop of less than two psi across the piston, is E-beam welded per AMS2681, and is qualified under AIAA-S-80.

Referring now to FIG. 44, and with continued reference to FIGS. 1-43, a schematic illustrates an example environment of a system of combustion acoustics-damping/management features (including for the LE111) 4400 according to some embodiments of the present disclosure. The system of Combustion acoustics-damping/management features (including for the LE111) 4400 includes systems for acoustic quarter-wave resonator in a single piece print 4402.

Referring now to FIG. 45, and with continued reference to FIGS. 1-44, a schematic illustrates an example environment of a system of hypergolic propulsion design features 4500 according to some embodiments of the present disclosure. The system of hypergolic propulsion design features 4500 includes systems for and Storable chemicals 4502.

Figure 46:
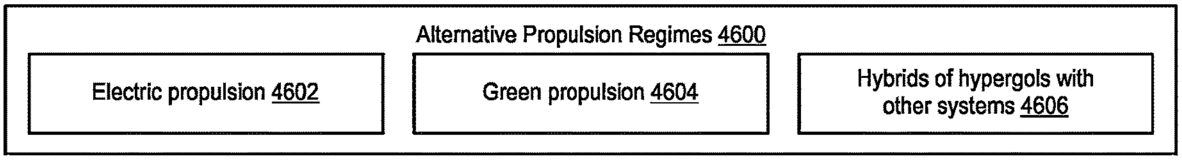
FIG. 46 is a schematic illustrating an example environment of a system of alternative propulsion regimes according to some embodiments of the present disclosure.

Referring now to FIG. 46, and with continued reference to FIGS. 1-45, a schematic illustrates an example environment of a system of alternative propulsion regimes 4600 according to some embodiments of the present disclosure. The system of alternative propulsion regimes 4600 includes systems for electric propulsion 4602, green propulsion 4604, and hybrids of hypergols with other systems 4606.

Figure 47:
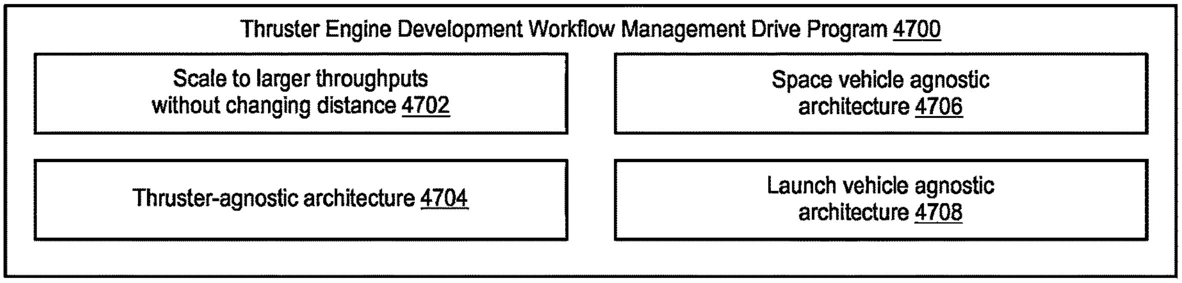
FIG. 47 is a schematic illustrating an example environment of a thruster engine development workflow management drive program according to some embodiments of the present disclosure.

Referring now to FIG. 47, and with continued reference to FIGS. 1-46, a schematic illustrates an example environment of a system of thruster engine development workflow management Drive Program 4700 according to some embodiments of the present disclosure. The system of thruster engine development workflow management Drive Program 4700 includes systems for scale to larger throughputs without changing distance 4702, thruster-agnostic architecture 4704, space vehicle agnostic architecture 4706, and launch vehicle agnostic architecture 4708.

Figure 48:
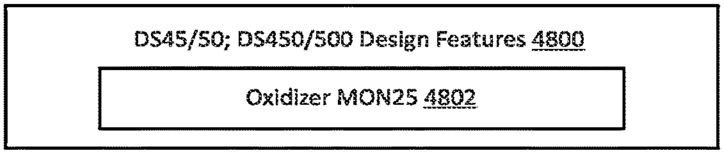
FIG. 48 is a schematic illustrating an example environment of a system of DS45/50; DS450/500 design features according to some embodiments of the present disclosure.

Referring now to FIG. 48, and with continued reference to FIGS. 1-47, a schematic illustrates an example environment of a system of DS45/50 and DS450/500 design Features 4800 according to some embodiments of the present disclosure. The system of DS45/50 and DS450/500 design features 4800 includes systems for MON25 oxidizer 4802.

Figure 49:
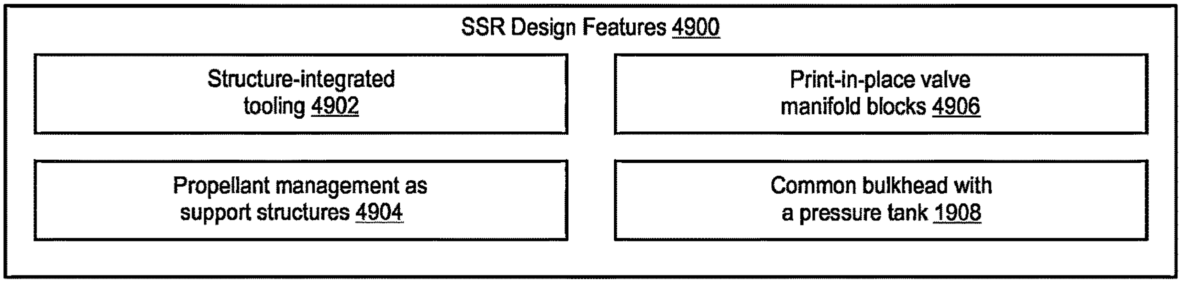
FIG. 49 is a schematic illustrating an example environment of a system of SSR design features according to some embodiments of the present disclosure.

Referring now to FIG. 49, and with continued reference to FIGS. 1-48, a schematic illustrates an example environment of a system of SSR design features 4900 according to some embodiments of the present disclosure. The system of SSR design features 4900 includes systems for structure-integrated tooling 4902, propellant management as support structures 4904, print-in-place valve manifold blocks 4906, and common bulkhead with a pressure tank 4908.

Referring now to FIG. 50, and with continued reference to FIGS. 1-49, a schematic illustrates an example environment of a system design features 5000 for a 111-N Hydrazine Bipropellant Engine (HBE) with Gas-Gas Injection according to some embodiments of the present disclosure. The system of LEI 11 design features 5000 includes systems with PMD omitted 5002, shark fin 5004, birdcage 5006, stiffness-enhancing pattern geometry to exit nozzle 5008, snap-off supports 5010, combined mixture-ratio control and FFC together 5012, manifolding 5014, injector manifold 5016, pressure management across face 5018, propellant distributed to elements in tree structure 5020, fractal injector 5022, bipropellant thruster 5024, dual-mode propellant 5026, dual-mode propellant with MMH/MON3 bipropellant 5028, dual-mode propellant with MMH/MON25 bipropellant 5030, dual-mode propellant with hydrazine/MON3 bipropellant 5032, hydrazine reactor catalytic pre-burner 5034, oxidizer cool regeneration cooling jacket 5036, reactor 5038, pebble-bed iridium coated alumina catalyst bed 5040, injector face with 3D printed self-supporting features 5042, combustion chamber with injector and reactor in single part 5044, turbulent mixing of oxidizer and fuel 5046, co-axial bi-propellant hypergol injector 5048, throttling engine 5050, throttle by controlling flow of propellants 5052, deep throttling by absence of pumps 5054, center-of-gravity balancing 5056, sensitive payloads 5058, four pack of thrusters 5060, swirling fins to reduce heat transfer to spacecraft 5062, even heating 5064, and Orifice control of film cooling 5066.

Figure 51:
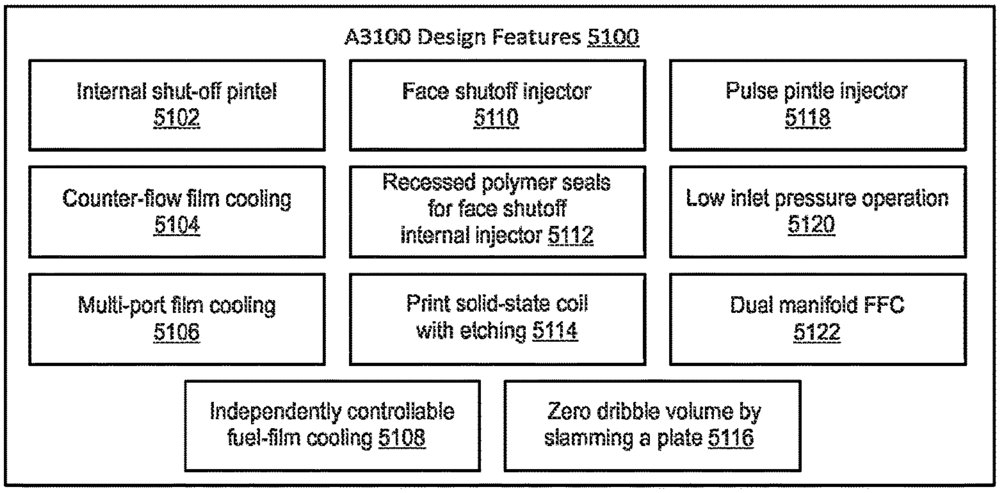
FIG. 51 is a schematic illustrating an example environment of a system of A3100 design features according to some embodiments of the present disclosure.

Referring now to FIG. 51, and with continued reference to FIGS. 1-50, a schematic illustrates an example environment of a system of A3100 design features 5100 according to some embodiments of the present disclosure. The system of A3100 design features 5100 includes systems with internal shut-off pintle 5102, counter-flow film cooling 5104, multi-port film cooling 5106, independently controllable fuel-film cooling 5108, face shutoff injector 5110, recessed polymer seals for face shutoff internal injector 5112, print solid-state coil with etching 5114, zero dribble volume by slamming a plate 5116, pulse pintle injector 5118, low inlet pressure operation 5120, and dual manifold FFC 5122.

Figure 52:
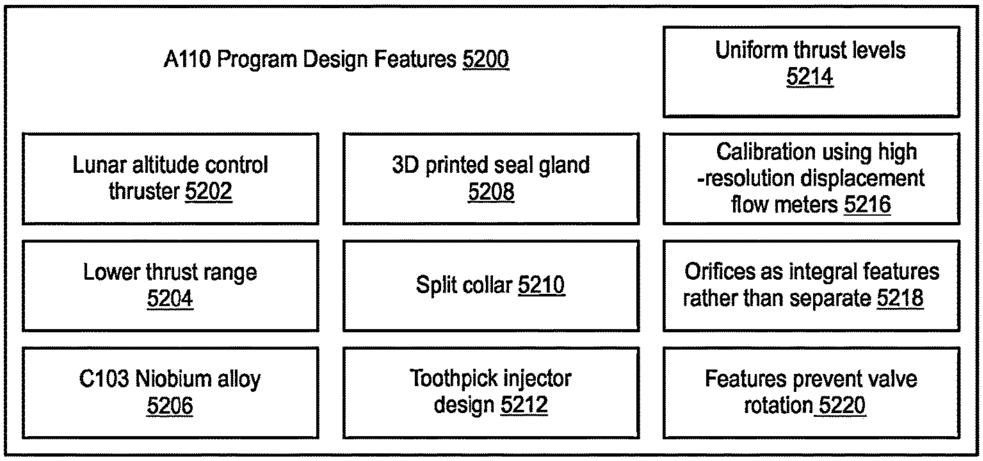
FIG. 52 is a schematic illustrating an example environment of a system of A110 program design features according to some embodiments of the present disclosure.

Referring now to FIG. 52, and with continued reference to FIGS. 1-51, a schematic illustrates an example environment of a system of A110 program design features according to some embodiments of the present disclosure. The system of A110 program design features includes systems for lunar altitude control thruster 5200, lower thrust range 5202, C-103 Niobium alloy 5204, 3D printed seal gland 5206, split collar 5208, toothpick injector design 5210, uniform thrust levels 5212, calibration using high-resolution displacement flow meters 5214, orifices as integral features rather than separate 5216, and features to prevent valve rotation 5218.

Figure 53:
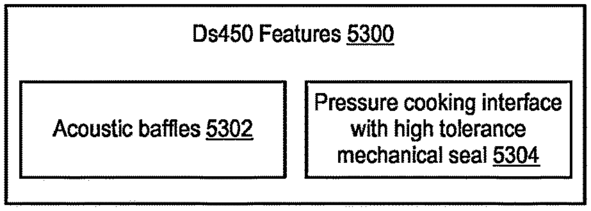
FIG. 53 is a schematic illustrating an example environment of a system of DS450 features according to some embodiments of the present disclosure.

Referring now to FIG. 53, and with continued reference to FIGS. 1-52, a schematic illustrates an example environment of a system of DS450 Features 5300 according to some embodiments of the present disclosure. The system of DS450 features 5300 includes systems for acoustic baffles 5302 and a pressure-cooking interface with high tolerance mechanical seal 5304.

Figure 54:
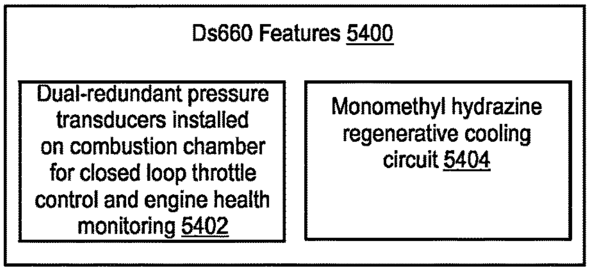
FIG. 54 is a schematic illustrating an example environment of a system of DS660 features according to some embodiments of the present disclosure.

Referring now to FIG. 54, and with continued reference to FIGS. 1-53, a schematic illustrates an example environment of a system of DS660 Features 5400 according to some embodiments of the present disclosure. The system of DS660 Features 5400 includes systems for dual-redundant pressure transducers installed on the combustion chamber for closed loop throttle control and engine health monitoring 5402 for and monomethylhydrazine regenerative cooling circuit 5404.

Referring now to FIG. 55, and with continued reference to FIGS. 1-54, a schematic illustrates an example environment of a system of other design features 5500 according to some embodiments of the present disclosure. The system of other design features 5500 includes systems for hydrazine monopropellant thruster having an iridium on alumina oxide pebble bed reactor and having a dual-seat hydrazine solenoid valve 5502, thruster with integrated electric heaters to warm catalyst 5504, bipropellant thruster that reaches 90% of thrust within 5 ms of receipt of electrical command 5506, chamber/nozzle with ceramic silicide coating 5508, iridium-lined rhenium combustion chamber/nozzle 5510, heavy-weight molybdenum TMZ alloy chambers 5512, axially paired divert module thruster orientation 5514, persistent maneuver capability 5516, dual mode propellant MON3/M20 5518, all internal features self-supporting 5520, delta-V Module 5522, gold-plated Inconel hot-gas seal 5524, high resistance thermal conduction pathways integrated into additively manufactured components 5526, floating injector 5528, turbulence generators to enhance gas-heat transfer 5530, on spacecraft active propellant utilization 5532, full authority digital engine controller (FADEC) 5534, thrust level and thrust vector where the engine figures out how to do that on its own 5536, printed and integral instrumentation ports 5538, printed and integral instrumentation ports with impression fittings 5540, 3D printed hot wall welded thermocouple port 5542, compliant hot wall structure 5544, multiple phases of heat transfer 5546, printed integral thrust take-up structures on the engine 5548, using power supply from electrical system as the power supply for a chemical thruster 5550, chemical as an anode for an electric propulsion system 5552, control base charge of space vehicle and do frequency suppression of the power supply 5554, add silicon oil to propellant 5556, add siloxane to propellants 5558, add tetraethyl orthosilicate to propellants 5560, propellant pressurization 5562, oxidation-resistant layer printed in chamber 5564, valves with electrically insulating material and thermally conducting material 5566, pressure vessels with impermeable material wrapped in high tensile modulus material 5568, multi-phase ejectors 5570, nitrous ejector 5572. IR camera 5574, vibrational mode interruption with additively printed support structures in nozzle 5576, dual seal piston tank 5578, triple seal 5580, and moonroof on thruster 5582.

Figure 56:
FIG. 56 is a schematic illustrating an example environment of a system of Monolithic multi-thrust assemblies according to some embodiments of the present disclosure.

Referring now to FIG. 56, and with continued reference to FIGS. 1-55, a schematic illustrates an example environment of a system of monolithic multi-thrust assemblies 5600 according to some embodiments of the present disclosure.

Figure 57:
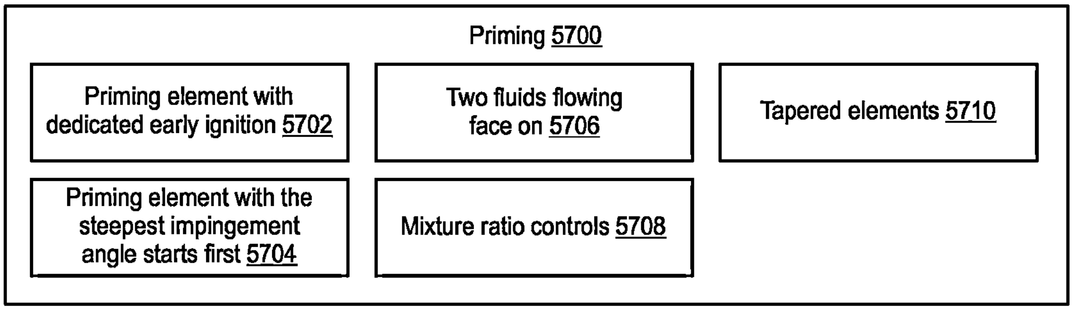
FIG. 57 is a schematic illustrating an example environment of a system of priming according to some embodiments of the present disclosure.

Referring now to FIG. 57, and with continued reference to FIGS. 1-56, a schematic illustrates an example environment of a system of priming 5700 according to some embodiments of the present disclosure. The system of priming 5700 includes systems for a priming element with dedicated early ignition 5702, priming element where the steepest impingement angle starts first 5704, two fluids flowing face on 5706, mixture ratio controls 5708, and tapered elements 5710.

Figure 58:
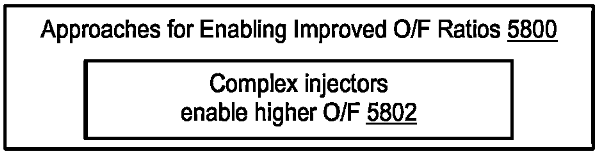
FIG. 58 is a schematic illustrating an example environment of a system of approaches for enabling improved O/F ratios according to some embodiments of the present disclosure.

Referring now to FIG. 58, and with continued reference to FIGS. 1-57, a schematic illustrates an example environment of a system of approaches for enabling improved ON ratios 5800 according to some embodiments of the present disclosure. The system of approaches for enabling improved O/F ratios 5800 includes systems for complex injectors that enable higher ON 5802.

Figure 59:
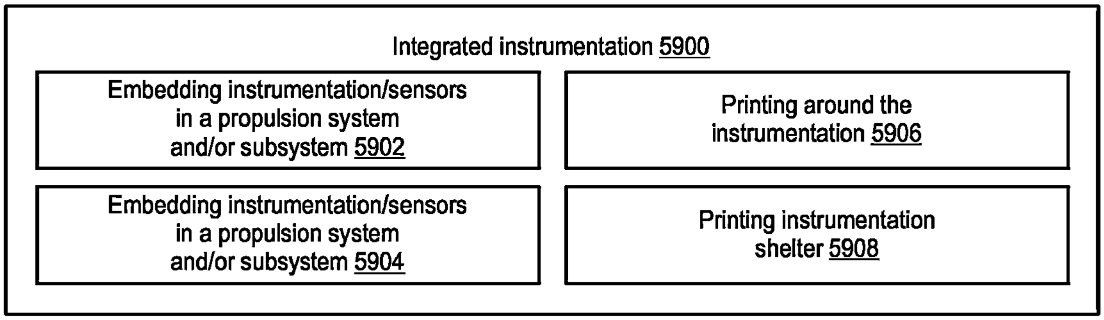
FIG. 59 is a schematic illustrating an example environment of a system of integrated instrumentation according to some embodiments of the present disclosure.

Referring now to FIG. 59, and with continued reference to FIGS. 1-58, a schematic illustrates an example environment of a system of integrated instrumentation 5900 according to some embodiments of the present disclosure. The system of integrated instrumentation 5900 includes systems for embedding instrumentation/sensors in a propulsion system and/or subsystem 5902, embedding instrumentation/sensors in a propulsion system and/or subsystem 5904, printing around the instrumentation 5906, and printing instrumentation shelter 5908. The system of integrated instrumentation 5900 also includes instrumentation port cooling, close coupled tuned pressure instrumentation ports, and the like.

Figure 60:
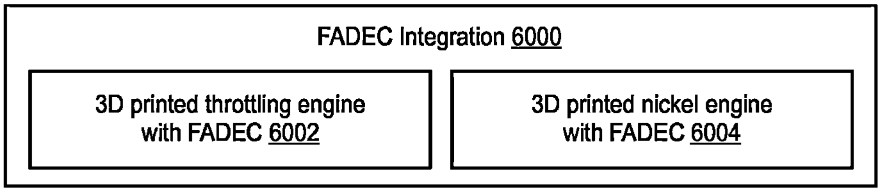

Referring now to FIG. 60, and with continued reference to FIGS. 1-59, a schematic illustrates an example environment of a system of FADEC integration 6000 according to some embodiments of the present disclosure. The system of FADEC integration 6000 includes systems for 3D printed throttling engine with FADEC 6002 and 3D printed nickel engine with FADEC 6004.

Figure 61:
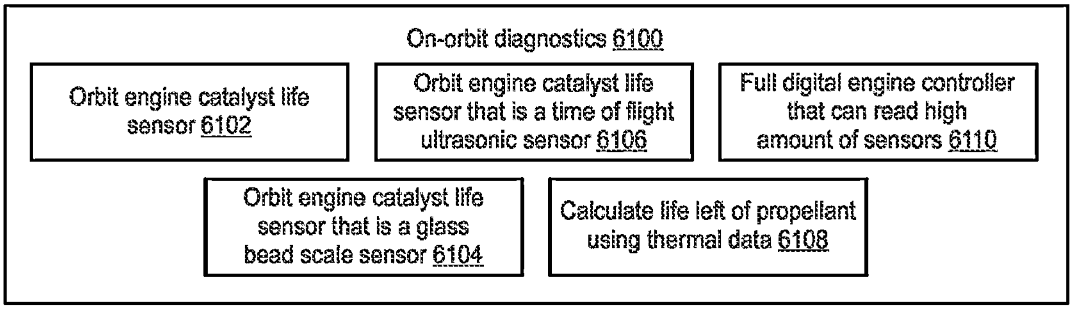
FIG. 61 is a schematic illustrating an example environment of a system of on-orbit diagnostics according to some embodiments of the present disclosure.

Referring now to FIG. 61, and with continued reference to FIGS. 1-60, a schematic illustrates an example environment of a system of on-orbit diagnostics 6100 according to some embodiments of the present disclosure. The system of on orbit diagnostics 6100 includes systems for orbit engine catalyst life sensor 6102, orbit engine catalyst life sensor that is a glass bead scale sensor 6104, orbit engine catalyst life sensor that is a time-of-flight ultrasonic sensor 6106, calculate life left of propellant using thermal data 6108, and full digital engine controller that can read a high number and type of sensors 6110.

Figure 62:
FIG. 62 is a schematic illustrating an example environment of a system of multi-engine control algorithms according to some embodiments of the present disclosure.

Referring now to FIG. 62, and with continued reference to FIGS. 1-61, a schematic illustrates an example environment of a system of multi-engine control algorithms 6200 according to some embodiments of the present disclosure.

Additive Manufacturing Platform for Space Propulsion Systems

Figure 63:
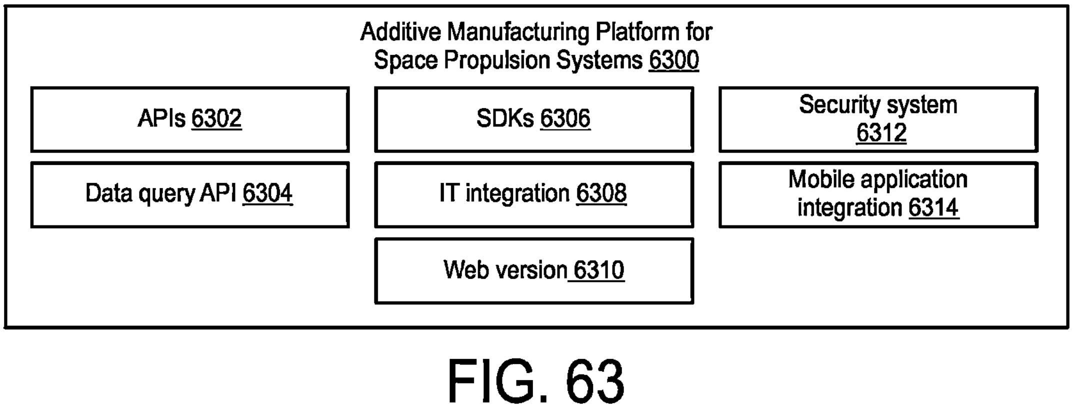
FIG. 63 is a schematic illustrating an example environment of a system of additive manufacturing platform for space propulsion systems according to some embodiments of the present disclosure.

Referring now to FIG. 63, and with continued reference to FIGS. 1-62, a schematic illustrates an example environment of an additive manufacturing platform for space propulsion systems 6300 according to some embodiments of the present disclosure. The additive manufacturing platform for space propulsion systems 63000 includes systems for APIs 6302, data query API 6304, SDKs 6300, IT integration 6308, web version 6310, security system 6312, and mobile application integration 6314.

Figure 64:
FIG. 64 is a schematic illustrating an example environment of a system of a mobile application for enabling mobile access to the platform according to some embodiments of the present disclosure.

Referring now to FIG. 64, and with continued reference to FIGS. 1-63, a schematic illustrates an example environment of a system of a mobile application for enabling mobile access to the platform 6400 according to some embodiments of the present disclosure.

Figure 65:
FIG. 65 is a schematic illustrating an example environment of a system of a user interface for an additive manufacturing platform for space propulsion systems according to some embodiments of the present disclosure.

Referring now to FIG. 65, and with continued reference to FIGS. 1-64, a schematic illustrates an example environment of a system of user interface for an additive manufacturing platform for space propulsion systems 6500 according to some embodiments of the present disclosure.

Figure 66:
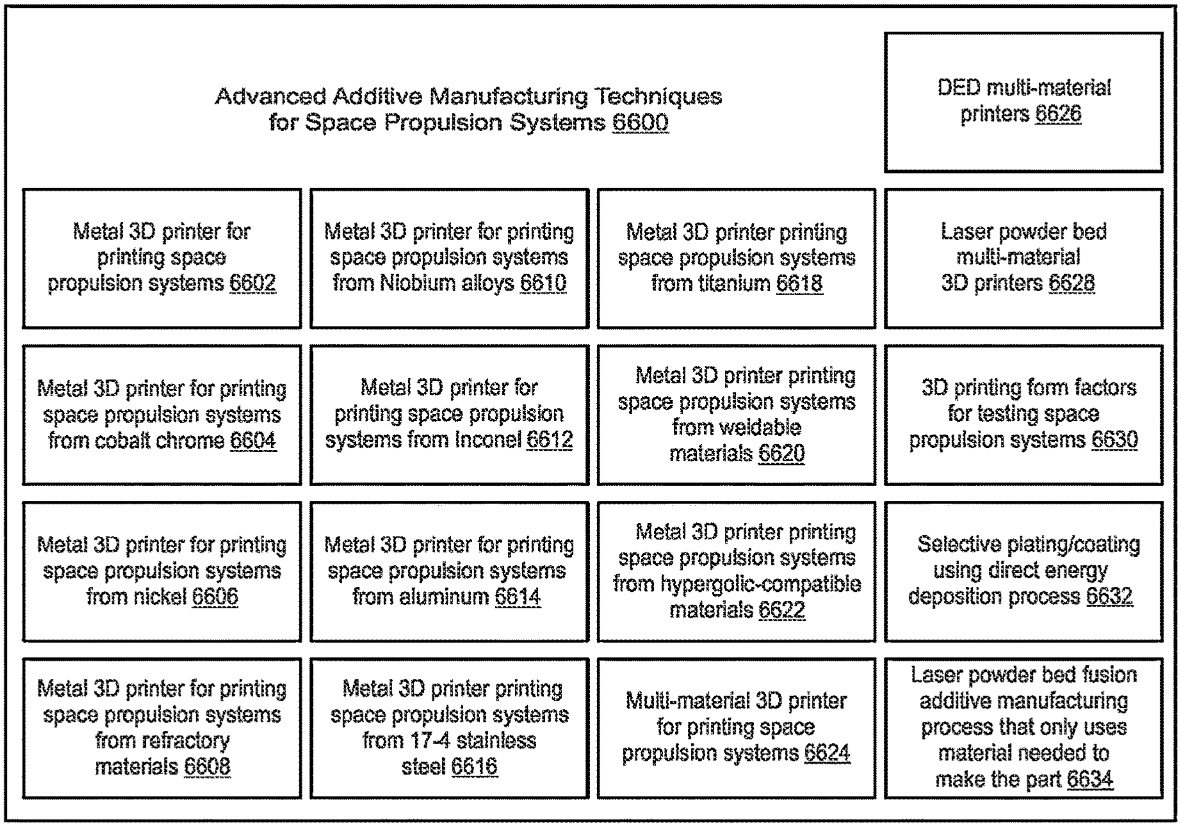
FIG. 66 is a schematic illustrating an example environment of a system of advanced additive manufacturing techniques for space propulsion systems according to some embodiments of the present disclosure.

Referring now to FIG. 66, and with continued reference to FIGS. 1-65, a schematic illustrates an example environment of a system of advanced additive manufacturing techniques for space propulsion systems 6600 according to some embodiments of the present disclosure. The system of advanced additive manufacturing techniques for space propulsion systems 6600 includes systems for metal 3D printer for printing space propulsion systems 6602, metal 3D printer for printing space propulsion systems from cobalt chrome 6604, metal 3D printer for printing space propulsion systems from nickel 6606, metal 3D printer for printing space propulsion systems from refractory materials 6608, metal 3D printer for printing space propulsion systems from Niobium alloys 6610, metal 3D printer for printing space propulsion systems from Inconel 6612, metal 3D printer for printing space propulsion systems from aluminum 6614, metal 3D printer for printing space propulsion systems from 17-4 stainless steel 6616, metal 3D printer for printing space propulsion systems from titanium 6618, metal 3D printer for printing space propulsion systems from weldable materials. 6620, metal 3D printer for printing space propulsion systems from hypergolic-compatible materials. 6622, multi-material 3D printer for printing space propulsion systems 6624, DED multi-material printers 6626, laser powder bed multi-material 3D printers 6628, 3D printing form factors for testing space propulsion systems 6630, selective plating/coating using direct energy deposition process 6632, and laser powder bed fusion additive manufacturing process that only uses material needed to make the part 6634.

Figure 67:
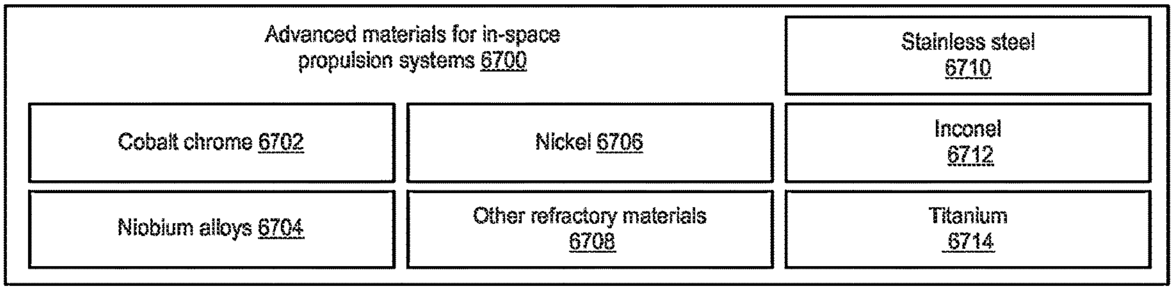
FIG. 67 is a schematic illustrating an example environment of a system of advanced materials for in-space propulsion systems according to some embodiments of the present disclosure.

Referring now to FIG. 67, and with continued reference to FIGS. 1-66, a schematic illustrates an example environment of a system of advanced materials for in-space propulsion systems 6700 according to some embodiments of the present disclosure. The system of advanced materials for in-space propulsion systems 6700 includes systems for cobalt chrome 6702. Niobium alloys 6704, nickel 6706, other refractory materials 6708, stainless steel 6710, Inconel 6712, and Titanium 6714.

Figure 68:
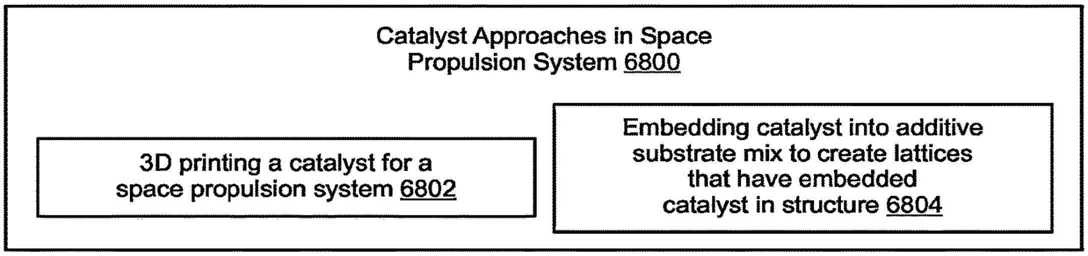
FIG. 68 is a schematic illustrating an example environment of a system of catalyst approaches in space propulsion systems according to some embodiments of the present disclosure.

Referring now to FIG. 68, and with continued reference to FIGS. 1-67, a schematic illustrates an example environment of a system of catalyst approaches in space propulsion systems 6800 according to some embodiments of the present disclosure. The system of catalyst approaches in space propulsion systems 6800 includes systems for 3D printing a catalyst for a space propulsion system 6802 and embedding catalyst into additive substrate mix to create lattices that have embedded catalyst in structure 6804.

Figure 69:
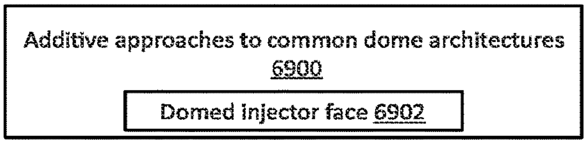
FIG. 69 is a schematic illustrating an example environment of a system of additive approaches to common dome architectures according to some embodiments of the present disclosure.

Referring now to FIG. 69, and with continued reference to FIGS. 1-68, a schematic illustrates an example environment of a system of additive approaches to common dome architectures 6900 according to some embodiments of the present disclosure. The system of additive approaches to common dome architectures 6900 includes a system for a domed injector face 6902.

Figure 70:
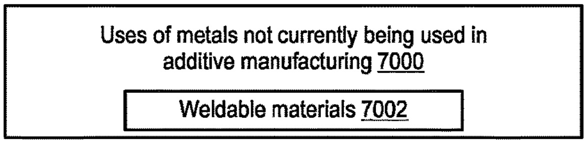
FIG. 70 is a schematic illustrating an example environment of a system of uses of metals not conventionally used in additive manufacturing according to some embodiments of the present disclosure.

Referring now to FIG. 70, and with continued reference to FIGS. 1-69, a schematic illustrates an example environment of a system of uses of metals not conventionally used in additive manufacturing 7000 according to some embodiments of the present disclosure. The system of uses of metals not conventionally used in additive manufacturing 7004) includes systems for weldable materials 7002.

Figure 71:
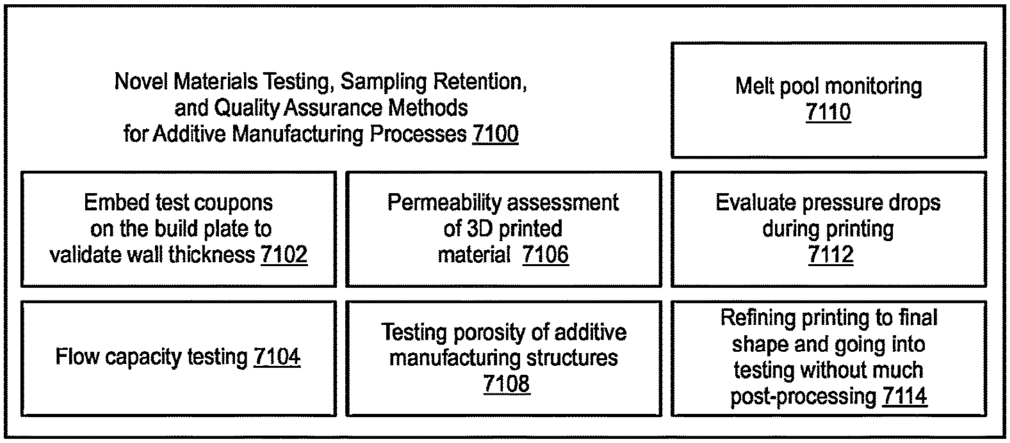
FIG. 71 is a schematic illustrating an example environment of a system of novel materials testing, sampling retention, and quality assurance methods for additive manufacturing processes according to some embodiments of the present disclosure.

Referring now to FIG. 71, and with continued reference to FIGS. 1-70, a schematic illustrates an example environment of a system of novel materials testing, sampling retention, and quality assurance methods for additive manufacturing processes 7100 according to some embodiments of the present disclosure. The system of novel materials testing, sampling retention, and quality assurance methods for additive manufacturing processes 7100 includes systems for embedding test coupons on the build plate to validate wall thicknesses 7102, flow capacity testing 7104, permeability assessment of 3D printed material 7106, testing porosity of additive manufacturing structures 7108, melt pool monitoring 7110, evaluating pressure drops during printing 7112, and refining printing to final shape and going into testing without much post-processing 7114. The system of novel materials testing, sampling retention, and quality assurance methods for additive manufacturing processes 7100 also includes systems for strategically placed material coupons on a part build, snap off material coupons, snap off build structures, and the like.

Figure 72:
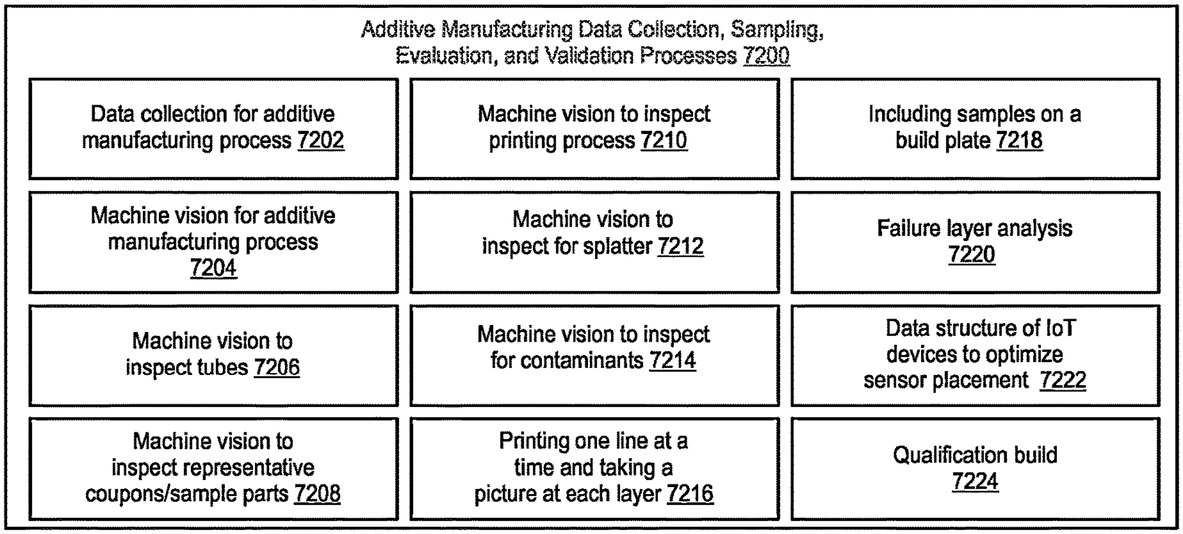
FIG. 72 is a schematic illustrating an example environment of a system of additive manufacturing data collection, sampling, evaluation, and validation processes according to some embodiments of the present disclosure.

Referring now to FIG. 72, and with continued reference to FIGS. 1-71, a schematic illustrates an example environment of a system of additive manufacturing data collection, sampling, evaluation, and validation processes 7200 according to some embodiments of the present disclosure. The system of additive manufacturing data collection, sampling, evaluation, and validation processes 7200 includes systems for data collection for additive manufacturing process 7202, machine vision for additive manufacturing process 7204, machine vision to inspect cubes 7206, machine vision to inspect representative coupons/sample parts 7208, machine vision to inspect printing process 7210, machine vision to inspect for splatter 7212, machine vision to inspect for contaminants 7214, printing one line at a time and taking a picture at each layer 7216, including samples on a build plate 7218, failure layer analysis 7220, data structure of IoT devices to optimize sensor placement 7222, and qualification build 7224.

Figure 73:
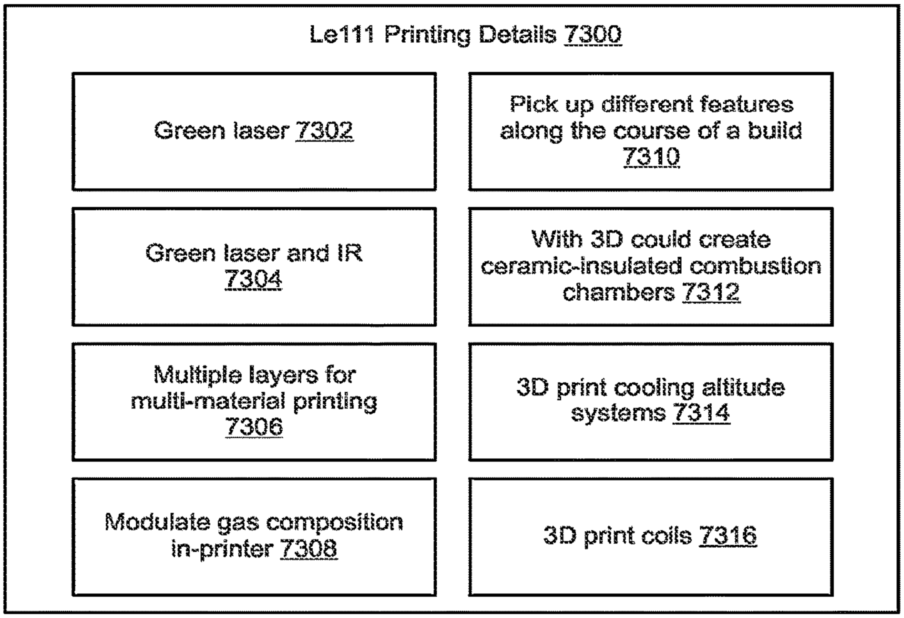
FIG. 73 is a schematic illustrating an example environment of a system of LEI 11 printing details according to some embodiments of the present disclosure.

Referring now to FIG. 73, and with continued reference to FIGS. 1-72, a schematic illustrates an example environment of a system of LE111 printing details 7300 according to some embodiments of the present disclosure. The system of LE111 printing details 7300 includes systems for green laser 7302, green laser and IR 7304, multiple layers for multi-material printing 7306, modulate gas composition in-printer 7308, pick up different features along the course of a build 7310, with ceramic-insulated combustion chambers enabled by additive manufacturing 7312, 3D print cooling altitude systems 7314, and 3D print coils 7316.

Figure 74:
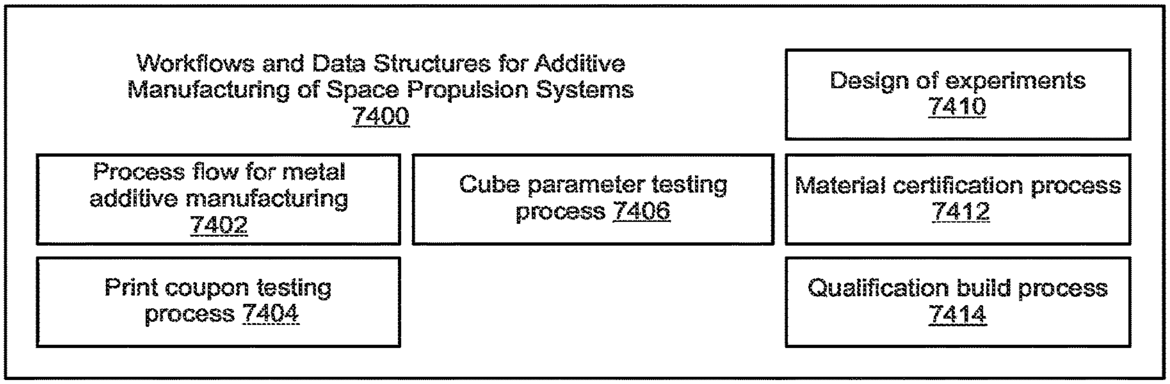
FIG. 74 is a schematic illustrating an example environment of a system of workflows and data structures for additive manufacturing of space propulsion systems according to some embodiments of the present disclosure.

Referring now to FIG. 74, and with continued reference to FIGS. 1-73, a schematic illustrates an example environment of a system of workflows and data structures for additive manufacturing of space propulsion systems 7400 according to some embodiments of the present disclosure. The system of workflows and data structures for additive manufacturing of space propulsion systems 7400 includes systems for process flow for metal additive manufacturing 7402, print coupon testing process 7404, cube parameter testing process 7406, design of experiments 7410, material certification process 7412, and qualification build process 7414.

Figure 75:
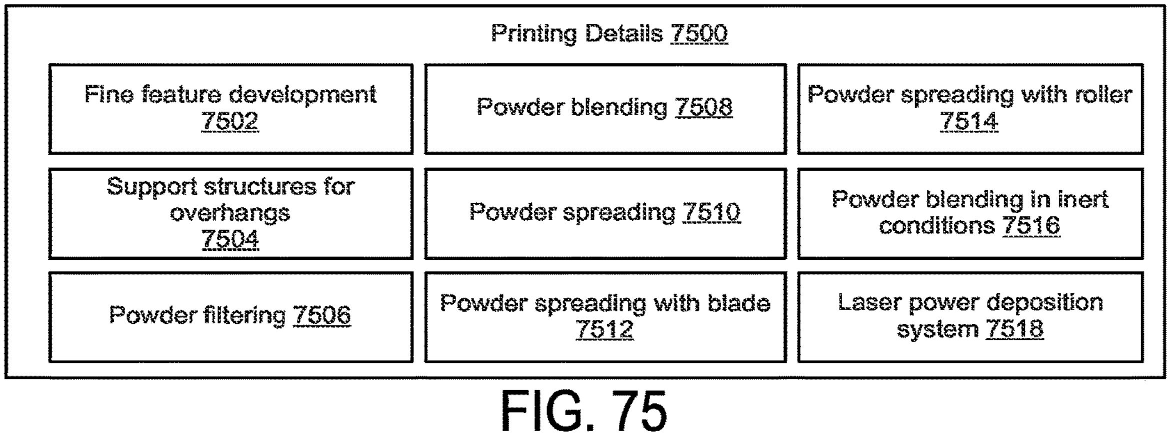
FIG. 75 is a schematic illustrating an example environment of a system of printing details according to some embodiments of the present disclosure.

Referring now to FIG. 75, and with continued reference to FIGS. 1-74, a schematic illustrates an example environment of a system of printing details 7500 according to some embodiments of the present disclosure. The system of printing details 7500 includes systems for fine feature development 7502, support structures for overhangs 7504, powder filtering 7506, powder blending 7508, powder spreading 7510, powder spreading with blade 7512, powder spreading with roller 7514, powder blending in inert conditions 7516, and laser power deposition system 7518.

Figure 76:
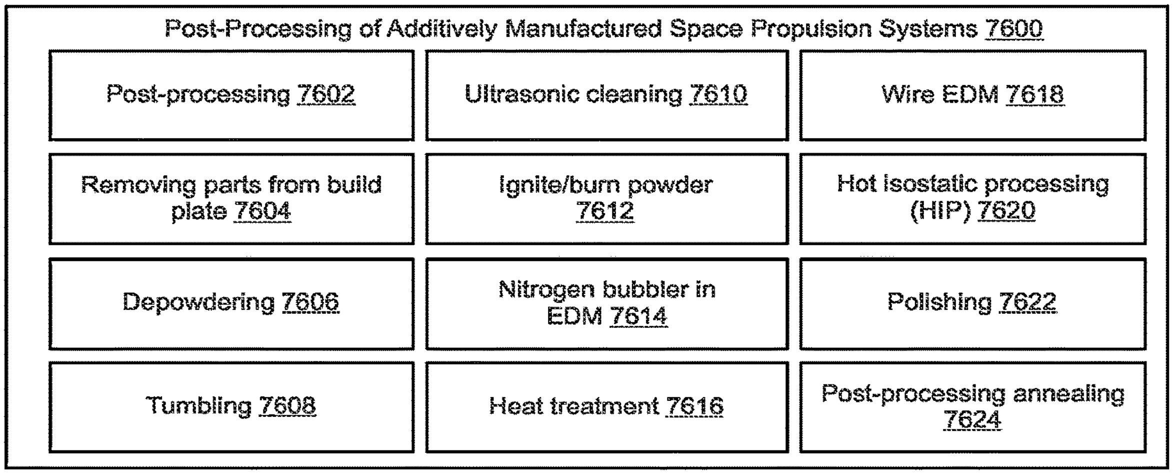
FIG. 76 is a schematic illustrating an example environment of a system of post-processing of additively manufactured space propulsion systems according to some embodiments of the present disclosure.

Referring now to FIG. 76, and with continued reference to FIGS. 1-75, a schematic illustrates an example environment of a system of post-processing of additively manufactured space propulsion systems 7600 according to some embodiments of the present disclosure. The system of post-processing of additively manufactured space propulsion systems 7600 includes systems for post-processing 7602, removing parts from build plate 7604, de-powdering 7606, tumbling 7608, ultrasonic cleaning 7610, ignite/burn powder 7612. Nitrogen bubbler in EDM 7614, heat treatment 7616, wire EDM 7618, hot isostatic processing (HIP) 7620, polishing 7622, and post-processing annealing 7624.

Figure 77:
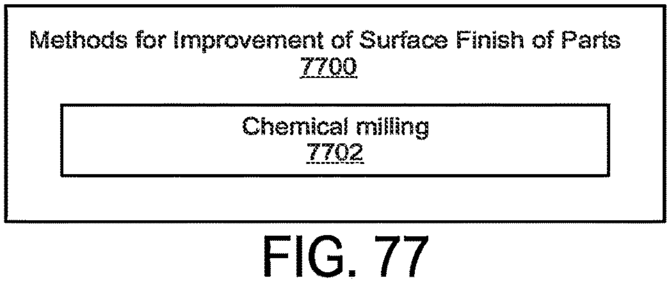
FIG. 77 is a schematic illustrating an example environment of a system of methods for improvement of surface finish of parts according to some embodiments of the present disclosure.

Referring now to FIG. 77, and with continued reference to FIGS. 1-76, a schematic illustrates an example environment of a system of methods for improvement of surface finish of parts 7700 according to some embodiments of the present disclosure. The system of methods for improvement of surface finish of parts 7700 includes chemical milling 7702.

Figure 78:
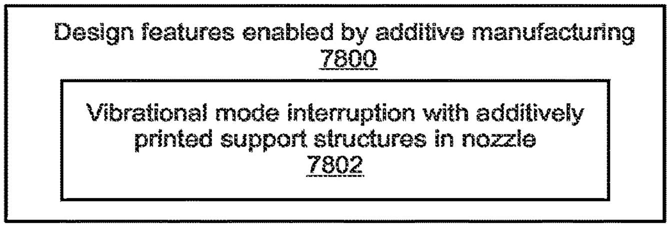
FIG. 78 is a schematic illustrating an example environment of a system of design features enabled by additive manufacturing according to some embodiments of the present disclosure.

Referring now to FIG. 78, and with continued reference to FIGS. 1-77, a schematic illustrates an example environment of a system of design features enabled by additive manufacturing 7800 according to some embodiments of the present disclosure. The system of design features enabled by additive manufacturing 7800 includes vibrational mode interruption with additively printed support structures in nozzle 7802.

Figure 79:
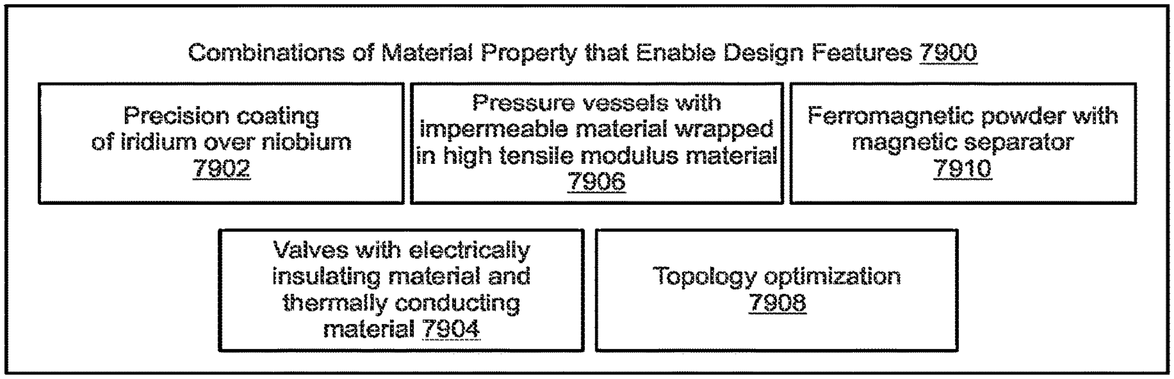
FIG. 79 is a schematic illustrating an example environment of a system of combinations of material property that enable design features according to some embodiments of the present disclosure.

Referring now to FIG. 79, and with continued reference to FIGS. 1-78, a schematic illustrates an example environment of a system of combinations of material property that enable design features 7900 according to some embodiments of the present disclosure. The system of combinations of material properties that enable design features 7900 includes systems for precision coating of iridium over niobium 7902, valves with electrically insulating material and thermally conducting material 7904, pressure vessels with impermeable material wrapped in high tensile modulus material 7906, topology optimization 7908, and ferromagnetic powder with magnetic separator 7910.

Figure 80:
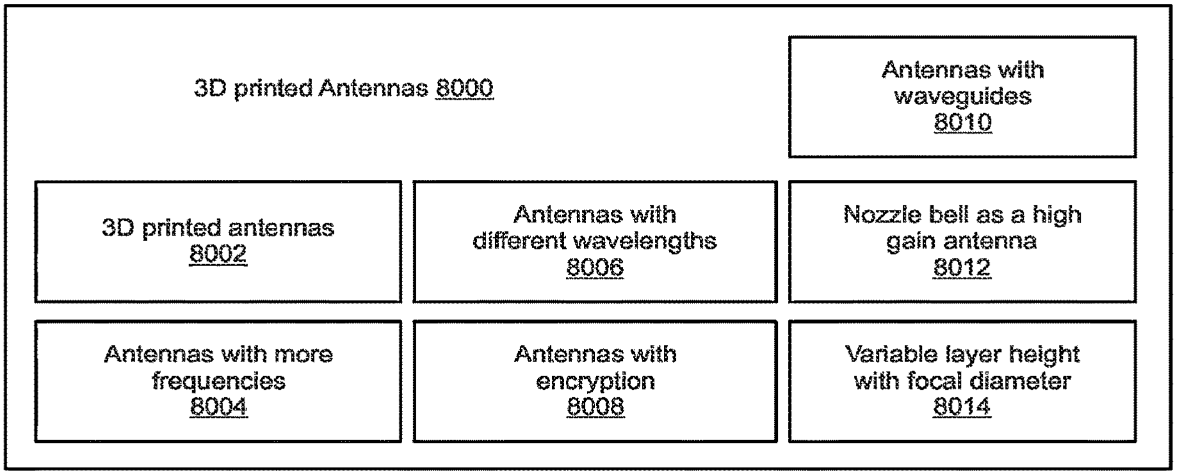
FIG. 80 is a schematic illustrating an example environment of a system of 3D printed antennas according to some embodiments of the present disclosure.

Referring now to FIG. 80, and with continued reference to FIGS. 1-79, a schematic illustrates an example environment of a system of 3D printed antennas 8000 according to some embodiments of the present disclosure. The system of 3D printed antennas 8000 includes systems for 3D printed antenna 8002, antennas with more frequencies 8004, antennas with different wavelengths 8000, antennas with encryption 8008, antennas with waveguides 8010, nozzle bell as a high gain antenna 8012, and variable layer height with focal diameter 8014.

Figure 81:
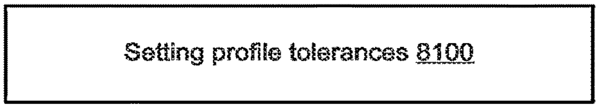
FIG. 81 is a schematic illustrating an example environment of a system of setting profile tolerances according to some embodiments of the present disclosure.

Referring now to FIG. 81, and with continued reference to FIGS. 1-80, a schematic illustrates an example environment of a system of setting profile tolerances 8100 according to some embodiments of the present disclosure.

Figure 82:
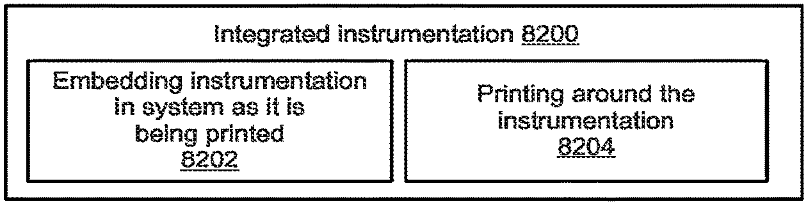
FIG. 82 is a schematic illustrating an example environment of a system of integrated instrumentation according to some embodiments of the present disclosure.

Referring now to FIG. 82, and with continued reference to FIGS. 1-81, a schematic illustrates an example environment of a system of integrated instrumentation 8200 according to some embodiments of the present disclosure. The system of integrated instrumentation 8200 includes systems for embedding instrumentation in the system as it is being printed 8202 and printing around the instrumentation 8204.

Figure 83:
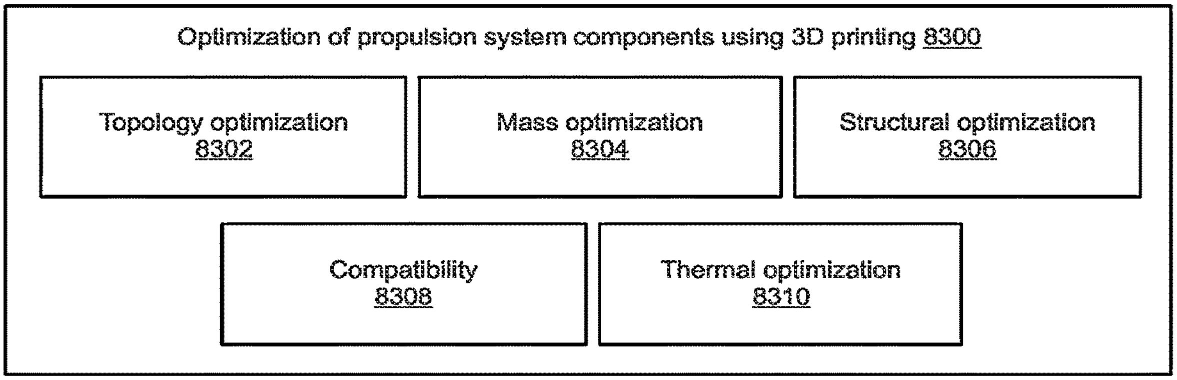
FIG. 83 is a schematic illustrating an example environment of a system of optimization of propulsion system components using 3D printing according to some embodiments of the present disclosure.

Referring now to FIG. 83, and with continued reference to FIGS. 1-82, a schematic illustrates an example environment of a system of optimization of propulsion system components using 3D printing 8300 according to some embodiments of the present disclosure. The system of optimization of propulsion system components using 3D printing 8300 includes systems for topology optimization 8302, mass optimization 8304, structural optimization 8306, compatibility 8308, and thermal optimization 8310. The system of optimization of propulsion system components using 3D printing 8300 includes systems for topology optimization for mass reduction, structural optimization, fluid flows, reacting flows, thermal management, propulsion aesthetics, and the like.

Figure 84:
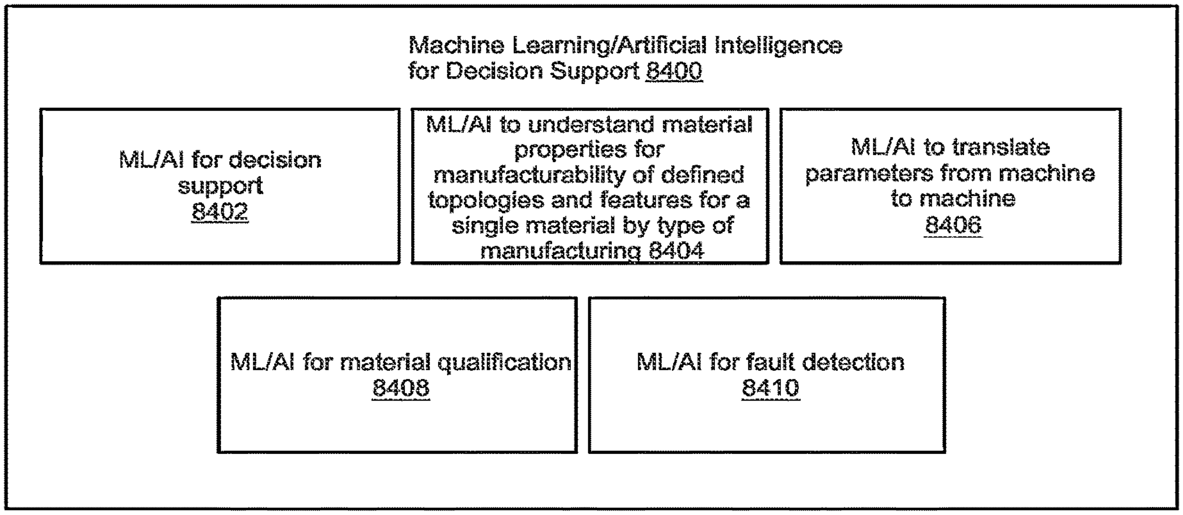
FIG. 84 is a schematic illustrating an example environment of a system of machine learning/artificial intelligence for decision support according to some embodiments of the present disclosure.

Referring now to FIG. 84, and with continued reference to FIGS. 1-83, a schematic illustrates an example environment of a system of machine learning/artificial intelligence for decision support 8400 according to some embodiments of the present disclosure. The system of machine learning/artificial intelligence for decision support 8400 includes systems for ML/AI for decision support 8402. ML/AI to understand material properties for manufacturability of defined topologies and features for a single material by type of manufacturing 8404, ML/AI to translate parameters from machine to machine 8406, ML/AI for material qualification 8408, and ML/AI for fault detection 8410.

Figure 85:
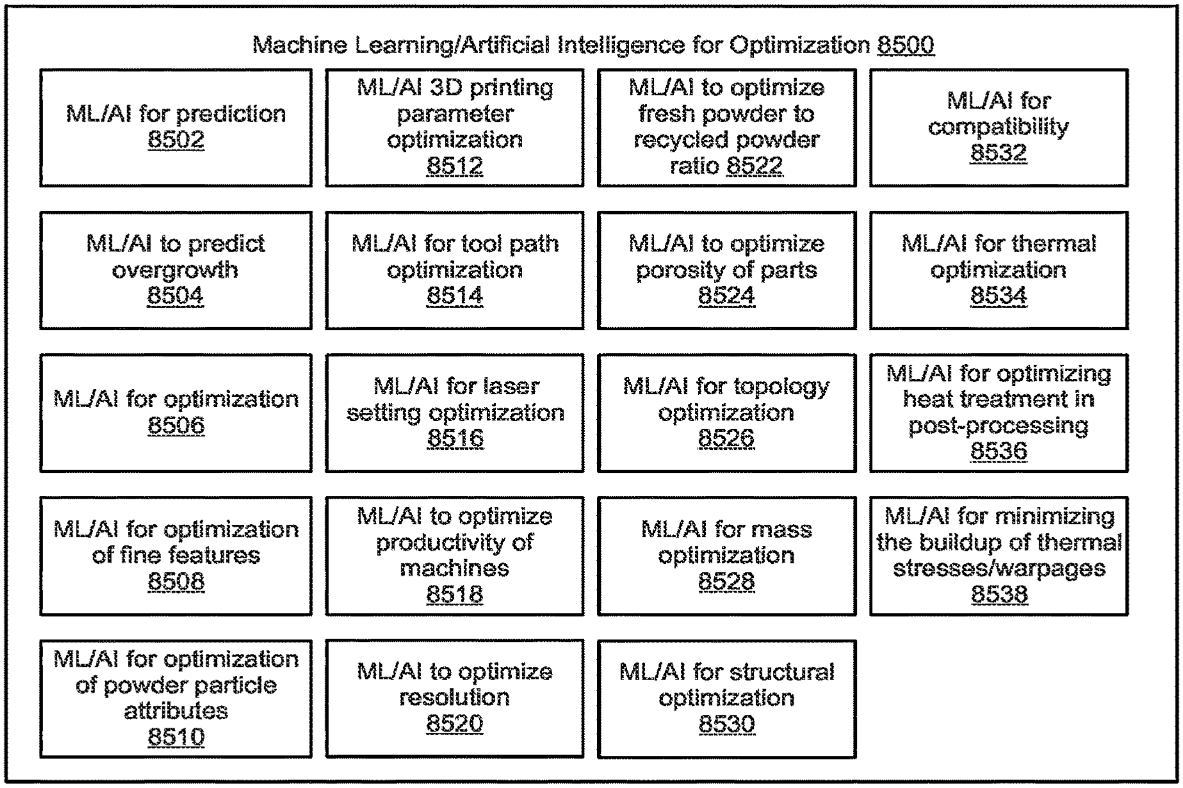
FIG. 85 is a schematic illustrating an example environment of a system of machine learning/artificial intelligence for prediction according to some embodiments of the present disclosure.

Referring now to FIG. 85, and with continued reference to FIGS. 1-84, a schematic illustrates an example environment of a system of machine learning/artificial intelligence for prediction 8500 according to some embodiments of the present disclosure. The system of machine learning/artificial intelligence for prediction 8500 includes systems for ML/AI for prediction 8502, ML/AI to predict overgrowth 8504, ML/AI for optimization 8506, ML/AI for optimization of surface finishes 8508. ML/AI for optimization of fine features 8510, ML/AI for optimization of powder particle attributes. 8512, ML/AI 3D printing parameter optimization 8514, ML/AI for tool path optimization 8516, ML/AI for laser setting optimization. 8518, ML/AI to optimize the productivity of machines 8520, ML/AI to optimize resolution 8522, ML/AI to optimize fresh powder to recycled powder ratio 8524, ML/AI to optimize porosity of parts 8526, ML/AI for topology optimization 8528. ML/AI for mass optimization 8530. ML/AI for structural optimization 8532, ML/AI for compatibility 8534. ML/AI for thermal optimization 8536. ML/AI for optimizing heat treatment in post-processing 8538, and ML/AI for minimizing the buildup of thermal stresses/warpages 8540.

Figure 86:
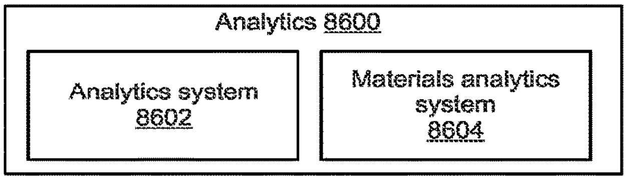
FIG. 86 is a schematic illustrating an example environment of a system of analytics according to some embodiments of the present disclosure.

Referring now to FIG. 86, and with continued reference to FIGS. 1-85, a schematic illustrates an example environment of a system of analytics 8600 according to some embodiments of the present disclosure. The system of analytics 8600 includes systems for analytics system 8602 and materials analytics system 8604.

Figure 87:
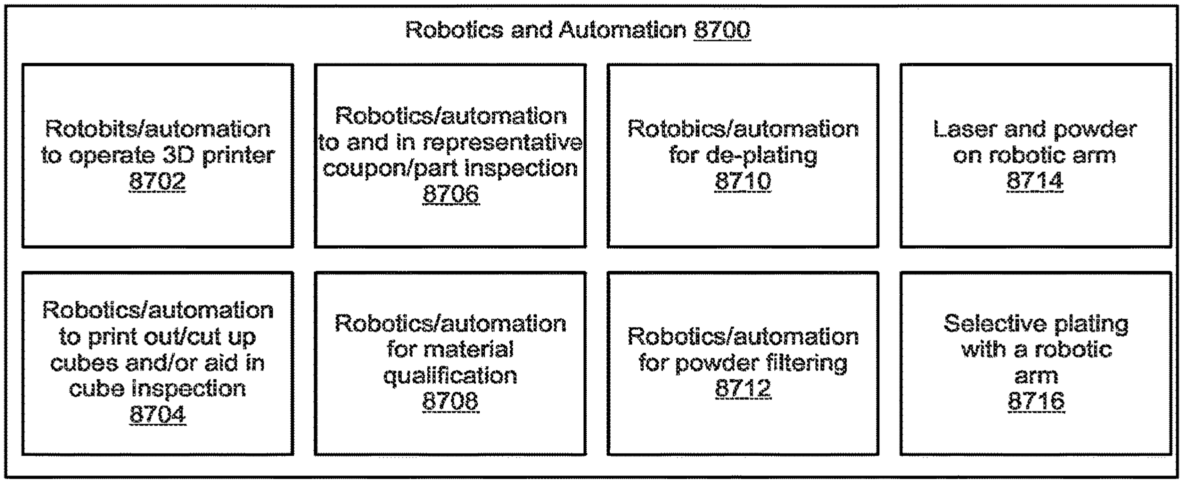
FIG. 87 is a schematic illustrating an example environment of a system of robotics/automation according to some embodiments of the present disclosure.

Referring now to FIG. 87, and with continued reference to FIGS. 1-86, a schematic illustrates an example environment of a system of robotics/automation 8700 according to some embodiments of the present disclosure. The system of robotics/automation 8700 includes systems for robotics/automation to operate 3D printer 8702, robotics/automation to print out/cut up cubes and/or aid in cube inspection. 8704, robotics/automation to aid in representative coupon/part inspection 8706, robotics/automation for material qualification 8708, robotics/automation for de-plating 8710, robotics/automation for powder filtering 8712, laser and powder on a robotic arm 8714, and selective plating with a robotic arm 8716.

Figure 88:
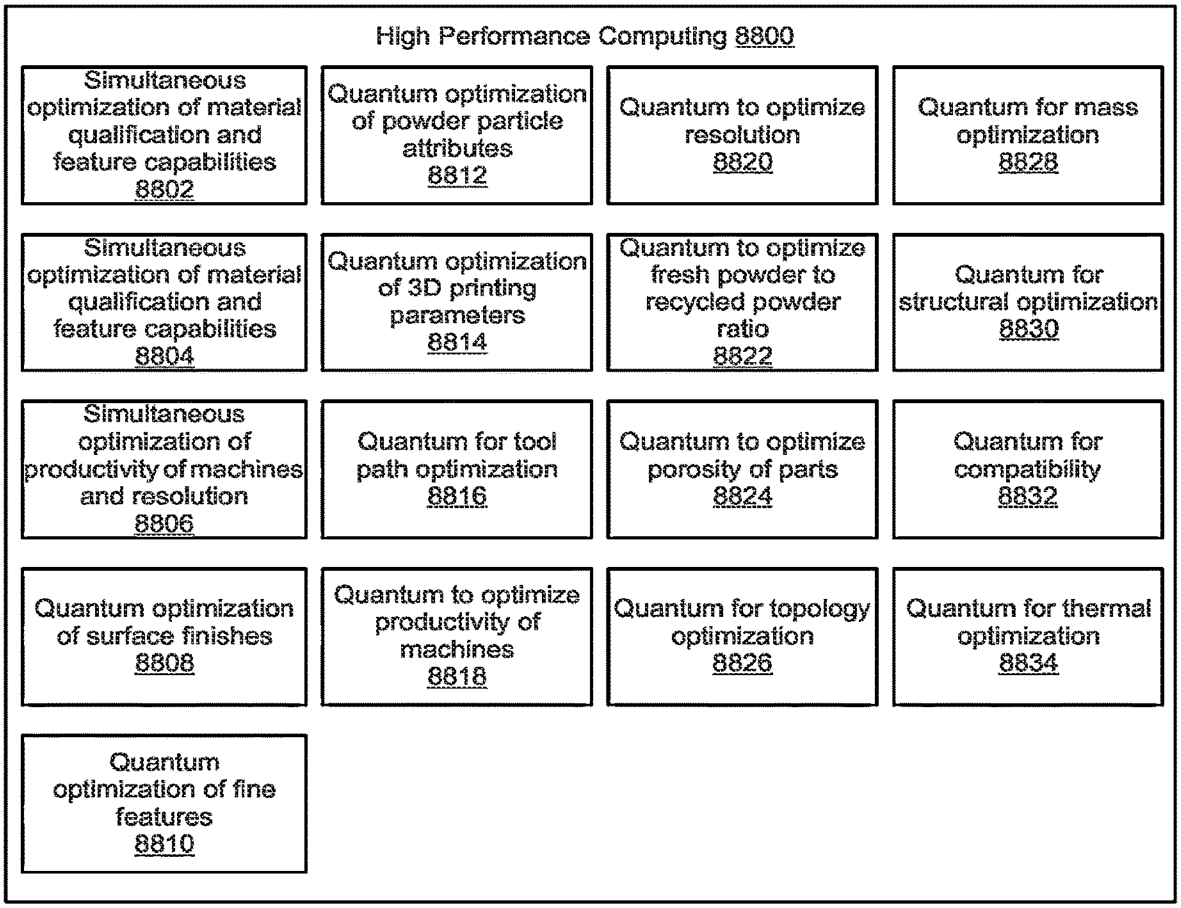
FIG. 88 is a schematic illustrating an example environment of a system of high-performance computing according to some embodiments of the present disclosure.

Referring now to FIG. 88, and with continued reference to FIGS. 1-87, a schematic illustrates an example environment of a system of high-performance computing 8800 according to some embodiments of the present disclosure. The system of high-performance computing 8800 includes systems for simultaneous optimization of material qualification and feature capabilities 8802, simultaneous optimization of material qualification and feature capabilities 8804, simultaneous optimization of productivity of machines and resolution 8806, quantum optimization of surface finishes 8808, quantum optimization of fine features 8810, quantum optimization of powder particle attributes. 8812, quantum optimization of 3D printing parameters 8814, quantum for tool path optimization 8816, quantum to optimize the productivity of machines 8818, quantum to optimize resolution 8820, quantum to optimize fresh powder to recycled powder ratio 8822, quantum to optimize porosity of parts 8824, quantum topology optimization 8826, quantum mass optimization 8828, quantum structural optimization 8830, quantum compatibility optimization 8832, and quantum thermal optimization 8834.

Figure 89:
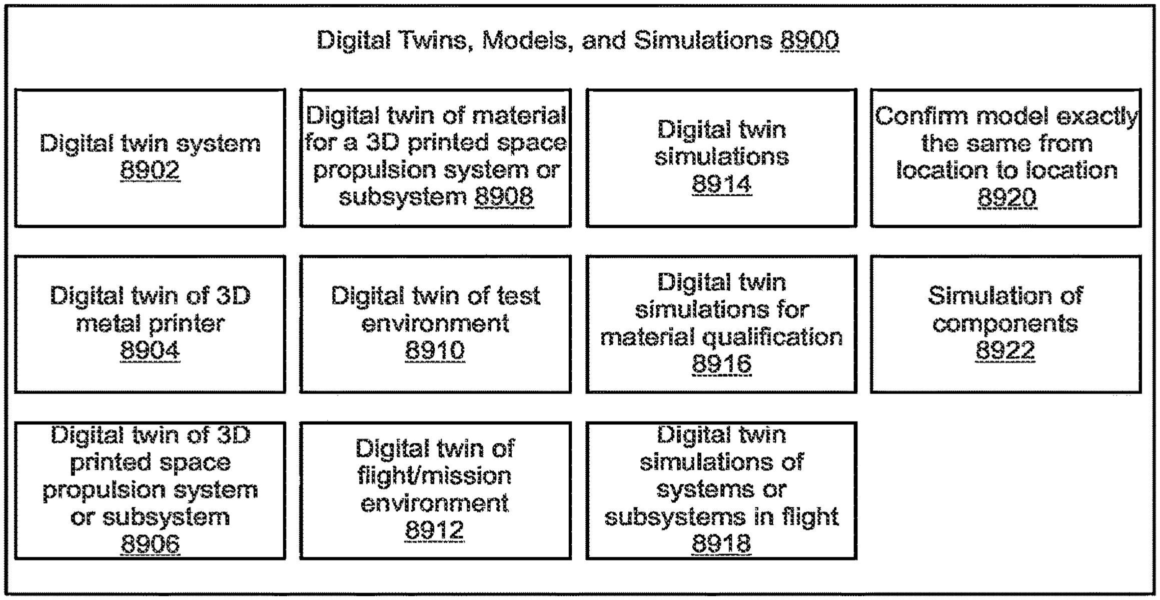
FIG. 89 is a schematic illustrating an example environment of an additive manufacturing platform for space propulsion systems having a digital twin system according to some embodiments of the present disclosure.

Referring now to FIG. 89, and with continued reference to FIGS. 1-88, a schematic illustrates an example environment of an additive manufacturing platform for space propulsion systems having a digital twin system 8900 according to some embodiments of the present disclosure. The additive manufacturing platform for space propulsion systems having a digital twin system 8900 includes systems for digital twin system 8902, digital twin of 3D metal printer 8904, digital twin of 3D printed space propulsion system or subsystem 8906, digital twin of material for a 3D printed space propulsion system or subsystem 8908, digital twin of test environment 8910, digital twin of flight/mission environment 8912, digital twin simulations 8914, digital twin simulations for material qualification 8916, digital twin simulations of systems or subsystems in flight 8918, confirm model exactly same from location to location 8920, and simulation of components 8922.

Figure 90:
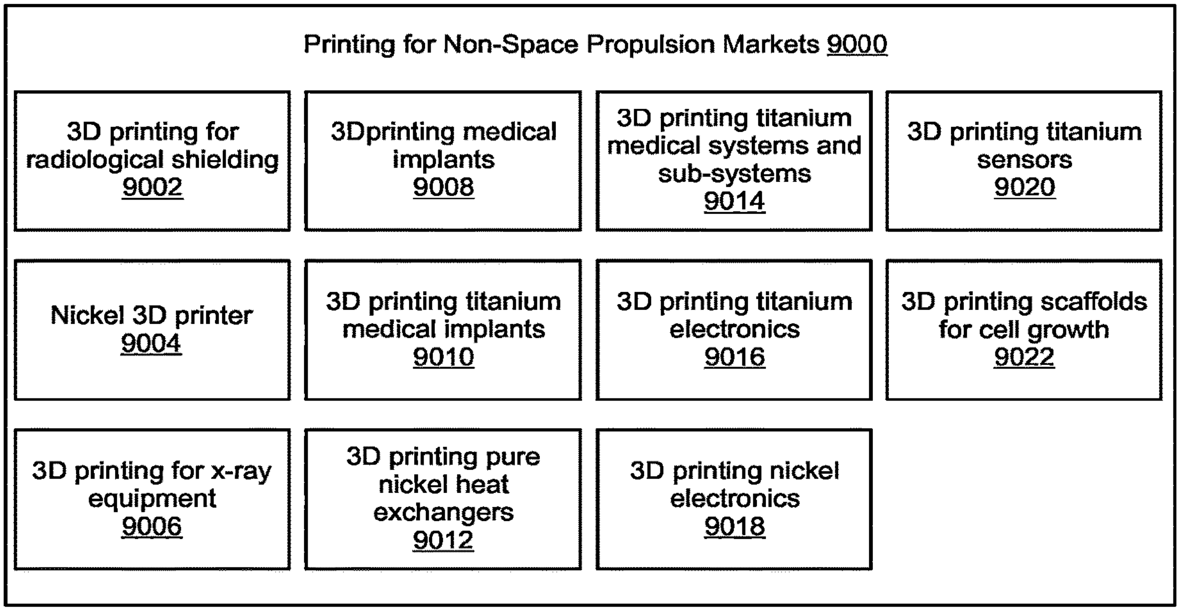
FIG. 90 is a schematic illustrating an example environment of a system of printing for non-space propulsion markets according to some embodiments of the present disclosure.

Referring now to FIG. 90, and with continued reference to FIGS. 1-89, a schematic illustrates an example environment of a system of printing for non-space propulsion markets 9000 according to some embodiments of the present disclosure. The system of printing for non-space propulsion markets 9000 includes systems for 3D printing for radiological shielding 9002, Nickel 3D printer 9004, 3D printing for x-ray equipment 9006, 3D printing medical implants 9008, 3D printing titanium medical implants 9010, 3D printing pure nickel heat exchangers 9012, 3D printing titanium medical systems and sub-systems 9014, 3D printing titanium electronics 9016, 3D printing nickel electronics 9018, 3D printing titanium sensors 9020, and 3D printing scaffolds for cell growth 9022.

Mission Agility and High Level Spacecraft Systems

Figure 91:
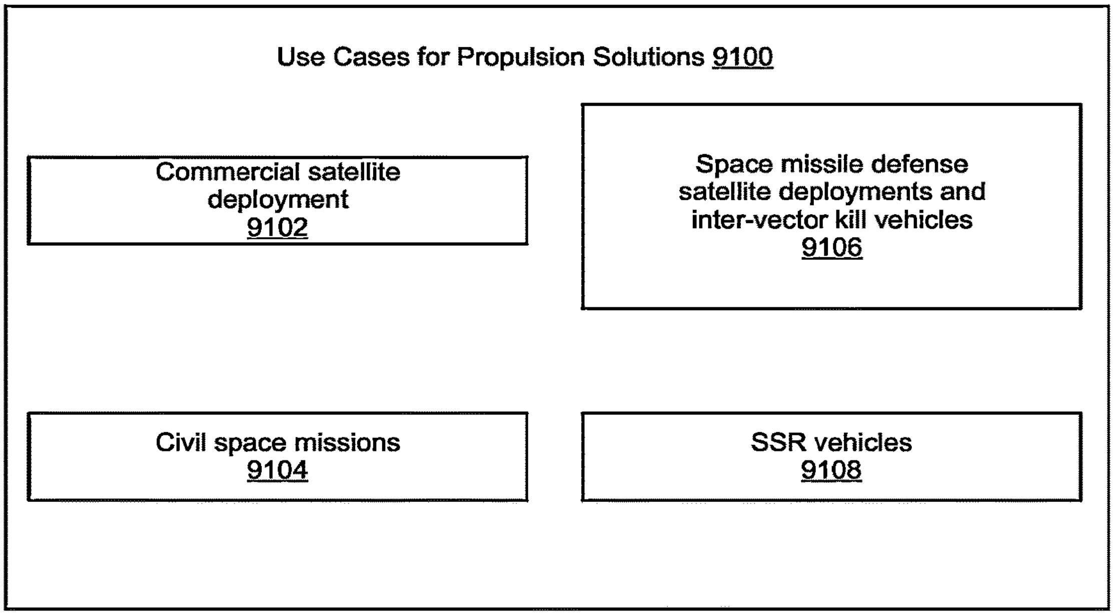
FIG. 91 is a schematic illustrating an example environment of a system of use cases for propulsion solutions according to some embodiments of the present disclosure.

Referring now to FIG. 91, and with continued reference to FIGS. 1-90, a schematic illustrates an example environment of a system of use cases for propulsion solutions 9100 according to some embodiments of the present disclosure. The system of use cases for propulsion solutions 9100 includes systems for commercial satellite deployment 9102, civil space missions 9104, space missile defense satellite deployments and inter-vector kill vehicles 9106, and SSR vehicles 9108.

Figure 92:
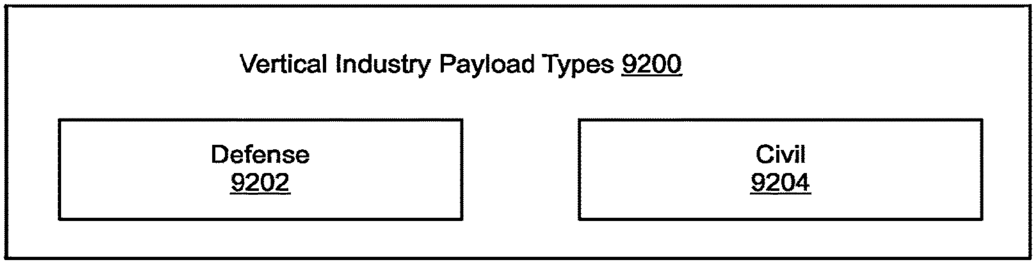
FIG. 92 is a schematic illustrating an example environment of a system of vertical industry payload types according to some embodiments of the present disclosure.

Referring now to FIG. 92, and with continued reference to FIGS. 1-91, a schematic illustrates an example environment of a system of vertical industry payload types 9200 according to some embodiments of the present disclosure. The system of vertical industry payload types 9200 includes systems for defense 9202 and civil 9204.

Figure 93:
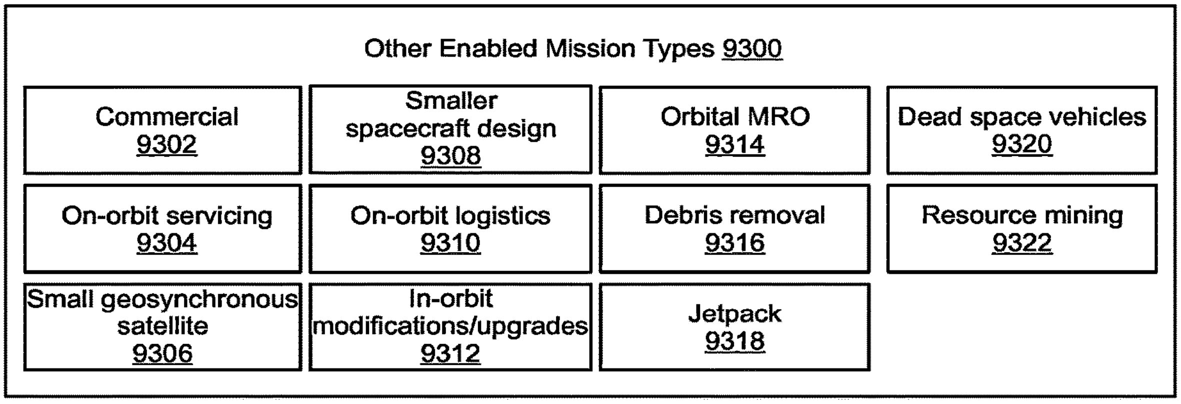
FIG. 93 is a schematic illustrating an example environment of a system of alternative mission types enabled by the disclosure according to some embodiments of the present disclosure.

Referring now to FIG. 93, and with continued reference to FIGS. 1-92, a schematic illustrates an example environment of a system of alternative mission types enabled by the disclosure 9300 according to some embodiments of the present disclosure. The system of alternative mission types enabled by the disclosure 9300 includes systems for commercial 9302, on-orbit servicing 9304, small geosynchronous satellite 9306, smaller spacecraft design 9308, on-orbit logistics 9310, in-orbit modifications/upgrades 9312, orbital MRO 9314, debris removal 9316, jetpack 9318, dead space vehicles 9320, and resource mining 9322.

Positive Displacement Tank

Figure 94:
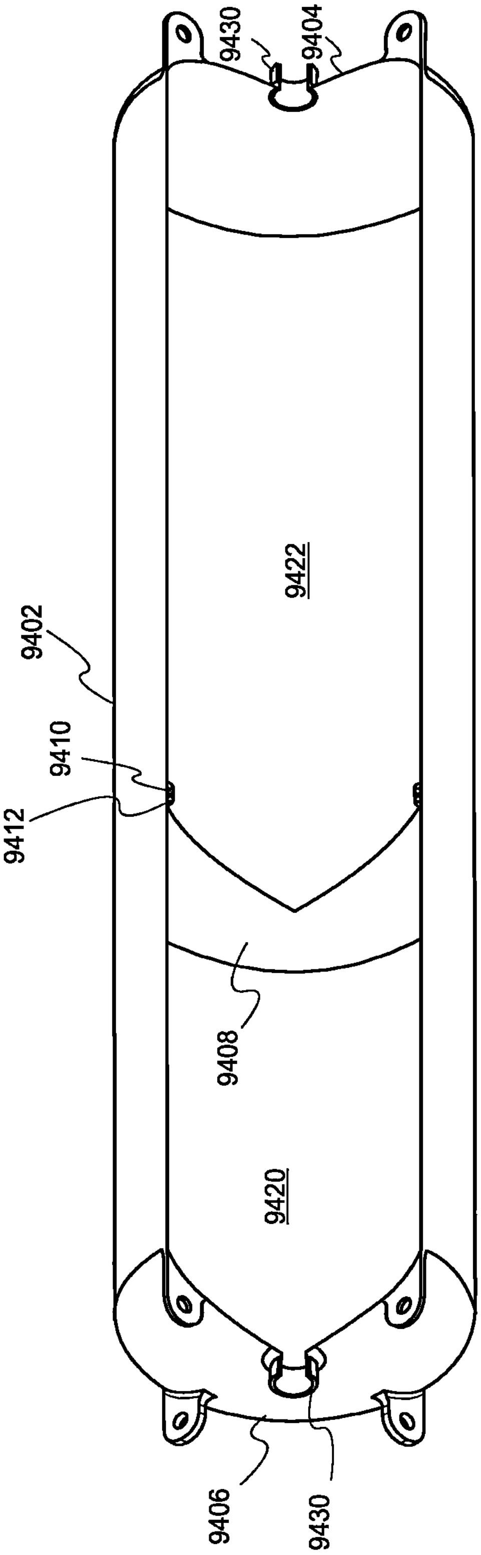
FIG. 94 is a cutaway view illustrating an example of a positive displacement tank according to some embodiments of the present disclosure.

Referring now to FIG. 94, and with continued reference to FIGS. 1-93, a positive displacement tank 9400 is illustrated in a cutaway view. The positive displacement tank 9400 is an example of the positive displacement tank 4304 and includes at least some of the tank design features 4300. The positive displacement tank 9400 includes a barrel 9402, a first dome 9404, a second dome 9406, a piston 9408, a first polytetrafluoroethylene (PTFE) seal 9410, and a second PTFE seal 9412. The barrel has a first end near the first dome 9404 and a second end near the second dome 9406. The piston 9408 is disposed within the barrel 9402 and is translatable between the first dome 9404 and the second dome 9406 to define and divide a barrel cavity into a propellant cavity 9420 and a displacement cavity 9422. In the example provided, the first dome 9404 and the second dome 9406 each have an integral tube stub 9430.

Testing

In embodiments, testing methods and testing systems may incorporate various teachings of the present disclosure. For example, the testing described herein may use examples of the space propulsion testing system 500, the test cell 800, the test environment data acquisition system 1100, the test stand software systems and subsystems 1200, the test stand hardware system 1300, and the thruster instrumentation and testing system 1500. It should be appreciated that the testing described herein may use other systems, methods, or teachings described herein without departing from the scope of the present disclosure.

In embodiments, a thruster can be tested to demonstrate stable performance of and can be evaluated to know catalyst decomposition when operating in a monopropellant only scenario at multiple fuel mass flow rates. For example, fuel may be flowed at nominal rates corresponding to a mixture ratio (MR) of 1.0 for 20 seconds duration each. In other examples, fuel may be flowed at an MR of 0.90 and 0.80 for 20 seconds each. The results of this phase of testing may demonstrate stability of the catalyst. For example, pop and spike values for a 111 N thruster described herein is observed at 1.4% and is below the 30% design requirement. In embodiments, results of the testing may suggest that a flow rate corresponding to an MR of 0.85 may be the most stressful on the reactor. Accordingly, the testing may be used to find a mixture ratio that results in a maximized lifespan or minimized stress operating environment for the reactor.

In embodiments, an engine and test sequence control include test article protection with programmable logic redlines; intuitive graphical interface for test sequence setup; flexible configuration allows any duty cycle; microsecond resolution control of engine fuel and oxidizer valves; and multi-channel multi-band fast Fourier transform redlines. In embodiments, a fast response close coupled feed system includes direct path 35" run line length; millisecond response for transient & pulse mode flow measurement; and 0.05% flow accuracy for stringent performance evaluation. In embodiments, a vertical tripod thrust system includes gravity symmetric vertical orientation; tripod configuration for thrust vector & combustion load assessment; elimination of propellant pooling in thrust chamber; and in-situ calibration with propellants pressurized & test conditions. In embodiments, altitude systems capability includes two stage diffuser-ejector system; unique diffuser eliminates backflow during start transients; 140+ kft vacuum for pulsing and steady state; vacuum soak adaptability; inert gas/zero impact drive media; and test article accessibility immediately pre & post vacuum test.

In embodiments, test article accessibility includes easy access pre & post-test for engine inspection and turn-around; test article at working height with 360° accessibility; and borescope fixturing for repeatable internal engine inspection. In embodiments, rapid configurability includes the test stand designed to support rapid test article replacement; unique capability for fast instrumentation reconfiguration; and ability to modify facility as required. In embodiments, on site lab and clean rooms includes clean room environment for engine processing; secure livestreaming of hot-fire testing includes test command center communication during testing via encrypted high-speed video uplink.

In embodiments, materials have been selected based on the primary requirements of MON3 and M20 propellant compatibility as well as the ability of the process to support the geometric features for innovative design elements and surface smoothness requirements for efficient and stable hot-fire performance. In these examples. Aluminum, Nickel. Titanium, Inconel 718, 17-4 Stainless Steel, Cobalt Chromium, and Niobium alloys are relevant.

In embodiments, single orifice element test beds were developed to have a unique geometry based on a fixed vertical element height of 0.125 inch, a diameter measured in thousandths of an inch, and an angle measured in degrees. In one example, the diameters ranged from 0.008 inch to 0.020 inch and angles ranged from 20° to 50°. In an example, LD (Ratio) elements utilized a fixed 0.012 inch diameter orifice at an angle of 30°, while the element length was determined by the length: diameter (L/D) ratio. In embodiments, the ratios range from 6 to 14. In an example, angle elements utilized a fixed 0.010 inch diameter and 0.100 inch length orifice at a given angle ranging from 10° to 60°. In embodiments, wall thickness studies utilize a fixed 0.010 inch diameter orifice at an angle of 30° and a length of 0.150 inch. Wall thicknesses ranged from 0.010 inch to 0.030 inch. In an example, several orifice elements are duplicated on the test bed to determine printing repeatability.

111 N Thruster Testing

In embodiments, the thruster may be tested according to the testing procedures and using the testing systems described herein. For example, the 111 N thruster may be shown to demonstrate the ability to achieve a vacuum Isp of 320 s. In some examples, an Isp in excess of 324 seconds for a fully-expanded nozzle was achieved.

In embodiments, the thruster can demonstrate thermal steady-state operations for 60 seconds at nominal inlet pressures and pressure conditions greater than 50,000 ft in altitude. In these examples, data from the thruster can be shown to demonstrate stable performance at nominal conditions for 600 s. Moreover, it can be shown that thermal steady-state (<1.0° F. per second change) was reached at 20 s, and temperatures oscillated around a nominal value by 80 seconds for the remainder of this 600 seconds' test.

In embodiments, the thruster can be shown to demonstrate an engine restart at maximum thermal soak-back conditions. During such a test, the engine can be run for 60 seconds to achieve thermal steady-state, shut down for 52 seconds to achieve maximum thermal-soak back, then restarted and run for an additional 30 s. In these examples, the start transient was shown to be repeatable during a maximum thermal soak-back restart during this test.

In embodiments, the thruster can be shown to demonstrate repeatable and stable performance around the corners and midpoints of both the 10% and 20% Pc/MR excursion boxes. It will be appreciated that Pc/MR target set pressures can be harder to estimate accurately for this engine than for typical thruster tests due to the changing resistance resulting from a moving point of liquid to gas transition in the engine during Pc/MR excursions. In examples, the thruster can be shown to demonstrate a Pc±3.5% and a MR±5.0% of the targeted values for each test.

In embodiments, the thruster can be shown to demonstrate repeatable and stable performance while throttling between 80%-100% of nominal while holding a nominal MR of 1.0. In these examples, each target on the throttle curve was held for 20 s. By way of these examples, throttling was accomplished using, for example, SS-4BRG™ valves with Hanbay™ actuators on the test stand. In these examples, remote metering valve voltage set points were determined by waterflow testing prior to hot fire for both fuel and oxidizer valves.

In embodiments, the throttle response of the thruster can be characterized by repeatable response transients when throttling rapidly while holding a nominal MR of 1.0 were demonstrated. In examples, the engine can be shown to track the most rapidly commanded throttle set point of 8.44% per second and can be shown to demonstrate successful throttling down to 70% of nominal in this phase. In these examples, throttling was accomplished using SS-4BRG™ valves with Hanbay™ actuators on the test stand. In embodiments, the remote metering valve voltage set points can be determined by waterflow testing prior to hot fire for both fuel and oxidizer valves.

In embodiments, the thruster can be shown to demonstrate the stable and functional transition from bipropellant to monopropellant operations through oxidizer depletion without deleterious soak-back effects. In examples, test results can show a graceful transition to stable monopropellant-only operation, and thermally the results were in a family with monopropellant tests described herein. By way of these examples, oxidizer depletion can be obtained by commanding the oxidizer master engine valve closed on the test stand during test.

A rise in measured thrust is observed during testing after oxidizer depletion. The rise in measured thrust is caused by changing test cell pressure during the transition from bipropellant to monopropellant operation, and vacuum corrected thrust, like Pc, remains constant and stable during this phase.

In embodiments, the thruster can be shown to demonstrate the stable and functional operation of the thruster during transient helium gas ingestion and two-phase transition. In examples, the engine was run at nominal conditions for 25 seconds and in that time, the helium injection master valve was actuated for either 0.25 or 1.0 seconds on the fuel or oxidizer side to let a relatively small or large helium bubble pass through the engine, and the engine was run for an additional 10 seconds at nominal to evaluate the recovery. Test results can be shown to demonstrate a stable recovery following helium bubble ingestion for all tests.

In embodiments, the thruster can be shown to demonstrate the ability to transition from bipropellant operations to monopropellant and back. In these examples, the engine can be run at nominal conditions until the oxidizer master engine valve was closed on the test stand, similar to the oxidizer depletion testing described herein. In these examples, test results can also show that monopropellant operation may be safely sequenced anywhere in a burn to achieve rapid changes in throttle or for attitude control.

In embodiments, the thruster can be shown to demonstrate stable and functional thruster performance with propellant inlet temperatures at 150° F. In these examples, the propellant heaters in the test stand were left on throughout hot fire operations, causing the inlet temperatures to steadily increase for both fuel and oxidizer throughout the duration of the test. In these examples, a first test was run at nominal conditions, while the next two were run at a high Pc of 168 and mixture ratios of 0.85 and 1.15. In these further examples, the engine can also be shut down and restarted at 104 seconds into each test in order to show engine start capabilities with hot propellants. In examples, results of a nominal test showed oxidizer temperatures ranging from 70°-158° F., and fuel temperatures ranging from 113°-178° F., with the engine restart occurring with measured oxidizer temperature of 154° F. and measured fuel temperature of 173° F. By way of these examples, results of the high Pc, low mixture ratio test showed oxidizer temperatures ranging from 95°-161° F., and fuel temperatures ranging from 129°-159° F., with the engine restart occurring with measured oxidizer temperature of 158° F. and measured fuel temperature of 157° F.

In embodiments, the thruster can be shown to demonstrate stable steady-state operation of the thruster for 600 seconds of continuous run time. In embodiments, the thruster can be shown to demonstrate stable steady-state operation of the thruster for 6,000 seconds of continuous run time.

In embodiments, an annular recirculating water cooling system is added around the y-stage of the diffuser, along with two sets of spray nozzles that inject water directly into the expansion section of the y-stage at different heights. These systems may be activated separately or together. In embodiments, welded thermocouples are added to the expansion section of the y-stage along with immersed thermocouples at the inlet and outlet of the water-cooling circuit to monitor the thermal status of the diffuser during the course of long-duration hot fire testing.

In embodiments, the thruster can be shown to demonstrate maximum performance of the thruster by running at optimum mixture ratio and best pressure.

Hot Fire Thruster Testing

Hot fire testing may be conducted in accordance with the teachings of the present disclosure. For example, hot fire thruster testing may be performed with use of the hot-fire tether testing 510 system of the space propulsion testing system 500. In embodiments, the hot fire testing can be conducted on the test stand hardware system 1300. In some examples, the test stand can be AS9100 accredited and can accommodate over 200 analog data acquisition channels at sampling rates of up to two MHz. In-place end-to-end calibrations using up-to-date NIST calibrated references can be performed with the test system in its operating configuration matching pressure, load, and temperature conditions, and loaded instrument zeroes are taken prior to every test.

In embodiments, the test stand feed system utilizes the PDFM instrument 1118 in relation with the water flow testing 532 for high fidelity control and measurement of propellants. In embodiments, the test stand PDFMs measure to 0.1% uncertainty for impulse bit measurements of 0.005 lbm of propellant. From the PDFM, a close-coupled direct-path 35-inch run line can connect to the thruster, which can allow for sub-millisecond response for transient flow measurements. For tests lasting longer than 300 seconds in duration, propellants bypassed the PDFMs and can be flown directly from the 4BW storage tanks to the engine. In the example provided. Coriolis flow meters are used to measure mass flow to 0.1% full-scale uncertainty.

Thrust Measurement System

Figure 95:
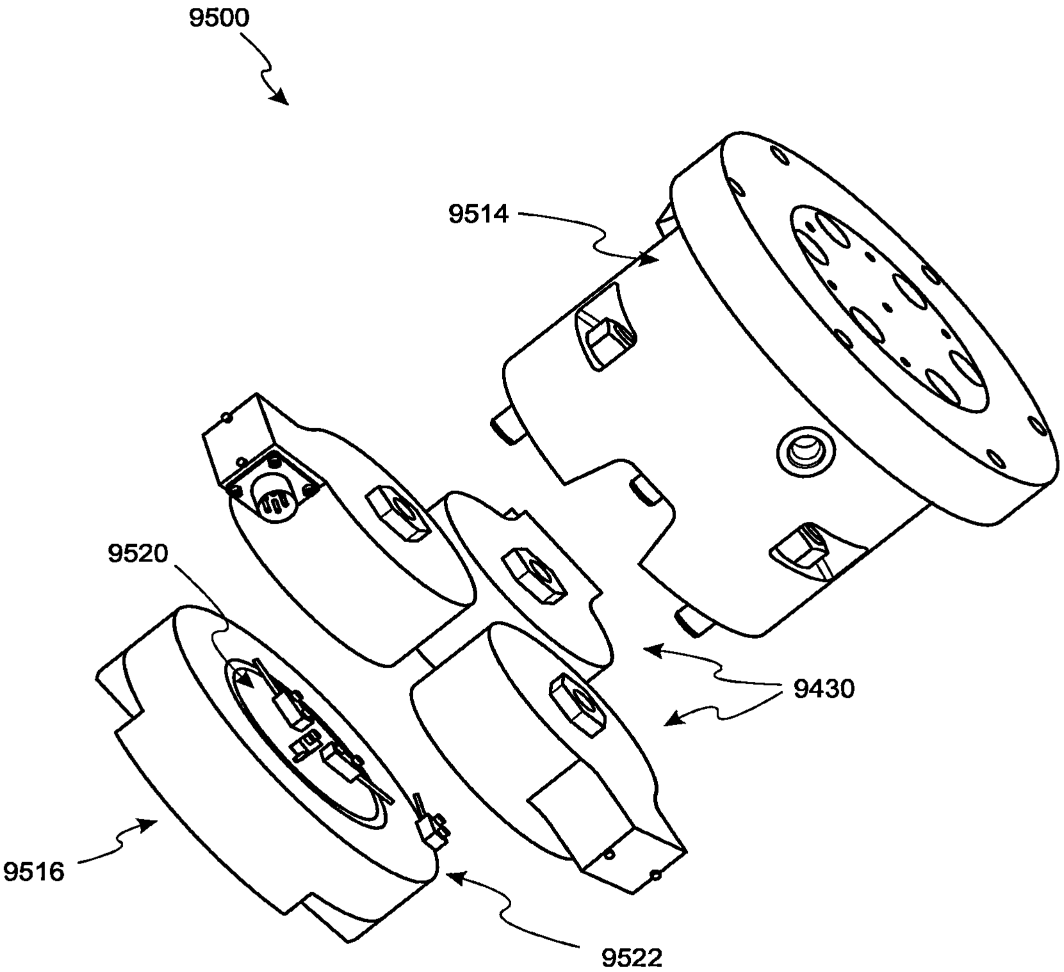
FIG. 95 is an exploded view of an example of a thrust measurement system according to some embodiments of the present disclosure.

Referring now to FIG. 95, and with continued reference to FIGS. 1-94, a thrust measurement system (TMS) 9500 is illustrated. In the example provided, the TMS 9500 is an example associated with the tripod thrust measurement system 1116 and/or the thrust measurement systems 1120.

In the example provided, the TMS 9500 includes load cells 9510, a thrust structure 9514, and an accelerometer assembly 9516. In the example discussed below, a 111 N thruster is itself mounted to the TMS 9500.

In embodiments, the load cells include three high accuracy dual bride load cells in a dual bridge configuration rated to 0.2% full sale uncertainty, which can allow for thrust vector measurements while maintaining side load insensitivity. For example, the load cells 9510 may use three dual bridge load cells commercially available as model LCF400 from FUTEK.

In the example provided, the accelerometer assembly 9516 includes tri-axial accelerometers 9520 and a two part, inner and outer extensometer assembly 9522 with high frequency isolation to thrust measurement. The TMS 9500 can also allow for undamped accelerometer measurements which are rated to ±5% uncertainty for the 2,000 to 60,000 g range. In the example provided, the thrust structure 9514 includes in-place load calibration.

In embodiments, bipropellant chambers tested were designed to accept a high frequency pressure transducer to measure $P_C$. These high frequency transducers may also be utilized in the propellant feed system and can be capable of a 300 kHz linear response rate and 0.25% full scale uncertainty. Additional specialty instrumentation includes 64 channels of high accuracy thermocouples with measurement rates of 80 Hz. and eight high speed thermocouples with measurement rates up to 20 kHz. In embodiments, all thermocouple types can be supported on the test stand and are capable of end-to-end NIST traceable calibration.

Hot-Fire Testing Instrumentation

Figure 96:
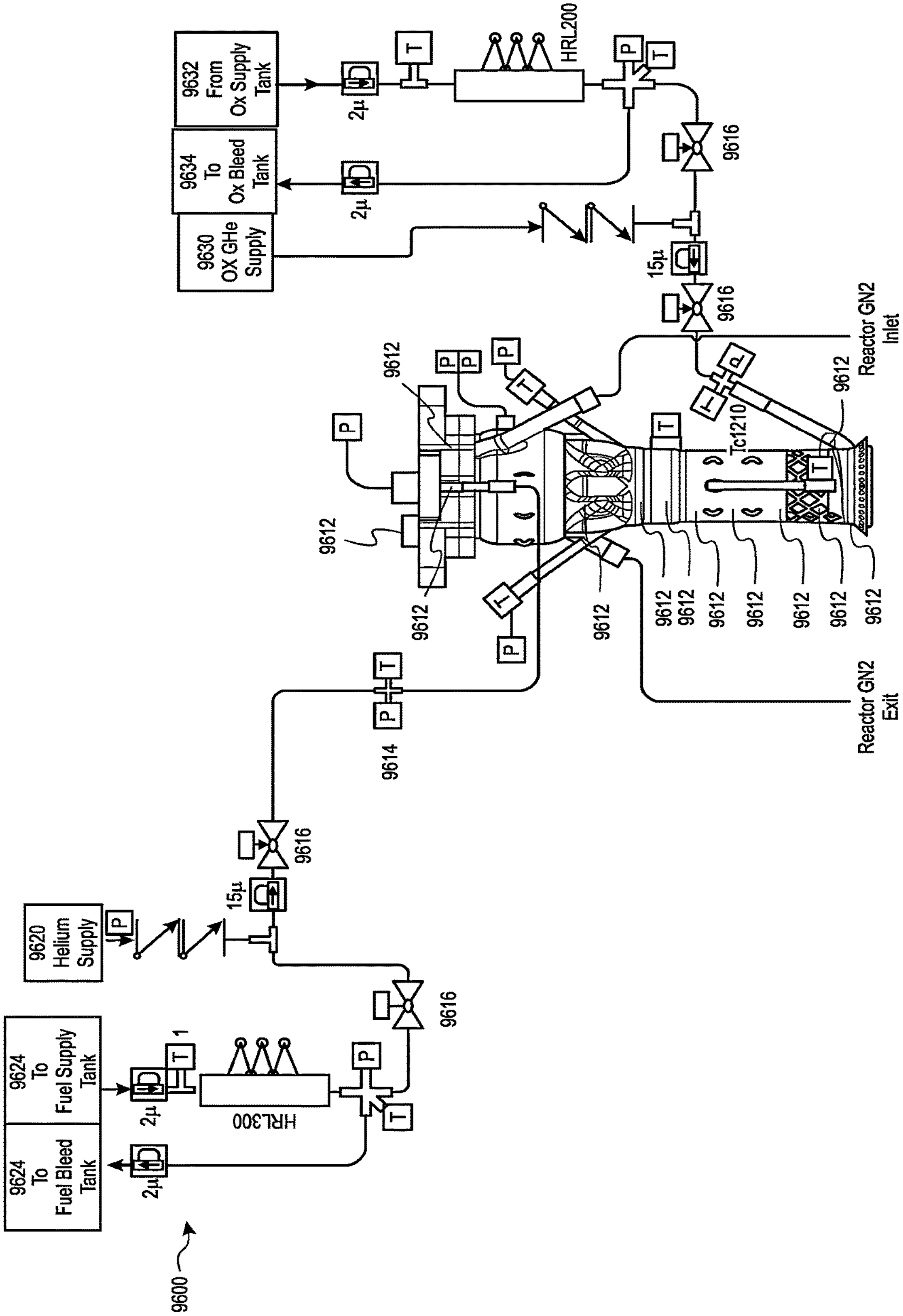
FIG. 96 is a schematic illustrating an example of an instrumentation diagram according to some embodiments of the present disclosure.

Referring now to FIG. 96, and with continued reference to FIGS. 1-95, an example of an instrumentation diagram 9600 for hot-fire testing is illustrated. In the example provided, the instrumentation diagram is provided in association with hot fire testing of a 111 N thruster in accordance with the teachings herein.

In the example provided, the testing involves a thruster 9610, a plurality of temperature sensors 9612, a plurality of pressure sensors 9614, a plurality of valves 9616, a helium supply 9620, a fuel supply tank 9622, a fuel bleed tank 9624, an oxidizer GHe supply 9630, an oxidizer supply tank 9632, and an oxidizer bleed tank 9634.

In the example provided, the thruster 9610 is a 111 N thruster as described herein. The plurality of temperature sensors 9612 (or labeled "T") may be, for example, K or T type thermocouples. The temperature sensors 9612 are located at multiple locations on the thruster for identifying temperatures at various parts of the thruster during hot fire testing. The plurality of pressure sensors 9614 (or labeled "P") are located at various locations for measuring fluid pressure throughout the test stand and thruster.

The plurality of valves 9616 is operably coupled between the thruster 9610 and the various tanks and supplies to control fluid flow in the test stand.

In embodiments, multiple remote temperature sensing methods can be used. In these examples, the test stand contains two single wavelength pyrometers able to measure 425° F. to 4,712° F. at 1 kHz and two dual wavelength pyrometers able to measure 1,380° F. to 3,270° F. at 500 Hz. In embodiments, all pyrometer positioning can be verified using a built-in laser. Additionally, an IR camera can be paired to a quartz viewing window on the test cell. In these examples, this camera can capture thermal images in a temperature range of 1,100° F. to 3,100° F. at a resolution of 640×480 pixels and 60 fps. In examples, two remotely triggered high-speed digital cameras and one remotely triggered high-definition digital camera with sound are also utilized to record every test from multiple adjustable viewing angles through twelve-inch windows.

In embodiments, the National Instruments LabVIEW™ Real Time can be used for engine and test sequence control on the test stand. In addition, LabVIEW™ FPGA can be utilized for hardware level red line control. In embodiments, thermocouples may be used as redlines at 200 Hz filtered, pyrometers at 1 kHz digital, while pressures may be used at up to 5 kHz filtered. In embodiments, accelerometer data can be processed using an FFT, and frequency ranges and amplitudes may be set as redline triggers. Once a redline has been tripped, in examples, action response time can be 5 microseconds to activate the shutdown command, which turns off the engine, closes the main run line valves, and begins a pre-programmed shutdown sequence.

During a typical test, for example, a sequence can be written which outlines what will take place during all phases of testing (initialization, vacuum, startup, continuous firing, and shutdown, among others). This test sequence can be then sent over an internal network to the control computer located in a close-coupled location on the test stand itself. The propellants can be pressurized with helium to predetermined set pressures and loaded instrumentation zeros are taken. At this time manual recording of low-speed data and video files are started, and the test sequence can be commanded to begin. Once commanded to start, the control computer on the test stand takes over, and the loaded test sequence can be run by the program. Operators are able to manually cut the test at any time using emergency stops located in the control center. Once a test can be complete the low-speed and high-speed .tdms files are transferred from the test stand back to the control center, where data can be converted into engineering units and stored in a multi-time file format.

Cold Flow Testing

Figure 97:
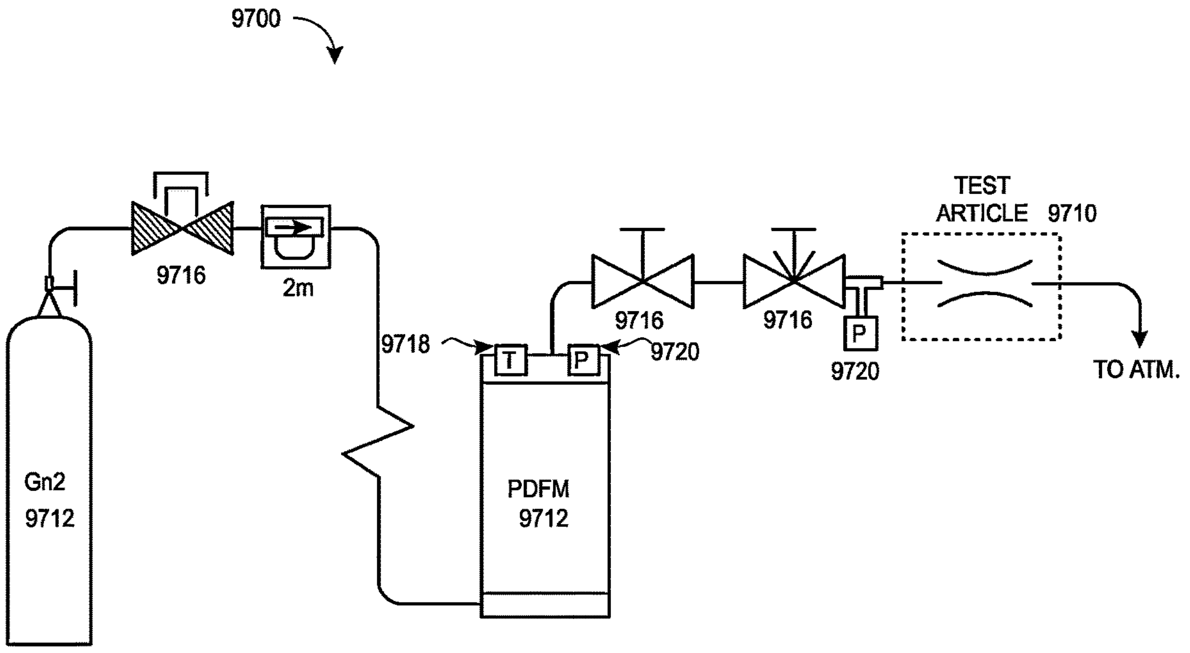
FIG. 97 is a schematic illustrating an example of a water flow test stand according to some embodiments of the present disclosure.

Referring now to FIG. 97, and with continued reference to FIGS. 1-96, a water flow test stand 9700 is illustrated. In embodiments, the water flow test stand 9700 may be used for the cold flow testing and/or water flow testing 532. In the example provided, the water flow test stand 9700 includes a test article 9710, a PDFM 9712, a gaseous nitrogen supply 9714, valves 9716, temperature sensors 9718, and pressure sensors 9720.

In embodiments, the additively manufactured parts can be visually inspected. During this initial inspection some part elements can be found in certain instances to be completely clogged with powder from the additive manufacturing process and are not tested further. In embodiments, hardware that passed visual inspection can be water flow tested with deionized water in the water flow test stand using a high precision positive displacement flow meter (PDFM) with constant back pressure. In the example provided, the PDFM 9712 is an example of the PDFM instrument 1118.

It will be appreciated in light of the disclosure that the PDFM 9712 can work in a way that can be synonymous to a syringe. In embodiments, the volume downstream of a piston can be filled with water, which can be then expelled by pressurizing the volume upstream of the piston with the gaseous nitrogen from the gaseous nitrogen supply 9714, driving the fluid outward. In embodiments, the volumetric flow rate can be calculated by measuring the displacement of the piston and can be rated to ±0.07% full scale uncertainty. The measured volumetric flow rate can be multiplied by the fluid density to determine a mass flow rate. Fluid density can be calculated from empirical relationships for water solely as a function of temperature (e.g., from a temperature sensor 9718) measured at the PDFM with a Type T thermocouple rated to ±0.75% full scale uncertainty. In embodiments, the pressure can be measured with the pressure sensor 9720. For example, the pressure may be measured with a Kulite HKM-375-2000A™ pressure transducer rated to ±0.5% full scale uncertainty.

In embodiments, the water flow can be regulated via a manual needle valve upstream of the injector element or any other test article. In embodiments, a pressure transducer can be located between the needle valve and injector element which can record the pressure drop across the injector as the difference between the measured pressure and atmospheric pressure. During testing, the flow rate and pressure drop across each injector can be measured for a given setting of the needle valve. The data can be recorded, e.g., via a DAQ and can be post-processed. e.g., with a script that calculates the flow resistance for each run.

In embodiments, the flow resistance model derives from the electric-hydraulic analogy and collectively quantifies the impedance caused by an internal flow passage. In these examples, this model can be geometry agnostic and allows for simple comparisons of unlike geometries based solely on empirical data, without making any underlying assumptions about discrepancies between as-built parts and original designs. The resistance equation used for this purpose can be represented by Equation 1. In this equation, the constant of proportionality, $g_c$, can be equivalent to $$32.174\frac{lbm-\text{ft}}{lbf-s^2}$$

and derives from the choice of pounds-mass (lbm) as the base unit of mass in the imperial unit system. The scaling factor of $$12\frac{\text{in}}{\text{ft}}$$

can be explicitly included so that resistance can be calculated in units of $$\frac{1}{\text{in}^4}.$$

$$\mathcal{R} = 12\frac{\rho\Delta P g_c}{\dot{m}^2} \quad \text{Equation 1}$$

Additional water flow testing can be conducted to assess the flow distribution balance of the received hardware. For these tests, a custom, in-house designed fixture can be used with each part to divert water into separate flow paths. In embodiments, the fixture can be 3D printed from plastic and attached to the thruster hardware being tested. In these examples, catchment bottles can then be placed at the exits of the catchment fixture, and water can be flown through the thruster hardware at similitude values that corresponds to nominal propellant flow rates. For the regenerative cooling jacket channels of the 111 N thruster bipropellant chamber described herein, the designed and printed fixture can separate the flow into eight octants, each representing a 45° segment of the flange interface. For the hydrazine and bipropellant injectors, each injector element can have flow diverted to a unique bottle for comparison. Accordingly, the tests collect high resolution microliter water flow data on each injector as it is processed. In embodiments, the water flow tests contribute to products with less than one tenth of a new second minimum impulse bit. In embodiments, the global volume and pressure drop across the injectors is a critical performance metric, and the water flow tests are a method of investigating the phenomena that impact process variability. In embodiments, a single unclear grain of powder, the exact geometry of the inner diameter of the melt pool, and various other surfaced finish phenomena all impact these parameters.

Data Acquisition and Analysis

In embodiments, data may be acquired and analyzed. For example, the data may be acquired and analyzed for iterative design or quality assurance purposes during testing or during use of the thrusters described herein. The data may be collected and/or analyzed using, for example, the test environment data acquisition system 316, the test environment data acquisition system 1100, the test stand software systems and subsystems 1200, the ML/AI for automation 1800, the additive manufacturing data collection, sampling, evaluation, and validation processes 7200, or other suitable systems or processes.

Thrust Based Performance Estimation (Specific Impulse)

In embodiments, the performance of a thruster may be estimated based on measuring thrust. For example, the thrust measurement systems may include three radially-symmetric load cells on a damping assembly with a total capacity of 3000 lbf. Each loadcell can deploy two Wheatstone bridges to perform two redundant measurements and error rejection. In the example provided, the thrust is measured with the thrust measurement system (TMS) 9500.

The measured thrust is then corrected for the test cell ambient pressure ($P_{amb}$) to determine the vacuum thrust produced as follows:

$$F_{vac} = F + \varepsilon A_t P_{amb} \quad \text{Equation 2}$$

where, ε is the thruster nozzle expansion ratio, F is the thrust measured by the TMS with the truncated nozzle of ε=8.9, and $A_t$ is the area of the throat. In addition to the thrust generated by the thruster, the specific impulse (Isp) of the thruster can be an important performance metric that evaluates the thrust per propellant unit mass flow rate of the thruster. In embodiments, the mass flow rate for each propellant ($\dot{m}_f$ for fuel and $\dot{m}_o$ for oxidizer) injected into the combustion chamber using the PDFM or Coriolis flow measurement system and the specific impulse can be evaluated as follows:

$$Isp_{8.9} = \frac{F_{vac}}{\dot{m}_f + \dot{m}_o}. \quad \text{Equation 3}$$

Since this specific impulse can be evaluated for the hot-fired truncated nozzle, this performance can be extrapolated to the flight expansion ratio. For some embodiments of a 111 N thruster, the flight expansion ratio can be currently defined as 300. In order to perform this extrapolation, the specific impulse efficiency, or the Energy Release Efficiency (ERF), can be first determined. In embodiments, the ERE can be the ratio of the measured vacuum specific impulse ($Isp_{8.9}$) to that of a perfect injector ($Isp_{PI,8.9}$) as calculated by the Two-Dimensional Kinematics (TDK) software based on the JANNAF liquid rocket thrust chamber performance prediction methodology and can be shown in Equation 4. In embodiments, the perfect injector Isp is the performance produced by a thruster which accomplishes fully mixed and combusted propellants in the combustion chamber. In embodiments, the average ERE value measured on a 111 N thruster at the nominal operating point is 97%.

$$ERE = \frac{Isp_{8.9}}{Isp_{PI,8.9}}. \quad \text{Equation 4}$$

Subsequently, the perfect injector specific impulse at ε=300 ($Isp_{PI,300}$) and performance losses associated with the boundary layer formed in on the inside of the extrapolated nozzle ($dBL_{300}$) can be estimated using the TDK code for the measured chamber pressure and mixture on a certain hot-fire test. These estimates can be corrected using the ERE, as shown in Equation 5, to result in a predicted vacuum specific impulse that is expected at the flight expansion ratio of 300. The boundary layer losses in, in these examples, can translate to a reduction in achieved specific impulse due to the formation of a boundary layer along the nozzle inside wall in a real system.

$$Isp_{300} = ERE(Isp_{PI,300}) - dBL_{300}. \quad \text{Equation 5}$$

As an example, on the 600 seconds duration test of a 111 N thruster targeted at the nominal operating point a chamber pressure of 139.5 psia, mixture ratio of 0.98 and vacuum thrust of 22.0 lbf can be measured on an average over 540 seconds (t=60 to 600 s). In examples, this results in a measured vacuum specific impulse of 259.4 seconds and an ERE of 96%. Using the extrapolation methods described above, the measured performance at an ε=8.9 results in a prediction of 317.9 seconds of vacuum specific impulse at the flight expansion ratio of 300. A plot of the predicted vacuum specific impulse as a function of mixture ratio and differentiated based on chamber pressure may then be generated. These methods provide a consistent way to predict performance on a flight-like thruster based on prototype thruster test measurements which can be verified during a formal qualification and acceptance testing program.

Chamber Pressure Based Performance Estimation (Characteristic Velocity or C*)

In embodiments, a thruster can be installed with two high-frequency pressure transducers at the end of a pressure tap originating on the injector face. In the example provided, the 111 N thruster described herein is installed. In embodiments, the pressure transducers measure the chamber pressure (Pc) of the thruster during a hot-fire test and the dual measurement of chamber pressure provides redundancy. In these examples, the pressure tap can be approximately six inches long to ensure survivability of the sensors from the harsh combustion gases, but six inch stand-off dampens some of the high-frequency content in the signal. Although this arrangement prevents the assessment of thruster start transients, it can ensure the recording of a clean, steady-state pressure signal with minimal thermal drift. Using this measured chamber pressure, propellant mass flow rates, and chamber throat area, the achieved characteristic velocity (C*) can be estimated as shown in Equation 6.

$$C^* = \frac{P_C A_t g_c}{\dot{m}_f + \dot{m}_o}. \qquad \text{Equation 6}$$

In these examples, this measurement can be compared to the theoretical C* estimated by the NASA CEA code for the tested propellant combination, chamber pressure, and mixture ratio to result in a C* efficiency or $\eta_{C^*}$. For an exemplary 111 N thruster, for example, the average C*efficiency is 96.64% at nominal operating conditions. The C*efficiencies for all tests conducted during all phases of testing may be plotted as a function of mixture ratio and differentiated based on chamber pressure. Such a plot shows that the C*efficiency on a 111 N thruster as described herein may be above 95% on all tests.

Reactor Life

In embodiments, the thruster can be equipped with real-time reactor health monitoring equipment. For example, the health monitoring equipment may be part of the system of on-orbit diagnostics 6100. In embodiments, the health monitoring equipment uses an LVDT or similar linear displacement measuring solution to determine the travel of the floating injector which can linearly correspond to remaining reactor life. It will be appreciated in light of the disclosure that this is a significant improvement in onboard diagnostic tools, allowing the mission planner to directly measure remaining thruster life. In embodiments, this tool also allows for in-depth analytic characterization of reactor life. In contrast, conventional thrusters had to demonstrate performance and extrapolate it to the mission duty cycle.

In embodiments, the thruster has a broad set of data on the operating toll of various configurations and setpoints, allowing mission planners to optimize maneuvers via digital-twin evaluation.

In the example provided, the reactor life is derived by solving the following equation:

$$L_{catalyst} = (N_{starts})(L_{starts}) + (N_{seconds})(L_{ONtime}), \qquad \text{Equation 7}$$

where $L_{starts}$ and $L_{ONtime}$ are themselves functions of several things. $L_{ONtime}$ is the loss rate per second of operation and depends on mixture ratio and is exponentially fit to the reactor pressure.

$$L_{ONtime} = A(MR) + B(P_{react})n + C, \qquad \text{Equation 8}$$

where A, B, C, and n are empirically determined from test data.

$L_{start}$ is a function of only $T_{react}$ at the time of reactor start. If the reactor can be maintained at over 800° F., $L_{start}$ trends towards a low asymptote.

Under the correct set of operating conditions, the reactor, in embodiments, can operate for more than 25,000 seconds of operating time. It can be shown that these operating times can be based on the use of a reactor compression technology that suppresses the formation of voids in the granular catalyst bed after significant operating time. This compression method can allow for a linear trend of reactor life that can be superior to traditionally sprung radial catalyst beds. The compression can be achieved by the wave spring used in between the hydrazine manifold and the floating hydrazine injector as described herein.

Regenerative Cooling Analysis Tool (RAT)

In embodiments, an iterative analysis of the combustion properties, regenerative cooling, and injector properties of a 111 N thruster can be performed with a regenerative cooling analysis tool (RAT). In one example, combustion property evaluation can be performed with NASA CEA and can be solved for iteratively in combination with the injector and regenerative cooling properties.

In embodiments, the injector properties can be evaluated assuming isentropic expansion across the injector and gas-gas injection into the combustion chamber and can be evaluated for any injector. The inputs to this section of the tool can be fuel and oxidizer overall orifice areas and discharge coefficients. The chamber pressure can be solved for iteratively based on the oxidizer and fuel inlet temperatures and pressures while the oxidizer inlet properties can be solved for using NASA CEA.

In embodiments, the Regenerative cooling analysis can be accomplished by dividing the chamber into several small sections, essentially generating a 1D mesh of the chamber. In these examples, important chamber dimensions are input by the user (or suggested by the trained expert system) and the program then can interpolate intermediate dimensions. By way of these examples, the solver can begin calculations from the cooling inlet for pressure and temperature changes at each location before proceeding on to the next station. This can continue up to the injector. In embodiments, the simulation can account for the transition of nitrogen tetroxide to nitric oxide ($N_2O_4 \rightarrow 2NO_2$) and changing internal temperature, pressure, velocity, and composition using, for example, NASA CEA. The solver can also account for nucleate boiling effects. An example output from such an analysis shows where the change in temperatures of the coolant (oxidizer) and chamber hot and cold walls at different locations along the length of the chamber are iteratively solved and plotted. For example, the plotted temperatures may show the subcooled liquid (no boiling) portion, the onset of subcooled nucleate boiling, the net vapor generation point, the onset of saturated nucleate boiling, the dryout (begin droplet flow), and the superheated vapor portions of the analysis through the expanding nozzle section, the nozzle throat, and the combustion chamber. In embodiments, a simulation of system temperatures can help predict major phase transition points in the system for design evaluation.

CFD Analysis

In embodiments. Computations Fluid Dynamics (CFD) analysis may be performed. For example, the post-processing/analysis software 1614 may include CFD software. For example, ANSYS Fluent™ can be used to provide insight into design trades during development and as a baseline reference to compare against test results. In these examples, models are imported from SolidWorks™ into ANSYS SpaceClaim™ for preparation, a mesh can be generated using ANSYS Fluent Meshing™, and the simulation can be set up and run in Fluent. Simulations are run using both the working propellants and water for comparison with water-flow data. In embodiments, the simulations can be run with a K-Omega SST™ turbulence model and a wall roughness model with an RMS roughness height of 177.8 micrometers as determined experimentally.

In embodiments, the primary results obtained from CFD are pressure drop and flow distribution. In embodiments, the pressure drop can be used to inform the effect of design trades as well as to correlate with data from waterflow tests to determine discrepancies between design and hardware performance. Flow distribution results may be plotted to inform design of flow passages to minimize circumferential biases in flow rate that could trigger destructive regenerative cooling feedback loops. Other results from CFD such as fluid flow velocity and skin friction coefficient can be used to ensure adequate cooling in critical regions such as the nozzle throat.

High Frequency Combustion Instabilities

In embodiments, the post-processing/analysis software 1614 performs post-processing to extract combustion instability data 1616. For example, the thruster may exhibit high frequency combustion instabilities at an approximate frequency of 32 kHz, and this can correspond to the first tangential mode natural frequency of the combustion chamber. In order to mitigate the instabilities, the thruster design can include a cylindrical quarter-wave resonator around the injector and open to the combustion chamber, as described below.

Failure Analysis

In embodiments, failure and potential failure and the contribution of various characteristics and properties may be evaluated in some embodiments. For example, hotwall porosity may be evaluated. Thin walls exhibit porosity which can grow over repeated firing cycles. In embodiments, these characteristics have a good response to wall thickness, but negative impacts to thermal margin. In embodiments, there is a strong sensitivity to upskin/downskin parameters. In embodiments, mitigation may be performed with autocatalytic electroless material plating.

In embodiments, material embrittlement may be evaluated. For example, part properties can be sensitive to trace materials not controlled by material specification. In an example, two powders ostensibly produced to the same specification can behave quite differently, and it may be necessary to control the process and material to very high levels.

Thruster and Space Vehicle Component Features

Divert Attitude Control System (DACS)

In embodiments, the space missile defense satellite deployments and inter-vector kill vehicles 9106 include a Divert Attitude Control System (DACS). For example, the DACS may be utilized for missile interceptors, ground launched air superiority missiles, and other flight vehicle propulsion applications to meet the evolving threats posed from near-peer and traditional adversaries. For exoatmospheric interceptors, the DACS provides lateral vehicle motion. The characteristics for impulse precision, thrust capability, and response time are all critical to vehicle kinematic performance, error containment, and lethality. A high performance, high reliability DACS is integral to interceptor optimization, and DACS propulsion technology innovations will enable the future generation of missile defense platforms.

In embodiments, the DACS includes Liquid Divert Attitude Control System (LDACS) propulsion technology that combines heritage systems and processes with innovations in hypergolic propulsion to offer high performance and technically reliable propulsion solutions. Critical propulsion technologies and LDACS are integrated through a multi-phased development program with integrated vacuum testing of an LDACS propulsion system. In embodiments, the LDACS include terrestrially proven propulsion technologies that have been extensively tested in operational, hot-fire environments using close-coupled diagnostic testing. Hardware rich development buys down technical risks early in program development through iterative design, build, test cycles. In one example, an LDACS system uses 1110 N (250 lbf) class thrusters and positive displacement piston tanks 4304.

Combining the thruster, tank, and close-coupled system testing for the LDACS enables flight system maneuverability, reach, and precision control. For example, the thrusters described herein with precise thruster pulses and superior tank expulsion resolution offer high characterization of propellant flow and impulse to support system maneuverability. Fast, repeatable, and smooth starts provide accurate thrust on demand. Additive manufacturing enables in-house manufacturing and testing of the thrusters to control unit cost and improve development completion times.

In embodiments, a data acquisition and control system (DACS) is associated with a software and hardware platform with data acquisition and control modules. For example, the DACS may be associated with the test environment data acquisition system 316. The DACS allows flexible configuration of acquisition and control channels, supports any instrumentation type, and provides manual and automatic programmable data recording. Highly instrumented thruster prototypes can be directly interfaced into the DACS, which can allow for automated redlines to be set for safe operations that ensure test hardware fidelity is maintained. In embodiments, DACS has 200+ analog data acquisition channels with up to 2 MHz simultaneous sampling, enabling comprehensive capture of a broad range of precision sensor inputs during test, that are compiled and cataloged with each dataset. In these examples, the high-resolution data system can feature FPGA-based control and can also be tied into an engine assembly facility for lab and water flow testing. In practice, this enables the efficient evaluation of hardware before and after hot-fire with unparalleled precision of qualitative evaluation. In these examples, test controllers can manage test operations more effectively, efficiently, and safely.

In embodiments, facility features include high resolution accuracy for stability performance; actionable diagnostic data; rapid configurability of test stand and test articles; dedicated test supports program schedule and requirements; and efficient operations and more tests per day, and collection of voluminous data per test.

In embodiments, advanced instrumentation and data acquisition include fast response high-frequency performance measurements: frequency tuned high accuracy thrust; redundant Pc with coupled static and dynamic content: instantaneous high accuracy flow measurement: close coupled data with low signal to noise ratio; daily in-situ & end-to-end calibration; high speed digital video, optical pyrometers, and IR cameras; and simultaneous expandable data acquisition through MHz range. In embodiments, real time diagnostics and data synthesis include streaming test data display on any required parameters; real time signal analysis for redline response; reduced data in customer format within minutes after test: immediate post test data analysis; and performance/thermal/combustion dynamics.

Quarter-Wave Resonator

Figure 98:
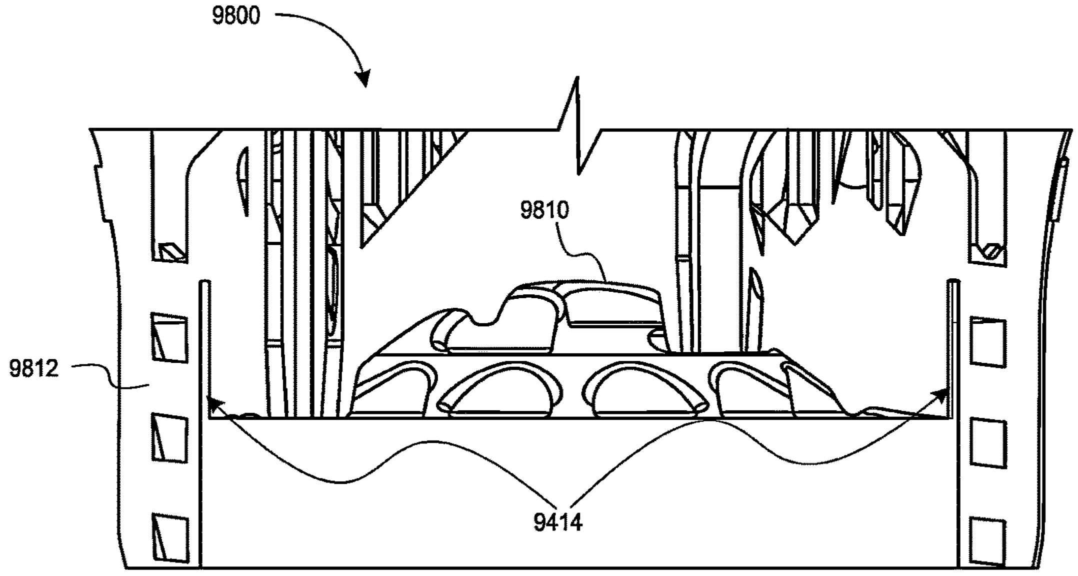
FIG. 98 is a cross-sectional view illustrating an example of a quarter wave resonating thruster according to some embodiments of the present disclosure.

Referring now to FIG. 98, and with continued reference to FIGS. 1-97, an example of a portion of a quarter wave resonating thruster 9800 is illustrated. In the example provided, the quarter wavelength feature is an example of the acoustic quarter wave resonator in a single piece print 4402 of the combustion acoustics—damping/management features 4400. The quarter wave resonating thruster 9800 includes an injector portion 9810 and a wall portion 9812. The wall portion 9812 defines a cylindrical quarter-wave resonator cavity 9814 around the injector. The cylindrical quarter-wave resonator cavity 9814 is open to the combustion chamber.

In embodiments, the Quarter-wave resonators can be configured as acoustic cavities with a quarter of the wavelength of the calculated natural frequency. For example, the acoustic cavities may be designed to mitigate instabilities identified by the post-processing/analysis software 1614. In embodiments, the cavities can phase shift the wave by 180 degrees (due to the time to travel back through the cavity, the wave travels ½ a wavelength) causing destructive interference. In embodiments, the cylindrical quarter-wave resonator cavity 9814 of the thruster 9800 mitigates high frequency instabilities.

Green Propulsion

In embodiments, a monopropellant thruster may use nontoxic or green propellants, such as Advanced Spacecraft Energetic Non-Toxic propellant (ASCENT), also known as AF-M315E. For example, a 22 N thruster with an Isp of 220 and a minimum impulse bit of <0.4 N-s may use ASCENT and have a recurring order time of less than six months. In another example, a 111 N thruster with an Isp of 230 and a minimum impulse bit of <2.0 N-s may use ASCENT and have a recurring order time of less than six months Bird Cage Structure on Bipropellant Chamber In embodiments, a "bird cage" structure may be designed onto the exterior of the bipropellant chamber around the throat region. The bird cage structure supports the throat during build and provides stability during thruster operation. For example, the bird cage structure may be an example of bird cage structure 5006. In some examples, the bird cage structure is designed with optimization for reduced weight and stiffness while avoiding thermal expansion strains during firing. In embodiments, the bird cage structure may be a grid or mesh with diamond shaped voids. An example of the bird cage structure may be seen, for example, in FIG. 125.

Nozzle Extension

In embodiments, the stiffness-enhancing pattern geometry to exit nozzle 5008 may be a titanium additively manufactured component. In an example, the geometry may extend from an axial location of expansion ratio 13 of the nickel part of a nozzle to the full expansion ratio of 300. In the example provided, the nozzle extension follows the same profile as the regeneratively cooled nozzle.

In embodiments, the radiatively cooled nozzle uses a 3D stiffening pattern that can be more sophisticated than the hoop stiffeners previously used on nozzle extensions. In embodiments, the extension was deployed by finding the natural frequency of a rectangular beam of an equivalent cross-section to the geometry which will be patterned on the nozzle extension and targeting that frequency at 1.3× the analytically predicted lowest frequency mode of the unstiffened nozzle.

In embodiments, the stiffeners provide further benefits. For example, a 3D printing slicer software may be unable to slice an unstiffened nozzle extension due to the lack of hatch area. In embodiments, the addition of the stiffening pattern results in successful processing of the geometry by the slicing software.

In embodiments, the nozzle extension can be attached to the single piece print by a split ring collar and nut like the integration of the nozzle and chamber to the thruster body on the 110 N thruster described herein.

Figure 99:
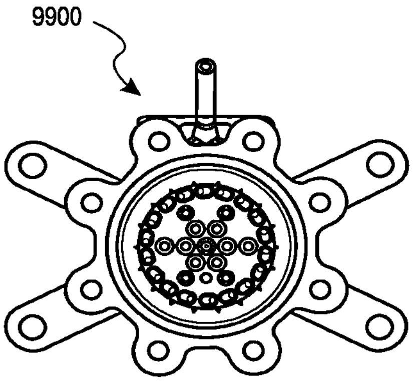
FIG. 99 is a bottom view.
Figure 100:
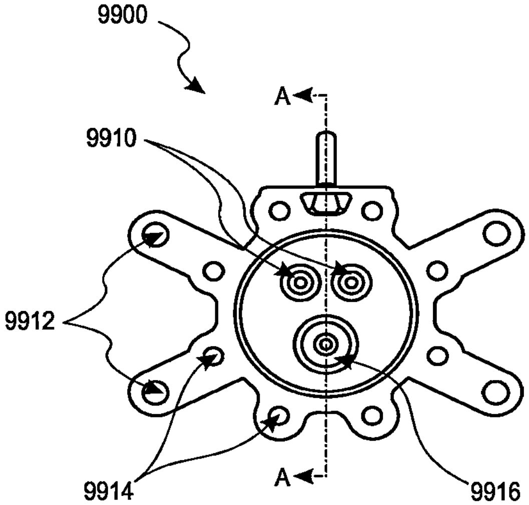
FIG. 100 is a top view.
Figure 101:
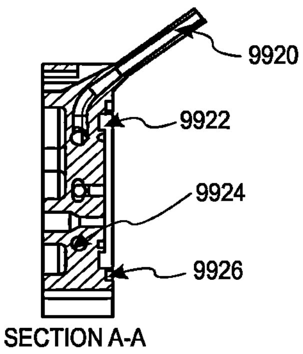
FIG. 101 is a cross-section view illustrating an example of a hydrazine manifold system according to some embodiments of the present disclosure.

Referring now to FIGS. 99-101, and with continued reference to FIGS. 1-98, a hydrazine manifold system 9900 is illustrated in a bottom view, a top view, and in a cross-section view in accordance with some embodiments. The hydrazine manifold system 9900 may be associated with the injector manifold 5016, manifolding 5014, multi-point manifolding of the fuel manifold 3346, or other related features. The hydrazine manifold system 9900 may be employed on any suitable thruster without departing from the scope of the present disclosure.

In the example provided, the hydrazine manifold system 9900 includes accelerometer mounting holes 9910, thruster mounting holes 9912, hydrazine manifold bolted-flange holes 9914, a floating injector depth-check port 9916, a hydrazine inlet 9920, a wave spring groove 9922, a manifold 9924, and a polymer seal gland 9926.

In embodiments, the hydrazine manifold system 9900 may be a top-side closeout for the reactor section of a 111 N engine. In the example provided, the hydrazine manifold system 9900 has the primary objective of distributing incoming hydrazine evenly to the floating injector inside the reactor. In embodiments, the manifold can be designed to provide a near zero pounds per square inch differential pressure drop across the fluid path, thereby providing a uniform backpressure at the inlet of the floating injector.

In embodiments, the hydrazine manifold can be additively manufactured using Nickel 201 and can be post-print machined to meet tolerances on sealing surfaces. The wave spring groove 9922 is shaped to seat a wave spring which can be used to provide a positive preload on the floating injector during launch and in between thruster firings. In embodiments, the hydrazine manifold can be bolted to the reactor section of a single-piece print component of the thruster using eight A286 6-32 bolts as indicated by the bolt-hole pattern of the hydrazine manifold bolted-flange holes 9914. In some configurations of the engine, the hydrazine manifold contains two solenoid valves providing primary control of propellant flow. Such configurations of the engine are also equipped with relevant inlet and outlet connections to the engine. In embodiments, the hydrazine manifold also includes a seal gland for use in a modular configuration and a weld site to integrate it with the single-piece print on future designs.

Floating Injector and Wave Spring Assembly

Figure 102:
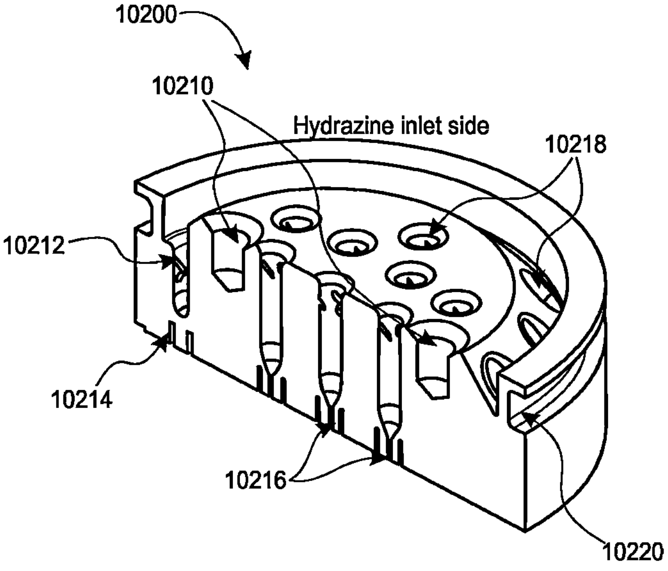
FIG. 102 is a cross-section view and FIG. 103 is an expanded view of a hydrazine floating injector according to some embodiments of the present disclosure.
Figure 103:
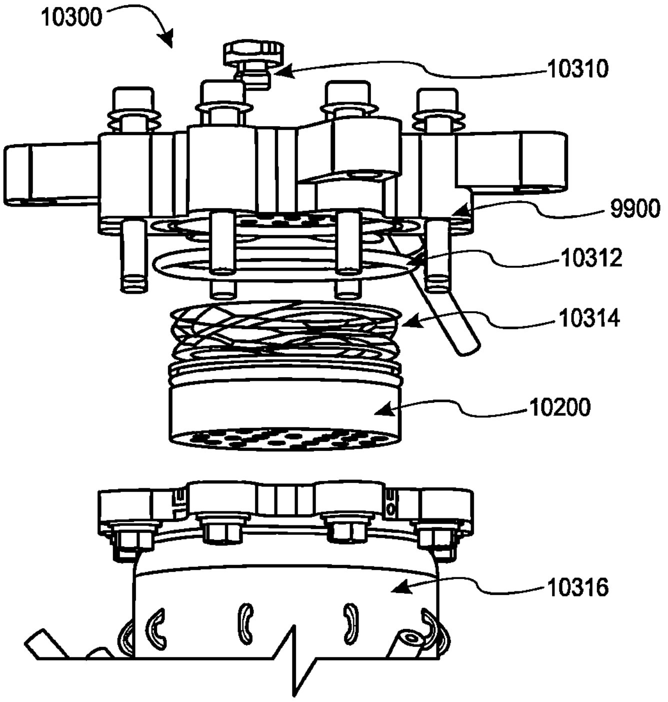

Referring now to FIG. 102 and FIG. 103, and with continued reference to FIGS. 1-101, a cross-sectional view of a hydrazine floating injector 10200 and an expanded view of the hydrazine floating injector 10200 in a reactor section 10300 of a thruster are illustrated in accordance with the teachings of the present disclosure. The hydrazine floating injector 1020) may be, for example, an example of the hydrazine floating injector 5526.

In the example provided, the hydrazine floating injector 10200 includes threaded holes 10210 used for injector removal, flow separators 10212, a thermal brake 10214, EDM drilled injector orifices 10216, hydrazine flow paths 10218, and a gland for a seal 10220.

In the example provided, the reactor section 10300 includes a plug 10310 for an injector depth check port, the hydrazine manifold system 9900, a hydrazine manifold seal 10312, a pre-load wave spring 10314, the hydrazine floating injector 10200, and a reactor section 10316 of a single piece print.

In embodiments, the hydrazine floating injector 10200 can be an additively manufactured, 0.43-inch-thick Nickel 201 disk with an outer diameter that allows its clearance fit into the bore of the reactor. In embodiments, this part can be printed with a minimal post-print machining process requirement (near-net), thereby reducing fabrication lead time. In embodiments, a TEFLON™ or KALREZ™ o-ring can be installed in the radial groove of the injector to provide a seal between the injector and the reactor bore, ensuring that the hydrazine only flows through the injector. In embodiments, the thermal-management design of the injector incorporates negative space on the injection face creating a thermal brake to limit heat conduction to the injector ports. Additionally, the injector ports are printed in a near-net configuration, which includes internal flow separators. By way of these examples, the flow separators can use centrifugal force to spin liquid hydrazine towards the walls and any gas-phase hydrazine can be rejected from the injector elements. Ingestion of gaseous hydrazine can lead to a rapid local decrease in mass flux and significant radial bed flow, thereby damaging the catalyst.

In embodiments, the floating injector is constrained by the pre-load wave spring 10314. In embodiments, the wave spring provides a preload, which ensures a constant bed loading on the catalyst that can be required to maintain consistent hydrazine decomposition. A loss of catalyst bed loading from degradation or disintegration of the catalyst grains reduces hydrazine decomposition efficiency and can lead to localized detonations or popping of the hydrazine in catalyst voids. In one example, the pre-load wave spring 10314.

In embodiments, the actual injector elements opening into the catalyst can be the EDM drilled injector orifices 10216 holes drilled into the injector disk during post printing and machining. The number and diameter of the injector orifices can be varied to achieve a variety of pressure drops based on the finalized design. In an example of a 111 N thruster, pressure drops from 32 to 56 pounds per square inch differential (psid) have been achieved. In embodiments, the optimal pressure drop can be approximately 20% of a total of reactor pressure and the maximum feasible reactor pressure excursion (or "pop"). For the purpose of matching the system pressure budget, the example 111 N thruster uses a floating injector pressure drop of 32 psid.

Iridium-Infused Alumina Granule for a Hydrazine Catalyst

In embodiments, the pebble-bed iridium coated alumina catalyst bed 5040 may be a bed of alumina granules infused with iridium as a hydrazine catalyst. In embodiments, the main component of the reactor section of the thruster can be the catalyst pack which decomposes the hydrazine to nitrogen, hydrogen, and ammonia prior to its flow into the bipropellant injector leading to the combustion chamber. The equilibrium state for the dissociation of ammonia into nitrogen and hydrogen shifts depending on the reaction temperature and pressure, but all three by products are expected to be present in gas exiting the catalyst pack. In embodiments, the catalyst pack can be an assembly consisting of the actual catalyst grains and an L605 (e.g., HAYNES 25) screen that separates the catalyst from the bipropellant section of the thruster. The upper surface of the catalyst pack can be retained by the preloaded floating injector 10200. In embodiments, the catalyst can be an iridium-infused alumina granule provided by HERAEUS and can be called KT Katalysator H-KC12GA CAT-3. A variety of catalysts fabricated to the S-405 specification, proprietary materials, and other materials can be deployed without departing from the scope of the present disclosure. In many examples, a 14-18 mesh grain size is utilized and is resilient to degradation during firing. In these examples, the minor decrease in surface area compared to the smaller catalyst (25-30 mesh) was compensated for by increasing the catalyst bed length. The 14-18 mesh catalyst grain size, however, requires a longer pre-heat period at a higher temperature than that for the 25-30 mesh grain size to avoid thermal degradation from a cold start of the reactor. Thermal degradation, in embodiments, can be mitigated by the use of a thermal jacket around the reactor outer diameter which can be used for heating the catalyst prior to thruster start and for cooling during thruster firing.

In embodiments, the L605 screen downstream of the catalyst can be supported by in-place printed supports at the bottom of the reactor which form a basket. In embodiments, this basket can be designed to offer minimum flow resistance while preventing the collapse of the L605 screen. In embodiments, the supports can be designed such that they do not require additional support material during the process of additive manufacturing.

Instrumentation Accommodation

In embodiments, an assortment of instrumentation has been installed in general purpose instrumentation tubes printed into the structure of the engine. In these examples, these tubes form the basis of a ⅛$^{th}$-inch Swagelok tube which is then polished by manual work. In these examples, Swagelok™ nuts and ferules are then swaged on.

In embodiments, a variety of surface mount instrumentation was added by using a wire welding process. On some 111 N thruster single piece prints, for example, a matrix of points can be printed to help locate the welded-on instrumentation. These can be labeled by integral marks also printed into the structure.

On completion of prototype hot-fire testing and down selecting designs for individual components, the mechanical connections between the bipropellant chamber and injector and between the reactor and bipropellant injector can be eliminated to create a seamless single-piece print of the thruster to reduce thruster part count and assembly time. Additionally, this effort permitted the elimination of some joint seals which could have posed leakage concerns, especially at elevated temperatures.

Oxidizer-Rich Preburner Systems and Methods

In some embodiments, a hypergolic pre-burner combusts hypergolic propellants (Hydrazine and MON3) to produce fuel rich gas. In these examples, gasified exhaust of the pre-burner can be used to power a turbine in a Staged Combustion Cycle rocket engine or other high-density, high-efficiency rocket engines. In embodiments, a pre-burner is an assembly that includes the following components: an injector, a combustion chamber, a throat, and an igniter. In embodiments, the pre-burner burns fuel rich (a higher fuel to oxidizer mixture ratio).

In embodiments, combustion challenges that the pre-burner solves can be shown to include providing thermal uniformity of exhaust, ensuring combustion stability; and controlling product gas properties. Providing thermal uniformity of gasified, hypergolic propellant exhaust helps to prevent degradation of the turbine where the exhaust is flowing. Ensuring combustion stability can extend the life of the pre-burner and integrated engine system. Controlling product gas properties, specifically temperature and composition, can extend the rocket engine life and performance.

In examples, the pre-burner can combust 100% of the hydrazine with ~7% of the oxidizer. This can be shown to result in a $T_c$ of ~1800 K. In many examples, the $T_c$ can be too high, and in some examples, the $T_c$ can be around 1150 K. In embodiments, the pre-burner can have a "pilot flame" including a small $N_2H_4$ reactor designed to stabilize the thermal decomposition of the hydrazine.

An example of a preburner is a subscale preburner sized for a 2,000 lbf engine and is operational using hydrazine and MON3 propellants. For example, the preburner may be associated with a mass flow of 1.08 kg's, a mixture ratio of 0.1, a preburner combustion pressure of 1,450 psi a 100% throttle, a preburner exit temperature of 1,800° F., and combustion stability with no modes above 30 G less than 50 kHz.

In embodiments, the preburner assembly consists of a cylindrical preburner combustion chamber flanged on either end, a central injection element, and an annular injection element. The preburner injector manifold is attached to the top flange and provides an annular injection element. The central injection element delivers oxidizer and a 12% mass flow catalytically decomposed hydrazine gas. At the 100% throttle condition, 80% of the mass flows through the annular element and 20% flows through the central element. At the minimum throttle condition (~16.7%), 100% of the gas generation is provided by the catalytically decomposed gas.

Unlike Doublet Infector

Figure 104:
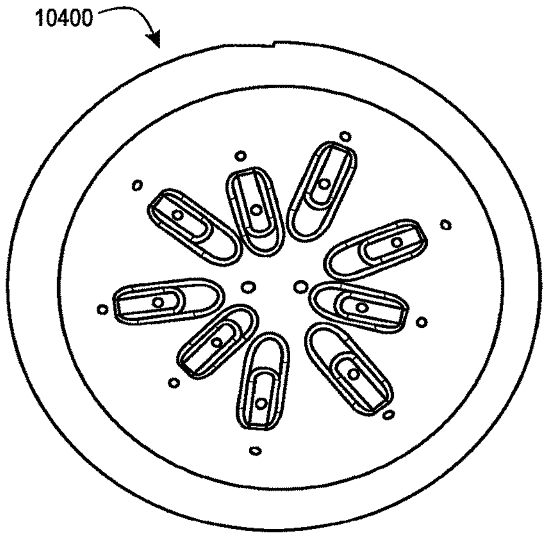
FIG. 104 is a top view and FIG. 105 is a perspective view illustrating an example of a ten element unlike doublet injector according to some embodiments of the present disclosure.
Figure 105:
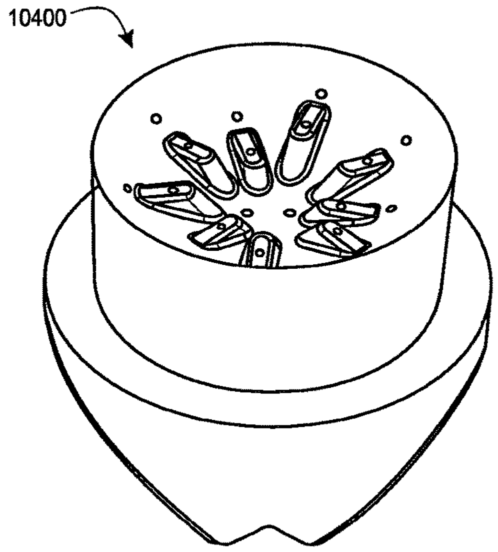

Referring now to FIG. 104 and FIG. 105, and with continued reference to FIGS. 1-103, a 10 element unlike doublet injector 10400 is illustrated in a top view and a perspective view in accordance with some embodiments.

By way of the examples, many types of injector designs are possible with high resolution additive manufacturing. In embodiments, a 10 element unlike doublet arrangement is shown for a 45 N thruster with high inertance, low dribble volume and unique features that can only be manufactured with high-resolution metal alloy 3D printing, as shown and described herein.

Figure 106:
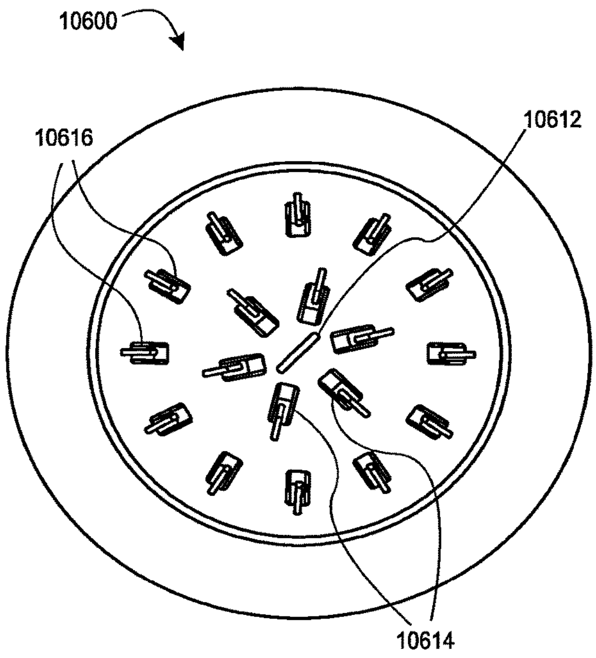
FIG. 106 is a top view and FIG. 107 is a perspective view illustrating an example of a 19 element unlike doublet injector according to some embodiments of the present disclosure.
Figure 107:
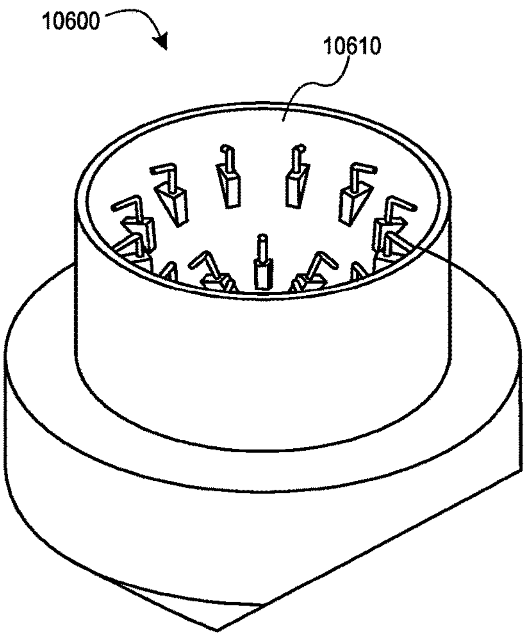

Referring now to FIG. 106 and FIG. 107, and with continued reference to FIGS. 1-105, a 19 element unlike doublet injector 10600 is illustrated in a top view and a perspective view in accordance with some embodiments. In embodiments, a 19-element unlike-doublet injector pattern has been chosen because of the rapid response times in hypergolic thrusters with unlike-doublet injectors. The layout of the injector spray pattern is shown over the injector body using a "toothpick model" shown in the FIGS. In these examples, the choice of 19 elements can be shown to ensure even mass flux across the injector face 10610, while having a dedicated central "priming" element 10612, and separate core injector elements 10614 and wall injector elements 10616 for mixture ratio control. Precise mixture ratio control of individual elements can be demonstrated by high-resolution powder-bed fusion process and validated through waterflow and hot-fire test. In these examples, the core flow ON ratio can be increased for maximum specific impulse while injector elements at the wall have reduced O/F ratios to decrease temperature for the chamber wall.

Thruster Cooling Features

In embodiments, both radiative and regenerative types of cooling strategies are described for use with the thrusters described herein. For example, the cooling strategies may be employed with as engines that range from 22 N of thrust to 2200 N of thrust.

It will be appreciated in light of the disclosure that the maximum temperature you can run your combustion chamber act directly is proportional to your peak instant specific impulse so for every degree of maximum temperature, there is an improvement of 0.03 seconds of ISP. Accordingly, there is an incentive associated with higher temperature alloys. In other cases, there may be increased thruster life with the advent of on orbit refueling, much like reusing boosters with the advent of on orbit servicing the expected life of a thruster. For example, some components have gone from 20 to 30 minutes to possibly several hours of on line over the duration of the spacecraft, interspersed with long cold folks in a higher radiation environment in vacuum.

It will be appreciated in light of the disclosure that there is a move toward more optimal mixture ratios. Depending on the propelling selections this can include things like equal volume ratios to decrease the expense of tanks and decreasing the amount of non-recurring engineering necessary to stand up different tank solutions for the fuel and the oxidizer. In embodiments, a move towards more stoichiometric and ISP optimal mixture ratios for some propellers is possible where, previously, temperatures would have prevented use of those mixture ratios. In embodiments, high temperature and alloys unlock these improvements.

In embodiments, regenerative cooling can be deployed on smaller engines. In embodiments, titanium tanks can be deployed. In some examples, titanium tanks are gated on the wall thickness necessary to obtain gas tightness instead of on the structural requirements based upon the printing process. In examples, the tank may be printed in parts at a bladder and then welded, illuminating one of the greatest benefits of additive manufacturing. In examples, printing the tank thicker than would otherwise be strictly necessary may be employed with the auxiliary impacts to the mass budget.

In embodiments, a high thermal conductivity process produces excellent regeneratively cooled thrust chambers. In embodiments, an Inconel 718 process is used for its strength and temperature. In embodiments, a cobalt-chrome process is used. In embodiments, repeated production of 6,000 holes for our injectors for our smaller line of products, as well as refractory high temperature metal alloys may be achieved. In embodiments, a C103 additive manufacturing process is employed.

In embodiments, the single-piece print component of the thruster can be printed from Nickel 201 alloy and the reactor section of this component can operate at temperatures close to the maximum working temperature of the material. In these examples, this warrants the inclusion of a cooling jacket in the wall of the reactor to maintain sufficient material strength at elevated operating temperatures of the thruster. In embodiments, this jacket can be designed to flow either gaseous nitrogen or liquid hydrazine to cool the reactor section. In examples, this can extract sufficient heat to enable the use of high-temperature polymer seals on both the floating injector and the hydrazine manifold.

In embodiments, the reactor cooling jacket can be designed to not boil or decompose the hydrazine before it reaches the reactor. This can be accomplished by careful tuning of the cooling passage cross-sections to maintain a high flow velocity to limit the heat pick-up of the hydrazine. In embodiments, the cooling jacket only covers critical high temperature sections of the reactor to limit the heat-pickup of the hydrazine, in these examples, the remainder of the reactor can be radiatively and conductively cooled.

Figure 109:
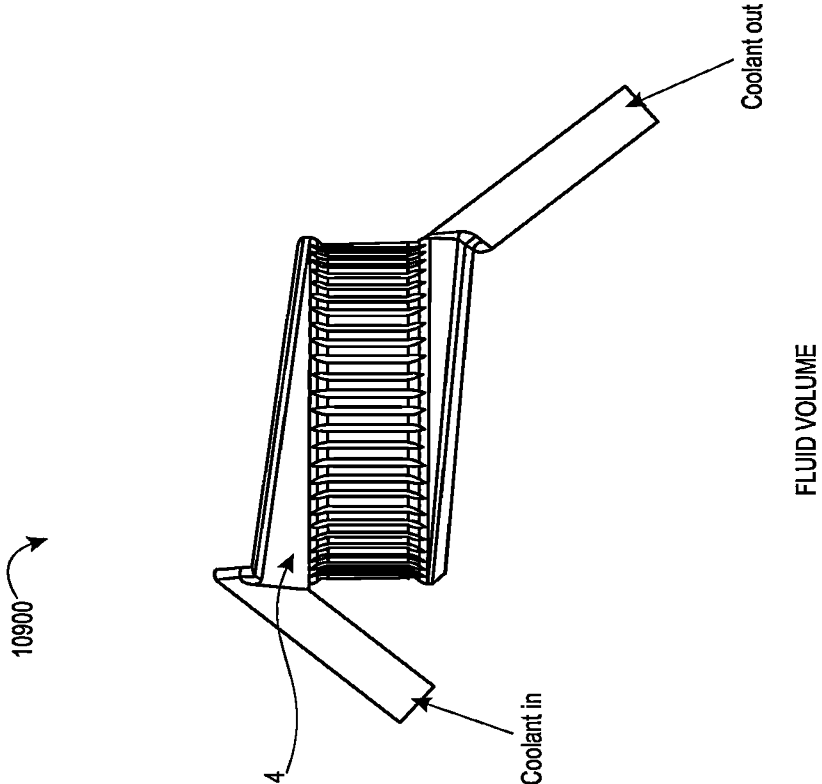
FIG. 109 is a side view illustrating an example of a fluid volume that may be enclosed by portions of the reactor section of FIG. 108 according to some embodiments of the present disclosure.
Figure 108:
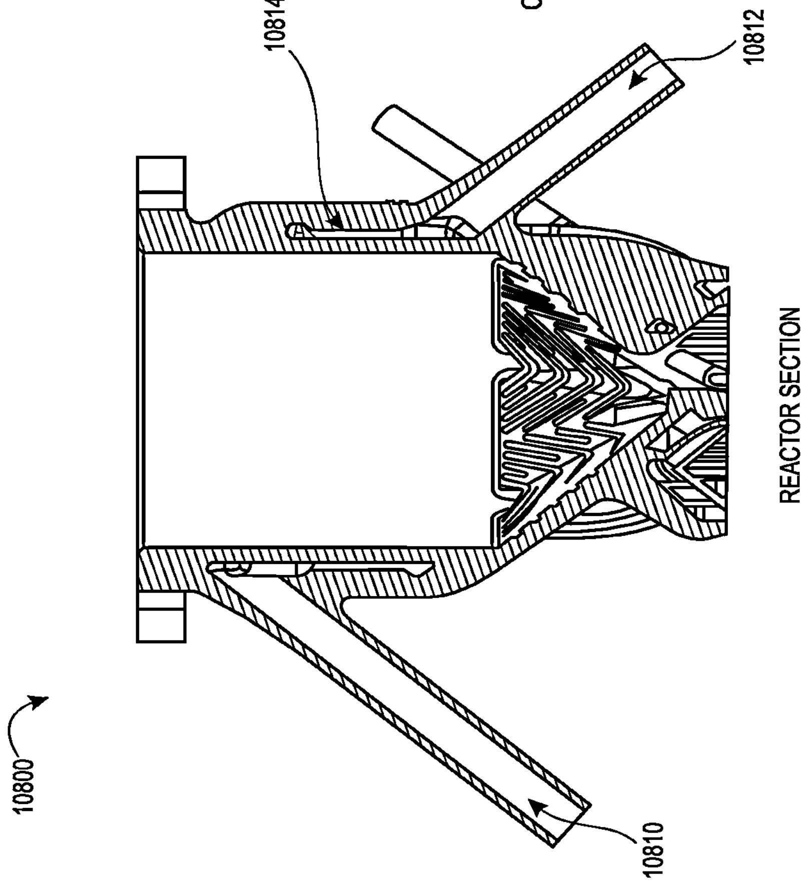
FIG. 108 is a cross-section view illustrating an example of a reactor section for a cooling jacket thermal control system according to some embodiments of the present disclosure.

Referring now to FIG. 108 and FIG. 109, a reactor section 10800 and a fluid volume 10900 are illustrated for a cooling jacket thermal control system in accordance with some embodiments. In the example provided, the reactor section 10800 includes a coolant inlet 10810, a coolant outlet 10812, and a cooling jacket 10814. The fluid volume 10900 illustrates the volume of cooling fluid as it occupies the coolant inlet 10810, the cooling jacket 10814, and the coolant outlet 10812.

Regenerative Cooling System

In embodiments, thrusters can be designed with a unique counterflow, single-pass, phase-change regenerative cooling loop. For example, the regenerative cooling system may be associated with an example of the system of thermal management structures for space propulsion systems 3000.

Figure 110:
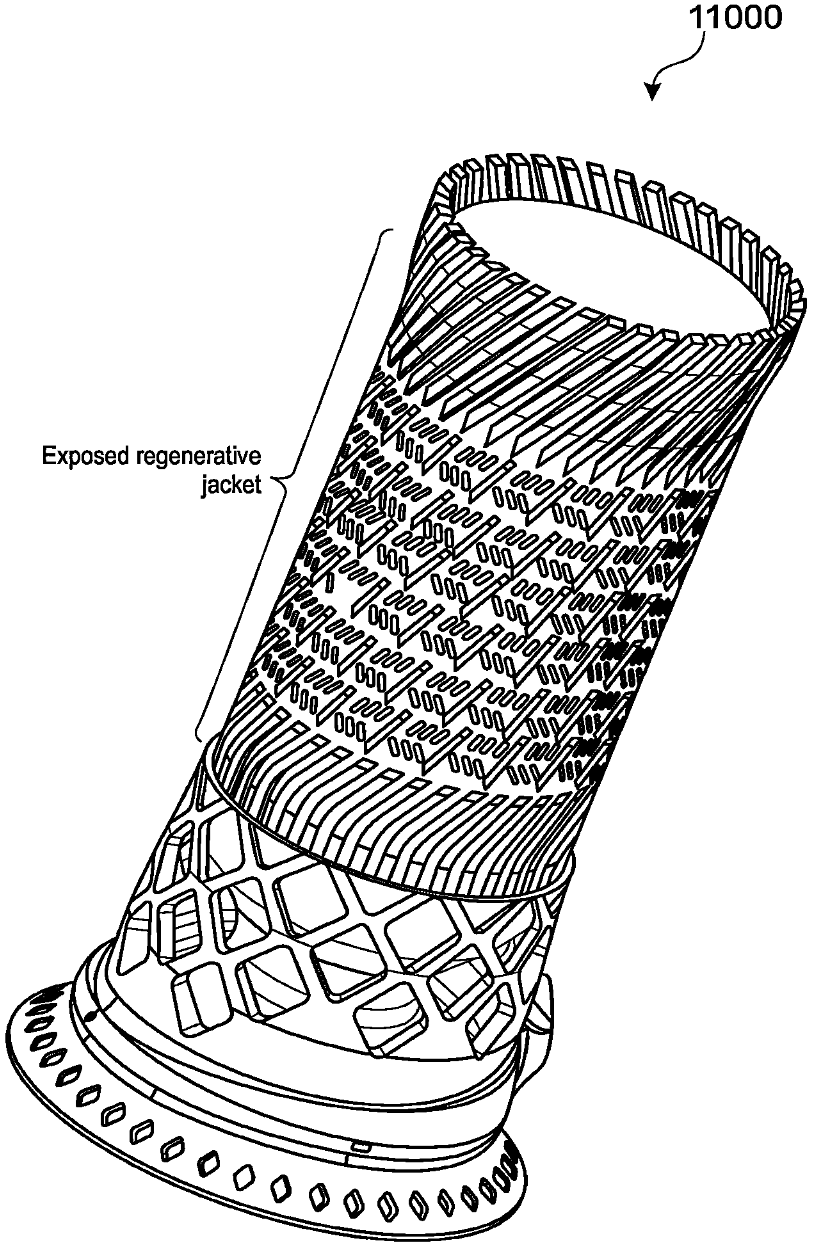
FIG. 110 is a perspective view illustrating an example of an exposed regenerative jacket according to some embodiments of the present disclosure.

Referring now to FIG. 110, and with continued reference to FIGS. 1-109, an exposed regenerative jacket 1100 around the combustion chamber is illustrated in accordance with some embodiments. For example, the exposed regenerative jacket 1100 may be an example of the oxidizer cool regeneration cooling jacket 5036. In the example provided, the exposed region extends from the oxidizer manifold to the start of the converging section on the chamber.

It will be appreciated in light of the disclosure that various features included in this cooling jacket are possible only due to additive manufacturing processes. It will be appreciated in light of the disclosure that architecturally, it can be necessary to boil the oxidizer along the flow path to achieve the gas-gas injection scheme which can be critical to the high performance of the engine. It will be also appreciated in light of the disclosure that practically, the adiabatic flame temperature of a 111 N thruster described herein greatly exceeds the maximum temperature at which the nickel structure can be a solid metal, which, in turn, can necessitate a combustion chamber hot-wall design with high heat transfer across multiple operational stages of the thruster. In an example, regenerative cooling keeps a chamber surface temperature below 400 degrees F.

It will be appreciated in light of the disclosure that the regenerative cooling jacket be necessary and will control for runaway thermal feedback loop due density/viscosity curves of MON3, corrosiveness of hot oxidizer gas, combustion chamber asymmetries driving gas dry-out asymmetries, powder clearing, hot wall buckling, hot wall porosity, and the like.

In many examples. Nickel 201 can be used as the primary material for the construction of the chamber. In these examples, this variant of nickel has enough thermal conductivity so that it can be shown to smooth out some asymmetries in the combustion chamber by providing significant axial and circumferential distribution of the heat load. It will be appreciated in light of the disclosure that Nickel can be lightly catalytic to some propellants, however it can be resistant to corrosion by the hot oxidizer gasses and combustion products.

It will be appreciated in light of the disclosure that MON3 can be a compound which exists in equilibrium with itself at a variety of temperatures, balancing some fraction of nitrogen oxide, nitrogen dioxide, and dinitrogen tetroxide. As the MON3 can be boiled it nearly simultaneously undergoes both a phase change and a chemical decomposition as the dinitrogen tetroxide decomposes to nitrogen dioxide in the gas phase.

It will be appreciated in light of the disclosure that this rapid and significant change drives a positive feedback loop if the coolant can be constrained to channels. As the volume of the MON3 increases dramatically while it retains appreciable viscosity, any channel which experiences a phase-change even infinitesimally before any other channel will see a rapid decrease in coolant mass flow, and therefore, cooling power. As the cooling power decreases, the channel will get hotter and boil sooner, while the channels that have not yet gone through a phase-change will see increased coolant flow, reducing the temperature. In order to suppress this asymmetry driving positive feedback loop, it can be not sufficient to use a shell design because the viscosity remains high enough to maintain mainly laminar flow. This weak mixing can maintain large thermal asymmetries for roughly 0.2 inches above the converging section of the nozzle until full dry-out has occurred. In some examples, these asymmetries can be enough to damage the engine. To resolve this in these examples, a bell nozzle can be deployed having a profile that reduces the total heat power absorbed by the coolant, moving the phase transition point higher up the straight section of the chamber. In embodiments, the channels were additionally given a 25° angle to the generatrix to provide some density stratification of the channels. This can be shown to slightly reduce cooling power in the channel section and delays the phase transition, while allowing for more homogenous conditions on the hot wall and cold wall around the circumference of the engine.

Shark Fin

In embodiments, a shark fin design is deployed and includes the termination of helical channels immediately above the converging section of the nozzle and replacement of them by two sizes of angled flow control features. In embodiments, large flow control features are the full height of the cooling jacket, connecting the hot wall and cold wall. In these examples, these features are called "bruces" and can serve to conduct heat between the hot wall and cold wall to reduce thermal strain inducing differences. In embodiments, bruces also straighten the flow in their relevant direction, setting the flow up to impinge upon the second flow control feature. In embodiments, "Dorys" can also be deployed and can be half-channel-height fins with a chamfered edge intended to trip wake eddy vortices. In these examples, these vortices are targeted at the subsequent stage of bruces to spit the vortex and promote mixing. In addition to promoting mixing the dorys can serve to dramatically increase heat transfer in order to ensure rapid and complete dry-out and can also be shown to minimize the length of the chamber susceptible to the strong positive feedback loop.

Film Cooling Manifold

A dual manifold FFC system has two tunable fuel film cooling manifolds to provide a thinner, more even film layer, maximizing performance. High cracking check valves on the lower manifold ensure excellent pulse impulse performance while maintaining adequate cooling.

Bipropellant Injector

Figure 111:
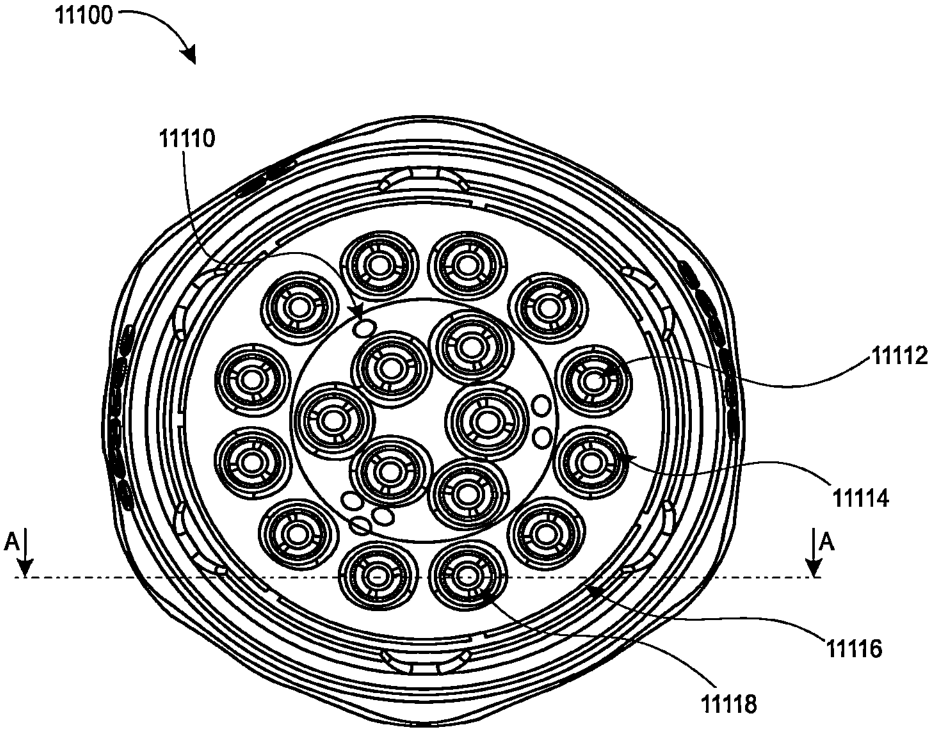
FIG. 111 is a top view and FIG. 112 is a cross-section view illustrating an example of a bipropellant injector according to some embodiments of the present disclosure.

Referring now to FIG. 111 and FIG. 1112, and with continued reference to FIGS. 1-110, a bipropellant injector 11100 is illustrated in a top view and in a cross-sectional view in accordance with some embodiments. For example, the bipropellant injector may be associated with examples from the system of injector design features 3300. In the example provided, the bipropellant injector 11100 includes clocking marks 11110, oxidizer element exits 11112, an annular fuel flow path 11114, an acoustic cavity 11116, support ribs 11118, a fuel manifold 11120, an oxidizer manifold 11122, a central oxidizer flow path 11124. In the example provided, the acoustic cavity 11116 is similar to the quarter wave resonator cavity 9814.

Printed clocking marks 11110 on the face of the injector provide a reference for inspection and documentation of the injector and adjacent chamber hot wall. A pulse pintle injector is a pintle with optimized L/D dimensions for superior pulse performance and combustion stability while providing schedule assurance in the development timeframe. In embodiments, a 111 Newton Hydrazine/MON3 bipropellant thruster can use a regenerative design with gas-gas propellant injection to deliver strong storable propellant performance and reliable long burn durations. It can be capable of dual-mode operation with bipropellant or hydrazine monopropellants, allowing it to fully deplete both propellants for maximum vehicle performance. In examples, these thrusters include a hydrazine reactor catalytic "pre-burner" that gasifies the liquid fuel prior to injection.

In the example provided, the bipropellant injector region includes two manifolds, 18 injector elements, and associated secondary structures. On the single-piece print, the bipropellant injector can be located downstream of the hydrazine reactor basket and upstream of the bipropellant chamber and can be printed from Nickel 201 as part of the single-piece print. In embodiments, the features in the injector are entirely self-supporting, enabling them to print within the single-piece print without post-processing. In an example, the reactor is hydraulically energized for an order of magnitude reduction in components and an extended reactor life.

In embodiments, the outermost manifold can be the oxidizer manifold 11122 for MON3, for example, supplied by the regenerative cooling jackets. In embodiments, the oxidizer manifold 11122 can be supported by twelve radial fins to prevent axial forces from deforming the manifold. In these examples, six of these fins are long such that they reach the full height of the manifold, while the rest are half-height fins extending as far up as the outer row of injector element tubes.

Figure 113:
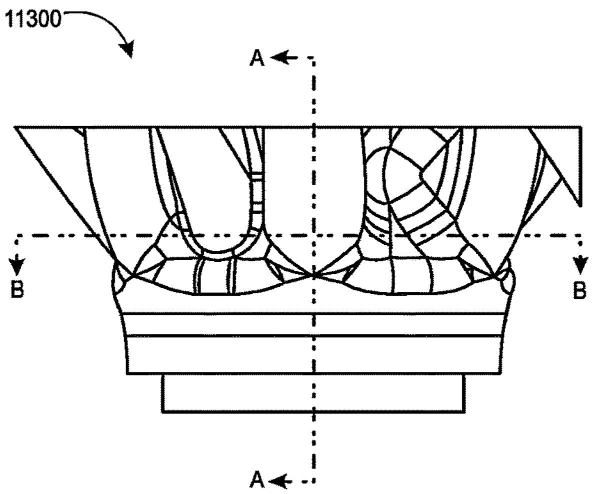
FIG. 113 is a side view.
Figure 114:
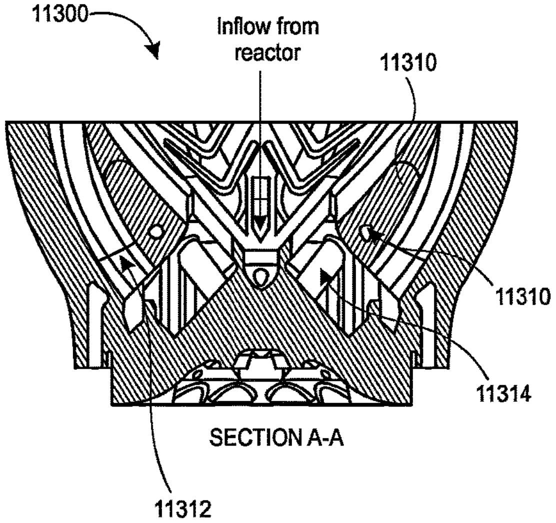
FIG. 114 is a cross-section view.
Figure 115:
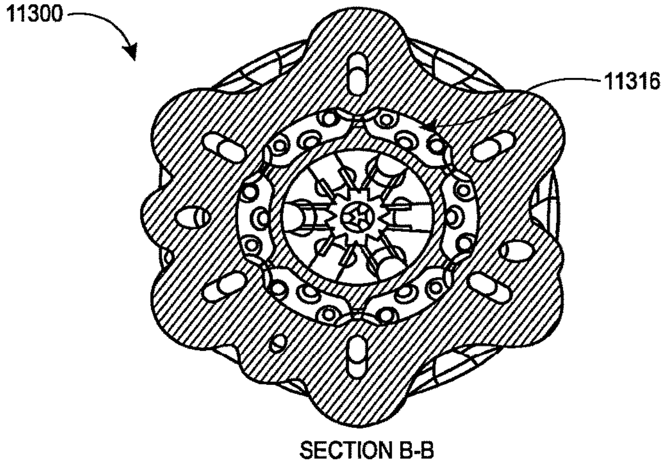
FIG. 115 is a cross-section view illustrating an example of a bipropellant injector according to some embodiments of the present disclosure.

Referring now to FIG. 113, FIG. 114, and FIG. 115, a bipropellant injector 11300 is shown in a side view and cross-sectional views in accordance with some embodiments. In the example provided, the bipropellant injector 11300 includes fins 11302, speed-holes 11310, a fuel downcomer 11312, an oxidizer tube 11314, an oxidizer plenum 11316 created by the fins 11302.

In embodiments, the fins 11302 are perforated with speed-holes 11310 of different dimensions to allow for crossflow between adjacent plenums of the manifold, as shown in FIG. 114. In embodiments, the crossflow allows a uniform pressure across the manifold and an even feed to the oxidizer elements and prevents the amplification of any circumferential asymmetries in the flow emerging from the regenerative cooling jacket.

In embodiments, the second and inner manifold in this region can be for fuel, which can be fed from the upstream reactor and closed out by the injector face. In embodiments, the fuel manifold can be primarily fed by the monopropellant reactor through a half-inch circular connection at the center of the manifold. Additionally, six supplementary fuel downcomers 11312 from the reactor can provide decomposed hydrazine to the outer region of the fuel manifold. These downcomers can also have the effect of suppressing non-axial flow in the catalyst bed which can cause non-uniform mass fluxes in the catalyst bed and erosion of the grains.

In embodiments, the fuel downcomers 11312 also reduce the pressure drop across the fuel circuit and provide even back-pressure conditions to the fuel elements. In embodiments, the manifold contains four rows of chamfered arches which support the injector face without restricting fluid flow through the manifold. In embodiments, the oxidizer tubes 11314 can originate from the oxidizer manifold and pass through the conical manifold separation wall before traversing the fuel manifold at a self-supporting angle to reach the injector face to inject gaseous oxidizer into the combustion chamber. In embodiments, the fuel manifold side of the injector face has concentric ridges at a self-supporting repose angle. In these examples, the peaks of these ridges can be associated with the four rows of the chamfered arches, supporting the rings which would otherwise be in empty space.

Figure 112:
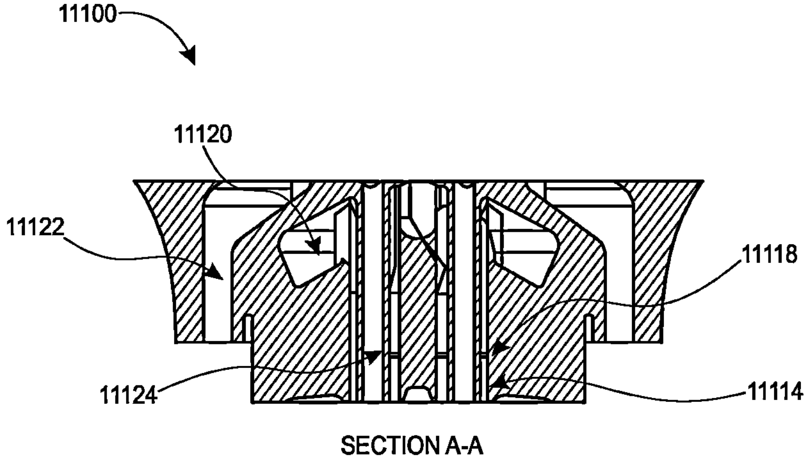

In embodiments, the injector elements can be designed to be shear coaxial elements. For such elements, it can be critical, in certain examples, for the inner oxidizer tubes to remain concentric with the outer wall bounding fuel flow. In some examples, a non-concentric arrangement causes a radially outward mass-flux of mixed propellants in the chamber and leads to a rapid temperature rise of the chamber hot-wall, resulting in burn-throughs. In order to prevent such non-concentricity in the coaxial elements which can be caused by the relaxation of residual stresses from the printing process, the oxidizer tubes 11314 can be supported by three angled ribs 11118 between the oxidizer tubes 11314 and the injector face, as shown in FIG. 111 and FIG. 112.

In embodiments, the conical profile at the back side of the injector face can cause a differential pressure across the injector face due to the difference in element L/D ratios. This can be mitigated by adding a dome to the combustion chamber side of the injector face as can be seen in FIG. 114. In embodiments, the dome accomplishes other benefits such as: combustion stability improvements by disrupting combustion chamber acoustic waves, mass reduction, hot-gas recirculation reduction, and improvement to manufacturability by reducing the incidence of spatter build-up on the injector face.

In embodiments, the dome on the injector face results in non-planar injector exit areas. In order to achieve a planar flow from the elements, the thruster, in embodiments, implements plinths to the dome to create planar injector element exits as shown in the dome region of FIG. 114. On an injector element, the oxidizer tube 11314 can be recessed into the annular fuel tube to create a blunt body for flame holding thereby encouraging additional mixing in the combustion chamber. Small area constrictions can be created by adding a negative draft angle to the fuel element tubes and creating a minor high-pressure zone inside the coaxial element. This can be shown to reduce the susceptibility of the injector to any chamber pressure feedback.

On the bipropellant injector, pressure drops between 28 and 48 pounds per square inch differential (psid) can be demonstrated. In embodiments, a pressure drop of approximately 32 psid can be optimal for suppressing feedback into the propellant feed system from chug instabilities (low frequencies, ≤400 Hz) in the combustion chamber. This level of pressure drop also prevents the development of supersonic oxidizer flow in the oxidizer channels. Supersonic oxidizer flow triggers a high amplitude, high-frequency instability of 31 kHz in the chamber that rapidly degrades the catalyst and mechanical structure of the engine.

In embodiments, a 111 N thruster injector uses the printed injector structure to an even greater effect by individually targeting mixture ratios for elements to produce a low-temperature wall layer and high temperature, high performance core flow. In embodiments, the geometry and pressure distribution of the manifolds can create a mixture ratio of roughly −20% in the outer twelve elements and +40% in the inner six (0.8 and 1.4 respectively at a nominal MR of 1.0).

In embodiments, the thruster design can produce combustion instability at a primary mode of approximately 31 kHz and at associated resonant harmonic modes of the primary mode. In embodiments, these modes can be damped by an annular, linear acoustic cavity. This cavity can be designed to target the 31 kHz primary mode and other similar frequencies in the 15% band of the primary frequency through energy dissipative properties. In embodiments, the acoustic cavity can be supported by seven radial stiffeners and provides suppression of circumferential modes.

Bipropellant Chamber

In embodiments, the bipropellant chamber can include the section of the single piece print from the injector face to the diverging section at an expansion ratio of 8.9. In embodiments, the bipropellant chamber can include the straight section of the chamber, the converging section of the nozzle, the throat, the diverging section of the nozzle, the regenerative oxidizer cooling manifolds and passages, and the nozzle extension interface features.

The bipropellant combustion chamber has an oxidizer cooled regeneration cooling jacket in which the oxidizer undergoes a phase change, so that the oxidizer injection into the combustion chamber is gaseous. High efficiency gas-gas injection elements can be used to deliver high mixing and combustion efficiency which can enable the thruster to exceed 330 seconds Isp over a vide range of inlet pressures and mixture ratios. The gas-gas injector design also enables the thruster to be throttled, which is useful for precise directional thrust control in multi-engine configurations. The thruster can be made with extensive use of additive manufacturing for the entire thruster. In embodiments, the reactor, injector, and combustion chamber will be made as a single, unitary, and monolithic single piece additive print. In embodiments, the thruster can provide thrust for storable propellant transfer stages and high $\Delta V$ propulsion for small spacecraft. As such, its high specific impulse can enable missions to achieve 2 km/s with a propellant mass fraction of only 1.85, meeting needs for high delta-V propulsion while being capable of providing up to 5 km/s of $\Delta V$ as well.

In embodiments, the contour of the nozzle can be an 83% Rao curve implementing minor corrections for the boundary layer phenomenon. In these examples, the contour can be based on a nominal expansion ratio of 300:1, though appreciable truncations may occur without significant degradation in performance due to the low divergence angle losses at the high expansion side of the nozzle profile.

In embodiments, the converging section of the nozzle has a typical $R_1$, $R_2$, $R_n$ structure on a 40° convergence angle. In examples, a steeper than normal convergence angle can be selected to enable the component to fit in the build volume of the additive machine, e.g., the TruPrint 2000™ printer. In these examples, the steeper convergence of the nozzle causes a minor degradation in performance, which can be offset by the marginal increase in allowable characteristic length (L') for the chamber.

In embodiments, a 111 N thruster uses a constant velocity volute (CVV) to distribute the oxidizer from the inlet to the regenerative cooling jacket. In some examples, it can be essential to have even oxidizer temperatures throughout the cooling jacket in order to suppress detrimental asymmetric feedback loops. In some examples, a constant area volute resulted in over 70° F. of temperature difference between the 180 and 360° locations of the volute. By way of these examples, the CVV can be designed to print without internal support material by being triangular in cross-section. Additional embodiments include being flipped so that the length of all regenerative cooling passages can be the same. In some examples, the long side of the CVV was detached from the chamber wall and connected to the second-generation birdcage to provide external support.

At the injector plane, the propellants to a 111 N thruster include hot hydrogen, nitrogen, trace quantities of ammonia, nitrogen dioxide, and trace quantities of dinitrogen tetroxide. It will be appreciated in light of the disclosure that this mix of materials is not promptly hypergolic. It will also be appreciated in light of the disclosure that combustion, however, can be shown to be promptly hypergolic with no observable ignition delay in bipropellant operation as confirmed by numerous start transient observations during hot-fire testing. It will further be appreciated in light of the disclosure that in these examples, the oxidizer dry out can be enough to ensure a smooth transition of the density of the oxidizer entering the chamber enabling a relatively slow sweep of the mixture ratio from zero up to the desired operating MR. It will be appreciated in light of the disclosure that the additional energy from sparse bipropellant reactions can be shown to ensure flame holding as the oxidizer flow ramps up.

Face Shutoff Pintle

A face shutoff pintle provides excellent minimum impulse bit at a best in class TWR Face shutoff enables more mass to the lunar surface, more reliably, while reducing costs. The face shutoff design may save about 0.4 kg of weight per valve, while achieving an improved minimum impulse bit. Fewer valve channels with lower valve power are required. A Helium line of 400-500 psi may be used with the face shutoff pintle.

Silicide Coating for Limiting Niobium Oxidization

Without a protective coating, Niobium will oxidize. For example, a silicide coating may have a coating thickness of 0.0029" and a density of about 2.6 g/cm^3 to limit oxidization of the Niobium. In embodiments, values for $$\frac{\frac{mg}{cm^2}}{\text{though thickness}}$$

of coating may be between a lower bound of 7.115 and 15.939.

Designing Space Vehicle Components

Space Propulsion Development

Figure 116:
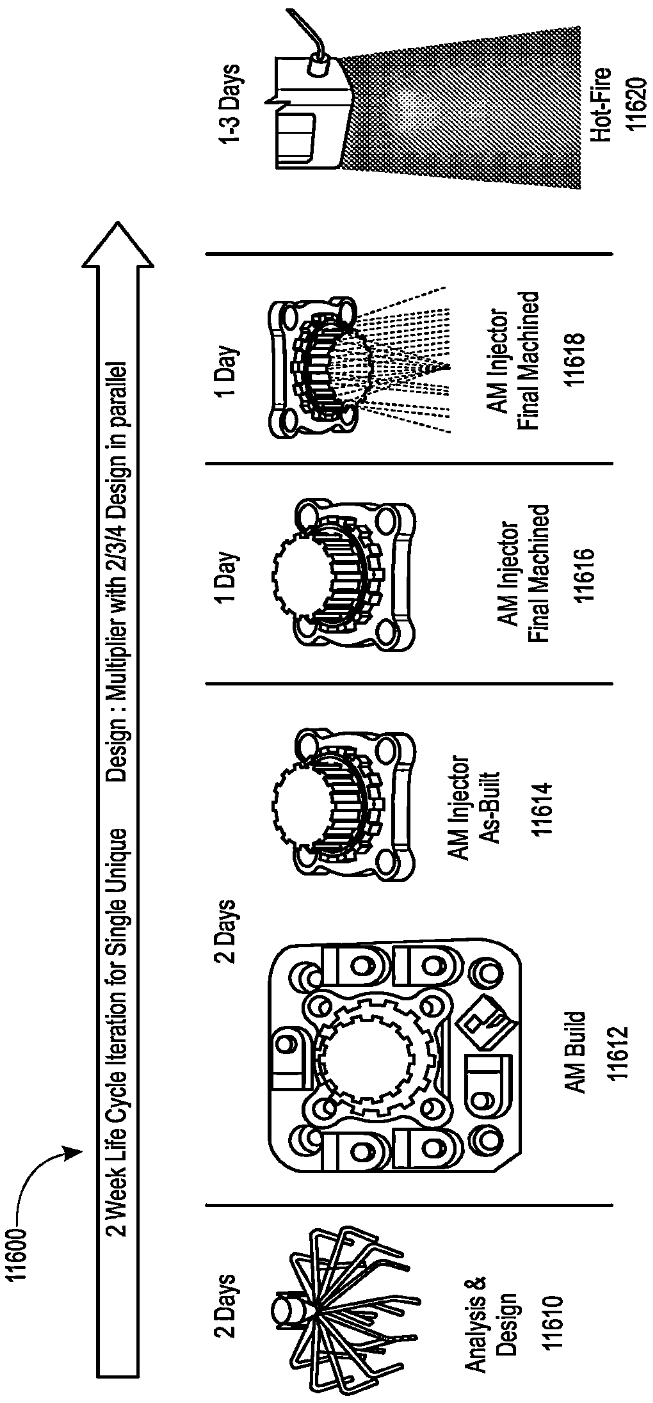
FIG. 116 is a schematic view illustrating an example of a development cycle according to some embodiments of the present disclosure.

Referring to FIG. 116, and with continued reference to FIGS. 1-115, a development cycle 11600 for rapid, low cost development and production for additive manufacturing based in-space propulsion is illustrated in a schematic view in accordance with some embodiments. In the example provided, the development cycle 11600 indicates a time that can be achieved with additively manufactured injectors in an RCS class thruster. The example development cycle 11600 provided includes analysis and design 11610, additive manufacturing build 11612, additive manufactured injector as-built 11614, final machining 11616, post machining inspection 11618, hot-fire test 11620. The development cycle 11600 may use flexible hardware configurations to enable rapid design reconfiguration and evaluation.

In embodiments, an additively manufactured prototype injector can be deployed in 100-lbf in-space thruster applications. Examples were hot-fire tested in a modular configuration with MON-25/MMH propellants across a wide range of Pc, MR, and propellant temperatures, and demonstrated good performance with excellent combustion stability margin.

The benefits of the development cycle 11600 can be shown to result in an order-of-magnitude reduction in thruster development cost and schedule, improved performance and combustion stability margin, and reduced costs and lead times in both development and production. This will ultimately result in lowered cost of propulsion systems while improving schedule, mission performance and system robustness.

In embodiments, low-cost MON-25/MMH propulsion systems can serve near term commercial, exploration, and defense elements of a rapidly growing space economy. In embodiments, thruster propulsion system components can use the propellant combination of Mixed Oxides of Nitrogen 25% (MON-25) and MonoMethylHydrazine (MMH). These innovative engines will be integrated into modular propulsion systems that can provide differentiated value to a breadth of small spacecraft applications they can scale to. In embodiments, these MON-25/MMH thrusters can be included in lander propulsion system.

In embodiments, flight system level hot-fire testing can be shown on multiple configurations of modular MON-25/MMH propulsion systems. These demonstrations can be shown to provide affordable, flexible propulsion architectures, modular scalable propulsion elements for commercial and defense small satellites and enable power-constrained deep space exploration missions. This will retire risks associated with feed system dynamics and possible integration challenges. In embodiments, full propulsion system hot-fire tether and hop tests can be shown to accelerate the advancement of low-cost modular propulsion systems for a high performance mission space.

In embodiments, advanced bipropellants such as MON-25 and MMH can be storable to lower temperatures than the widely used traditional MON-3 and MMH propellants. The oxidizer. MON-25, contains 25% Nitric Oxide (NO), instead of 3% in MON-3, which can reduce the freezing point of the oxidizer to be identical to that of the fuel, MMH.

In embodiments, the thruster can be a 35N Hydrazine Monopropellant thruster. It can use an iridium on alumina oxide pebble bed reactor to decompose the hydrazine before exhausting it through, in examples, an ER=100 nozzle, achieving an isp of 210 seconds. In embodiments, the thruster uses a dual-seat hydrazine solenoid valve. In one example, such a valve can be available from Valvetech Inc., of Phelps, NY. In embodiments, the valve can operate at 28 volts pull-in, is rated for 100,000 cycles, and has a response time under 15 ms.

In embodiments, a hydrazine monopropellant thruster can use a pebble-bed iridium coated alumina catalyst bed to decompose hydrazine. In embodiments, the thruster has demonstrated stable operation with fuel inlet temperatures up to 151° F.

In embodiments, the thruster chamber and nozzle are produced from HAYNES 214, a nickel superalloy with flight heritage in monopropellant thruster applications. The thruster interface is made from Ti-6Al4V and the propellant tube interface is made from stainless steel. The thruster may be integrated into the flight propulsion system with either orbital tube welding or with a fitting. The thruster can include integrated electric heaters to warm the catalyst prior to firing use that operate at 28 volts DC. The thruster mass, when packaged, is expected, in many examples, to be less than 730 grams and has a height of 175 mm from the interface plane.

In embodiments, thrusters can be shown to provide for the mission needs through qualification testing of the thruster in vacuum using a mechanical pump and tank system, capable of achieving millitorr pressures to accurately simulate the space environment when firing. Qualification testing can be baselined as being 2.5× the expected mission propellant throughput, and acceptance testing will be performed with 50% of the expected life throughput. Vibration testing will also occur for the thrusters to GEVs levels for small spacecraft components (e.g., 14.1 grams qualification, 10.0 grams acceptance) and qualification level shock testing.

Workflows and Data Structures for Additive Manufacturing of Space Propulsion Systems In embodiments, the process flow for metal additive manufacturing 7402 includes material parameter development, print parameter validation, and melt pool topography monitoring.

During parameter development, a design of Experiments (DoE) 7410 may be conducted to identify optimal power (P), scan speed (v), and hatch distance (h) using 40 μm Layer Thickness (t). Volumetric Energy Density (VED) may be used to represent parameter combinations:

$$VED = \frac{P}{v \times h \times t} \quad \text{Equation 9}$$

In embodiments of a cube parameter testing process 7406, Surface Response Methodology (SRM) is used to evaluate the density of different VED values. For example, SRM may be used to evaluate the density of 35 different VED values. Cubes may be evaluated for Theoretical Density (TD). For example, 50 cubes with dimensions of 10×10×10 $mm^3$ may be evaluated for Theoretical Density (TD). The cubes may be sectioned and polished along the XZ printing plane. The density along the build (+Z) direction may also be evaluated for density (%) using optical microscopy. In an example, a maximum TD was 99.98% and a minimum TD was 94.24%.

Feature Characterization Studies

Prior to printing the thruster prototypes, the designs can be first deconstructed down to their smallest printable features and geometries, which are then incorporated into sets of print coupons. These coupons can then be evaluated for both efficacy and performance, with pressure drop and other key performance parameters like stream quality, element diameter, and impingement heights being measured and in turn fed forward into the machine's print parameters. These coupons can enable the "dialing in" of the LPBF machines to be used for prototyping and production. By measuring critical features such as hole diameters, wall thicknesses, gaps, surface roughness, and any limitations on build orientations, the job can quickly converge on the best process and the critical feature limitations. The evaluation of each part determines the design and print limitations and identifies any deviations in the manufacturing process.

The sample part evaluation can be completed after analyzing the flow resistance, injector stream quality, quantitative flow distribution and mixing, permeability, dimensional accuracy, and repeatability of material properties and geometric features of printed test coupons. Process quality control, in-situ monitoring and process scalability to production can be tracked. While spot defects can be caught at a component level during acceptance testing, design or process defects can be caught earlier if an appropriate test is used. By way of these examples, an innovative test fixture (using "pucks" and helium gas) can allow permeability evaluation. Several test pucks can be produced to quantify porosity. The sample can consist of a small puck, with an integral helium cavity and several test sections. The central cavity is supplied with helium at high pressure (300-900 psi is standard, depending on the desired test data). Using a helium sniffer, a port hole at the bottom of the test puck can be analyzed to determine the leak rate. In doing so, this can provide a quantitative value for the leak rate of the helium. By varying the thickness of the walls and the orientation of the sample during the printing process, a wide variety of test data on the helium permeability of thin wall features can be obtained inexpensively. This data, in turn, can be used to anchor material properties and design requirements.

Simulation of Components

Because laser powder bed fusion (LPBF) melts and re-melts the metal powder for each layer in the build, complex thermal stresses can build up in the part which can be heavily dependent on the geometry and its orientation on the build platform. If these thermal stresses are not accounted for beforehand, features can physically deform during the build. In these examples, there can be an analysis of the thermal strain that builds up in a component on a layer-by-layer basis which is expressed in residual strain (MPa) as well as the physical deformation that is anticipated to cause (mm or in). In embodiments, design features can minimize the buildup of thermal stresses and warpages, which maximizes the quality of the LPBF parts. The on-plate distortion in the thruster caused by a particular set of build parameters may be plotted and analyzed for improvement.

Design for Additive Manufacturing (DFAM) Review. In embodiments, all internal features can be "self-supporting" (i.e., there are no supports that need to be removed post-print), which reduces the amount of post-processing necessary and can eliminate the risk of any internal support structure impairing functionality. This particular constraint can limit the use of support structures to the external surface of the part, which can result in the support's rapid removal as well as the elimination of any surface roughness generated by the witness marks where the supports were attached to the part.

Qualification and Acceptance Testing (Validation and Verification

In embodiments, all powder lots that are used for production components are qualified through a build that contains tensile specimens, density cubes, and dimensional stability coupons. In embodiments, a stepped calibration squire may be built. With the current process, a theoretical density of 99.986% can be shown to be achievable through the as-built specimens and 99.993% after SR and HIP In embodiments, the quality of LPBF components can be assured through the employment of a multi-step post processing regimen for all flight-qualified components. For example, the multi-step post processing regimen may include powder removal; stress relief heat treatment; wire EDM (when applicable); hot isostatic pressing (HIP); and polishing.

In powder-based additive manufacturing processes, it can be critical to ensure that no unmelted powder remains trapped in the negative spaces of a built component. While powder removal via compressed air or rotation on a two axis depowdering machine (aka "tumbling") may be sufficient for geometries with limited or no internal features, geometries with winding internal features (such as injectors) can require increased effort. In order to ensure that all powder is removed prior to any testing, an ultrasonic bath can be employed to remove loose powder from internal cavities and channels. In ultrasonic cleaning, the part can be submerged in a bath of water or solvent and then a transducer can be used to create ultrasonic waves. These waves lead to the rapid cavitation throughout the liquid and the powder in the surrounding area can be removed upon collapse of the bubble.

Due to the rapid heating and cooling that takes place in the LPBF process, thermal stresses can build in the part layer-by-layer. The parts' connection to the build plate and support structures can prevent parts from warping during the process, but these stresses remain even after the build has cooled down. A stress relief (SR) heat treatment can be conducted at or below the annealing temperature for the specific material. Removing LPBF parts from the built plate prior to SR will result in warpage.

In these examples, production units can be CT scanned to validate that the units are fully dense parts free of any defects or loose powder. Additionally, the chemistry of a sacrificial coupon (likely the grip section for tensile bars) can be tested to validate that the chemical composition has remained in compliance with the applicable material specification.

To produce a product with industry leading reliability, an extensive validation process is employed to be informed from the ground up by "test as you fly, fly as you test." In the example provided, the validation process includes, in sequence with feedback improvements incorporated in repeated tests: coldflow testing, proof and leak testing, hotfire testing with nominal conditions, hotfire testing with nominal and off-nominal conditions, hotfire testing with qualification specification, vibration and shock testing with qualification specification, proof and leak testing with qualification specification, thermal vacuum testing with qualification specification, proof and leak testing, coldflow testing, proof and leak testing, hotfire testing with nominal conditions, hotfire testing with nominal and off-nominal conditions, and proof and leak testing.

In embodiments, Qualification Testing Programs can include Coldflow testing; Proof and Leak testing; Hot-fire testing and trim; Hot-fire testing to acceptance test excursions; Qualification Hot-fire (e.g.: 40,000 pulse cycles (2×life); Propellant throughput equivalent 2× life; and Excursion testing for pressure, O/F ratio, and temperature per requirements); Qualification level shock and vibe testing (e.g.: Proof and leak testing after); Qual TVAC cycling (e.g.: Proof and leak testing during and after); Coldflow testing; Proof & Leak testing; Hot-fire testing at nominal; Hot-fire testing to acceptance level test excursions; and Proof & Leak Testing.

In embodiments, Thruster component acceptance testing can include components that are validated before the assembly level with specific acceptance tests including Injector validation via waterflow, and Valve Acceptance Testing.

In embodiments, Assembled Thruster Acceptance Testing can include the assembled thruster that can progress through an ordered set of acceptance tests, culminating in hot-fire to validate the assembled unit and to demonstrate thruster performance after seeing acceptance loads, shocks, and vibe. The testing can include coldflow testing, proof and Leak testing, hot-fire testing (no more than 10%, of max thruster propellant mission throughput); steady state performance at nominal operating condition; thruster trimming/tuning to achieve nominal O/F and thrust level; random vibration testing; proof and leak testing; TVAC cycle testing; proof and leak testing during and after; hot-fire testing; steady-state operation at nominal and corners of Pc &O/F box of plotted results based on the propulsion system expected excursions of pressure, mixture ratio, and temperature; minimum impulse bit performance at nominal, hot, and cold propellants and at worst-case drive voltage; reduced duration pulse trains representative of expected mission duty cycle, and proof and leak testing.

In embodiments, Valve Qualification Testing Program, prior to thruster qualification testing, will undergo qualification testing that includes Proof and leak testing; Voltage-Temperature-Margin-Testing (VTMT) and response characterization; Shock Testing at qualification levels; Vibration testing at qualification testing; EMI/EMC test; and Cycle test to 4× expected life.

Real-Lime Process Improvements

In embodiments, process improvements include integrating tools like melt pool geometry, structured light scans, and topology mapping of the powder bed to drive real time process improvement on the printer. In embodiments, the printer can observe its melt pool geometry and compare it to prior families of injectors for melt pool geometry and make compensations with that knowledge.

Manufacturing

Single Piece Print (SPP) Manufacturing

In embodiments, the thrusters and components described herein may be printed as a single piece. For example, the single price printing (SPP) may use the single piece 3D printed space propulsion system 2700 described above. A single piece print eliminates joints or seals to reduce leak risk. The fluid paths may be optimized for operation, rather than for assembly as in conventional subtractive manufacturing methods.

In embodiments, the material used for 111 N thruster prints can be Nickel-914-3. In these examples, the powder adheres to the chemical composition of Nickel 201 and the powder has a +15/−45 micron particle size distribution. In many examples, the prints were fabricated on the Trumpf TruPrint (TP) 2000™ printer, some of the components of the print were printed on the Trumpf TruPrint 1000™ printer. In these examples, the processes executed on both TP1000 and 2000 drew from the same lots of Nickel powder. In embodiments, the process parameter sets for the TruPrint 2000™ printer can be developed into identified suitable for hot-fire components. In one example, a print of Nickel on the TP2000 includes cubes that were 10×10×10 mm. These cubes can be assigned varying combinations of laser power, scan speed, and hatch distance.

In embodiments, the use of the single piece print architecture was shown to greatly simplify assembly, removing multiple joints, seals, and part finishing processing.

Laser Powder Bed Fusion System

In embodiments, a Laser Powder Bed Fusion System may be used for at least part of the manufacturing of the thrusters and components described herein. For example, the Laser Powder Bed Fusion System may be part of the system of advanced additive manufacturing techniques for space propulsion systems 6600. In the example provided, the laser powder bed fusion system is capable of printing pure Nickel, stainless steel 316L, stainless steel 17-4PH, GRCop-84, Ti-6V-4Al, Co-28Cr-6Mo, and Niobium C-103. For example, the laser powder bed fusion system may utilize commercially available TRUMPF printer models TRUPRINT 1000 or TRUPRINT 2000. In embodiments, rhenium, molybdenum, tungsten, and iridium are printed by the printer.

In embodiments, the printers are capable of accurate printing with various materials when they are configured with appropriate settings for the material being printed. In the example provided, the laser spot size of the printer is 30 microns and the layer thickness is 20 microns. The settings achieve a tolerance of +/−0.120 mm plus +/−0.051 mm per each additional inch for a well-designed part.

A workflow of laser metal fusion printing includes customer part review, data preparation, printing, part removal, and final part evaluation. The customer part review may include evaluating printable geometry, tolerances, etc. The data preparation may include adding supports if needed. Part removal may include removing the parts from the plate with wire EDM, band saw, or other subtractive methods. Support structures may also be removed during part removal. Post processing may be performed on the entire part or on the supported surfaces where a lower quality surface finish may be present. Post processing may include polishing, sanding, media blasting, or other suitable processes to improve surface finish.

In embodiments, the workflow includes minimizing support structures. Support structures may be necessary when a surface is not self-supporting, a surface has an overhang of less than 45 degrees, or for thermal dissipation. The workflow may include redesigning the part to change the angles, to make the surface self-supporting, or to improve thermal dissipation without supports. Such redesigning may reduce the amount of post processing that may need to be performed on the finished part.

Powder removal may be part of the workflow. For example, powder removal may be successful down to a channel diameter of 0.0008 inch. An ultrasonic bath may be employed remove any excess residue. Larger holes have lower risk of having powder residue remain after the ultrasonic bath.

In embodiments, post-processing includes use of at least one of wire EDMs, media blasting, lathes, 5-axis CNCs. In embodiments, chambers, reactors, injectors, nozzles, single piece thrusters, and thin wall pressure vessels may all be printed by the system of advanced additive manufacturing techniques for space propulsion systems 6600.

A method for additive process development and qualification includes process characterization of qualified materials, feature DOE analysis, qualified material process printing, qualified part post processing, and qualified part delivery.

In embodiments, the LPBF process that can be used to fabricate the injector and thrust chamber can follow this basic sequence: model, slice, and print layer-by-layer. Once the CAD model is created, it can be sliced by software provided by the system's OEM where the CAD model is sliced into layers composed of scan vectors that determine the laser path for each layer. Once the sliced (or "job") file is sent to the machine, then the physical process can begin.

Metal powder can be loaded into the dispensing platform and the building platform can be preheated to minimize the thermal gradient generated throughout the process. The build can be initialized by spreading a laver of powder of a specified thickness, generally anywhere from 10 um-50 um depending on the material. The laser then follows the path specified by the sliced file, melting the powder into a solid. Once the scan for the layer is complete, the build plate lowers corresponding to one laver thickness, another layer of powder is spread, and the scan can begin for the subsequent layer. This process repeats until part completion.

After part completion, it is left to cool and the surrounding unused powder is collected. The build platform is removed from the printer, then the part and any support structures holding the part to the platform are removed. The LPBF part may then be subject to post-processing, such as machining, heat treatment, and surface finishing.

Printer Settings

In examples, settings of the additive printing platform include laser settings, scan strategy, gas speed, etc. For each part or portions thereof, every setting of the additive printing platform may be stored and may be adjustable (or purposefully held constant) during one or more builds of the additive printing platform. The settings may include the machine programming for every applicable CAD model, how the CAD model is sliced to be transformed into the build of the part from the additive printing platform, how the additive printing platform generates the tool path from such CAD models, and everything the additive printing platform would need to run and then run again for later recall of the part with the same or similar specifications and quality.

In examples, settings of the additive printing platform can include the following: 1) Angle, 2) Application, 3) Apply Skip Angle Range(s), 4) Beam Compensation, 5) Border Distance, 6) Brick Wall Shift Direction, 7) Brick Wall Shift Factor, 8) Build Direction, 9) Build Order Mode, 10) Build Strategy, 11) Bulk Density, 12) Connection Factor, 13) Correction Offset, 14) Delivery, 15) Dynamic Powder Supply, 16) Enable Build Direction Reordering, 17) Enable Do %% m-skin, 18) Enable Gap Fill, 19) Enable Instance 1, 20) Enable MatAMX Output, 21) Enable Offset Correction, 22) Enable Point Reduction, 23) Enable Region Sorting Debug Output, 24) Enable Selective Down-skin, Exposure, 25) Enable Shift Hatches, 26) Enable Skywriting, 27) Enable Up-skin, 28) Export Magics Machine, Configuration (MMCF), 29) Export original part contour, 30) Export Used Parameter Profile, 31) Field Offset, 32) Field Size X, 33) Field Size Y, 34) Filling Orientation, 35) First Layer Iterations, 36) Grid Angle, 37) Grid Distance, 38) Hatch Distance, 39) Hatch Offset, 40) Hatch Style, 41) Increment, 42) Jump Path Optimization, 43) Laser Beam Diameter, 44) Laser Power, 45) Laser Speed, 46) Marginal Distance, 47) Maximal Gap Size, 48) Maximum Merge Length, 49) Merge Small Vectors, 50) Merge vectors within islands, 51) Minimal Down-skin Area Perimeter, 52) Minimal Field Size, 53) Minimal Up-skin Area Perimeter, 54) Minimum delay between vector types, 55) Minimum Layer Time, 56) Minimum Supply Factor, 57) Minimum Vector Time, 58) Number of Borders, 59) Number of First Layers, 60) Number of Lavers, 61) Number of Lavers in a Set, 62) Number of Scanned Layers in a Set, 63) Offset Into In-skin, 64) Optimize Block Sorting, 65) Overlap Into In-skin, 66) Oxygen Level, 67) Pattern. 68) Pattern Shift, 69) Pattern Shift X, 70) Pattern Shift Y, 71) Pattern Style, 72) Perimeter Threshold, 73) Period, 74) Powder Bed Monitoring, 75) Pulse Duration, 76) Pulsing, 77) Reduce Gas Speed for First Layers, 78) Reduced Gas Speed, 79) Remelting Count, 80) Return, 81) Scale Center, 82) Scale X, 83) Scale Y. 84) Scale Z, 85) Scan every . . . layer, 86) Scan every . . . layer, 87) Scan Order, 88) Scanning Order, 89) Sharp Edge Angle Threshold, 90) Shielding Gas Speed, 91) Shielding Gas Type, 92) Size of debug markers, 93) Skip Angle Range(s), 94) Slice Thickness, 95) Stripe Offset, 96) Stripe Size, 97) Supply Factor for First Layers, 98) Threshold Angle, 99) Threshold for Hatch Vector Filter, 100) Threshold for Jump Optimization, 101) Threshold for Optimized Island and Part Sorting, 102) Tolerance, 103) Trimming Factor, 104) Typical/Maximum Supply Factor, 105) Vector Support Sorting Mode, and 106) WZA Format Version.

In many examples, each (or sets thereof) of the aforementioned machine settings of any additive printing platforms can include detail of each of these machine settings stored at a per line number basis. By way of this example, the additive printing platform can move from layer to layer and, e.g., layer 129 may have many different or similar machine settings relative to layer 130 and also relative to layer 128. It will be appreciated in light of the disclosure that parts, products, and portions thereof of the additive build can have very fine detail features and be made of rather exotic materials that can necessitate various modifications of such settings of the additive printing platform to maintain proper dimensional tolerances and various characteristics of the finished material (e.g., density, regional porosity, or the like). In embodiments, the additive printing platform can print in pure nickel, C103, cobalt chrome, or other applicable aerospace powder metals. In examples, C-103 is a Niobium-based alloy containing approximately 10% Hafnium and 1% Titanium. In many examples, the settings of the additive printing platform are global but specific for the metal powder material being printed. By way of these examples, the settings of the additive printing platform can include machine and platform settings associated with the material being printed and, in many examples, such settings are not changed during printing. In many examples, the machine settings include oxygen content, shielding gas speed, shielding gas type, recoding speed, or the like. In these settings such as recoding speed, there can be control of the pushing of the metal powder being printed across the additive build. In these examples, the rate of the push, the feed, and how the powder moves can be adjusted. In many examples, the platform settings can further include build direction, starting location, build order, vector types, and the like.

When printing an additive build in the additive printing platform, the build or a portion thereof can have an up skin, an in skin, and a down skin. In relation to the additive build (or a portion thereof), the up skin, the in skin, and the down skin are different upward facing surfaces. Inside the additive build and in various downward facing surfaces, there can be different laser energies and scan paths used to form the layers of the additive build. In embodiments with fine features, with printing overhangs, or printing a very aggressive angled part, the additive printing platform can adjust strategies for the down skin that can be specific to these fine feature additive builds. In examples with larger overhangs, the additive printing platform can insert tubes, tees, or suitable support structure that can otherwise be removed to provide the final shape of the additive build. In embodiments, the additive printing platform can adjust the down skin to facilitate more strong and durable overhangs.

In embodiments, the additive printing platform can control for overgrowth. By way of these examples, the additive printing platform can anticipate the predictability so as to be able to form channels or beads associated with the additive build that can be around two thousandths of an inch or about fifty micrometers—on the order of the diameter of human hair. In these examples, the additive printing platform can control beam compensation so a tool path can be adjusted to better define the outer edge of a portion of the additive build. By adjusting laser beam compensation, portions of overgrowth can be increased or decreased to drive the final additive print to the desired nominal design. It can be shown that overgrowth can be determined by, for example, printing actual parts and measuring the as-printed dimensions. From that, an overgrowth factor can be determined and can be based on multiple prints that line up with the overgrowth in the as-built additive build.

In embodiments, the additive printing platform can provide an additive build with no support structures or limited support structures. In designing an additive build without support structures, the additive printing platform can be shown to provide very stable thermal control throughout the additive build.

In embodiments, the additive printing platform can direct the regional porosity of portions of the additive build to minimize porosity and, in turn, minimize (or eliminate) the propagation of gasses through the walls or other portions of the additive build. When in space or in thinner atmosphere environments, the change of pressure across such walls or other portions of additive build can increase such propagation. In these examples, the propagation of gasses can be leaking through the bulk material—right through the thickest part of the wall—of the additive build. In embodiments, skin parameters on the hot wall of an additive build that contains combustion can be set such that there is predetermined very low porosity in that one part, i.e., looking to avoid or sufficiently eliminate porosity in the process. In these examples, the additive printing platform can adjust the hatching and the intersections of all the different laser passes to further reduce regional porosity in one or more regions. In doing so, the adjustment of the laser, in these examples, is in a way increasing the impedance of the additive material by adjusting its microstructure. In these examples, the adjustment of the microstructure can introduce, in some examples, a labyrinth-like structure (or almost solid).

In embodiments, the additive printing platform can make bulbous and cantilevered additive builds or portions thereof. In such additive builds, the build or a portion thereof can have the up skin, the in skin, the down skin. In embodiments, the additive printing platform can adjust the in-skin by adjusting, for example, scan speed, laser intensity, and the distance from the inside of the part to the in-skin. In examples of portions of the additive build, a wall thickness can be 0.4 millimeters making the down-skin even smaller. In embodiments, settings used in contouring for the in-skin, which can be used to build your vertical walls, can be applied to the down-skin. By way of these examples, skin hatching, which is a characteristic of laser speed, can be about 1,100 millimeters per second at about 125 watts but in predetermined different areas, the laser speed can be about 1,300 millimeters per second at about 100 watts. In doing so, the laser that is used to form the additive builds can have lower energy in that line and, in turn, provide faster scan speed at the lower laser power. In implementing such examples, portions of the additive build can be at (i.e., extend from a portion of the additive build at) an angle and those same portions extending at such angles can have less than 0.4 millimeters of total wall thickness with sufficiently low porosity throughout the entire wall. It will be appreciated in light of the disclosure that purposeful adjusting of power and scan speed can be shown to produce desired regional micro density with the goal of the highest density and most stable process. It will be appreciated in light of the disclosure that this process will work for developing density in almost any material used for the additive build. As such, this can be applicable to many 3D printed materials for laser powder bed fusion and the application of the same skin settings on the down-skin to the in-skin when printing fine detail additive builds. In these examples, the distance between the edge and the end of the laser path are the border distance and the hatch offset. In these examples, cantilevered or bulbous portions of the additive build can have angles from adjacent walls of the build that can form in a range of angles from 40 to 90 degrees. In other examples, cantilevered or bulbous portions of the additive build can have angles from adjacent walls of the build that can form in a range of angles of less than 90 degrees.

In many examples, one parameter can define the entire print but there are various scenarios where the additive build is sectioned into portions of the part to deploy multiple disparate scan strategies. For example, there may be one parameter for the entire part but sectioned out from that part, can be a small feature set like a ring, nozzle tip, etc., which can have a different setup but otherwise be a unitary component of the additive build.

In embodiments, the additive build can include a very fine set of rings printed on top of a portion of the additive build. In these examples, these rings can be different build profile than the majority of the additive build but still be a unitary portion of that build. In these examples, these rings can be printed in concentric circles. In doing so, there can be relatively very long and controlled laser passes, relative to many small "choppy" passes or quick hits. It will be appreciated in light of the disclosure that the selection of these laser patterns can be beneficial to drive feature resolution. In these examples, there can still be variation between layers but otherwise, maximize longer laser passes. In doing so, it can be shown that porosity can be greatly reduced in both regions but even through the very fine detail portions of the build.

In embodiments, the additive printing platform can deploy a primary build with one or more secondary builds embedded within it with myriad different parameters but otherwise produced on single unitary structures. In many examples, even with one scan strategy applied to the entire additive build, the laser paths can be changed from layer-to-layer (e.g., flipping between two angles of laser pathways) and this setting can be adjusted. It will be appreciated in light of the disclosure that such changing per layer can be used to provide beneficial grain structure. In embodiments, the additive printing platform can print engine catalyst materials into the 3D print to produce structural catalyst components and/or produce shapes of the catalyst within the greater structure of the additive print.

Advanced Materials

Advanced materials for additive manufacturing may be used in the design and manufacturing of space vehicle components. For example, the advanced materials may relate to the advanced materials for in-space propulsion system 6700. In embodiments, Nickel 201 is printed in a 0.010" gas tight wall for heat exchangers and rocket chambers. In embodiments, structural components are printed with Inconel 718 with 208 ksi ultimate strength. In embodiments, ultra-fine injectors may be printed with cobalt-chrome to enable 0.006" holes. In embodiments, radiatively cooled rocket nozzles are printed with Niobium C-103. In embodiments, TiZrMo, Rhenium, GRCop-42, Ti-6V-4Al are used for various features and components.

In an example, a printing process for high temperature refractory metal alloys, notably C103 is developed. There is a substantial cost savings associated with the improved by the fly ratio. It will be appreciated in light of the disclosure that the lead time improvement over a cold spray process is very large. It will also be appreciated in light of the disclosure that the amount of touch labor compared to a welding process is excellent.

It will be appreciated in light of the disclosure that getting a sufficient amount of energy into the material to maintain key holding regime formation for the feature set with such a high temperature alloy required substantial challenges on the machine side. In response, a pre-heat strategy and a volumetric energy density strategy were developed to get the density desired. Prior to hot isostatic pressing, printed parts were obtaining greater than 99.98% theoretical density. After hot isostatic pressing, there is no determinable difference between rock density and as printed density.

Fine Feature Printing

Feature size, smaller injector features allow for lower thrust levels and shorter pulses. Smaller channels allow for various regenerative cooling improvements. Tank wall thickness for low pressure SV tanks may be considered. In embodiments, a process for dealing with observed offsets and return to these processes helps to gain a holistic understanding of machine factors that influence these features.

Powder Recycling

In embodiments, during the powder recycling process, handling powder after it has been heated under a mostly inert atmosphere is considered. Over a variety of cycles, the Niobium powder can accumulate some oxygen content and eventually it will be in violation of the specification for Niobium powder. It will be appreciated in light of the disclosure that because it is well-dispersed oxygen, it is not a surface oxidation treatment that is traditionally so detrimental to the nozzle extensions of years past, but rather is a dispersion hardened alloy by some fraction of oxygen. In embodiments, we are able to demonstrate sufficient toughness against cracking in this application by a combination of margin, planned life and testing.

Configured Thrusters

In the hypergolic rocket engine (such as the hypergolic rocket engine 114), a thruster is a propulsive device used by spacecraft for station keeping, altitude control, in a reaction control system, or long-duration, low-thrust acceleration. Thrusters are designed to produce precise impulses by achieving fast response times using hypergolic propellants. The chemical kinetics of ignition between these hypergolic propellants are well known. Additionally, such thrusters of different thrust ranges have also been studied and developed. Since one of the key aspects of these thrusters is the response time to guidance system commands, which is directly connected to the injector manifold volume, or dribble volume, this feature of a thruster has been studied by researchers in single-pulse tests. Some work has also been done to characterize the evolution of pulse response over the first three pulses with 50 ms ON time pulses. The thruster characteristics of per-pulse impulse, response times, and repeatability can be improved by the use of multi-element injectors with low dribble volumes, which are a challenge to achieve on low-thrust propulsion systems. This aspect of the thrusters is addressed by the use of additive manufacturing (AM) to fabricate thruster components with fine design features and more efficient injector manifolds. The best conventionally machined injectors of this class typically have an injector manifold volume that is 200% or more than what may be possible to achieve with additive manufacturing.

As discussed, the hypergolic rocket engine has a minimum thrust, a minimum responsiveness, and a pulse repeatability configured for in-space transfers and orbit manipulation of the objects. Herein, the minimum thrust, the responsiveness, and the pulse repeatability are suitable for at least one of orbit transfers, last space mile delivery, lunar delivery, space manufacturing logistics, space debris management, sample return from space, satellite servicing, space hazard avoidance, or space maneuvering for sustainable energy.

For the hypergolic rocket engine, the thrusters can be of two main types: monopropellant thrusters and bipropellant. Generally, monopropellant thrusters generate thrust by liquid hydrazine flowing through an open propellant valve into a catalytic decomposition chamber where the propellant goes through a highly energetic decomposition process and the hot decomposition gases are then accelerated through a converging-diverging nozzle. On the contrary, bipropellant thrusters produce thrust when two propellant valves open and liquid fuel (typically monomethylhydrazine, or hydrazine) and liquid oxidizer (nitrogen tetroxide) hypergolically ignite in the chamber, which provides resulting hot gas exiting the nozzle, creating thrust. In some embodiments, the bipropellant thrusters, as described herein, may be pre-qualified for operability with other hydrazine derivate fuels.

The techniques and systems described herein may be used to design and manufacture thrusters with various capabilities. For example, a 22 N thruster may be designed and manufactured with an Isp of 295 s, an ON ratio of 1.0, a mass of 281 g, a minimum impulse bit of less than 0.1 N-s, may use MMH fuel, and may use MON3 or MON25 oxidizers. In another example, a 45 N thruster may be designed and manufactured with an Isp of 305 s, a mass of 324 g, a minimum impulse bit of less than 0.15 N-s, may use MMH or M20 fuel, and may use MON3 oxidizer. In another example, a 110 N thruster may be designed and manufactured with an Isp of 310 s, a mass of 353 g, a minimum impulse bit of less than 0.4 N-s, may use M20 fuel, and may use MON3 oxidizer. In another example, a 450 N thruster may be designed and manufactured with an Isp of 315 s, a mass of 1.5 kg, a minimum impulse bit of less than 4.5 N-s, may use MMH fuel, and may use MON3 or MON25 oxidizer. In another example, a 660 N thruster may be designed and manufactured with an Isp of 300 s, a mass of 1.75 kg, a minimum impulse bit of less than 10 N-s, may use MMH fuel, and may use MON3 oxidizer. In another example, a 3100 N thruster may be designed and manufactured with an Isp of 321 s, a mass of 5 kg, a minimum impulse bit of less than 150 N-s, may use Hydrazine fuel, and may use MON3 oxidizer. It should be appreciated that other thrusters with different specifications may be designed and manufactured without departing from the scope of the present disclosure.

Monopropellant thrusters may be designed and manufactured using the techniques and teachings of the present disclosure. For example, a 5 N monopropellant thruster may have an Isp of 200 s, a mass of 170 g, a minimum impulse bit of less than 0.1 N-s, and may use Hydrazine as the monopropellant. In another example, a 35 N monopropellant thruster may have an Isp of 220 s, a mass of 730 g, a minimum impulse bit of less than 1 N-s, and may use Hydrazine as the monopropellant.

Throttled bipropellant thrusters may be designed and manufactured as space Vehicle main engines using the techniques and teachings of the present disclosure. For example, a 111 N throttled bipropellant engine may have an Isp of 324 s, a mass of 2.0 kg, a throttle range of 20-170%, may use Hydrazine fuel, and may use MON3 oxidizer. In another example, a 2200 N throttled bipropellant engine may have an Isp of 318 s, a mass of 5.0 kg, a throttle range of 50-100%, may use M20 fuel, and may use MON3 oxidizer. In another example, a 3100 N throttled bipropellant engine may have an Isp of 321 s, a mass of 5.5 kg, a throttle range of 50-100%, may use M20 fuel, and may use MON3 oxidizer. In another example, a 4500 N throttled bipropellant engine may have an Isp of 321 s, a mass of 7.5 kg, a throttle range of 40-100%, may use M20 fuel, and may use MON3 oxidizer.

4 N Thruster

Figure 117:
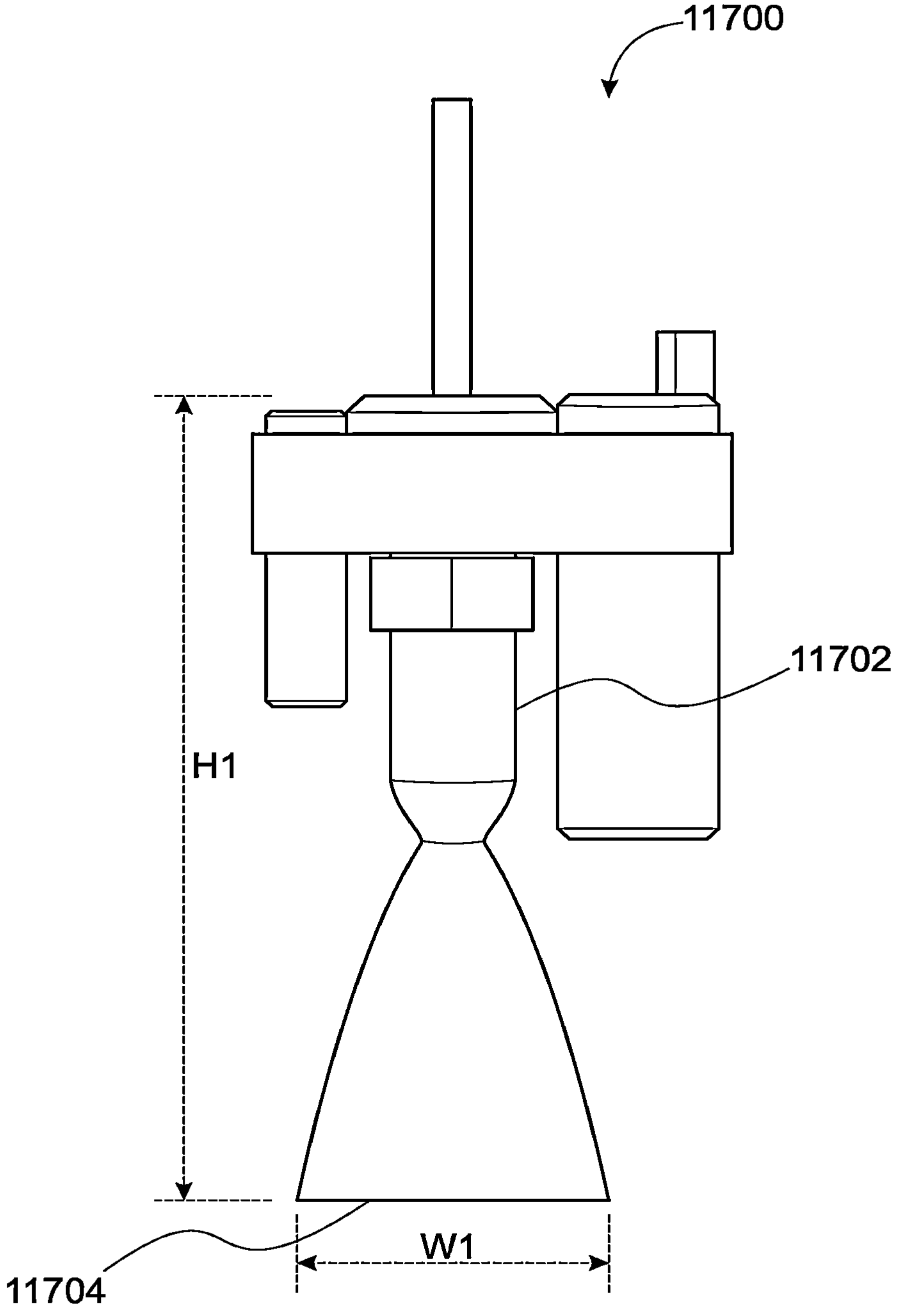
FIG. 117 is a perspective view illustrating an example of a 4 Newton thruster according to some embodiments of the present disclosure.

Referring now to FIG. 117, and with continued reference to FIGS. 1-116, a diagram illustrates a monopropellant thruster 11700 according to some embodiments of the present disclosure. In some embodiments, the monopropellant thruster 11700 is a 4 N (~1 lbf) hydrazine monopropellant thruster. Hereinafter, the monopropellant thruster 11700 has been referred to as 4 N thruster 11700. In some examples, the M4 thruster from AGILE is an example of a 4 N thruster as described herein. It will be appreciated in light of the disclosure that the 4 N thruster contains many ornamental features separate and distinct from the many functional features disclosed herein.

As shown, the 4 N thruster 11700 includes a propulsion chamber 11702. Further, the 4 N thruster 11700 includes a nozzle 11704 as part of the propulsion chamber 11702. In the example provided, the propulsion chamber 11702 of the 4 N thruster 11700 has a height of about 1.38 inches, and the propulsion chamber 11702 of the 4 N thruster 11700 has a width at the nozzle 11704 of about 0.49 inches. The 4 N thruster 11700 is designed for attitude control and precision maneuvering of small spacecraft. The 4 N thruster 11700 is extremely lightweight due to its highly optimized additively manufactured propulsion chamber 11702, including heat-break and chamber. The 4 N thruster 11700 is delivered ready for spacecraft integration with an electric catalyst heater and thermistor, terminated with flying leads. Overall, the 4 N thruster 11700 provides an extremely mass efficient and low-cost propulsion solution for small spacecraft.

Table 1 below provides details of specifications of the 4 N thruster 11700.

TABLE 1

| 4N thruster Specifications | |
|---|---|
| Pulse | Yes |
| Thrust | 4N (0.9 lbf) |
| Fuel | Hydrazine |
| Oxidizer | N/A |
| Inlet Pressures | 220-300 PSIA |
| O/F Ratio | N/A |
| Specific Impulse | 210 s |
| Chamber Pressure | N/A |
| Expansion Ratio | 70 |
| Minimum Impulse Bit | <0.04N-s |
| Cycles/Life | 3000 cycles |
| Start And Shutdown Time | <15 ms |
| Total Mass | 230 g |

35 N Thruster

Figure 118:
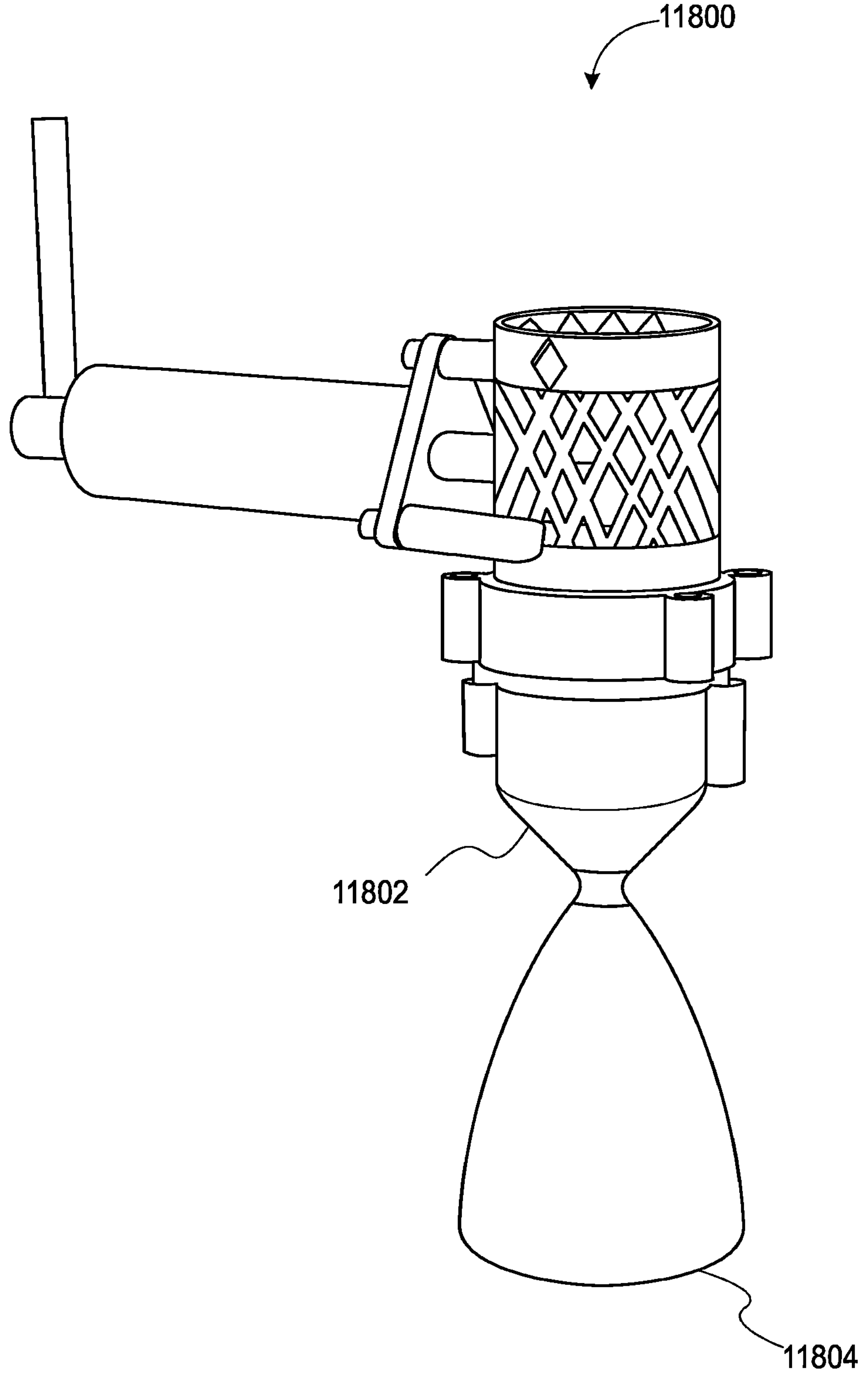
FIG. 118 is a side view illustrating an example of a 35 Newton thruster according to some embodiments of the present disclosure.

Referring now to FIG. 118, and with continued reference to FIGS. 1-117, a diagram illustrates a monopropellant thruster 11800 according to some embodiments of the present disclosure. In some embodiments, the monopropellant thruster 11800 is a 35 N (~8 lbf) long life hydrazine monopropellant thruster. Hereinafter, the monopropellant thruster 11800 has been referred to as 35 N thruster 11800. In some examples, the M35 thruster from AGILE is an example of a 35 N thruster as described herein. It will be appreciated in light of the disclosure that the 35 N thruster contains many ornamental features separate and distinct from the many functional features disclosed herein.

As shown, the 35 N thruster 11800 includes a propulsion chamber 11802. Further, the 35 N thruster 11800 includes a nozzle 11804 as part of the propulsion chamber 11802. In the example provided, the propulsion chamber 11802 of the 35 N thruster 11800 has a height of about 1.38 inches and an overall width of about 5.4 inches, and the propulsion chamber 11802 of the 35 N thruster 11800 has a width at the nozzle 11804 of about 1.9 inches. The 35 N thruster 11800 is designed for spacecraft attitude control and AV maneuvers. The 35 N thruster 11800 includes a reactor design which reduces catalyst degradation during the life thereof by providing constant reactor bed preload. In operation, the 35 N thruster 11800 has accumulated 15,455 seconds of hot-fire on-time during its development campaign, which includes a 6,000-second, uninterrupted, stable burn. The 35 N thruster 11800 is delivered ready for spacecraft integration with an electric catalyst beater and thermistor.

Table 2 below provides details of specifications of 35 thruster 11800.

TABLE 2

| 35N thruster Specifications | |
|---|---|
| Pulse | Yes |
| Thrust | 35N (8 lbf) |
| Fuel | Hydrazine |
| Oxidizer | N/A |
| Inlet Pressures | 200-450 PSIA |
| O/F Ratio | N/A |
| Specific Impulse | 220 s |
| Chamber Pressure | N/A |
| Expansion Ratio | 70 |
| Minimum Impulse Bit | <1N-s |
| Cycles/Life | 6000 cycles |
| Start And Shutdown Time | <15 ms |
| Longest Single Burn Demonstrated | 6000 s |
| Total Mass | 730 g |

22 N Thruster

Figure 119:
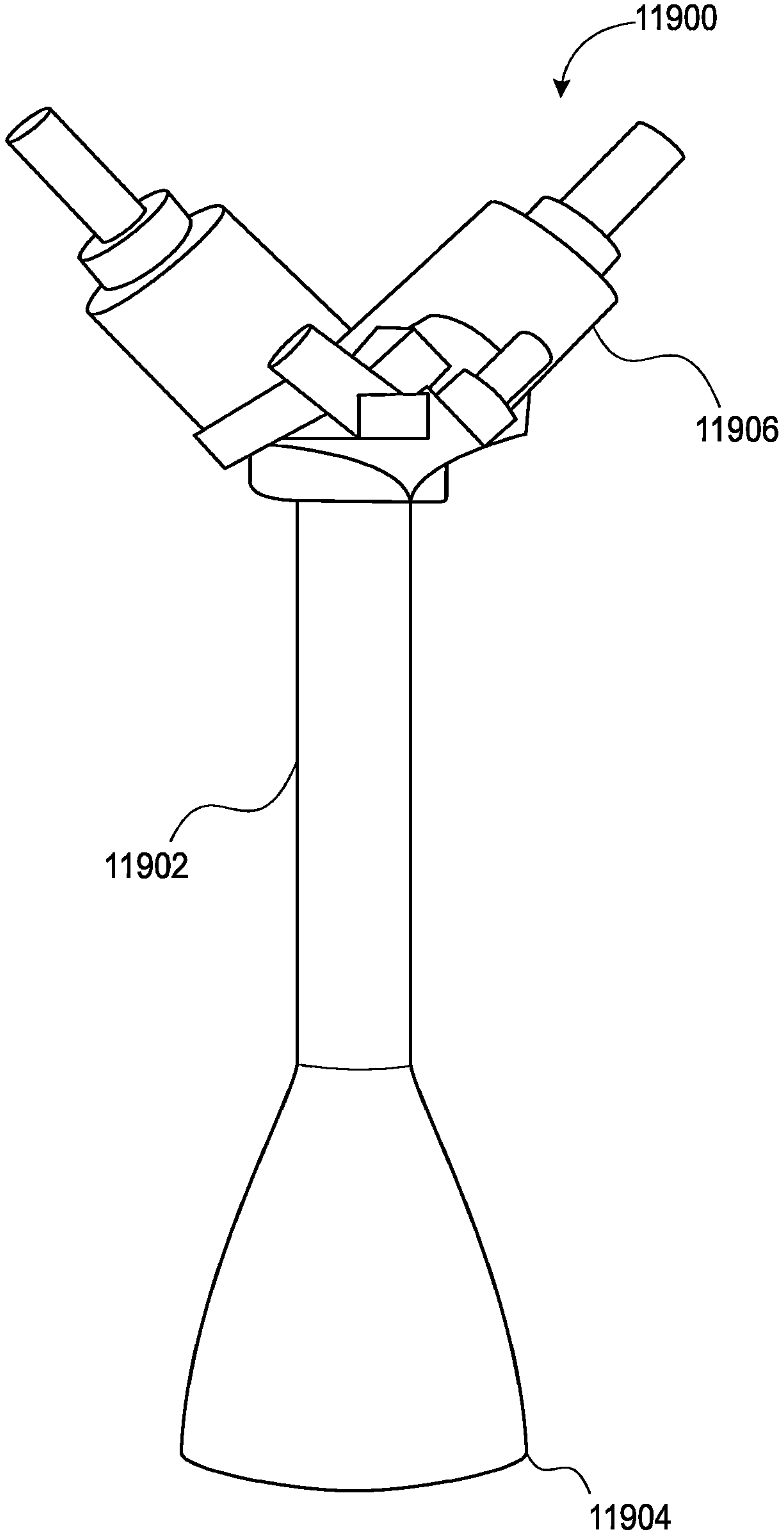
FIG. 119 is a perspective view illustrating an example of a 22 Newton thruster according to some embodiments of the present disclosure.

Referring now to FIG. 119, and with continued reference to FIGS. 1-118, a diagram illustrates a bi-propellant thruster 11900 according to some embodiments of the present disclosure. In some embodiments, the bi-propellant thruster 11900 is a 22 N (~5 lbf) Monomethylhydrazine (monomethyl hydrazine, MMH) bipropellant thruster. Hereinafter, the bi-propellant thruster 11900 has been referred to as 22 N thruster 11900. In some examples, the DS22 thruster from AGILE is an example of a 22 N thruster as described herein. It will be appreciated in light of the disclosure that the 22 N thruster contains many ornamental features separate and distinct from the many functional features disclosed herein.

As shown, the 22 N thruster 11900 includes a propulsion chamber 11902. Further, the 22 N thruster 11900 includes a nozzle 11904 and a valve body 11906 as part of the propulsion chamber 11902. In the example provided, the propulsion chamber 11902 of the 22 N thruster 11900 has an overall height of about 5.15 inches and a height at the valve body 11906 of about 1.05 inches, and the propulsion chamber 11902 of the 22 N thruster 11900 has a width at the nozzle 11904 of about 1.27 inches. The 22 N thruster 11900 is designed for ultra-precise spacecraft attitude control. The 22 N thruster 11900 is operable with MON propellants, which are mixed oxides of nitrogen (MON) formed by solutions of nitric oxide (NO) in dinitrogen tetroxide/nitrogen dioxide, including, but not limited to, MON3 and MON25 oxidizers at propellant temperatures as low as −40° C. (−40° F.). In operation, the 22 N thruster 11900 has completed over 600 seconds of on-time and 6,000 pulses during hot-fire testing to demonstrate combustion stability with MON25.

Table 3 below provides details of specifications of the 22 N thruster 11900.

TABLE 3

| 22N thruster Specifications | |
|---|---|
| Pulse | Yes |
| Thrust | 22N (5 lbf) |
| Fuel | MMH |
| Oxidizer | MON3 or MON25 |
| Inlet Pressures | 290 PSIA Nominal |
| O/F Ratio | 1.45 |
| Specific Impulse | 295 s |
| Chamber Pressure | 200 PSIA |
| Expansion Ratio | 100 |
| Minimum Impulse Bit | <0.10N-s |
| Cycles/Life | 6212 pulses demonstrated |
| Total Mass | 281 g |

In embodiments, a 22N thrust attitude control thruster (ACT) can be comprised of two direct acting single seat solenoid valves for fast startup and shutdown responses, refractory-metal chamber and nozzle, a low-dribble volume multi-element injector, and a hot-gas metal seal between the chamber and injector. In these examples, the thruster can feature a small form factor, low mass, and a high-precision impulse bit capability to support reliable control maneuvers for a lunar lander. Precision impulses of less than 5 ms can be accomplished by using fast-acting solenoid valves and metal additively manufactured components including the injector. The injector is designed to have a very small "dribble volume," minimizing thrust transients. In these examples, the thruster can operate at low inlet pressures and reach full thrust or shutdown within 10 ms of command. Additive manufacturing of the one-piece refractory-metal chamber and nozzle can save cost by increasing the "buy to fly" ratio and accelerating time from design to test. The inlet tubes can be made from Ti6-Al-4V and are friction stir welded to the stainless-steel valve body. Electrical Interfaces can be provided as flying leads for the valves, integrated heaters on each valve, valve thermistors, and thruster body thermistor for in-flight telemetry.

In embodiments, a gold-plated Inconel X-750 hot-gas seal can eliminate the need for welding between the injector and chamber, thereby reducing cost and risk by ensuring that hardware configurations used for test are identical to those that will fly. The thruster's low mass can be attributed to high resistance thermal conduction pathways integrated into the additively manufactured components. In these examples, the thruster can be shown to be the lowest mass bi-propellant thruster in this thrust class producing ~3 kg+ of shipset mass savings compared to legacy products that have inferior pulse performance.

45 N Thruster

Figure 120:
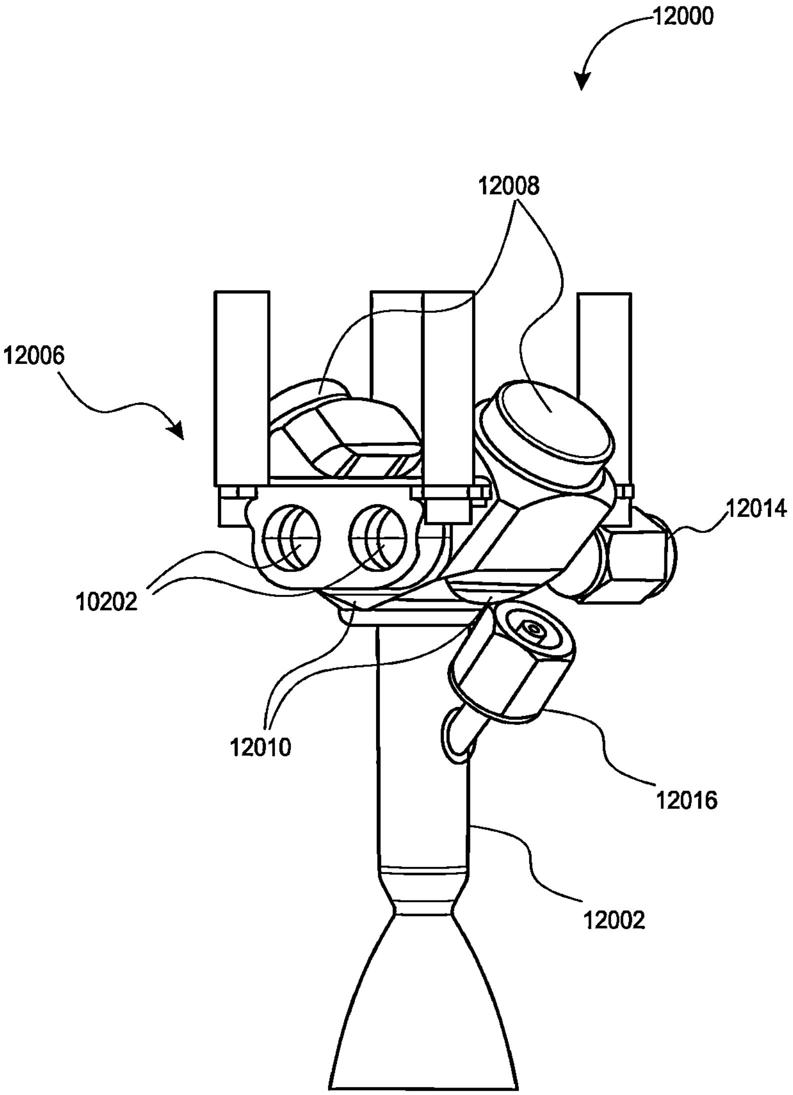
FIG. 120 is a perspective view illustrating an example of a 45 Newton thruster according to some embodiments of the present disclosure.

Referring now to FIG. 120, and with continued reference to FIGS. 1-119, a diagram illustrates another bi-propellant thruster 12000 according to some embodiments of the present disclosure. In some embodiments, the bi-propellant thruster 12000 is a 45 N (~10 lbf) M20 (which is a 19.78% MMH and 80.22% hydrazine fuel blend) bipropellant thruster. Hereinafter, the bi-propellant thruster 12000 has been referred to as 45 N thruster 12000. In some examples, the A45 thruster from AGILE is an example of a 45 N thruster as described herein. It will be appreciated in light of the disclosure that the 45 N thruster contains many ornamental features separate and distinct from the many functional features disclosed herein.

As shown, the 45 N thruster 12000 includes a propulsion chamber 12012. Further, the 45 N thruster 12000 includes a nozzle 12000 and a valve body 12006 as part of the propulsion chamber 12002. In the example provided, the propulsion chamber 12002 of the 45 N thruster 12000 has an overall height of about 3.82 inches and a height at the valve body 12006 of about 0.53 inches, and the propulsion chamber 12002 of the 45 N thruster 12000 has a width at the nozzle 12004 of about 0.93 inches. The 45 N thruster 12000 is designed for precision attitude control and ΔV spacecraft maneuvers. The 45 N thruster 12000 features soft-start injector technology as described herein that prevents startup overpressure and improves the repeatability of short-duration pulses. The additively manufactured design of the 45 N thruster 12000 (as described in the proceeding paragraphs in more detail) enhances injector performance and minimum impulse bit. The 45 N thruster 12000 is built with a custom specification valve to withstand, in operation, up to 20,000 cycles and 500 seconds of total mission on-time and has demonstrated over 11,000 hot-fire pulses and 113 seconds of on-time in a vacuum environment.

Table 4 below provides details of specifications of the 45 N thruster 12000.

TABLE 4

| 45N thruster Specifications | |
|---|---|
| Pulse | Yes |
| Thrust | 45N (10 lbf) |
| Fuel | M20 |
| Oxidizer | MON3 |
| Inlet Pressures | 300 Nominal PSIA |
| O/F Ratio | 0.85 |
| Specific Impulse | 300 s |
| Chamber Pressure | 200 PSIA |
| Expansion Ratio | 70 |
| Minimum Impulse Bit | <0.15N-s |
| Cycles/Life | 11000 pulses demonstrated, 500 seconds on-time |
| Start and Shutdown Time | <10 Ms (~5 ms) |
| Total Mass | 281 g |

In the example provided, the 45 N thruster 12000 includes two injectors 12008 installed between the propulsion chamber 12002 and the valve body 12006. Further, the valve body 12006 provides two propellant valves 12010. Also, as shown, the 45 N thruster 12000 includes propellant one or more inlet pressure ports 12012 and a fuel inlet port 12014. In some embodiments, the 45 N thruster 12000 may further use a close-coupled pressure transducer 12016 installed over the propulsion chamber 12002 to measure chamber pressures $P_c$ therein. In the example provided, the close-coupled pressure transducer 12016 may have a diaphragm with length of about 25.4 mm and an internal diameter of about 1.0 mm.

For purposes of the present disclosure, in the 45 N thruster 12000, in some embodiments, the valve body 12006 may be conventionally machined, specifically 6061 CNC machined. In some embodiments, the propulsion chamber 12002 of the 45 N thruster 12000, along with the nozzle 12004, may be additively manufactured using the laser powder bed fusion method with Niobium C103 alloy. In some embodiments, the valve body 12006, including the injectors 12008, may also be additively manufactured using the same additively manufacturing technique as the propulsion chamber 12002. The evolution of such design will incorporate combining all of these elements into a monolithic additively built thruster.

A test demonstration for the 45 N thruster 12000 was conducted using a thruster chamber designed to produce 45 N thrust with a nozzle expansion ratio $\epsilon$ of 21. The test program spanned two days (session I and session II), and each day was dedicated to testing each of the two injectors 12008. The injectors 12008 were designed to have an average dribble volume (i.e., volume of the valve body 12006) of 35 µl, and the element orifices were refined to provide barrier cooling through mixture ratio (MR) bias between inner and outer elements. This was achieved by running the 45 N thruster 12000 at a fuel-rich mass mixture ratio, with stoichiometric MR being 1.65 for this propellant combination. The two injectors 12008 were designed with the same dribble volume and to produce the same overall MR However, the level of MR control between inner and outer elements was different between the two injectors 12008 through orifice sizing. The use of two injectors 12008 over the two-day test campaign was also intended to illustrate the rapid testing turnaround that was facilitated by the additively manufactured components, as they were fabricated simultaneously on the same machine. Herein, the 45 N thruster 12000 used individual fast-acting propellant valves 12010, which have a maximum opening time of 3.0 ms and maximum closing time of 2.5 ms. These propellant valves 12010 are close coupled with the injector 12008 to ensure a low dribble volume. The 45 N thruster 12000 is pressure fed from individual propellant tanks, and the pressures upstream and downstream of the propellant valves 12010 are also measured to monitor pressure drops.

The above described test demonstration focused on the evaluation of precise pulse performance of the injectors 12008 over different operating conditions, chamber pressures $P_c$, and MRs. Precise pulse performance characterization was achieved through the ability to measure thrust and mass flow rates with high accuracy and microsecond time intervals. These measurement systems provide synchronous sub-millisecond response times, which, when combined, provide highly precise and accurate pulse performance measurements. The tests were designed to evaluate transient response, combustion stability, thermal capability, and pulse performance of the 45 N thruster 12000. In accordance with these objectives, tests conducted to characterize transient response and pulse repeatability used the close-coupled pressure transducer 12016 in the chamber pressure port to measure dynamic pressure (range of 0-20.7 MPa and sampled at 200 kHz). Tests aimed at assessing stability and thermal and pulse performance used a dual-redundant pressure transducer combination (range of 0-6.9 MPa each and sampled at 200 kHz) on a relatively long standoff to ensure sensor integrity during thermally intense operations. The longer standoff of the pressure transducer only provides a static pressure measurement of the chamber pressure $P_c$ and reduces response times. Measurement accuracy information for these transducers is tabulated in Table 5 below along with the accuracy of other measurements.

TABLE 5

Measurement accuracy of sensors used

| Sensor description | Uncertainty, % full scale output |
|---|---|
| Static, dual-redundant chamber pressure Transducers | ±0.10 |
| Dynamic/transient chamber pressure | ±0.10 |
| Thrust | ±0.15 |
| Mass flow rate | ±0.61 |
| Accelerometer (U95 (95% uncertainty confidence) between 20-2000 g) | ±1.90 |

Multiple pulse sequences were designed to demonstrate the robustness of the 45 N thruster 12000 in addition to the above characterizations. The pulse sequences have a 50 Hz cycle frequency and are shown in Table 6 below. The propellant flow rate is measured using a positive displacement flow meter (PDFM). Herein, the PDFM works similarly to a syringe. The positive displacement volumetric resolution is 0.18 ml and is measured in time increments of 2 µs. This provides very high accuracy and temporal volumetric flow measurements. The high-accuracy temperature measurement of the propellant at the PDFM tanks and engine inlets allows for accurate density calculation and thereby results in high-accuracy propellant mass flow calculations, as shown in Table 5 above. The run-line distance between the PDFM and the thruster inlet is approximately 762 mm, which emulates flight propellant system architectures and allows highly responsive mass flow rate measurements due to the close coupling.

Test $P_c$-MR points achieved during session I and session 11 may be plotted to demonstrate operational margins for performance and any potential limits of combustion stability. The test program may be structured to evaluate several aspects of the thruster's performance in a limited number of tests while performing thousands of pulses. All tests discussed in this work were conducted in a vacuum test cell operating at a pressure of 5.17 kPa (20 km altitude).

TABLE 6

| | ON time, ms | OFF time, ms | Number of pulses | Intermission, ms |
|---|---|---|---|---|
| Pulse sequence 1 | 400 | 0 | 1 | 600 |
| | 5 | 15 | 5 | 1000 |
| | 10 | 10 | 5 | 2000 |
| | 15 | 5 | 5 | Shutdown |
| Pulse sequence 3 | 300 | 0 | 1 | 700 |
| | 5 | 15 | 20 | 600 |
| | 7.5 | 12.5 | 15 | 600 |
| | 10 | 10 | 10 | 600 |
| | 12.5 | 7.5 | 10 | 600 |
| | 15 | 5 | 10 | 600 |
| | 500 | 0 | 1 | Shutdown |
| Pulse sequence 4 (dry manifold assessment) | 300 | 0 | 1 | 700 |
| | 5 | 195 | 10 | 500 |
| | 5 | 155 | 10 | 500 |
| | 5 | 115 | 10 | 500 |
| | 5 | 75 | 10 | 500 |
| | 5 | 35 | 10 | 500 |
| | 10 | 190 | 10 | 500 |
| | 10 | 150 | 10 | 500 |
| | 10 | 110 | 10 | 500 |
| | 10 | 70 | 10 | 500 |
| | 10 | 30 | 10 | 500 |
| | 500 | 0 | 1 | Shutdown |

The data recorded from this test demonstration span a total of 61 tests and is summarized in Table 7. The measured $P_c$ (±0.10%) and MR (±1.22%) from the first pulse of each test (>300 ms) is considered a representative chamber pressure and MR for that particular test. In addition to these values, the vacuum thrust (sampled at 100 kHz), C*efficiency (ηC*), and vacuum $I_{sp}$ (based on thrust) as measured over the first pulse are tabulated in Table 7 to provide an overall performance characterization from these tests. C* efficiency is calculated as a ratio of measured C* to that calculated from NASA's chemical equilibrium code such as what is disclosed in Gordon, S., and McBride, B. J., "Computer Program for Calculation of Complex Chemical Equilibrium Compositions and Applications I," NASA Reference Publ. 1311, 1994, which is incorporated by reference herein in its entirety.

In embodiments, chamber pressure, thrust, and mass mixture ratio from a typical pulse sequence 1 may be plotted. This test and all tests conducted to characterize transient response and pulse repeatability used a close-coupled pressure transducer to measure chamber pressure $P_c$. The pressure transducer 12016 was installed at the end of a 25.4 mm standoff to preserve its integrity in a thermally intense environment. The standoff tube had a 3.2 mm outer diameter (OD) with an internal diameter (ID) of 1.0 mm to minimize dead volume and improve temporal response, thereby enabling the measurement of pressure response times, as described later in the description in more detail.

TABLE 7

| Test ID | Chamber pressure, Pc, KPa Achieved | MR Achieved | Pulse sequence | Vacuum thrust, N | C* efficiency ηC, % From first pulse | Vacuum $I_{sp}$ at ϵ 21, s | Vacuum $I_{sp}$ at ϵ 70, s Prediction |
|---|---|---|---|---|---|---|---|
| A45-032 | 1404 | 0.95 | Sequence 1 | 45.2 | 90.1 | 280 | 293 |
| A45-035 | 1227 | 1.09 | Sequence 2 | 40.2 | 87.9 | 280 | 293 |
| A45-036 | 1092 | 0.96 | Sequence 2 | 36.0 | 88.1 | 281 | 294 |
| A45-040 | 1299 | 1.31 | Sequence 3 | 41.3 | 94.4 | 289 | 301 |
| A45-053 | 1207 | 1.31 | Sequence 3 | 39.5 | 91.3 | 288 | 300 |
| A45-054 | 1211 | 1.33 | Sequence 4 | 40.0 | 91.3 | 290 | 302 |
| A45-061 | 809 | 0.88 | 6001 Pulses | 26.2 | 92.0 | 284 | 297 |

In some embodiments, the testing demonstration is conducted with the objective of measuring thruster steady-state and thermal performance (A45-035 and A45-036) by using a highly accurate dual-pressure transducer chamber pressure measurement. This arrangement was installed at the end of a 304.8-mm-long, 3.2-mm-OD (1.4-mm-ID) standoff. The longer standoff helps reduce thermal soak back from the combustion chamber to the pressure transducers and accommodates tests with higher heat load. The dual measurements at identical locations also improve data redundancy for this important parameter. As a consequence of this standoff, the temporal response was slower and involves frequency attenuation in the pressure signal. However, this ensures reliable static pressure measurement due to lack of sensor heating. These static $P_c$ measurements enabled the calculation of the characteristic velocity (C*) and thus predicted combustion efficiency.

Thrusters designed for attitude control require repeatable pulse trains to ensure predictability of thruster performance. The pulse performance of the 45 N thruster 12000 was evaluated under two scenarios: a 50 Hz duty cycle with varying ON times and a dry manifold assessment, which is performed with decreasing duty cycle frequency but with a constant ON time. The pulse performance data from these tests were evaluated based on the vacuum-corrected measured thrust. The measured thrust was numerically integrated to estimate the cumulative vacuum impulse for each pulse.

Figure 121:
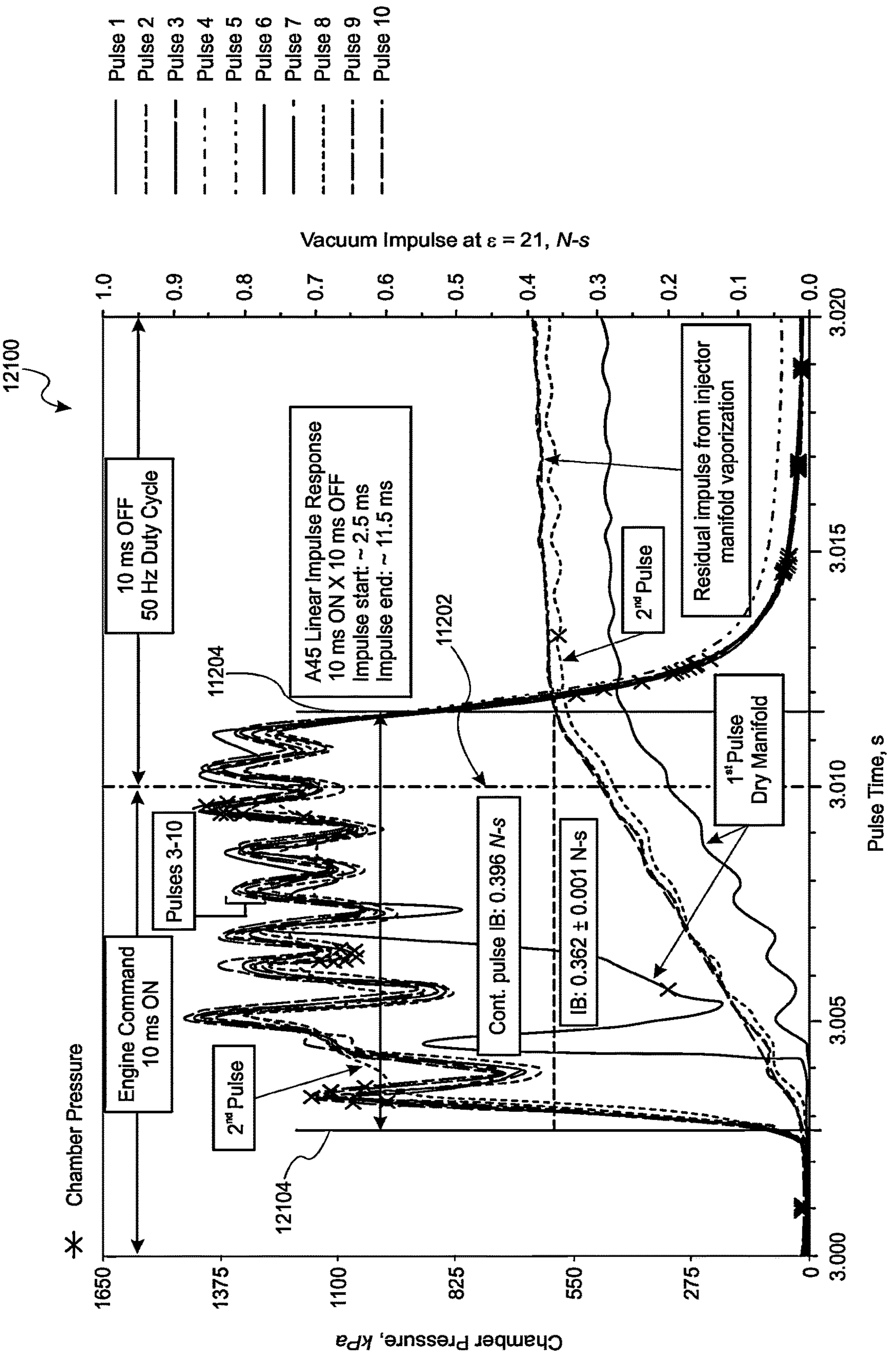
FIG. 121 is a graph illustrating a pulse performance characteristic of a pulse train associated with the 45 Newton thruster of FIG. 120 according to some embodiments of the present disclosure.

Referring to FIG. 121, a graph 12100 illustrates pulse performance characteristics of a 10 ms ON×10 ms OFF pulse train from A45-053. In particular, the vacuum impulses for each pulse of a pulse train in the graph 12100 were overlaid to graphically show repeatability in pulse performance while also identifying discrete operating regimes that can be characterized for more precise guidance, navigation, and control (GNC) planning. As may be seen from the graph 12100, overlaid chamber pressure trace from each pulse shows repeatability.

The graph 12100 shows the 50% duty cycle (10 ms ON×10 ms OFF) pulse train from test A45-053. The pulse train starts at t=3 s, and all pulses are represented with a pulse time of 3.00-3.02 seconds for ease of assimilation. Dashed line 12102 represents the actual engine electrical command, while vertical lines 12104 show the actual response of the 45 N thruster 12000 to the engine command, which naturally lags the electrical command. As indicated in Table 6, each pulse train is preceded by a 600 ms interval, which produces a dry manifold start to the pulse train, as shown by the lower impulse on pulses 1 and 2 in the graph 12100. The impulses from these two pulses are excluded from statistical analysis, as they are not indicative of pulse train performance, and are not shown on subsequent plots.

In general, the evaporation mechanism of propellants from injector manifolds is complex due to transient pressures and temperatures between pulses and pulse trains and requires more detailed analysis to evaluate the extent of dryness of the injector manifold. However, due to the elevated temperatures of the injector during operation (~500-600 K near the injector face) and the momentum of the fluids post-valve closure, it is highly likely that most of the fuel and oxidizer are ejected/vaporized, if not fully evacuated. Additionally, the close-coupled Pc response can also be compared to assess this. In general, the Pc start response time of the first pulses of pulse trains was 70-85% of the Pc start response time of the very first pulse of the test (true dry manifold), whereas start response times of pulses 3-10 were 36% of the response time of the first 300 ms pulse. The relatively slower Pc response times on first pulses are indicative of a dry manifold for all practical purposes. Additional consideration would be that the injector is relatively cold on the first pulse of the test vs the subsequent pulse trains. A warm injector shortens ignition response time as well in comparison to the start of the test. These factors indicate that 600 ms intervals between pulse trains is adequate to produce a mostly dry manifold.

Pulses 3 and 4 are also shown in the graph 12100 because they marginally deviate on some pulse trains. The constant pulse impulse bit (IB) is calculated from the vacuum thrust measured on the first 300 ms pulse and provides an upper limit for a given initial condition. The impulse bit for a particular pulse train is the average of that measured from pulses 3 to 10 over the thruster response time. The standard deviation of the impulse bit for this pulse train is 0.362±0.001 N-s. The performance of each pulse in this pulse train was also characterized, and the vacuum impulse bit and specific impulse for each pulse is tabulated in Table 8 below. This form of discretization of the performance from a pulse train is valuable for a GNC evaluation and improves overall predictability of the delivered impulse. Furthermore, the start and shutdown response times for each pulse can also be characterized. Similar per-pulse performance for all qualified pulse trains required by a mission can be quantified to aid with GNC planning.

Additionally, the repeatability of these pulse trains can also be assessed by overlaying $P_c$ signals from all pulses of a train. The graph 12100 presents the pressure pulse data for the 50% 50 Hz duty cycle as an example. The 50% here indicates that the target pulse ON time is 50% of the 50 Hz duty cycle, or a 10 ms ON time out of 20 ms (with this nomenclature being used throughout the present disclosure). The average ON and OFF response times are characterized by the time it takes for the chamber pressure to rise to 90% of the steady $P_c$ at the start and the time it takes for the chamber pressure to decay to 10% of the steady $P_c$ at the end of the pulse, respectively. In the case of test A45-053, chamber pressure rises to 90% of the steady $P_c$ in 3.45 ms and decays to 10% of the steady $P_c$ at the end of the pulse in 2.15 ms. Once again, this analysis begins with pulse 3 for the pulse train, as the first and second pulses of the pulse train are identified and treated as discrete and different operating regimes. The response times were assessed based on the rise and fall times of $P_c$ measured by the close-coupled pressure transducer. As described, this installation included a 25.4 mm standoff, which is expected to introduce a time delay of up to 1 ms. It may be noted that the $P_t$ response times for other pulse trains in the present test demonstration are also within a 10 ms target

TABLE 8

| Pulse number | Vacuum impulse bit, N · s | Vacuum $I_{sp}$ at $\epsilon = 21$, s |
|---|---|---|
| 1 | 0.2778 | 193 |
| 2 | 0.3500 | 244 |
| 3 | 0.3624 | 252 |
| 4 | 0.3604 | 251 |
| 5 | 0.3634 | 253 |
| 6 | 0.3614 | 252 |
| 7 | 0.3632 | 253 |
| 8 | 0.3620 | 252 |
| 9 | 0.3614 | 252 |
| 10 | 0.3626 | 252 |

The method described above was used to evaluate the performance of pulse trains for the 45 N thruster 12000 with a 50 Hz duty cycle and different ON times on test A45-040.

Further, the pulse performance of the 45 N thruster 12000 in a dry manifold scenario was assessed next to quantify the repeatability and response times. For this purpose, test A45-054 was used, as this test included a pulse sequence with different pulse OFF times and two ON times of 10 ms and 5 ms. The previously discussed method was again used for this evaluation, and the vacuum impulse plots for the 10 ms ON time pulse trains.

Fast response time at start and shutdown is an essential property of a thruster used for attitude control. Average start and shutdown response times based on vacuum impulse curves for the 50 Hz duty cycle and dry manifold tests may be plotted. The impulse start and shutdown response times may be evaluated and plotted against pulse OFF times to understand their effect. The start response time is defined as the time between the pulse start command and when the impulse starts to rise. Likewise, the shutdown response time is quantified as the difference between the ending inflection time on the impulse curve and the time at which the pulse is commanded OFF. Start response times on the 50 Hz duty cycle do not show any change. Starting response times increase greatly with 30 and 35 ms OFF times on test A45-054 but do not change significantly at longer OFF times. These points follow an approximate logarithmic trend. The start response times also correlate well with chamber pressure start responses.

Also, as described with respect to the graph 12100 of FIG. 121, the impulse bit for each pulse was obtained by numerically integrating the measured thrust. This impulse bit per pulse was divided by the total mass of propellant injected into the thruster per pulse to estimate the unsteady specific impulse per pulse at the tested expansion ratio $\epsilon$ of 21. The percentages of the vacuum $I_{sp}$ measured on the first 300 ms pulse at $\epsilon=21$ is 289 and 290 seconds in tests A45-040 and A45-054, respectively. In the absence of a dry manifold, the 45 N thruster 12000 produced a pulse $I_{sp}$ that is 70% of steady state at 25%-50 Hz duty cycle, the shortest pulse ON time. As expected, the pulse $I_{sp}$ for the dry manifold pulse trains is lower than those measured from a primed manifold. These values are quantified as part of the characterization.

Further, combustion instabilities are one of the more important causes of failure of thruster development programs, and extensive research on this aspect continues to improve understanding of this complex phenomenon in general and, in particular, with rocket combustion chambers. A 60 kHz triaxial accelerometer was mounted on the valve body 12006 to assess the combustion stability characteristics of the 45 N thruster 12000. Data from each channel of the accelerometer were acquired at 500 kHz to ensure no signal aliasing, with a noise-rejecting low-pass 200 kHz antialiasing filter. Vibration amplitude and frequency measured by the accelerometer were correlated with other measurements to understand the origins of any detected oscillations.

A valuable correlation of accelerometer data is with the close coupled chamber pressure transducer 12016, and due to this, test A45-040 is chosen for this analysis. A correlation of accelerometer response with chamber and feed line pressures and valve current on the first pulse of test A45-040 may be observed. Specifically, the amplitude measured by the accelerometer may be plotted along with chamber pressure and valve current. The accelerometer registered amplitude and frequency around 3 and 8 ms from the start of the pulse. However, it is important to note that the response at 3 ms coincides with the response on the valve current and corresponds to valve solenoid stoppage. Similarly, the response at 8 ms coincides with the start of combustion, as indicated by the rise in chamber pressure. It is important to note that these impulses measured by the accelerometer subside to the order of sensor noise by approximately 15 ms, and no further vibrations are recorded by the accelerometer during the pulse. This is evidence of the absence of significant combustion-induced pressure oscillations in this thruster and that the initial vibrations recorded by the accelerometer are caused by valve operation and a rise in chamber pressure at ignition.

A correlation of accelerometer response with chamber and feed line pressures and valve current on a 5 ms ON, 15 ms OFF pulse train of test A45-040 may be performed. The accelerometer responses associated with valve stoppage and the start of combustion may be observed, but the responses subside in between pulses and after the pulse train. This analysis substantiates the isolation of combustion dynamics from the feed line transient responses and showcases the stable operation of the 45 N thruster 12000 in pulse-mode and in a relatively steady-state scenario. Additionally, chug-mode instabilities were also not observed in these tests, further demonstrating the isolation of any feed line pressure oscillation from the combustion in the chamber.

In general, the performance of the 45 N thruster 12000 can be compared with Aerojet Rocketdyne's 62.3 N AJ10-220™ thruster, which is conventionally machined. Although the AJ10-220 is designed for a relatively larger thrust and uses MMH, instead of 19.78% MMH and 80.22% hydrazine fuel blend (M20), it serves as a useful comparison of thrusters in the same class. The AJ10-220 produces a steady-firing specific impulse of 285 s, a pulse-mode specific impulse of 269 seconds at an expansion ratio of 75, and a minimum impulse bit (MIB) of 0.998 N-s at an undisclosed pulse ON time and duty cycle. Based on the pulse performance, the 45 N thruster 12000 produces an MIB of 0.147 N-s at a 5 ms ON time at a 50 Hz duty cycle and is estimated to produce a maximum steady-firing specific impulse of 302 seconds and pulse-mode specific impulse of 276 seconds (10 ms ON time) at a comparable expansion ratio of 70. The lower MIB achieved by the 45 N thruster 12000 is a direct consequence of the low dribble volumes possible due to the ability of additive manufacturing to fabricate fine features. A secondary benefit of additive manufacturing is the short lead time associated with this method, which has enabled the industry to test and improve designs on a shorter timeline than before, potentially leading to fast qualification of thrusters.

In embodiments, the 45 Newton thruster can have variants that are capable of running on multiple propellant combinations, including MMH/MON-3, MMH/MON-25, and Hydrazine/MON-3. All variants are capable of extremely fast response times and reach 90% of thrust within 5 ms for receipt of an electrical command. Minimum impulse bits of less than 0.1 N s are possible while achieving an Isp over 300 s. In examples, these 45N thrusters can be shown to achieve over 700 seconds of on time and performed over 17,000 pulses across various configurations.

Additionally, the MON-25 oxidizer DS-Line variant can be shown to offer a deeper temperature operating range (−40° C.) without requiring the mass or power of heaters (net-net a DS propulsion system could be upwards of one kg lighter than amonoprop M35 propulsion system). By way of these examples, these 45N thrusters can use unlike doublet injection and a combination of mixture-ratio control and radiative cooling of a high-temperature, Niobium C103 chamber/nozzle with a ceramic silicide coating. The 3D printed injector can have minimal dribble volume, increasing repeatability and accuracy of start transients and impulse bits.

In embodiments, a 45N thrust attitude control thruster (ACT) can comprise two direct acting single seat solenoid valves for fast startup and shutdown responses, refractory-metal chamber and nozzle, a low-dribble volume multi-element injector, and a hot-gas metal seal between the chamber and injector. By way of these examples, the thruster can feature a small form factor, low mass, and a high-precision impulse bit capability to support reliable control maneuvers. Precision impulses of less than 5 ms can be accomplished using fast-acting solenoid valves and metal additively manufactured components including the injector. The injector can be designed to have a very small “dribble volume,” minimizing thrust transients. In embodiments, the thruster can operate at low inlet pressures and reach full thrust or shutdown within 10 ms of command. Additive manufacturing of the one-piece refractory-metal chamber and nozzle save cost by increasing the “buy to fly” ratio and accelerating the time from design to test. The inlet tubes can be made from Ti6-Al-4V and can be friction stir welded to the stainless-steel valve body. Electrical Interfaces can be provided as flying leads for the valves, integrated heaters on each valve, valve thermistors, and thruster body thermistors for in-flight telemetry.

In embodiments, a gold-plated Inconel X-750 hot-gas seal can be shown to eliminate the need for welding between the injector and chamber, thereby reducing cost and risk by ensuring that hardware configurations used for test are identical to those that will fly. The thruster’s low mass can be attributed to high resistance thermal conduction pathways integrated into the additively manufactured components. By way of these examples, the A45 is the lowest mass bi-propellant thruster in this thrust class producing ~2.5 kg+ of shipset mass savings compared to legacy products that have inferior pulse performance.

Figure 122:
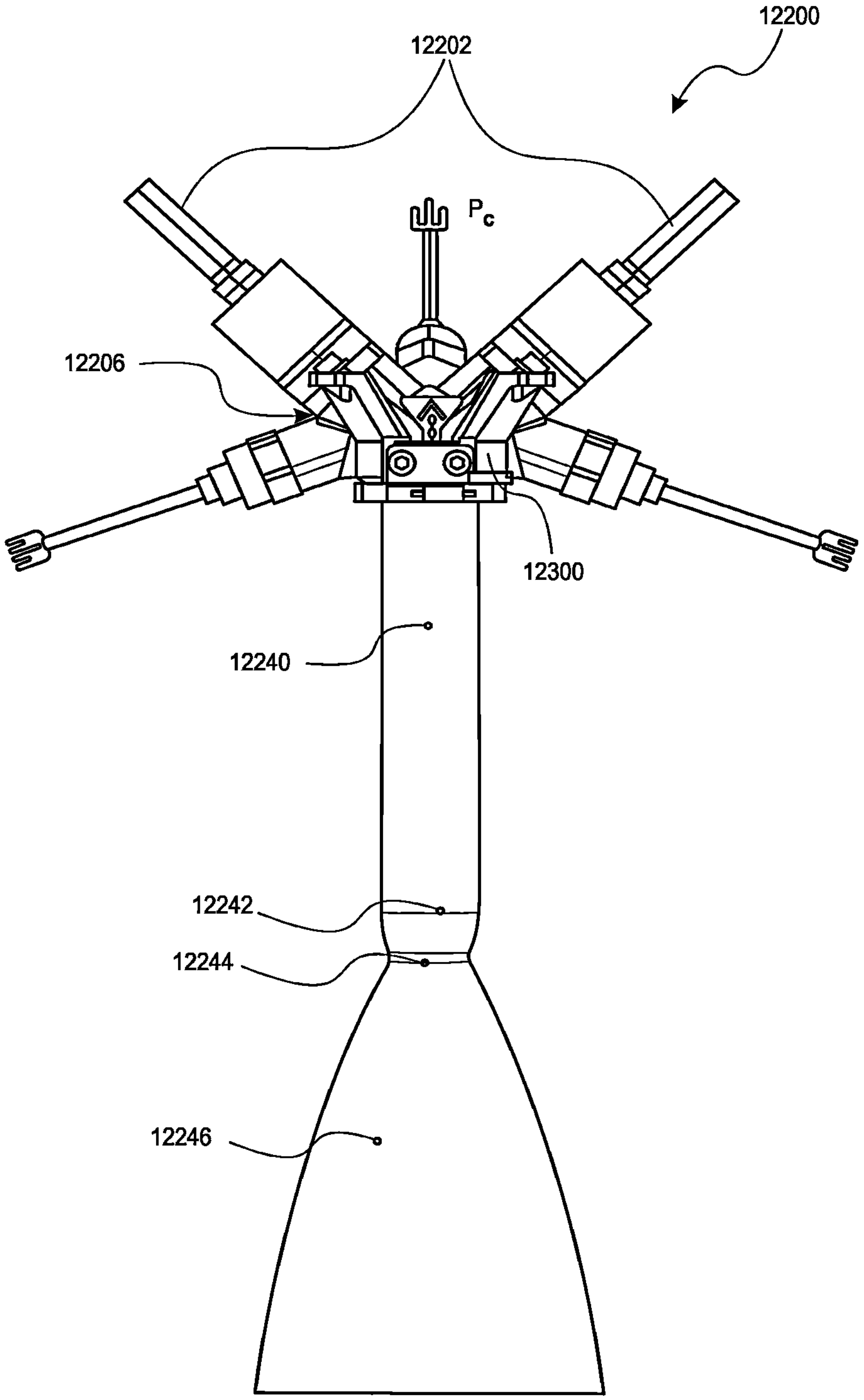
FIG. 122 is a perspective view and FIG. 123 is an expanded view of an example of a 110 Newton thruster according to some embodiments of the present disclosure.
Figure 123:
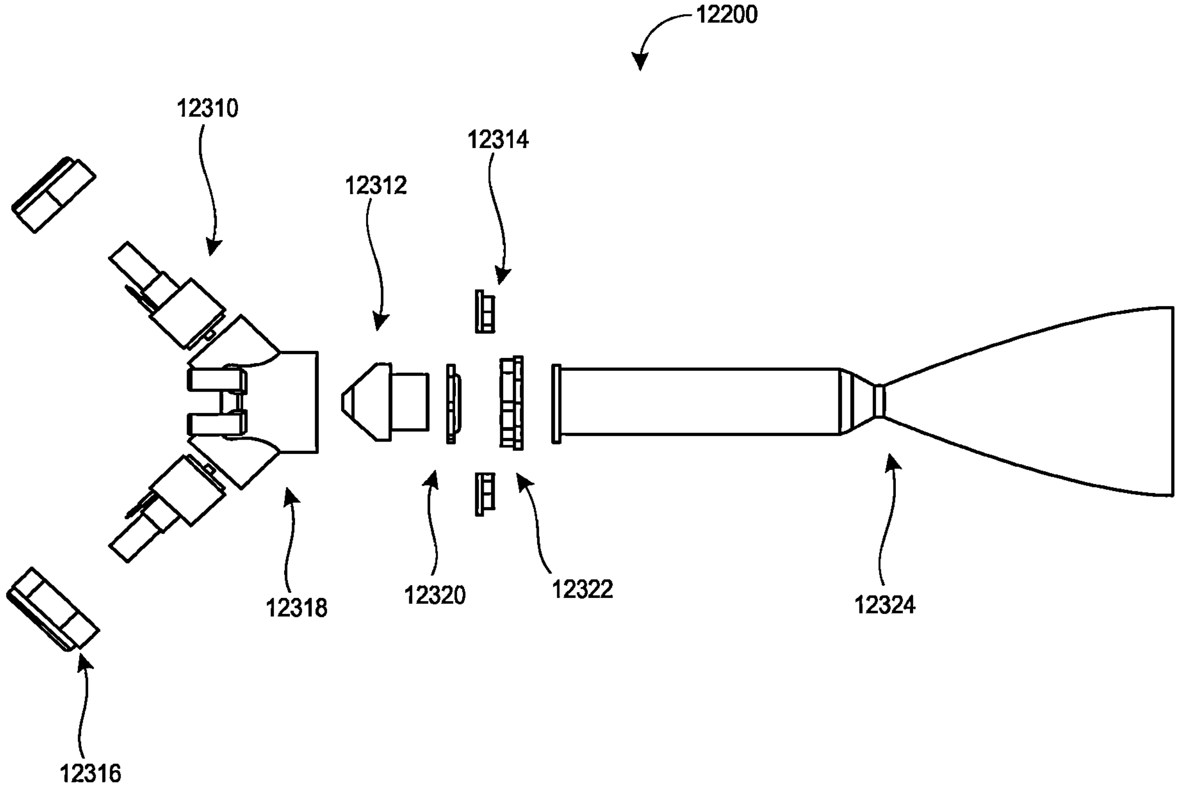

Referring now to FIG. 122 and FIG. 123, and with continued reference to FIGS. 1-121, a diagram illustrates yet another bi-propellant thruster 12200 according to some embodiments of the present disclosure. In some embodiments, the bi-propellant thruster 12200 is a 110 N (~25 lbf) M20 (which is a 19.78% MMH and 80.22% hydrazine fuel blend) bipropellant thruster. Hereinafter, the bi-propellant thruster 12200 has been referred to as 110 N thruster 12200. In some examples, the A110 thruster from AGILE is an example of a 35 N thruster as described herein. It will be appreciated in light of the disclosure that the 110 N thruster contains many ornamental features separate and distinct from the many functional features disclosed herein.

In the example provided, the 110 N thruster 12200 includes a solenoid valve 12300, an injector 12310, an injector 12312, chamber split collars 12314, a valve retention nut 12316, a valve block 12318, a hot-gas seal 12320, a chamber retention nut 12322, and a C103 nozzle with silicide coating 12324.

In some embodiments, A110 is a 25-lbf hypergolic thruster for spacecraft attitude control and delta-v maneuvers. The A110 can be comprised of two direct-acting single-seat solenoid valves for fast startup and shutdown responses, a refractory-metal chamber and nozzle, low-dribble volume multi-element injector, and a hot-gas metal seal between the chamber and injector. A110 features a small form factor, low mass, and a high-precision impulse bit capability to support reliable control maneuvers for a lunar lander. Precision impulses of less than 5 ms are accomplished by using fast acting solenoid valves and metal additively manufactured components including the injector. The A110 injector is designed to have a very small “dribble volume,” minimizing thrust transients. A110 can operate at low inlet pressures and reach full thrust or shutdown within 1.0 ms of command. Additive manufacturing of the one-piece refractory-metal chamber and nozzle saves cost by increasing the “buy to fly” ratio and accelerating time from design to test. The inlet tubes are made from Ti6-Al-4V and are friction stir welded to the stainless-steel valve body. Electrical interfaces are provided as flying leads for the valves.

As shown, the 110 N thruster 12200 includes a propulsion chamber 12202. Further, the 110 N thruster 12200 includes a nozzle 12204 and a valve body 12206 as part of the propulsion chamber 12202. In the example provided, the propulsion chamber 12202 of the 110 N thruster 12200 has an overall height of about 9.0 inches and a height at the valve body 12206 of about 1.3 inches, and the propulsion chamber 12202 of the 110 N thruster 12200 has a width at the nozzle 12204 of about 2.4 inches. The 110 N thruster 12200 is a radiatively-cooled thruster for spacecraft attitude control and ΔV maneuvers. The 110 N thruster 12200 includes two direct-acting, single-seat solenoid valves for fast startup and shutdown responses. The 110 N thruster 12200 further includes a refractory-metal chamber and nozzle, and a low-dribble volume multi-element injector. The additively manufactured injector enables precision pulses of less than 5 milliseconds and high-performance steady-state operation. The 110 N thruster 12200 has been tested and has undergone an extensive hot-fire test campaign in the flight configuration, with a total on-time of 600 seconds across a variety of test conditions.

Table 9 below provides details of specifications of the 110 N thruster 12200.

TABLE 9

| 110N thruster Specifications | |
|---|---|
| Pulse | Yes |
| Thrust | 111.2 ± 4.45N (25 ± 1 lbf) |
| Fuel | M20 |
| Oxidizer | MON3 |
| Inlet Pressures | 425-530 PSIA (Configurable) |
| O/F Ratio | 0.90 |
| Specific Impulse | ≥305.5 s |
| Chamber Pressure | 220 PSIA |
| Expansion Ratio | 70 |
| Minimum Impulse Bit | ≥0.60N-s |
| Cycles/Life | >12000 cycles or 500 seconds [Qualification spec] |
| Longest Single Burn Capability | 30 seconds [Qualification spec] |
| Longest Single Burn Demonstrated | 84 s |
| Start and Shutdown Time | <10 ms |
| Total Mass | ≤362.9 g |
| Flow Rate | 19.25 g/s (M20) and 17.33 g/s (MON3) at nominal O/F of 0.90 |
| Electrical Interface | Flying leads or connectors to valves |
| Mechanical Interface | 4 × #6 fasteners |

The 110 N thruster 12200 is developed for broad attitude control applications including lunar landers. The 110 N thruster produces 110 N (25 lbf) of nominal thrust and in-excess of 305.5 seconds of specific impulse ($I_{sp}$) while operating on a fuel blend of 20% monomethylhydrazine-80% hydrazine (M20) with mixed oxides of nitrogen containing 3% nitric oxide (MON3) as the oxidizer. The injector and combustion chamber are additively manufactured with Cobalt-Chrome and Niobium C103, respectively, to enable the rapid development required of the industry. The 110 N thruster 12200 is capable of response times of under 10 ms and currently produces a Minimum Impulse Bit (MIB) of 0.436 N-s and has demonstrated operation in pulse-mode with a variety of duty cycles during development testing. These capabilities allow for the generation of precise pulses for accurate control of a lander.

In particular, the 110 N thruster 12200 is designed to produce a nominal thrust of 110 N (25 lbf) with a nozzle expansion ratio, ε, of 70 while operating at a chamber pressure, $P_c$, of 1517 kPa (220 psia) and a mixture ratio, MR, of 0.90. The combustion chamber is additively manufactured using Niobium C103 alloy using an internally developed laser powder bed fusion (LPBF) process. This combustion chamber is coated with a layer of thermal barrier coating to provide additional thermal protection to the C103 substrate. The 110 N thruster 12200 is equipped with a multi-element "unlike" doublet injector that is also additively manufactured and uses the Cobalt-Chrome alloy. The injector face consists of features that can be shown to mitigate high-frequency instabilities during operation of the 110 N thruster 12200. In order to aid fast response times, the injector manifold volume is optimized to 38 μL on average. The combustion chamber and injector are integrated into a thruster body using a nut, and this arrangement allows for overall modularity. This thruster body is conventionally machined using Titanium alloy. The thruster body accommodates two fast-actuation valves closely coupled with the injector to minimize the overall dribble volume. The thruster dribble volume is 68 μL (valve+manifold) for each propellant side. The valves are capable of a maximum opening and closing time of 3 ms. The 110 N thruster 12200 is pressure fed from individual propellant tanks, and the pressures upstream and downstream of the valves are also measured to evaluate start transients and water-hammer effects.

Further, details of tests performed on the 110 N thruster 12200 are described to demonstrate the steady-state and pulse performance thereof based on a set of requirements defined for lunar lander missions. The testing on the 110 N thruster 12200 is used to evaluate steady-state and pulse-mode specific impulse, impulse repeatability, and combustion stability. The measured performance, i.e., specific impulse and characteristic velocity (C*), are also compared with theoretical values calculated from the NASA CEA code. The capabilities demonstrated by the 110 N thruster 12200 are applicable to a wide range of lunar lander missions and can be qualified for minor changes in thruster requirements for additional missions without the need for major design changes. The thruster is designed and tested to meet a set of requirements which result in optimal use for attitude control on lunar landers. In the example provided, the list of requirements includes: Specific impulse≥305.5 s; Combustion stability over an operating space of nominal $P_c$-MR±15%; Minimum Impulse Bit (MIB)≤0.4 N-s; Thrust startup and shutdown response time≤10 ms; Propellant temperature range of 45-100° F. (280-311 K); and Stable operation with helium saturated propellants. The testing discussed hereinafter focuses primarily on the first four requirements. Hot fire testing is conducted on a test stand that is AS9100 accredited and can accommodate over 200 analog data acquisition channels at sampling rates of up to 2 MHz In-place end-to-end calibrations using up-to-date NIST calibrated references are performed with the test system in its operating configuration matching pressure, load, and temperature conditions, and loaded instrument zeroes are taken prior to every test. Precise pulse performance characterization of this thruster is achieved through the ability to measure thrust and mass flow rates with high accuracy and microsecond time intervals. These measurement systems provide synchronous sub-millisecond response times, which, when combined, provide highly precise and accurate pulse performance measurements.

The tests are further designed to evaluate transient response, combustion stability, thermal capability, and pulse performance of the 110 N thruster 12200. In order to characterize transient response and pulse repeatability, the 110 N thruster 12200 used a close-coupled pressure transducer directly installed in the thruster body to measure dynamic pressure (range of 0-20.7 MPa and sampled at 200 kHz). This arrangement provides the pressure transducer with a 15.25-mm standoff from the hot combustion gases to prevent damage while still able to measure thruster responses. The internal diameter (ID) of the standoff is 0.635 min which minimizes the dead volume in the standoff to improve temporal response.

During hot fire testing, the propellant flow rate is measured using a positive displacement flow meter (PDFM) (as discussed earlier) which works similarly to a syringe. The positive displacement volumetric resolution is 0.18 ml and is measured in time increments of 2 μs. This provides very high accuracy and temporal volumetric flow measurements. The high-accuracy temperature measurement of the propellant in the PDFM tanks and engine inlets allows for accurate density calculation and thereby results in high-accuracy propellant mass flow calculations. Using these measurements, a $P_c$-MR operating box (as discussed later) is used to demonstrate operational margins for performance and any potential limits of combustion stability. In the test cell, the 110 N thruster 12200 is mounted to our Thrust Measurement System (TMS). The TMS consists of three Stellar Technology PNC710 dual-bridge load cells rated to 0.10% full-scale uncertainty, which allow for thrust vector measurements while maintaining side load insensitivity. The load cells arranged in the TMS have a combined range of 1335 N (300 lbf). The 110 N thruster 12200 accommodates an accelerometer 12300 during the current development phase and includes propellant valves 12302 provided on the valve body 12206 thereof. In some embodiments, the accelerometer 12300 for the 110 N thruster 12200 is rated to ±5% uncertainty over a 60,000 g range.

The pulse performance of the 110 N thruster 12200 is evaluated through a pulse sequence test which operates the thruster in different duty cycles as listed in Table 10 below. The 110 N thruster 12200 is also operated at a duty cycle of 5 ms ON-15 ms OFF over 100 pulses to evaluate the shortest pulse ON time. Overall, the test program is structured to evaluate several aspects of the performance of the 110 N thruster 12200 in a limited number of tests. All tests discussed are conducted in a vacuum test cell operating at a pressure of 690 Pa (0.1 psia).

TABLE 10

| ON Time [ms] | OFF time [ms] | Number of pulses | Intermission [ms] |
|---|---|---|---|
| 5000 | 0 | 1 | 1000 |
| 25 | 75 | 20 | 1000 |
| 50 | 50 | 20 | 1000 |
| 25 | 25 | 20 | 1000 |
| 3000 | 500 | 5 | 2000 |
| 5000 | 0 | 1 | Shutdown |

During a typical test, an auto-sequence is written which outlines flow of events (initialization, vacuum, startup, continuous firing, and shutdown, among others). This test sequence is then sent over an internal network to Lab VIEW Real Time control computer close-coupled with the test stand. The propellants are pressurized with helium to predetermined set pressures and loaded instrumentation zeros are taken. At this time, manual recording of low-speed data and video files are started, and the test sequence is commanded to begin. Once commanded to start, the Real Time control computer on the test stand takes over, and the loaded test sequence is run by the program. Operators are able to manually cut the test at any time using emergency stops located in the control center in addition to the programmed redline stops. Once a test is complete, the low-speed and high-speed files are transferred from the test stand back to the control center, where data is converted into engineering units and stored in a multi-time file format, viewable for review and analysis using NASA's Winplot application.

Overall, 13 hot fire tests are conducted on the 110 N thruster 12200 and are summarized in Table 11 below. On pulse-mode tests, the measured $P_c$ and MR from the first pulse of each test measuring≥300 ms is considered a representative chamber pressure and mixture ratio for that particular test and is plotted on the operating space (as discussed later). The tests listed in Table 11 target operating points (Pc-MR combinations) that are nominal (1518 kPa-0.90) and ±15% corners from nominal at a burn time of 1,000 ms. Additionally, the 110 N thruster 12200 is also fired at the nominal point for 5,000 and 20,000 ms to evaluate operation in a thermal steady-state mode. The Minimum Impulse Bit (MIB) pulse test fired the 110 N thruster 12200 for 100 pulse with 5 ms ON and 15 ms OFF duty cycle.

TABLE 11

| Test ID | Ch. pressure, $P_c$ [kPa] | Mixture ratio, MR [—] | Duration [ms] | Vacuum thrust [N] | C* efficiency, $\eta_C$* [%] | Vacuum $I_{sp}$ [s] |
|---|---|---|---|---|---|---|
| A110-P074 | 1499 | 0.90 | 300 | 104 | 94.7 | 303.9 |
| A110-P075 | 1513 | 0.91 | 1,000 | 106 | 94.9 | 307.8 |
| A110-P076 | 1523 | 0.90 | 5,000 | 107 | 95.7 | 309.6 |
| A110-P077 | 1514 | 0.89 | 20,000 | 106 | 95.3 | 308.4 |
| A110-P078 | 1344 | 0.97 | 1,000 | 94 | 93.5 | 304.7 |
| A110-P079 | 1279 | 1.06 | 1,000 | 90 | 91.9 | 302.4 |
| A110-P080 | 1317 | 0.75 | 1,000 | 92 | 95.5 | 302.5 |
| A110-P081 | 1767 | 0.76 | 1,000 | 123 | 96.4 | 304.8 |
| A110-P082 | 1719 | 1.04 | 1,000 | 121 | 94.3 | 308.8 |
| A110-P083 | 1526 | 0.91 | Pulse Test | 107 | 95.4 | 308.7 |
| A110-P084 | 1527 | 0.91 | 1,000 | 107 | 95.3 | 309.6 |
| A110-P085 | 1518 (Target) | 0.90 (Target) | MIB | — | — | — |
| A110-P086 | 1533 | 0.90 | Pulse Test | 108 | 95.5 | 309.7 |

Herein, the $P_c$, thrust, and MR are some of the direct performance metrics measured for each test on the 110 N thruster 12200.

Using the measured $P_c$, thrust, propellant mass flow rates, and the test cell ambient pressure from each test the vacuum-corrected thrust, characteristic velocity (C*), and specific impulse (L) are estimated. The C* for these tests is based on the measured throat area of the chamber and hence represents the actual combustion performance of the thruster. Additionally, the C* efficiency ($\eta_{c*}$) is estimated as the ratio of measured C* to the theoretical C* as calculated from NASA CEA. These performance metrics for all tests are tabulated in Table 11 above. Since the 110 N thruster 12200 is tested with the flight nozzle of ε=70, the measured $I_{sp}$ is as expected in the flight configuration and no further extrapolation may be required.

Further, for steady state analysis, the 110 N thruster 12200 is fired for 5,000 and 20,000 ms at nominal $P_c$-MR to assess specific impulse and C* efficiency changes, if any, over a prolonged burn time. The test durations for these tests are defined to achieve thermal steady-state operation. As shown in FIG. 122, the 110 N thruster 12200 may also be provided with four pyrometers 12240, 12242, 12244, and 12246 aimed at different locations on the chamber outer surface. Two of them are Photrix™ single wavelength pyrometers able to measure 491 K to 2,873 K (425° F. to 4,712° F.) at 1 kHz and the other two are Photrix™ dual wavelength pyrometers able to measure 1,022 K to 2,072 K (1,380° F. to 3,270° F.) at 500 Hz. All pyrometer positioning is verified using a built-in laser. Pyrometers 12242 and 12246 are aimed at the hottest zone of the chamber which is from the start of the converging section to the throat. The other two pyrometers are meant to monitor and track thermal gradients along the axial length of the 110 N thruster 12200.

The performance of each pulse in a pulse train is also characterized, and the impulse bit is tabulated in Table 12 below, which provides performance metrics of each pulse from the 25 ms ON×75 ms OFF pulse train.

TABLE 12

| Pulse Number [−] | Impulse Bit [N-s] | Start Response [ms] | Shutdown Response [ms] |
|---|---|---|---|
| 1 | 2.351 | 6.75 | 6.26 |
| 2 | 2.609 | 3.65 | 6.26 |
| 3 | 2.634 | 3.65 | 6.26 |
| 4 | 2.654 | 3.58 | 6.26 |
| 5 | 2.677 | 3.60 | 6.26 |
| 6 | 2.651 | 3.62 | 6.26 |
| 7 | 2.677 | 3.65 | 6.26 |
| 8 | 2.679 | 3.63 | 6.26 |
| 9 | 2.676 | 3.61 | 6.26 |
| 10 | 2.672 | 3.62 | 6.26 |
| 11 | 2.678 | 3.65 | 6.26 |
| 12 | 2.667 | 3.67 | 6.26 |
| 13 | 2.674 | 3.67 | 6.26 |
| 14 | 2.671 | 3.70 | 6.26 |
| 15 | 2.675 | 3.68 | 6.26 |
| 16 | 2.667 | 3.72 | 6.26 |
| 17 | 2.673 | 3.72 | 6.26 |
| 18 | 2.669 | 3.73 | 6.26 |
| 19 | 2.672 | 3.70 | 6.26 |
| 20 | 2.673 | 3.73 | 6.26 |

Analysis is conducted on the other pulse trains of different tests (MIB test), and the average impulse bits and response times are tabulated in Table 13 below. Once again, the averages in Table 13 do not include the metrics from the first pulse of every pulse train as it is not representative of the rest of the pulse train. In comparison, the two pulse trains with a 25-ms ON time show a decrease in impulse bits with an increase in OFF time. Although these are only two points of comparison, this decrease in IB with an increase in OFF time follows. As shown in Table 13, the impulse bit, 0.436±0.016 N-s is greater than 0.400 N-s defined in the requirement of minimum Impulse Bit (MIB)≤0.4 N-s. However, it may be appreciated that the pulse ON Lime can be further reduced below 5 ms in order to meet this operational criterion. Further, the average thrust response start times from the pulse trains in Table 13 are defined as the time taken for the pulse to reach 90% steady state thrust or when the estimated impulse starts to rise. Similarly, the end response times are quantified as the difference between the ending inflection time on the impulse curve and the time at which the pulse is commanded OFF. These average response times are below the values defined as per the requirement of thrust startup and shutdown response time being ≤10 ms.

TABLE 13

| Duty Cycle | | Impulse Bit | Response Time | |
|---|---|---|---|---|
| ON [ms] | OFF [ms] | [N-s] | Start [ms] | End [ms] |
| 25 | 75 | 2.667 ± 0.018 | 3.66 | 6.26 |
| 25 | 25 | 2.726 ± 0.005 | 4.12 | 4.70 |
| 50 | 50 | 5.449 ± 0.005 | 4.51 | 6.26 |
| 5 (MIB) | 15 | 0.436 ± 0.016 | 4.27 | 2.56 |

As discussed, the 110 N thruster 12200 is provided with the 60,000 g triaxial accelerometer installed on the thruster body to measure any vibrations from combustion instabilities. The accelerometer has a typical frequency response of up to 140 kHz and is sufficient to capture any high-frequency instabilities which might be produced by the 110 N thruster 12200. Data from each accelerometer channel is acquired at 200 kHz. Vibration amplitude and frequency measured by the accelerometer are correlated with other measurements to understand the origins of any detected oscillations. A valuable correlation of accelerometer data is with the chamber pressure signal and valve current. A test is chosen for this correlation as a representative and also because the corner with $P_c$=1289 kPa and MR=1.035 has been previously susceptible to instabilities.

Thus, the above disclosure overall demonstrates the capability of the 110 N thruster 12200 using a propellant combination of M20-MON3 over a variety of operating conditions, both steady-state and pulse mode.

In embodiments, the chamber/nozzle can be constructed from a single piece AM print of Niobium C-103 alloy with an R-512E silicide coating and a 70:1 expansion ratio. This material and coating combination is capable of operation up to temperatures of 2700° F. (1755 K). In embodiments, the thruster chamber can be cooled through a combination of radiative cooling and mixture ratio control of the injector elements. The laser powder bed fusion (LPBF) additive manufacturing process only uses the material that is needed to make the part, and in contrast to traditional subtractive processes, is less costly and much quicker. In embodiments, the chamber can be mechanically joined to the injector with a retention nut and split collars. Chamber-to-injector sealing can be provided by an all-metal K-seal with gold plating. In these examples, the seal is protected from combustion heat because it is recessed behind the injector face and is rated to operate up to 1400° F.

In embodiments, the thruster valves are single-seat, single-coil, fast-acting solenoid valves. In examples, the valves can be provided by Valvetech of Phelps, NY. In embodiments, the valves can have an opening response time<3.0 ms and closing time<2.5 ms with a pull-in voltage between 24 and 32 volts DC. It is capable of operating at pressures up to 1000 psia and handling surge pressures in excess of 1500 psia. The valve is an inline type with a tube stub inlet and O-ring seal on the outlet which interfaces to the valve body. The tube stub is made of stainless steel and can be directly orbital tube welded to or connected by fittings to various propulsion systems.

Upstream of the valves, in the inlet tubes, in embodiments, sit an in-line filter constructed of an MP35N screen with a 50 micron filtration capability and optional pressure-restricting orifice. In embodiments, the thruster is capable of operation at feed pressures of up to 1000 psia with appropriate upstream orifices, which can be installed during valve final assembly.

In embodiments, the valve body is constructed of titanium (Ti-6Al4V) to further reduce weight while minimizing thermal soak back to the valves and spacecraft structure. In embodiments, "Heat-breaks" can be designed into the mechanical connections between the thruster chamber and the valve body and the low thermal conductivity of titanium can reduce the amount of heat that is soaked into the valves, keeping them below their temperature limit during operation.

In embodiments, the thruster can have two sets of static O-ring seals that can be downstream of the valve seats—one that interfaces between the valve outlet and the valve body, and another that interfaces between the valve body and the injector. In these examples, the valve body can include a "weep hole" to allow for leak inspection of the injector-to-valve body seals so that once the thruster throat has been plugged, all seals can be inspected for leakage. In these examples, the O-rings on the oxidizer side can be made from virgin PTFE per AMS-3660 and the O-rings on the fuel side can be made of EPDM per AMS-3266. At the interface between the valve body and thruster can be a set of two offset eccentric holes, which can allow for fine tuning of the mixture ratio and thrust. This can be achieved by loosening the valve capture nut and rotating the valve along the flow axis. In these examples, tuning the thruster performance in-situ on the test stand can simplify the number of possible hardware configurations and accelerates the thruster trimming and acceptance testing process. A thruster trimming process may be employed where the rotation of the valve can adjust the thruster trim. After trimming, the valve can be locked into place so it cannot rotate.

111 N Thruster

Figure 124:
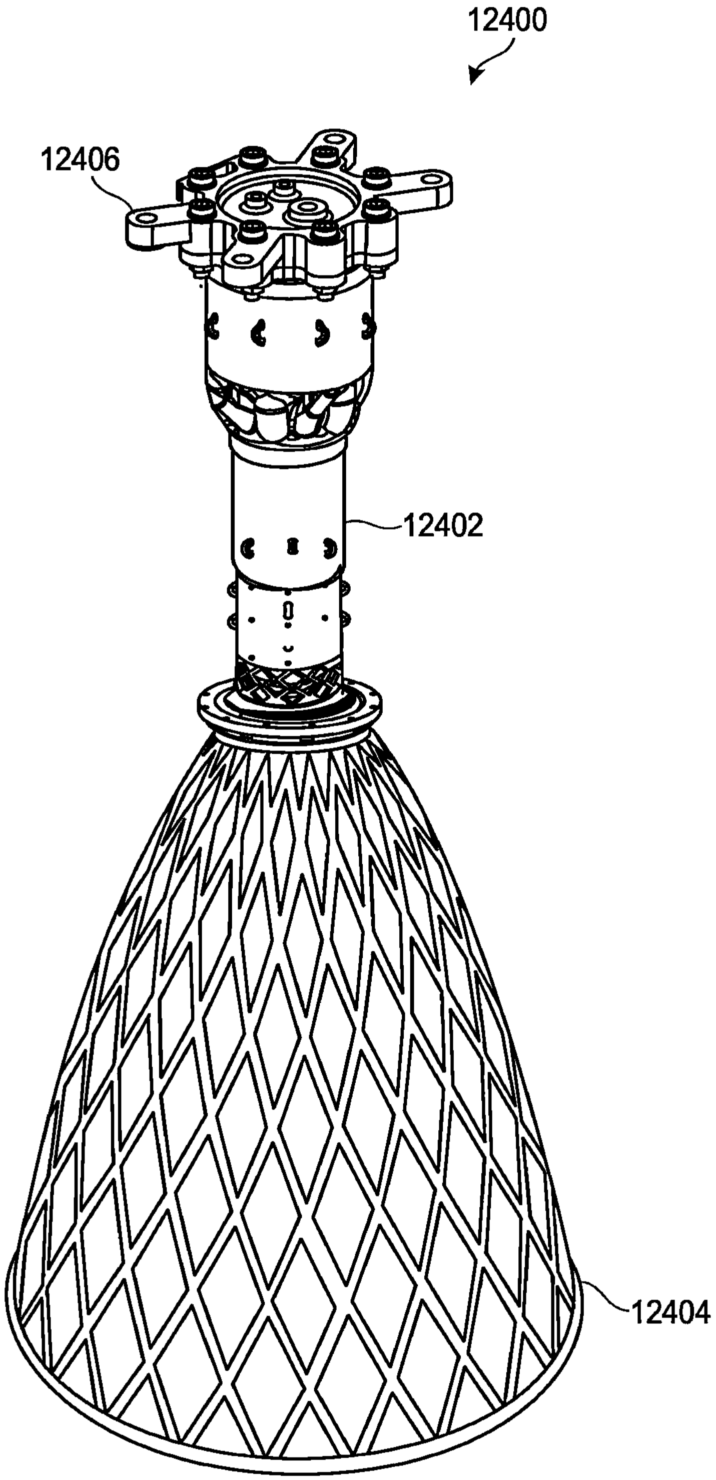
FIG. 124 is a perspective view.
Figure 125:
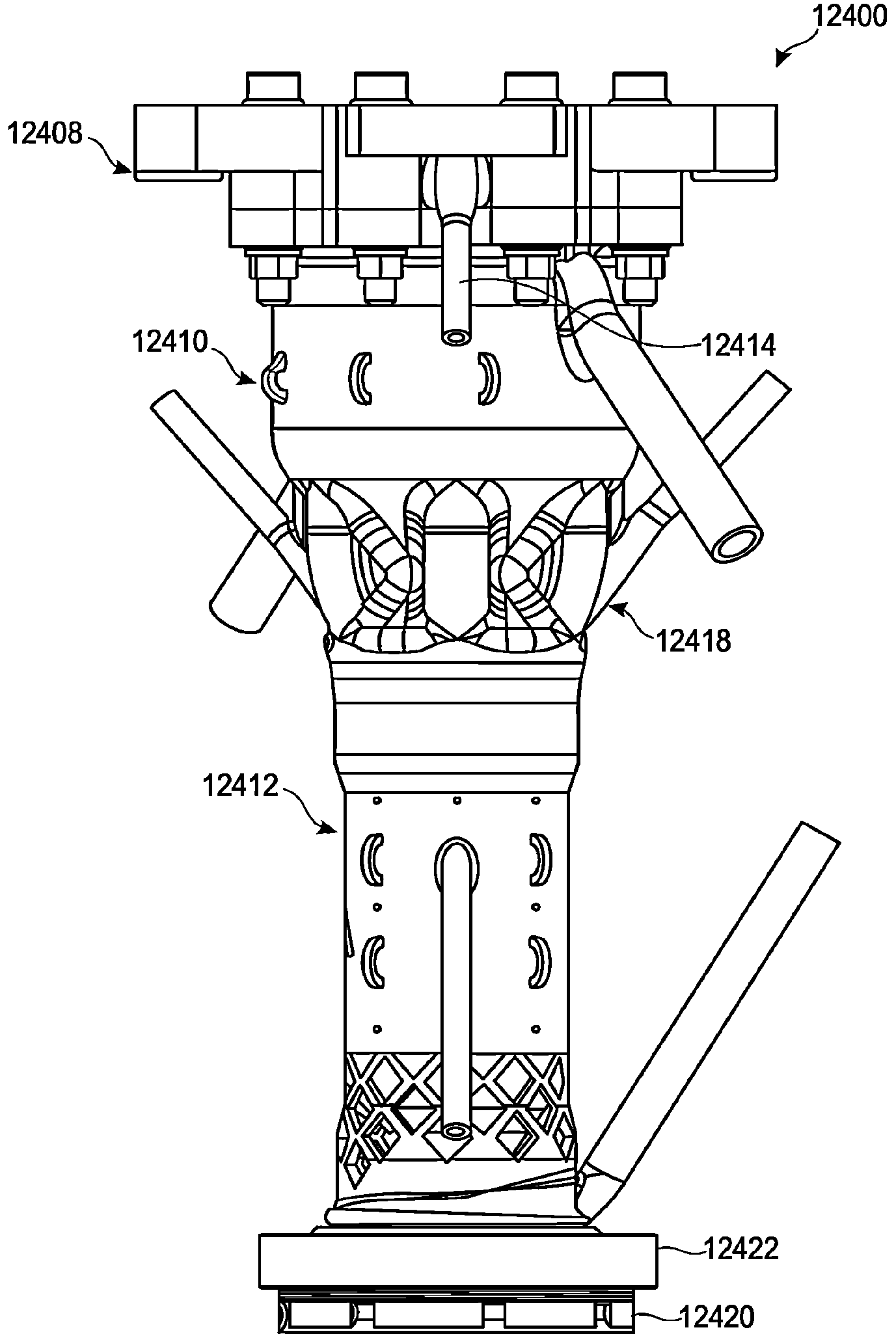
FIG. 125 is a side view.
Figure 126:
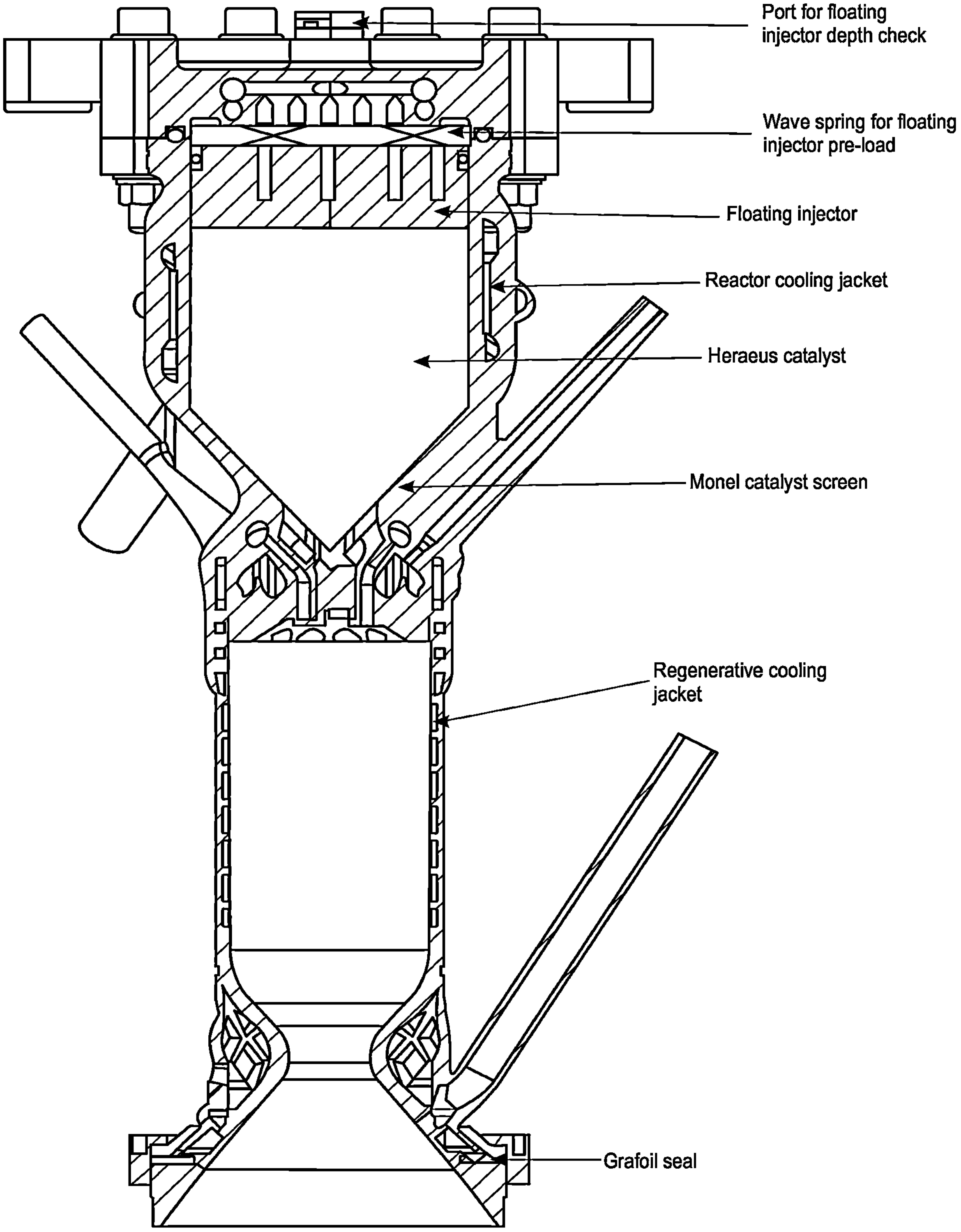

Referring now to FIG. 124, FIG. 125, and FIG. 126, and with continued reference to FIGS. 1-123, a diagram illustrates still another bi-propellant thruster 12400 according to some embodiments of the present disclosure. In some embodiments, the bi-propellant thruster 12400 is a 111 N (~25 lbf) Hydrazine dual-mode thruster. Hereinafter, the bi-propellant thruster 12400 has been referred to as 111 N thruster 12400. In some examples, the LE111 thruster from AGILE is an example of a 111 N thruster as described herein. It will be appreciated in light of the disclosure that the 111 N thruster contains many ornamental features separate and distinct from the many functional features disclosed herein.

As shown, the 111 N thruster 12400 includes a propulsion chamber 12402. Further, the 111 N thruster 12400 includes a nozzle 12404 and a valve body 12406 as part of the propulsion chamber 12402. In the example provided, the propulsion chamber 12402 of the 111 N thruster 12400 has an overall height of about 13.9 inches and a height at the valve body 12406 of about 0.8 inches, and the propulsion chamber 12402 of the 111 N thruster 12410 has a width at the nozzle 12404 of about 6.0 inches. The 111 N thruster 12400 achieves unprecedented performance and operating envelope through a novel micro-coaxial gas-gas injection scheme and an innovative regeneratively cooled combustion chamber and hydrazine reactor (as discussed in more detail herein). The 111 N thruster 12400 is highly throttleable, allowing for a thrust range from 25 to 170% of nominal. Additionally, the 111 N thruster 12400 can run in either bipropellant or monopropellant mode, allowing for a 100% utilization of the propellant system. In hot-fire testing, the 111 N thruster 12400 achieved 15,455 seconds of accumulated on time and a maximum continuous burn time of 6000 seconds across a variety of test conditions.

Table 14 below provides details of specifications of the 111 N thruster 12400.

TABLE 14

| 111N thruster Specifications | |
|---|---|
| Throttling | Yes |
| Thrust | 111N (25 lbf) |
| Fuel | Hydrazine |
| Oxidizer | MON3 |
| Inlet Pressures | 300 PSIA Nominal |
| O/F Ratio | 0.80-1.45 |
| Specific Impulse | up to 328 s |
| Chamber Pressure | 140 PSIA Nominal |
| Expansion Ratio | 300 |
| Throttling Range | 25-170% |
| Longest Single Burn Demonstrated | 6000 s |
| Start and Shutdown Time | 100 ms |
| Total Mass | ≤2.0 kg |
| Electrical Interface | Flying leads |
| Mechanical Interface | 4 × #8 fasteners |

The 111 N thruster 12400 utilizes hydrazine and MON3 as fuel and oxidizer, and produces a thrust of 111 N at nominal operating conditions with an $I_{sp}$ of up to 328 s. The 111 N thruster 12400 is throttleable through the use of separate fuel and oxidizer metering valves and is able to transition to a hydrazine monopropellant mode at any point during its operation. In particular, the 111 N thruster 12400 uses separate fuel and oxidizer metering valves for continuously variable thrust output between 25% and 166% throttle settings. This throttle capability is further extended to allow the 111 N thruster 12400 to run in a hydrazine monopropellant mode, either by fully closing the oxidizer valve or in a complete oxidizer depletion scenario. With a nominal inlet pressure of 1,586 kPa (230 psi) required to achieve 100% thrust, the 111 N thruster 12400 is compatible with high mass fraction tank systems. In some embodiments, the 111 N thruster 12400 includes a full-authority digital engine controller (FADEC) to provide data-rich telemetry closed loop control of the engine. The performance specifications of the 111 N thruster 12400 can be compared with Northrup Grumman's Secondary Combustion Augmented Thruster (SCAT). The SCAT thruster, like the 111 N thruster 12400, can be operated in monopropellant-only mode, and uses a catalyst-bed chamber to decompose hydrazine. When run in bipropellant operations, SCAT can accommodate similar allowable mixture ratios (0.95 to 1.6) and produces 18 to 62 N of thrust at $I_{sp}$ of up to 325 s. Completed qualification testing of the 111 N thruster 12400 has demonstrated a versatile operating box (as discussed later) that includes chamber pressure-mixture ratio excursions, heated propellants up to 341 K, and gaseous helium ingestion through propellant flow paths. Overall, the 111 N thruster 12400 has achieved 15,455 seconds of accumulated on-time and a maximum continuous burn time of 6,000 s.

The 111 N thruster 12400 achieves its exceptional performance and operating envelope by using a novel micro-coaxial gas-gas injection scheme and an innovative regeneratively cooled combustion chamber, which uses the oxidizer as the working fluid. In addition, the fuel provides cooling to the hydrazine reactor section of the 111 N thruster 12400. Utilizing this combined oxidizer and fuel cooling, the propellants of the 111 N thruster 12400 regenerate over 34 kW of thermal power. The 111 N thruster 12400 is assembled from four major components: the single piece printed body, the hydrazine injector, the hydrazine manifold, and a weld-on nozzle extension. The proceeding paragraphs discuss the design objectives and requirements for the 111 N thruster, descriptions of its components, manufacturing and assembly processes, and hot flow testing procedures and results, and relevant analyses.

In general, the objectives of the technical demonstration of the 111 N thruster 12400 are broken out into three phases. The first phase (Phase I) demonstrates the primary viability of the 111 N thruster 12400 by demonstrating 60 seconds duration capability with high combustion performance. The second phase (Phase II) demonstrates additional operating capabilities which are the basis for meeting the overall requirements for the Hypergolic Bipropellant Engine specification. The third phase (Phase III) shows flight qualification capability with a continuous 6000 second duration test.

In the example provided, Phase I involves:

a. Demonstrate the performance and longevity of the hydrazine monopropellant reactor by firing the 111 N thruster for multiple 30 seconds durations.

b. Demonstrate the thruster's high performance design with the capability to achieve 320 seconds of vacuum specific impulse (Ivac) with a flight design. Combustion performance is to be evaluated using precision chamber pressure, thrust, and propellant flow measurements, and c. Demonstrate thruster steady state thermal operation at a 60 second duration burn at nominal inlet pressure conditions and an ambient pressure condition greater than 15,240 m (50,000 ft) altitude.

In the example provided, Phase II involves:

a. Demonstrate thruster functional operability over the specification inlet pressure range. This is accomplished by an exploration of $P_c$ and mixture ratio excursions by varying fuel and oxidizer inlet pressures independently and to extremes across the specified inlet pressure range.

b. Demonstrate thruster throttling capability between 80%-100% nominal thrust level while maintaining nominal MR, c. Characterize thruster throttle response. The limits of throttle response transient are to be explored and demonstrated with repeatability, d. Demonstrate thruster ability to operate in a stable and functional manner during oxidizer depletion. Perform multiple oxidizer depletion scenarios, including transient helium gas ingestion, two phase transition, and straight depletion. Evaluate thermal response to depletion, e. Demonstrate thruster operability and performance in monopropellant mode. Establish parameters for starting in monopropellant mode and transitioning to monopropellant mode from bipropellant mode. Establish performance for transient and steady state operations, and f. Demonstrate thruster ability to operate in a stable and functional manner with propellant inlet temperatures up to 341K (150° F.). Perform evaluation at multiple operating points.

In the example provided, Phase III involves demonstrating thruster flight-like qualification durations up to 6,000 seconds continuous on-time. These tests may be performed with a flight like propellant supply system using Coriolis flow meters for propellant flow measurement.

The final design of the 111 N thruster 12400 is an integration of modular components evaluated and tested during the prototype phase of the thruster development.

In the example provided, the 111 N thruster 12400 includes a hydrazine manifold 12408, a catalytic hydrazine reactor 12410 (also referred to as "reactor section") and a bipropellant chamber 12412. The hydrazine manifold 12408 is the top-side closeout for the reactor section 12410 of the 111 N thruster 12400. The hydrazine manifold 12408 provides a hydrazine inlet 12414 and has the primary objective of distributing the incoming hydrazine evenly to the fuel injector inside the reactor section 12410. The hydrazine manifold 12408 is additively manufactured using nickel and is post-print machined to meet tolerances on sealing surfaces. The hydrazine manifold 12408 is bolted to the reactor section 12410 of the single-piece print component of the 111 N thruster 12400, although a weld may be used to integrate it with the single-piece print. The actual injector elements opening into the catalyst are EDM hole-drilled into the hydrazine manifold 12408 post printing and machining. The number and diameter of the injector orifices can be varied to achieve a variety of pressure drops based on the finalized design. For the purpose of matching the system pressure budget, the 111 N thruster 12400 uses a reactor injector pressure drop of 221 kPa (32 psi).

The main component of the reactor section 12410 of the 111 N thruster 12400 is a reactor inlet providing a catalyst pack which decomposes the hydrazine to nitrogen, hydrogen, and ammonia prior to its flow into the bipropellant injector leading to the combustion chamber 12402. The catalyst is an iridium-infused alumina granule provided by Heraeus and is called KT Katalysator H-KC12GA CAT-3. The 14-18 mesh grain sire of the H-KC12GA CAT-3 proved to be the most resilient to degradation during firing. The minor decrease in surface area compared to the smaller catalyst (25-30 mesh) was compensated for by increasing the catalyst bed length. However, the 14-18 mesh catalyst grain size requires a longer pre-heat period at a higher temperature than that for the 25-30 mesh grain sin to avoid thermal degradation from a cold start of the reactor. This concern is mitigated by the use of a thermal jacket around the outer diameter of the reactor section 12410 which is used for heating the catalyst prior to thruster start and for cooling during thruster firing. A key technical requirement of the reactor cooling jacket is to not boil or decompose the hydrazine before it reaches the reactor. This is accomplished by careful tuning of the cooling passage cross-sections to maintain a high flow velocity to limit the heat pick up of the hydrazine. For general operation during Phase I-III testing, the catalyst was warmed through the beating jacket, the 111 N thruster 12400 was run in a monopropellant-only mode for 2 s, then the 111 N thruster 12400 transitioned to bipropellant operations.

The bipropellant chamber 12412 consists of the section of the single piece print from the injector face to the diverging section at an expansion ratio (a) of 8.9. The bipropellant chamber 12412 consists of the straight section of the combustion chamber 12402, the converging section of the nozzle 12404, the throat, the diverging section of the nozzle 12404, the regenerative oxidizer cooling manifolds and passages, and nozzle extension (as represented by reference numeral 12420). The nozzle extension 12420 is a titanium additively manufactured component that extends from the axial location of the nickel part of the nozzle 12402 from the expansion ratio 13 to the full expansion ratio of 300. The nozzle extension 12420 follows the same profile as the regeneratively cooled nozzle. The nozzle extension 12420 is attached to the single piece print by a split ring collar and nut 12422. In some embodiments, the radiatively cooled nozzle uses a 3D stiffening pattern that is more sophisticated than the hoop stiffeners previously used an nozzle extensions. This extension was designed by fording the natural frequency of a rectangular beam of an equivalent cross-section to the geometry which may be patterned on the nozzle extension and targeting that frequency at 1.3× the analytically predicted lowest frequency mode of the unstiffened nozzle. Herein, the contour of the nozzle 12404 is an 83% Rao curve implementing minor corrections for boundary layer phenomenon. The contour is based on a nominal expansion ratio of 300, though appreciable truncations may occur without significant degradation in performance due to the low divergence angle losses at the high expansion side of the nozzle profile. The converging section of the nozzle 12402 has a typical $R_1$, $R_2$, $R_n$ structure on a 40° convergence angle. A steeper than normal convergence angle is selected to enable the component to fit in the build volume of the TruPrint 2000 printer as configured by Agile. This steeper convergence of the nozzle 12402 causes a minor degradation in performance, which is offset by the marginal increase in allowable characteristic length for the bipropellant chamber 12412.

The bipropellant chamber 12412 further provides a bipropellant injector region 12418 which consists of two manifolds, coaxial injector elements, and associated secondary structures. On the single-piece print, the bipropellant injector is located downstream of the hydrazine reactor basket and upstream of the bipropellant chamber and is printed from nickel as part of the single-piece print. The outermost manifold in this region is the oxidizer manifold, supplied by the regenerative cooling jacket. The second and inner manifold in this region is for fuel, which is fed from the upstream reactor and closed out by the injector face. The injector elements are designed to be shear coaxial elements. For such elements, it is critical for the inner oxidizer tubes to remain concentric with the outer wall bounding fuel flow. A non-concentric arrangement causes a radially outward mass-flux of mixed propellants in the chamber and leads to a rapid temperature rise of the chamber hot-wall resulting in burn-throughs. In order to prevent such non-concentricity in the coaxial elements which are caused by the relaxation of residual stresses from the printing process, the oxidizer tubes are supported by three angled ribs between the oxidizer tubes and the injector face. The 111 N thruster 12400 uses the printed injector structure to an even greater effect by individually targeting mixture ratios for elements to produce a low-temperature wall layer and high temperature, high performance core flow.

Herein, pressure drops between 193 and 331 kPa (28 and 48 psi) have been demonstrated on the bipropellant injector region 12418. A pressure drop of 221 kPa (32 psi) is optimal for suppressing feedback into the propellant feed system from chug instabilities (low frequencies, ≤400 Hz) in the combustion chamber 12402 of the 111 N thruster 12400. This level of pressure drop also prevents the development of supersonic oxidizer flow in the oxidizer channels. Supersonic oxidizer flow triggers a high amplitude, high-frequency instability of 31 kHz in the chamber that rapidly degrades the catalyst and mechanical structure of the 111 N thruster 12400.

In embodiments, the 111 N thruster 12400 may have an expansion ratio of 16:1. In embodiments, the 111 N thruster 12400 may have an expansion ratio of 300:1. In the example provided, the Ill N thruster 12400 includes a regenerative jacket as described above.

For testing the 111 N thruster 12400, hot-fire testing was conducted on a test stand that is AS9100 accredited and can accommodate over 200 analog data acquisition channels at sampling rates of up to 2 MHz In-place end-to-end calibrations using up-to-date NIST calibrated references were performed with the test system in its operating configuration matching pressure, load, and temperature conditions, and loaded instrument zeroes are taken prior to every test. The test stand feed system utilizes Positive Displacement Flow Meters (PDFMs) (as discussed) for high fidelity control and measurement of propellants. The PDFM can work, in some aspects, synonymously to a syringe. The volume downstream of a piston is filled with propellant, which is then expelled by pressurizing the volume upstream of the piston with helium, driving the fluid outward. The volumetric flow rate is calculated by measuring the displacement of the piston and is rated to ±0.07% full scale uncertainty. The measured volumetric flow rate is multiplied by the fluid density to determine a mass flow rate. Fluid density is calculated from empirical relationships for fluids solely as a function of temperature measured at the PDFM with an Omega Type T thermocouple. The test stand PDFMs measure to 0.1% uncertainty for impulse bit measurements of 0.002 kg (0.005 lbm) of propellant. From the PDFM, a close-coupled direct-path with a length of 0.9 m (35 in) was provided to run line connections to the Ill N thruster, which allows for sub-millisecond response for transient flow measurements. For tests lasting longer than 300 seconds in duration, propellants bypassed the PDFMs and were flown directly from the 4BW storage tanks to the engine. For these tests, Coriolis flow meters were used to measure mass flow to 0.1% full-scale uncertainty.

The 111 N thruster 1300 was itself is mounted to Agile's Thrust Measurement System (TMS). The TMS consists of three dual bridge load cells rated to 0.2% full-sale uncertainty, which allow for thrust vector measurements while maintaining side load insensitivity. The TMS also allows for undamped accelerometer measurements which are rated to ±5% uncertainty for the 2,000 to 60,000 g range. The bipropellant chamber, as tested, was designed to accept dual high frequency pressure transducers to measure $P_c$. These high frequency transducers were also utilized in the propellant feed system and are capable of a 300 kHz linear response rate and 0.25% full scale uncertainty. Additional specialty instrumentation includes 64 channels of high accuracy thermocouples with measurement rates of 80 Hz, and eight high speed thermocouples with measurement rates up to 20 kHz. All thermocouple types are supported on the test stand and are capable of end-to-end NIST traceable calibration.

Testing utilized multiple remote temperature sensing methods as well. The test stand contains two single wavelength pyrometers able to measure 491 K to 2,873 K (425° F. to 4.712° F.) at 1 kHz and two dual wavelength pyrometers able to measure 1,022 K to 2,072 K (1.380° F. to 3,270° F.) at 500 Hz. All pyrometer positioning is verified using a built-in laser. Additionally, an IR camera is paired to a quartz viewing window on the test cell. This camera can capture thermal images in a temperature range of 866 K to 1,978 K (1,100° F. to 3,100° F.) at a resolution of 640×480 pixels and 60 fps. Two remotely triggered high-speed digital cameras and one remotely triggered high-definition digital camera with sound were also utilized to record every test from multiple adjustable viewing angles through twelve-inch windows. Further, National Instruments LabVIEW Real Time was utilized for engine and test sequence control on the test stand. In addition, LabVIEW FPGA was utilized for hardware level red line control. Thermocouples may be used as redlines at 200 Hz filtered, pyrometers at 1 kHz digital, while pressures may be used at up to 5 kHz filtered. Accelerometer data is processed using an FFT, and frequency ranges and amplitudes may be set as redline triggers. Once a redline has been tripped action response time is 5 microseconds to activate the shutdown command, which turns off the engine, closes the main run line valves, and begins a pre-programmed shutdown sequence.

During a typical test, a sequence is written which outlines what will take place during all phases of testing (initialization, vacuum, startup, continuous firing, and shutdown, among others). This test sequence is then sent over an internal network to the LabVIEW Real Time control computer located in a close-coupled location on the test stand itself. The propellants are pressurized with helium to predetermined set pressures and loaded instrumentation zeros are taken. At this time manual recording of low-speed data and video files are started, and the test sequence is commanded to begin. Once commanded to start, the Real Time control computer on the test stand takes over, and the loaded test sequence is run by the program. Operators are able to manually cut the test at any time using emergency stops located in the control center. Once a test is complete the low-speed and high-speed .tdms riles are transferred from the test stand back to the control center, where data is converted into engineering units and stored in a multi-time file format, viewable by analysts using NASA's Winplot program.

Once initial (Phase 0) prototype testing was completed and the thruster design was finalized, the 111 N thruster 12400 was subjected to three phases of testing to demonstrate its capabilities for the record. These phases of testing included 44 individual hot fire tests, which are described in Table 15 below which provides Phase I-III complete test matrix. All tests in Phase I-III were performed successfully. Herein, the purpose of Phase III.a.1 testing was to demonstrate stable long-duration steady-state operation of the thruster at nominal $P_c$, and MR.

The purpose of Phase II.b testing was to demonstrate repeatable and stable performance of the 111 N thruster 12400 while throttling between 80%-100% of nominal while holding a nominal MR of 1.0. Each target on the throttle curve was held for 20 s. Throttling was accomplished using SS-4BRG valves with Hanbay™ actuators on the test stand. Remote metering valve voltage set points were determined by waterflow testing prior to hot fire for both fuel and oxidizer valves. The purpose of Phase II.f testing was to demonstrate the ability of the 111 N thruster 12400 to transition from bipropellant operations to monopropellant and back. During these tests the 111 N thruster 12400 was nm at nominal conditions until the oxidizer master engine valve was commanded closed on the test stand, then opened again to return the 111 N thruster 12400 to bipropellant operations. Test results showed that monopropellant operation may be safely sequenced anywhere in a burn to achieve rapid changes in throttle or for attitude control.

TABLE 15

| Test | Purpose | Hot Fire |
| --- | --- | --- |
| Ph I.a.1 | Monopropellant only at MR = 1.0 flow rate, 20 seconds | LE111-285 |
| Ph I.a.2 | Monopropellant only at MR = 1.0 flow rate, 20 seconds (repeat) | LE111-286 |
| Ph I.a.3 | Monopropellant only at MR = 0.9 flow rate, 20 seconds | LE111-289 |
| Ph I.a.4 | Monopropellant only at MR = 0.8 flow rate, 20 seconds | LE111-288 |

Because the specific impulse during Phase I-III testing is evaluated for the hot-fired truncated nozzle, this performance needs to be extrapolated to the flight expansion ratio ε=300. In order to perform this extrapolation, the specific impulse efficiency, or the Energy Release Efficiency (ERE), is first determined. The ERE is the ratio of the measured vacuum specific impulse ($I_{sp_{8.9}}$) to that of a perfect injector ($I_{spPi_{8.9}}$) as calculated by the Two-Dimensional Kinematics (TDK) software based on the JANNAF liquid rocket thrust chamber performance prediction methodology and is shown in Equation 10 below. The perfect injector $I_{sp}$ is the performance produced by a thruster which accomplishes fully mixed and combusted propellants in the combustion chamber. The average ERE value measured on the 111 N thruster 12400 at the nominal operating point is 97%.

$$ERE = \frac{Isp_{8.9}}{Isp_{PI,8.9}} \qquad \text{Equation 10}$$

Subsequentially, the perfect injector specific impulse at ε=300 (IspPi,300) and performance losses associated with the boundary layer formed on the inside of the extrapolated nozzle (dBL300) are estimated using the TDK code for the measured chamber pressure and mixture on a certain hot-fire test. These estimates are corrected using the ERE, as shown in Equation 11 below, to result in a predicted vacuum specific impulse that is expected at the flight expansion ratio of 300. The boundary layer losses translate to a reduction in achieved specific impulse due to the formation of a boundary layer along the nozzle inside wall in a real system.

$$Isp_{300} = ERE(Isp_{PI,300}) - dBL_{300} \qquad \text{Equation 11}$$

The above method has shown agreement between predicted and real-world results when performed on previously designed truncated and fully expanded thrusters. Measured C* from Phase I-III testing is compared to the theoretical C* estimated by the NASA CEA code for the tested propellant combination, chamber pressure, and mixture ratio to result in a C* efficiency or ηC*. For the 111 N thruster 12400, the average ηC*=96.64% at nominal operating conditions.

This, the above described test program demonstrates the capabilities of an additively manufactured, regeneratively cooled, hydrazine bipropellant engine utilizing gas-gas injection. The 111 N thruster 12400 achieved 15,455 seconds of accumulated on-time, with a maximum continuous burn of 6,000 s. Tests conducted during the Phase I-III test campaign demonstrated the throttle-ability, ability to transition to monopropellant-only mode and back to bipropellant operations at any point during a burn, stable helium ingestion, stable operation given heated propellants, and stable operation during 10% and 20% chamber pressure-mixture ratio excursions of the 111 N thruster 12400. An important feature of the 111 N thruster 12400 is a very small thermal signature, which is of high value for low-detectable maneuvers. Although methods for optical and radar concealment have been well understood, the Ill N thruster 12400 provides impulsive repositioning of a spacecraft without residual thermal signature, thereby concealing any resulting maneuvers.

The rapid rise of interest in space applications has precipitated the need for a new kind of in-space maneuvering thruster. In response to this need, the 111 N thruster utilizes hydrazine and mixed oxides of nitrogen (MON3) as fuel and oxidizer, respectively, at design mixture ratios between 0.8 and 1.45, and produces a thrust of 111 N (25 lbf) with a specific impulse (Isp) of up to 328 s. The thruster can be throttleable through the use of separate fuel and oxidizer metering valves, allowing for variable thrust between 25% and 170% of nominal. This throttle capability can be further extended to allow the Ill N thruster to run in a hydrazine monopropellant mode, either by fully closing the oxidizer valve or in a complete oxidizer depletion scenario. Additionally, with a nominal inlet pressure of just 300 psia required to produce 100% thrust, the 111 N thruster can be compatible with high mass fraction tank systems. In embodiments, the 111 N thruster has demonstrated a versatile operating box that includes chamber pressure-mixture ratio (Pc-MR) excursions, heated propellants up to 155° F., and gaseous helium ingestion through propellant flow paths. In embodiments, the mixture ratio from 0.6 to 1.45 and inlet pressures from 80% to 200% of nominal feed pressures to achieve the expanded Pc-MR excursions. Overall, the thruster can be shown to achieve 15,455 seconds of accumulated ON-time and a maximum continuous burn time of 6,000 s. The 111 N thruster can be shown to achieve its unprecedented performance and operating envelope through a novel micro-coaxial gas-gas injection scheme and an innovative regeneratively cooled combustion chamber, which uses the oxidizer as the working fluid. In addition, the fuel can provide cooling to the hydrazine reactor section of the thruster. Utilizing this combined oxidizer and fuel cooling, the 111 N thruster's propellants regenerate over 34 kW of thermal power. The thruster can be assembled with 4 major components: the single-piece additively manufactured body, the hydrazine injector, the hydrazine manifold, and a weld-on nozzle extension. The 111 N thruster can be shown to demonstrate performance capabilities and utilizes innovative design features unprecedented among engines in its class. In embodiments, the cumulative burn duration can be extended to 80,000 seconds and integrated throttle valves and a digital engine controller can be added to extend the utility of the 111 N thruster.

Nomenclature: Pc=chamber pressure [psi]; G=bed loading factor [kg/m2]; C*=Characteristic Velocity [m/s] or [ft/s]; $C_f$=nozzle thrust coefficient [–]; Isp=Instant Specific Impulse [s]: $\dot{m}$=Nozzle Mass Flow [kg/s] or [$lb_m$/s]; ηc*=Characteristic velocity efficiency [%]; ERE=Energy Release Efficiency [%].

The rapid rise of interest in space applications has precipitated the need for a new kind of in-space maneuvering thruster. The 111 N thruster can be shown to provide 111 N of thrust at nominal conditions, it can run on Hydrazine and Dinitrogen Tetroxide at mixture ratios between 0.8 and 1.44, and can be shown to achieve an Isp of up to 328 s. The engine can use metering valves for continuously variable thrust output between 25 and 166% throttle settings. With a nominal inlet pressure of 230 psi required to achieve 100% thrust, the 111 N thruster can be compatible with high mass fraction tank systems. In embodiments, the 111 N thruster can include a full-authority digital engine controller (FADEC) to provide data-rich telemetry closed loop control of the engine along with industry leading FDIR capability.

In embodiments, the 111 N thruster can be shown to achieve its remarkable performance and operating envelope by using a gas-gas injection scheme and innovative regeneratively cooled chamber using the oxidizer as its working fluid. In embodiments, the thruster can be assembled from 4 major components: the single piece printed body, the hydrazine injector, the hydrazine manifold, and a weld-on nozzle extension. This report discusses the design objectives and requirements for the Ill N thruster, detailed descriptions of its components, manufacturing and assembly processes, cold and hot flow testing procedures and results, and relevant analyses in the following sections. In embodiments, the 111 N thruster can leverage the data collected from various tests and associated analyses to evolve the design to cater to specific programs.

In embodiments, the thruster can be shown to demonstrate 60-s duration capability with high combustion performance. In embodiments, the thruster can be shown to have flight qualification capability with a continuous 6000-s duration test.

In embodiments, the thruster can be shown to demonstrate the performance and longevity of the hydrazine monopropellant reactor by firing the 111 N thruster for multiple 30-s durations.

In embodiments, the thruster can be shown to demonstrate the 111 N thruster high performance design with the capability to achieve 320 seconds of vacuum specific impulse ($I_{vac}$) with a flight design. Combustion performance can be evaluated using precision chamber pressure (Pc), thrust, and propellant flow measurements.

In embodiments, the thruster can be shown to demonstrate 111 N thruster steady state thermal operation at a 60-s duration burn at nominal inlet pressure conditions and an ambient pressure condition greater than 50.000 ft altitude.

In embodiments, the thruster can be shown to demonstrate the 111 N thruster functional operability over the specification inlet pressure range. This can be accomplished by an exploration of Pc and mixture ratio (MR) excursions by varying fuel and oxidizer inlet pressures independently and to extremes across the specified inlet pressure range. Any areas of unacceptable operation will be evaluated with multiple designs to find an optimum configuration.

In embodiments, the thruster can be shown to demonstrate throttling capability between 80%-100% nominal thrust level: Maintaining nominal MR, while the inlet pressures of the fuel and oxidizer can be reduced to demonstrate the desired throttling range.

In embodiments, the thruster can be shown to characterize 111 N thruster throttle response including limits of throttle response transients.

In embodiments, the thruster can be shown to demonstrate the ability to operate in a stable and functional manner during oxidizer depletion. In embodiments, the thruster can perform multiple oxidizer depletion scenarios, including transient helium gas ingestion, two phase transition, and straight depletion. Evaluate thermal response to depletion.

In embodiments, the thruster can be shown to demonstrate the operability and performance in monopropellant mode. In embodiments, the thruster can establish parameters for starting in monopropellant mode and transitioning to monopropellant mode from bipropellant mode. In embodiments, the thruster can establish performance for transient and steady state operations.

In embodiments, the thruster can be shown to demonstrate the ability to operate in a stable and functional manner with propellant inlet temperatures up to 150° F.

In embodiments, the thruster can be shown to demonstrate flight like qualification durations up to 6,000 seconds continuous on-time. These tests can be performed with a flight like propellant supply system using Coriolis flow meters for propellant flow measurement.

In embodiments, the 111 N thruster can be an integration of modular components evaluated and tested during the prototype phase of the thruster development. In embodiments, the thruster integration included a bolted-flange design between multiple components along with a variety of hot-gas sealing methods (polymer seals, metal crush washers, separate printed metal seals and in-place printed metal seals). On completion of individual and assembly-level assessment of different thruster components, the thruster design evolved to exclude the bolted-flange joint between the bipropellant injector and chamber. In embodiments, the bolted-flange joint on the hydrazine reactor section can be retained to allow the packing of the catalyst and the installation of the catalyst screen, the hydrazine floating injector, and the wave spring used to apply consistent catalyst bed-loading.

144 N Thruster

In embodiments, a 144 N thruster is a high performance. 25 lbf delta-v thruster for in-space maneuvering that achieves its high performance and expansive operating envelope by using a gas-gas injection scheme and an oxidizer regeneratively cooled chamber. The thruster is assembled from 4 major components: the single piece printed body, the hydrazine injector, the hydrazine manifold, and a weld-on nozzle extension. The 144 N thruster has been demonstrated to operate with hot propellants (up to 155° F.}, the regen cooling maintains chamber surface temperatures below 400° F., and propellants can be run through depletion because the engine is dual-mode capable. In some examples, the LE144 thruster from AGILE is an example of a 144 N thruster as described herein.

In an example, the 144 N thruster has specifications according to: Operating Propellants Hydrazine/fVION3: Steady State Vacuum Thrust 32.4-lbf (144N). Steady State Vacuum Specific Impulse 319 s, 322 s, 325 s; 0/F Ratio 0.85, 1.0, 1.24, respectively with reference to the specific impulse. Inlet Pressure 270-330 psia; Expansion Ratio 300:1; Mass 1.31 kg; Total On Time 5,000 s; Max Single Engine Burn Duration 3,000 s; Dimensions*6.25 in (Diameter)×12.3 in (Height). It will be appreciated in light of the disclosure that the 144 N thruster contains many ornamental features separate and distinct from the many functional features disclosed herein.

333 N Thruster

Figure 127:
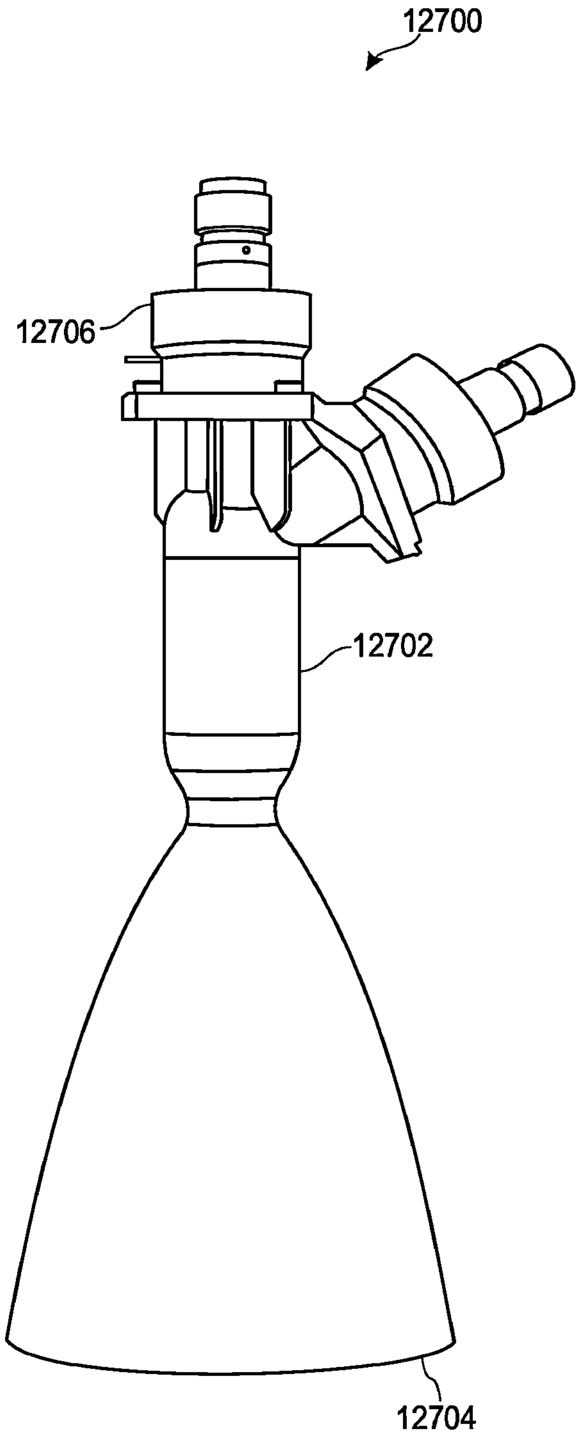

Referring now to FIG. 127, and with continued reference to FIGS. 1-126, a diagram illustrates still another bi-propellant thruster 12700 according to some embodiments of the present disclosure. In some embodiments, the bi-propellant thruster 12700 is a 333 N (75 lbf), MMH-MON3/MON25 bipropellant pulse mode attitude control thruster. Hereinafter, the bi-propellant thruster 12700 has been referred to as 333 N thruster 12700. In some examples, the DS350 thruster from AGILE is an example of a 333 N thruster as described herein. It will be appreciated in light of the disclosure that the 333 N thruster contains many ornamental features separate and distinct from the many functional features disclosed herein.

As shown, the 333 N thruster 12700 includes a propulsion chamber 12702. Further, the 333 N thruster 12700 includes a nozzle 12704 and a valve body 12706 as part of the propulsion chamber 12702. In the example provided, the propulsion chamber 12702 of the 333 N thruster 12700 has an overall height of about 13.32 inches and a height at the valve body 12706 of about 2.57 inches, and the propulsion chamber 12702 of the 333 N thruster 12700 has a width at the nozzle 12704 of about 4.63 inches. The 333 N thruster 12700 leverages additive manufacturing of refractory metal and boundary layer fuel film cooling to allow for embedded, scarfed, and long-life applications while maintaining a high specific impulse and low minimum impulse bit. The 333 N thruster 12700 further integrates high heritage valves into a low-mass envelope with extensible mounting, insulation, and mold-line integration options.

Table 16 below provides details of specifications of the 333 N thruster 12700.

TABLE 16

| 333N Thruster Specifications | |
|---|---|
| Throttling | Yes |
| Thrust | 350N (75 lbf) |
| Fuel | MMH |
| Oxidizer | MON3, MON25 |
| Inlet Pressures | 250 PSTA |
| O/F Ratio | 1.65 |
| Specific Impulse | 290 s |
| Chamber Pressure | 170 PSIA |
| Flow Rate | 117 g/s (44 g/s MMH and 73 g/s MON3) |
| Cycles/Life | 500 thermal cycles and 20000 total bums |
| Longest Single Burn Capability | 20000 s |
| Start and Shutdown Time | <20 ms |
| Total Mass | 2 kg |

445 N Thruster

Figure 128:
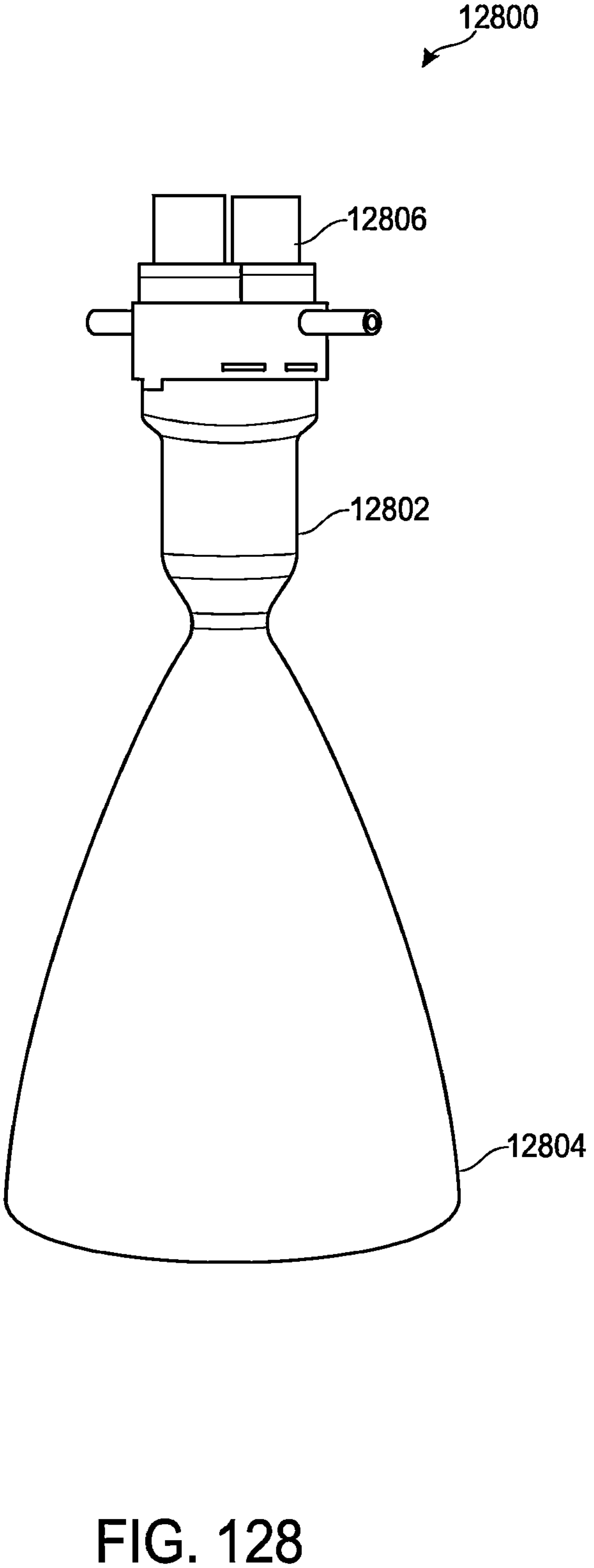

Referring now to FIG. 128, and with continued reference to FIGS. 1-127, a diagram illustrates still another bi-propellant thruster 12800 according to some embodiments of the present disclosure. In some embodiments, the bi-propellant thruster 12800 is a 445 N (100 lbf), MMH bipropellant thruster developed for spacecraft AV maneuvers. Hereinafter, the bi-propellant thruster 12800 has been referred to as 445 N thruster 12800. In some examples, the DS450 thruster from AGILE is an example of a 445 N thruster as described herein. It will be appreciated in light of the disclosure that the 445 N thruster contains many ornamental features separate and distinct from the many functional features disclosed herein.

As shown, the 445 N thruster 12800 includes a propulsion chamber 12802. Further, the 445 N thruster 12800 includes a nozzle 12804 and a valve body 12806 as part of the propulsion chamber 12802. In the example provided, the propulsion chamber 12802 of the 445 N thruster 12800 has an overall height of about 11.4 inches and a height at the valve body 12806 of about 1.2 inches, and the propulsion chamber 12802 of the 445 N thruster 12800 has a width at the nozzle 12804 of about 4.9 inches. The 445 N thruster 12800 additively manufactured design allows for a low-cost thruster that delivers high performance and extremely precise minimum impulse bits. The 445 N thruster 12800 is equipped with single-seat, fast-actuating valves which have a lifespan of at least 10,000 cycles. During testing in a heat-sink configuration for over 870 starts and 141 seconds of cumulative on-time, the 445 N thruster 12800 demonstrated high performance and combustion stability.

Table 17 below provides details of specifications of the 445 N thruster 12800.

TABLE 17

| 445N Thruster Specifications | |
|---|---|
| Throttling | Yes |
| Thrust | 450N (100 lbf) |
| Fuel | MMH |
| Oxidizer | MON3, MON25 |
| Inlet Pressures | 380 PSIA |
| O/F Ratio | 1.65 (equal volume) |
| Specific Impulse | >311 s |
| Chamber Pressure | 200 PSIA |
| Expansion Ratio | 100 |
| Minimum Impulse Bit | <10N-s |
| Cycles/Life | 7500 cycles |
| Longest Single Burn Capability | 500 s |
| Start and Shutdown Time | <20 ms |
| Total Mass | 1.5 kg |
| Flow Rate | 148 g/s (56 g/s MMH and 92 g/s MON25) |
| Electrical Interface | Flying Leads |

1110 N Thruster

In embodiments, a 1110 N (250 lbf) thruster includes radiation and film cooling, a refractory metal chamber/nozzle, and a single piece 3D printed chamber/nozzle made from Niobium alloy. In embodiments, the single-piece refractory metal chamber/nozzles may be similar to the chamber/nozzle used for 110 N lunar landing ACS thrusters described herein. In embodiments, the injector is fabricated using a high-resolution 3D printing process similar to those used for thrusters ranging from 7 lbf to 150 lbf. It will be appreciated in light of the disclosure that the 1110 N thruster contains many ornamental features separate and distinct from the many functional features disclosed herein.

The injector design improves the effectiveness of film-cooling and increases the effective combustion chamber characteristic length (L*) by using a concave injector face. The concave injector face absorbs and interrupts acoustic energy to limit or prevent high frequency combustion instability and expand the operating envelope of the thruster. The injector design allows for controlled ignition of hypergolic propellants as they are injected into the chamber, resulting in "soft starts." This "Soft-Start" technology results in fast, highly repeatable ignition transients and lower peak pressures in the combustion chamber, permitting reduced mass.

In embodiments where the 1110 N thruster is integrated with an LDACS, the thruster is capable of operating at a high O/F ratio because the high resolution additive manufacturing permits the even delivery of thin layers of film cooling to the chamber walls. The film-cooling technology protects chamber walls from oxidation during firing, allowing the radiatively cooled refractory metal chambers to operate at higher temperatures than typically allowable. For example, the 1110 N thruster alloys operate at up to 3000° F. and deliver high performance.

In embodiments, the additive manufacturing process includes the addition of dispersion hardening ceramic particles into the metal matrix, increasing strength and stiffness at high temperature. Based on final system mass requirements, the chamber, nozzle, and injector geometry may be printed in a single piece. Printing in a single piece reduces cost and time for manufacturing and simplifies integration.

In embodiments, the 1110 N class thruster uses a helium pilot-operated dual-propellant valve. In the example provided, the 1110 N class thruster utilizes a valve that has heritage from past exoatmospheric kill vehicles such that stock and availability of the valve for use in immediate development testing to reduce development and deployment risk. The valve has a fast-opening speed, meets the flow rate requirements, and additional units can be rapidly manufactured to support the delivery timeline.

Additively manufacturing the thruster results in low unit costs, reduces part count, eliminates fixed tooling, increases the "buy-to-fly" ratio, and accelerates manufacturing time. Table 18 below shows specifications of an example of a 1110 N class thruster.

TABLE 18

| 1110N Thruster Specifications | |
|---|---|
| Fuel/Oxidizer | Hydrazine/MON3 |
| Thrust | 250 lbf (1110N) |
| Isp | >310 s (steady-state $\epsilon$ = 23) |
| O/F Ratio | 1.40 |
| Min. Impulse Bit | 2.5 lbf-s (11N-s) |
| Impulse bit repeatability | ±5% |
| Feed Pressure | 350 psi |
| Chamber Pressure | 250 psi |

2000 N Throttling Engine

In embodiments, a 2000 N thrust throttling engine can run on monomethylhydrazine (MMH) and MON3 specifically designed for lunar landers. The engine has two latching solenoid valves to control startup and shutdown, and an electric actuator controls the position of the pintle sleeve to throttle the thrust level at continuous increments between 100% and 70% thrust. Dual-redundant pressure transducers can be installed on the combustion chamber to allow vehicle avionics to perform closed loop throttle control and engine health monitoring, making this thruster one of the smartest engines in its class and reducing mission risk. It will be appreciated in light of the disclosure that the 2000 N throttling engine contains many ornamental features separate and distinct from the many functional features disclosed herein.

In embodiments, the injector assembly consists of DMLS commercially pure nickel and titanium. These components bolt onto a printed nickel regeneratively cooled thrust chamber which can incorporate integrated mounting features for components like the valves and throttle sleeve actuator. The nozzle extension is 3D printed from titanium and welded to the nickel chamber.

In embodiments, the engine interface to the spacecraft is through ½ inch propellant inlet tubes made from Ti6-AI-4V. In these examples, the electrical interface can be a set of 14 conductors from the engine, comprising the motor power, motor encoder, two latch solenoid valves and two pressure transducers. These conductors can terminate at a 14 circuit D38999 male connector. Mechanical load can be transferred through the combustion chamber, and additive manufacturing can make it adaptable to any structural interface desired.

2224 N Thruster

Figure 129:
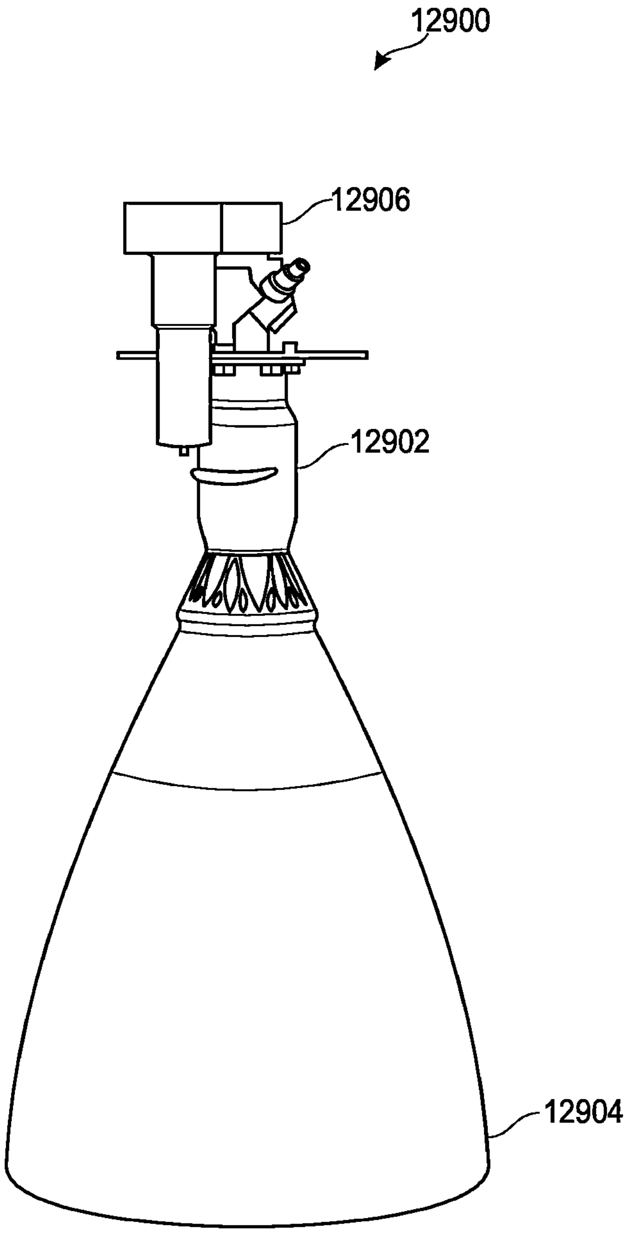

Referring now to FIG. 129, and with continued reference to FIGS. 1-128, a diagram illustrates still another bi-propellant thruster 12900 according to some embodiments of the present disclosure. In some embodiments, the bi-propellant thruster 12900 is a 2224 N (500 lbf), M20 bipropellant engine. Hereinafter, the bi-propellant thruster 12900 has been referred to as 2224 N thruster 12900. In some examples, the A2200 thruster from AGILE is an example of a 2224 N thruster as described herein. It will be appreciated in light of the disclosure that the 2224 N thruster contains many ornamental features separate and distinct from the many functional features disclosed herein.

As shown, the 2224 N thruster 12900 includes a propulsion chamber 12902. Further, the 2224 N thruster 12900 includes a nozzle 12904 and a valve body 12906 as part of the propulsion chamber 12902. In the example provided, the propulsion chamber 12902 of the 2224 N thruster 12900 has an overall height of about 250.7 inches and a height at the valve body 12906 of about 3.9 inches, and the propulsion chamber 12902 of the 2224 N thruster 12900 has a width at the nozzle 12904 of about 11.8 inches. The 2224 N thruster 12900 is designed to provide maximum performance for demanding space missions. The 2224 N thruster 12900 incorporates a pintle sleeve throttling mechanism for deep throttling which provides a smooth ride and fine spacecraft control. The 2224 N thruster 12900 is capable of throttling from 50% to 100% thrust in under 650 milliseconds.

Table 19 below provides details of specifications of the 2224 N thruster 12900.

TABLE 19

| 2224N Thruster Specifications | |
|---|---|
| Throttling | Yes |
| Thrust | 2224 ± 156N (500 ± 35 lbf) |
| Fuel | M20 |
| Oxidizer | MON3 |
| Inlet Pressures | 480 + 50/−10 PSIA (3309 ± 207 kPa) |
| O/F Ratio | 1.45 |
| Specific Impulse | ≥318 s |
| Chamber Pressure | 380 PSIA |
| Expansion Ratio | 160 |
| Throttling Range | 50-100% |
| Throttling Rate | Throttle between 0-100% within 3 s |
| Cycles/Life | 1000 s |
| Longest Single Burn Capability | 500 s |
| Start and Shutdown Time | 90% of steady state thrust in ≤650 ms |
| Peak Power | <200 W |
| Total Mass | ≤7 kg |
| Flow Rate | 0.29 kg/s (M20 and 0.42 g/s (MON3) at nominal O/F of 1.45 |
| Electrical Interface | Flying Leads |
| Mechanical Interface | 8 × ¼ inch fasteners |

A3100 Engine

An A3100 engine is a pulse mode main engine, built from niobium with an oxidizer centered face shutoff pintle injector and advanced multi-point film cooling to obtain excellent performance in both steady state and pulse mode. It will be appreciated in light of the disclosure that the A3100 contains many ornamental features separate and distinct from the many functional features disclosed herein.

4003 N Thruster

Figure 130:
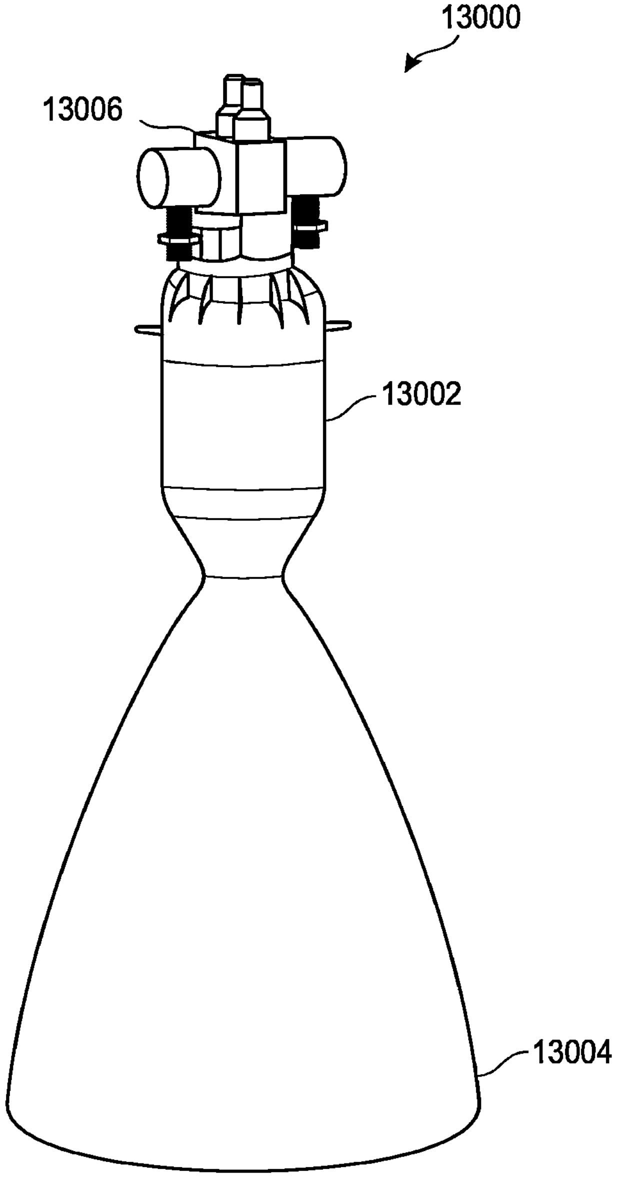

Referring now to FIG. 130, and with continued reference to FIGS. 1-129, a diagram illustrates still another bi-propellant thruster 13000 according to some embodiments of the present disclosure. In some embodiments, the bi-propellant thruster 13000 is a 4003 N (900 lbf) high-performance MMH bipropellant rocket engine. Hereinafter, the bi-propellant thruster 13000 has been referred to as 4003 N thruster 13000. In some examples, the DS4000 thruster from AGILE is an example of a 4003 N thruster as described herein. It will be appreciated in light of the disclosure that the 4003 N thruster contains many ornamental features separate and distinct from the many functional features disclosed herein.

As shown, the 4003 N thruster 13000 includes a propulsion chamber 13002. Further, the 4003 N thruster 13000 includes a nozzle 13004 and a valve body 13006 as part of the propulsion chamber 13002. In the example provided, the propulsion chamber 13002 of the 4003 N thruster 13000 has an overall height of about 25 inches, and the propulsion chamber 13002 of the 4003 N thruster 13000 has a width at the nozzle 13004 of about 13.1 inches. The 4003 N thruster 13000 is designed for in-space propulsion applications. The 4003 N thruster 13000 features an innovative injector design that promotes a wide range of stable operation and includes high-fidelity fuel mixture control for maximum life. The 4003 N thruster 13000 utilizes qualified and space-flown latching solenoid valves and is designed for a qualified life of 2,000 seconds and 5 starts.

Table 20 below provides details of specifications of the 4003 N thruster 13000.

TABLE 20

| 4003N Thruster Specifications | |
|---|---|
| Thrust | 4003N ± 5% (900 lbf) |
| Fuel | MMH |
| Oxidizer | MON3 |
| Inlet Pressures | 200-300 PSIA |
| O/F Ratio | 1.65 |
| Specific Impulse | 303 s |
| Chamber Pressure | 250 PSI (nominal) |
| Expansion Ratio | 40 |
| Cycles/Life | 2000 s |
| Longest Single Burn Capability | 400 s |
| Start and Shutdown Time | ~1.2 s |
| Total Mass | <9 kg |
| Electrical Interface | 2 × D38939-21YA35PN on engine |

Clustered Thrusters

The thrusters described herein may be combined into clustered thruster packs. For example, the thrusters may be clustered into tri-packs or four packs for ACS and axial engines.

Figure 131:
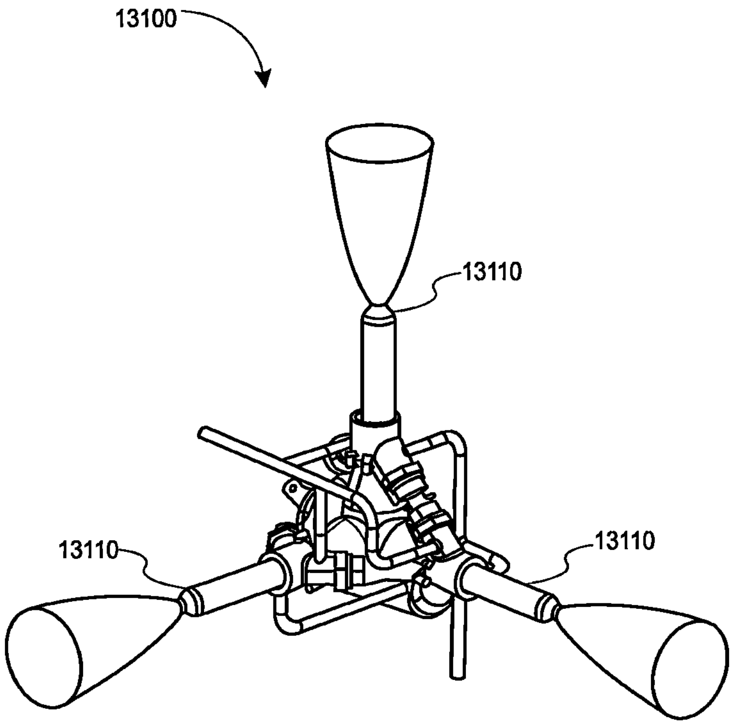

Referring now to FIG. 131, a thruster tri-pack 13100 is illustrated in accordance with some embodiments. In the example illustrated in FIG. 131, three 45 N thrusters 13110 are clustered into a tri-pack. For example, the 45 N thrusters 13110 may be oriented to each produce thrust along one of an x-axis, a y-axis, or a z-axis.

Figure 132:
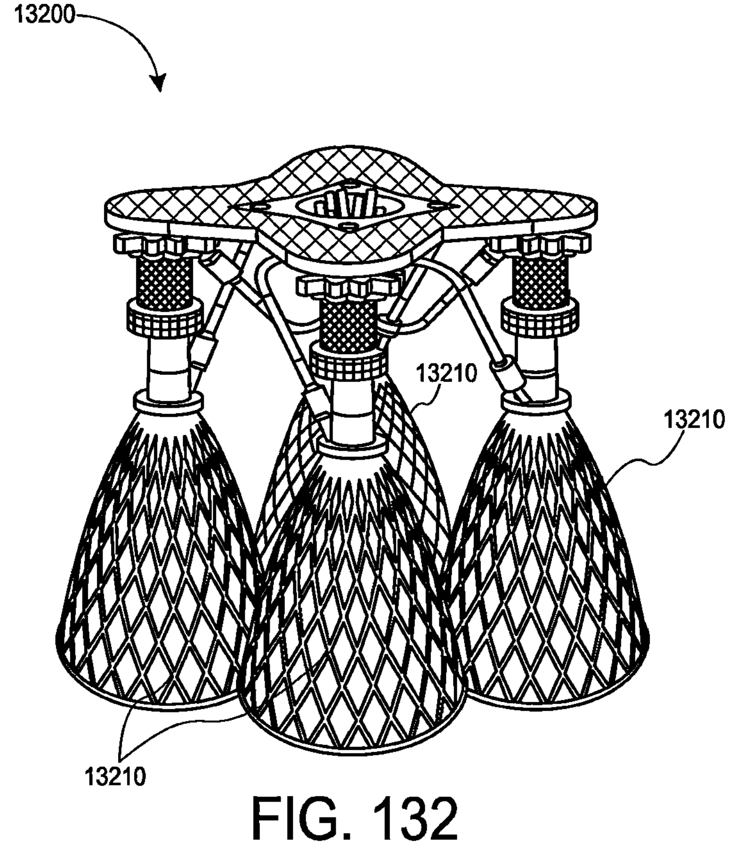

Referring now to FIG. 132, a thruster four pack 13200 is illustrated in accordance with some embodiments. In the example illustrated in FIG. 132, four 111 N thrusters 13210 are clustered into the thruster four pack 13200 to produce thrust along the same axis. In embodiments, other thrusters are clustered into tri-packs, four packs, and packs of other numbers of thrusters.

Mission Specific Designs

Sample Return Vehicle

It will be appreciated in light of the disclosure that small spacecraft can serve as cost-efficient sample return vehicles from small body planetary surfaces such as the moon, near-earth asteroids, and Martian moons. These vehicles can also be used in conjunction with human transport missions in a moon-to-mars exploration architecture, where small sample return capabilities can be used to evaluate landing sites. Small spacecraft missions will retain small budgets while supporting larger spacecraft masses. Their efficiency can enhance mission capabilities with higher mass propulsion systems that rapidly execute science missions. The thrusters disclosed herein can support a range of small spacecraft with increased volume and mass.

In embodiments, hypergolic thrusters can use MMH/MON25 propellants, which are capable of operation to −40° C. This temperature is significantly below existing chemical or EP propulsion systems, which enables small spacecraft to perform missions in challenging thermal environments without adding significant heater and power mass. Mission environments can include deep space, or extended time periods operating in shadowed regions of the moon or asteroids.

In embodiments, low-temperature hypergolic propulsion systems can be leveraged using MON25 to compress the timeline for planned small missions to the outer planets. Small spacecraft can have limited radiation shielding, and executing missions rapidly is vital to preserving sensor and processing capabilities. Such spacecraft have already demonstrated their ability to perform missions in cis-martian space. Investment in hypergolic propulsion systems for transfer stages and spacecraft can accelerate the ability to more effectively and efficiently utilize small spacecraft in deep space.

It will be appreciated in light of the disclosure that thrusters and propulsion systems do not have to be packaged together. For example, the MON25-line of thruster technologies disclosed herein can support dual-purposes (cislunar transfer stages and small spacecraft deep space propulsion) while providing advantageous mass fraction propulsion systems that are based on different technologies from multiple providers. Moreover, modularity and standardized interfaces can further enable more effective and efficient space vehicle architectures.

In embodiments, the chemical hypergolic propulsion systems for use in low-cost moon landers, geosynchronous spacecraft, and small spacecraft missions can support SST-001 and other high ΔV propulsion for small spacecrafts.

In embodiments, a Simple Sample Return (SSR) propulsion system can provide a containerized sample return capability from anywhere on the lunar surface, the SSR vehicle also functions as a 2.5 km/s dV transfer stage for small spacecraft or cubesats in 1 U-3 U range. The propulsion system can use low temperature propellants, making it ideal for small spacecraft operations in the cislunar environment.

When used as a sample return system, the design reference mission can return 130 g of sample from the Lunar South Pole in a cryogenically cooled vault to preserve volatiles for later study. Missions without the cooling system can return in excess of 500 g of sample material. After receiving samples from the lunar surface, the return system uses the 45N thruster to propel it on a low energy return trajectory. In embodiments, the return system executes a ballistic entry with ablative shielding followed by lithobraking for a cost-effective sample return mission.

It will be appreciated in light of the disclosure that in order to establish proliferation of contested orbits with highly maneuverable and on orbit reconfigurable constellations, a flexible, reconfigurable, and scalable means of providing ΔV can be required.

Moreover, the next decade of proliferating contested orbits could be underpinned by two key enabling propulsive platforms: an orbital transfer-stage and an advanced cubesat maneuvering module that are both modular, scalable, and on-orbit upgradable as well as reconfigurable and repurposable. These benefits are further extended by on-orbit refuel ability using heritage storable propellants and made more capable and resilient with additively manufactured thrusters with lower mass and part count in addition to increased performance capabilities (e.g.: the LE111 has exceeded many ISP performance targets by 10 seconds using ML-enhanced 3D-printed design features and made more robust with throttling and dual mode corporations through oxidizer-depletion).

It will be appreciated in light of the disclosure that increased maneuvering capability can be achieved with the implementation of strap-on chemical kick stages that can be rapidly procured and sized for mission needs. The adoption of flexible chemical kick/transfer stages can allow tailoring of a single qualified propulsion system to a variety of mission needs dependent on required ΔV and spacecraft mass. Emphasis on a common, stretchable propellant tank system, flexible quantity of He pressurant bottles with plug and play thruster adaptability allows a new vehicle for a new mission to be delivered in as little as six months. With a scalable ΔV per mission of up to 3500 m/s, this propulsion system can be a significant enabler of rapid deployment of spacecraft to unique orbits on a broader range of flight opportunities. In embodiments, the system can scale to accommodate payloads from 6 U CubeSats up to 180 kg payloads and beyond, which can enable multi-manifesting and ride-share opportunities that, in turn, can provide substantial mission cost savings in comparison to dedicated launch.

In embodiments, ΔV Cubestacks & Tankstacks are cubesat form factor propulsion systems and expandable propellant tank modules. Cubestacks & Tankstacks with on-orbit refuellable fill/drain valves (such as those from Orbit Fab) and room for other mission critical systems/sensors allow the flexibility for simple reconfigurations, with expansion ports to enable stacking to further increase range. Additive manufacturing allows for both rapid customization and fielding (e.g., in as little as 3 months). ΔV Stacks can be staged or strung together in serial or parallel orientations that are interchangeable/reconfigurable on-orbit by a servicer. Once tankstack modules have been depleted (or are nearing depletion) they can be jettisoned onto a deorbit trajectory or tugged/self-propelled to rendezvous with an orbital fuel depot such as those planned by Orbit Fab to enable high ΔV persistent maneuvering operations for extended duration missions from LEO to xGEO.

Cubestacks can incorporate high ΔV propulsion with increased maneuverability within a 6 U form factor. If an orbital fuel depot supply chain with servicers and stations in strategic orbits, persistent maneuver operations could be extended indefinitely as long as the supply of propellants is maintained. The smaller form factor of ΔV Cubestacks mitigates the quantities of propellants needed on-orbit and Tankstacks enable more efficient mission extension operations.

In embodiments, the propulsion systems and thrusters disclosed herein can be modularly configurable and compatible with a range of storable propellants that enable optimal maneuverability. Mon-25/MMH for Cislunar and xGEO can be used, with minimal power requirements for heating and conditioning resulting in smaller solar panels as well as a smaller target with a reduced heat signature. This deep space optimized bipropellant architecture better enables space basability and terrestrial polar basability due to super storable temperature ranges of both fuel and oxidizer.

Hydrazine/Mon-3 for optimal LEO-GEO performance the III newton thruster offers best in class performance and when clustered into a 4 pack axial orientation can replace a single point of failure 100-lbf heritage thruster with a more resilient maneuvering solution with the added robustness of dual-mode bi/mono-prop operation through oxidizer depletion.

Regenerative cooling features and throttling capabilities can further mitigate heat signature while increasing precision maneuverability.

In embodiments, extended basability with low-toxicity and stability/storability and improved energy density (50% total ΔV increase over hydrazine by volume) can be provided and enabled by low cost Iridium-lined Rhenium combustion chamber/nozzle manufacturing process and additively manufactured catalyst reactor and injector features. Component tests of Ir/Re designs optimizing performance can show that gains of 20 seconds specific impulse Isp over C103 are possible with Earth-storable propellants by eliminating the need for fuel-film cooling.

In embodiments, space vehicle and mission-optimizable thruster configurations range from ultra-low cost single engine with cold gas ACS, to axially paired divert module orientations for enhanced maneuverability.

Additional envisioned enabling innovations could include hybrid mode chemical/EP for VLEO by using a green monopropellant that allows for chemical and ion mode operation. Additional power could also be provided to the space vehicle through solid oxide fuel cells utilizing onboard storable chemical propellants to supplement or supplant solar panels for greater power: mass ratios while increasing the difficulty of detection. Energetic space storable propellants can be passively stored in space, within mission constraints, without active cooling or refrigeration; tests with liquid oxygen and hydrazine have produced an Isp of 350 seconds based on 200:1 area ratio nozzle.

3D-printed propulsive space vehicle payloads with thin-walled common bulkhead pressure-vessels with integrated propulsion system can enable mass fractions that allow lunar launch for 150 g payload delivery to Earth in 20 kg encapsulated form factor but are scalable and configurable for other applications.

It will be appreciated in light of the disclosure that orbits at unique altitudes and inclinations are particularly challenging for existing launch vehicle providers to meet. In addition to facilitating more effective and efficient rideshare and fielding to operational orbits, stretch stages and ΔV cubestacks can bridge today's capability gap for high LEO orbits less than 28 degrees inclination and between 60 degrees and polar orbits. The efficacy of launch vehicles can be increased by more efficient multi manifesting and rideshares enabled by flexible propulsive platforms that can be rapidly customized to spacecraft and the orbit it is being deployed to, which ultimately unlocks launch savings by decreasing the quantity of launch vehicles required to deploy various space vehicles.

In embodiments, a potential application of persistent maneuver capability is asset temporal displacement to avoid adversaries from learning orbital tracks of our space-based imaging assets. While one solution is to increase the amount of cameras/radar in orbit with distributed architectures, an alternate solution is to use a persistent maneuver to force orbital procession, and therefore overflight timing, degrading our adversaries' ability to conceal their activities.

With slightly retrograde extremely low polar orbits and a ΔV budget supporting very low orbits, precession rates greater than 4 min RAAN/day can be achieved. In extreme cases, "air steering" could be used for very large single orbit maneuvers by using solar arrays as "wrings" and generating lift from upper atmosphere interaction.

It will be appreciated in light of the disclosure that persistent maneuver can currently defeat most multi-orbit characterization schemas. Thruster firing during the known observation range of adversarial ground detection systems could complicate or thwart orbit characterization attempts. Regenerative cooling features provide the additional benefit of low thermal signature of high ΔV thrusters while firing.

It will be appreciated in light of the disclosure that increased on-orbit maneuvering can allow for greater assurance of hazard/threat avoidance. Furthermore, the low-cost, high maneuverability of Cubestacks also allows for quick tactical repurposing of a space-based asset as a pawn to be sacrificed to neutralize/eliminate an orbital threat, if proliferated on orbit such a constellation could provide an incognito layer of missile defense. Space-based sensor/shooters positioned in medium inclination Molniya-type orbits with the Argument of Perigee above the continental United States can be used both for defense services and strategic defense from (EMP/Ballistic Strike/Fractional Orbital Bombardment).

The addition of a strap-on propulsive kick stage can add to vehicle mass and may increase the moment of inertia and ability to achieve high slew rates or increase the required size of reaction wheels. Additional tankage volume for propellant can increase the potential for slosh of propellant residuals, which may add challenges to fine and/or rapid pointing control. This can be mitigated by having the propulsive kick stage separate from the spacecraft once the destination orbit has been reached and performing its own end of life disposal. Alternatively, the use of positive displacement propellant tanks can completely eliminate slosh issues. Use of hypergolic super-storable propellants has no anticipated storage or compatibility issues.

It will be appreciated in light of the disclosure that applying techniques from inertial navigation can help mitigate this difficulty, i.e., predicting a post-maneuver orbit using applied impulses and then refining it with ground based assets.

Sensor mesh networking and/or distributed telemetry and tracking command placed on constellations could allow for fewer, multipurpose ground stations and lower power and gain requirements on the spacecraft (with network analysis necessary to route commands).

With high maneuverability, rapidly deployed chemical propulsion solutions do add the challenge of increased launch mass. Today, launch costs are falling dramatically while spacecraft cost is not keeping pace. In embodiments, stretch stages are capable of replacing a spacecraft's integrated propulsion system with a common core propulsion architecture, reducing overall mission cost. Increased spacecraft mass is, in many cases, a good trade for increased mission performance, speed to operational orbit, and lifetime.

In embodiments, 22N and 100N Advanced Spacecraft Energetic Non-toxic Propellant (ASCENT) engines can provide improved performance over state of the art hydrazine systems. Critical technologies can improve preheat requirements, ignition delay, duty cycle, and thruster lifetime. More efficient injectors, igniters and thruster heater designs can balance power draw with the required propellant ignition temperature while meeting metrics of reduced propulsion system size, weight, and power relative to the same thrust class hydrazine engine for a given mission.

It will be appreciated in light of the disclosure that preheat energy, ignition response, and thruster lifetime can be improved through tailored thruster design and strategic use of spacecraft energy. ASCENT's critical temperature has been determined to be much lower than typically used preheat temperatures of 285-400 C for ignition. It will be appreciated in light of the disclosure that catalyst bed heater power draw is a primary driver of propulsion system total draw. In embodiments, preheating can enable the propellant when contacted with a hot catalyst to achieve a temperature where it readily decomposes. In embodiments, ignition delay can be accelerated by preheating the propellant and use of a catalyst engineered to transfer heat rapidly to the propellant.

In embodiments, injectors can be used to preheat propellant (within a safe temperature threshold to prevent thermal ignition) by using conventional external heaters or embedding cartridge heaters in the injector. In examples, the injector can be of a low dribble volume design appropriate for achieving minimum impulse bit. In embodiments, preheating the propellant will reduce viscosity and improve atomization and distribution.

In embodiments, injector elements can be made as small as 0.006" to further improve propellant atomization and reduce local bed loading to eliminate quenching in the induction zone (upper bed). A further advantage of having fine injector holes is the reduction in injector face maximum temperature because the "hot spots" between the elements will be relatively cooler.

In embodiments, granular and monolithic catalysts with high heat capacity and thermal conductivity (high thermal effusivity) can be used for transferring additional heat into the propellant. This contrasts with the most often used granular catalysts for ASCENT which are based on zirconium or hafnium oxides that have low thermal effusivities.

Previous attempts included thermal effusivity catalyst materials, a prechamber of copper or SiC foam for initial heating and decomposition, foam igniters, bundled iridium or platinum wires or tubes for ignition of the propellant. The shortcoming of these previous approaches is that foam, wires and tubes have a relatively small surface area for catalysis and heat transfer to the propellant. It will be appreciated in light of the disclosure that combining high thermal effusivity catalysts with good surface area and large volumetric filling factor combined with propellant preheating in the injector can be shown to provide improved ignition response times, quicker readiness to firing, lower total energy draw, better reliability, longer life, and increased ΔV.

In embodiments, 22N heavyweight molybdenum "TZM" alloy chambers can be used, transitioning to 22N flight weight iridium-lined rhenium chambers and ultimately to the WON thrust level.

Lunar Sample Return

Figure 133:
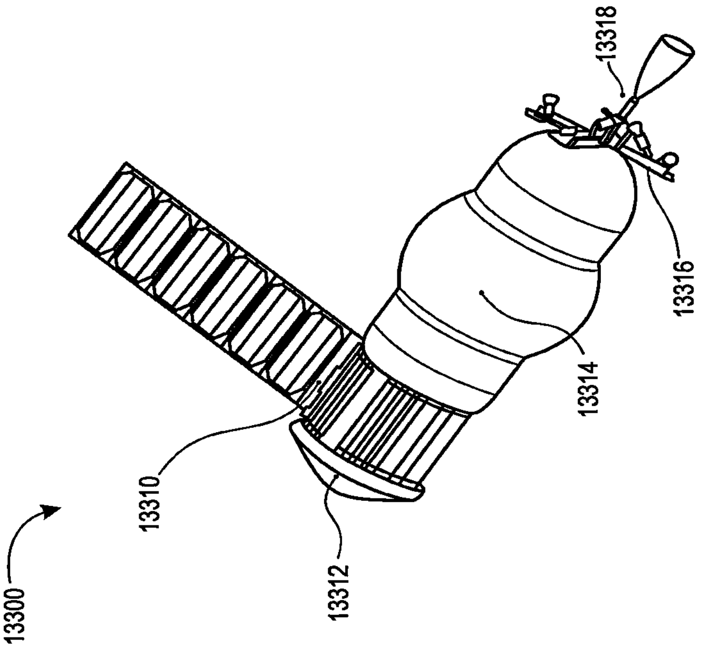

Referring now to FIG. 133, a lunar sample return vehicle 13300 is illustrated in accordance with some embodiments. In embodiments, a highly-integrated bipropellant propulsion system and separable return vehicle weighing less than 20 kg with a payload capability of 330 g of lunar material can enable lunar sample return capability as part of larger lunar missions and can fly back to earth from the lunar surface independent of the parent vehicle. This exemplary mission requires an excellent mass fraction with good performance at a small scale. In the example provided, the lunar sample return vehicle 13300 includes a power assembly 13310, a sample return capsule 13312, a monocoque tank 13314, four helium ACSs 13316, and a 45 N thruster 13318.

The mission begins by launching as a payload on a lunar landing mission. After a sample is provided to the vehicle by instruments on the lander (provided by third parties) the capsule is closed, and the vehicle is launched on command. The return vehicle lifts itself into lunar orbit before injecting itself into a weak-stability boundary return trajectory from the moon to earth. The vehicle is conceptualized to separate from its sample canister, which has an integrated heat shield, and the sample enters ballistically to be recovered from an appropriate location on the surface of the earth. In an example, the lunar sample return vehicle may travel a lunar return trajectory utilizing a weak-stability boundary transfer.

The design of this highly-integrated propulsion system can be shown to be extensible to a variety of future missions. Flown as a secondary payload on a Geostationary Transfer Orbit (GTO) mission, for example, a variant of this vehicle could enable sample return from a variety of Near Earth Objects (NEO) for scientific or commercial analysis. For a 40 kg small satellite, this system can provide 600 m/s of ΔV in a "bolt-on" configuration, only requiring a simple interface.

In embodiments, the exemplary design of the return vehicle consists of a sample return capsule 13312 and propulsion module. The propulsion module is based around an integrated multi-tank structure and contains the majority of the vehicle systems. The payload return capsule contains the sample canisters, the heat shield, and a heartbeat transceiver.

In these examples, the main structural component of the propulsion module is an additively manufactured (AM) monocoque tank structure 13314. This single part structure contains a double common-bulkhead pressure vessel containing MON25 oxidizer, helium pressurant, and monomethylhydrazine (MMH) fuel. The 3D printed pressure vessel monocoque structure also includes tubing runs for the fluids. The tubes connect tanks, printed-in-place manifold valve seats, and tube stubs for Ground Support Equipment (GSE) and the thruster(s). By integrating these tubes into the structure of the vehicle, further mass efficiencies can be realized while reducing integration time and complexity. These tanks and tubes encompass nearly the entirety of the vehicle fluidic system, supporting the Attitude Control System (ACS), fill and drain system, and the primary propulsion system.

As part of the AM monocoque structure, the design includes a concept for a first-of-its-kind tank-integrated Propellant Management Device (PMD). This device provides sufficient propellant for the vehicle to settle its tanks using the main propulsion system while doubling as a structural component.

In embodiments, secondary structures integrated into the aft end of the monocoque can be used for stiffening external propellant feed-tubes. In these examples, flight proven valves are installed into the ends of the printed tube studs to serve as the He gas ACS. The ACS consists of a set of thrusters oriented to obtain very precise 3-axis roll control with the valves able to deliver control pulses of less than 2 ms in duration. In examples, such valves can be supplied by the Lee company.

Figure 134:
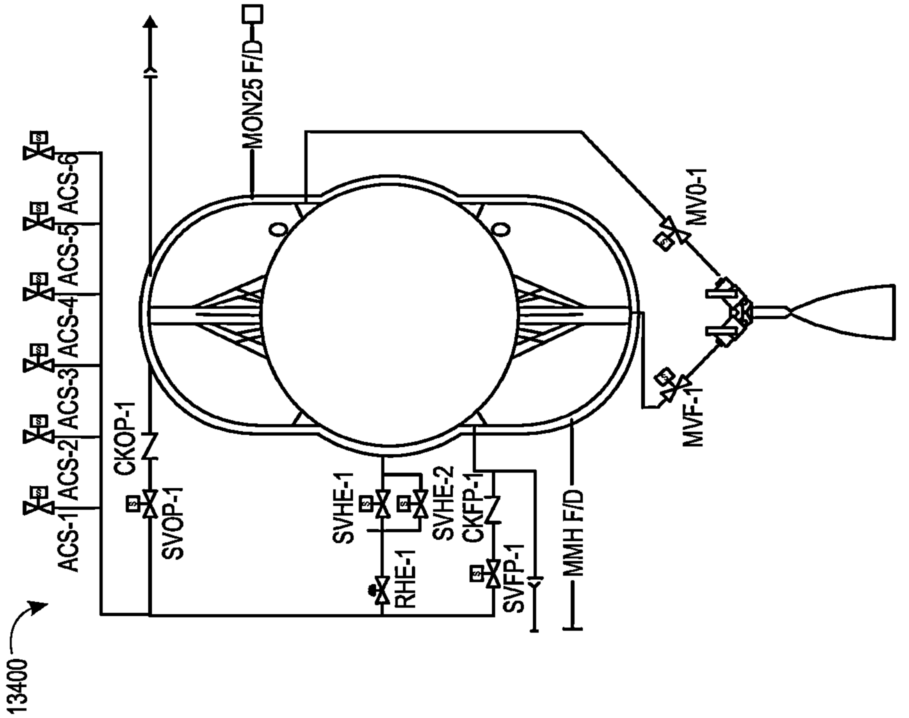

Referring now to FIG. 134, a Plumbing and Instrumentation Diagram (PID) 13400 for the exemplary return vehicle 13300 is illustrated in accordance with some embodiments.

In these examples, the strength characterization of the thinnest wall features that could be reliably reproduced can drive overall vehicle sizing with a mass optimized structure. The characterization of thin wall permeability confirmed that these very thin additively manufactured walls can create a solid material that does not have enough porosity to create a measurable leak. In these examples, a series of sub-scale AM-fabricated pressure vessels can show that the cyclic fatigue behavior of AM titanium pressure vessels to be comparable with wrought or machined titanium alloys.

In embodiments, the main bipropellant propulsion of the vehicle can be the 45 N thruster described above. For example, the propulsion may include a 45 N MON25/MMH thruster that also heavily leverages additive manufacturing. In these examples, this engine can be manufactured separately, then attached to the vehicle. In embodiments, an ultra-high resolution AM process is used to produce the injector, and a refractory metal AM process is used to create the niobium alloy chamber and nozzle. In embodiments, this nozzle extension can also be additively manufactured out of titanium before bonded to the chamber/nozzle.

Auxiliary Delta V

It will be appreciated in light of the disclosure that with the advancement of proliferated satellite constellations including layers of small satellites, there is an emerging need for increased on-orbit maneuvering capabilities to promote resiliency and space superiority in next generation space architectures by fully exploiting their inherent versatility. Enabling responsive operational deployment as well as persistent maneuverability in spacecraft once on-orbit requires propulsion solutions that are highly reliable, rapidly manufacturable, efficient, adaptable, and applicable to a range of space mission sets.

In embodiments, an auxiliary Delta-V Module (ΔVM), a high performance, bolt-on, chemical propulsion system can be rapidly scaled and fabricated for a diverse range of defense, civil, and commercial satellites. The ΔVM can maximize the cooperative maneuverability of satellites by improving their propulsive capabilities to achieve the goals stated above. ΔVM can be integrated prior to launch for satellites that have an identified need for persistent or responsive maneuvering. Long-term, this propulsion unit could be integrated to already deployed satellites to improve their maneuverability or Mission lifetime by use of an orbit servicing vehicle.

ΔVM can be scalable up to 2,000 kN-Sec of impulse and can provide auxiliary propulsion for payloads ranging from 6 U CubeSats through GEO-sized satellites. ΔVM can be baseline compatible with standard smalls at clamp bands and will leverage spacecraft avionics for telemetry and control. The system's high ΔV capabilities can enable on-orbit transfers throughout the LEO to xGEO regime and lower constellation costs through expanded launch opportunities on small launch vehicles or through rideshares on large launchers. ΔVM will be developed with long term reusability in mind by featuring a refuellable propulsion architecture. With ΔVM integrated across spacecraft, unique cross platform capabilities become available like formation flying to perform maneuvering of multiple spacecraft.

In embodiments, ΔVM can deliver highly capable and rapidly fieldable hardware. In embodiments, ΔVM can leverage thruster designs disclosed herein that across configurations have demonstrated Isp exceeding 330 s, precise minimum impulse bits of <0.2N-s, and have operated using propellant combinations including MMH/MON3, MMH/MON25, M20/MON3, and Hydrazine/MON3.

In embodiments, a 667 N main propulsion engine can run on MMH/MON3 propellants. In these examples, such systems can be configured for deployment on previously developed spacecraft. In embodiments, the engine can have two shutoff valves to control startup and shutdown, and an electric actuator controls the position of the pintle sleeve to throttle the thrust level at continuous increments between 100% and 70% thrust. Dual-redundant pressure transducers installed on the combustion chamber can allow vehicle avionics to perform closed loop throttle control and engine health monitoring, making it one of the smartest engines in its class and reducing mission risk.

In embodiments, the engine uses a monomethylhydrazine regenerative cooling circuit to achieve low thermal soakback and high combustion efficiencies with a feed pressure as low as 300 psia. The engine can be shown to meet the performance target of 320 seconds specific impulse with a length of 19 inches and can achieve an isp of 324 seconds with a length of 23 inches. Regenerative cooling can be used to an expansion ratio of ~25 before transitioning to a radiatively cooled nozzle extension. The baseline thruster can meet the performance target with an equal volume of fuel and oxidizer but increases in O/F ratio can improve specific impulse and vehicle mass fraction. Increases in inlet pressure will allow a reduction of thruster mass and small increases in specific impulse.

In embodiments, the engine looks to incorporate additive manufacturing for the injector, nozzle, and chamber to reduce mass and tooling costs while accelerating lead times. Additive manufacturing of the regenerative cooling chamber can allow for lightweight, efficient, and quick to prototype chamber designs not previously possible. Copper is not compatible with storable hypergolic propellants such as monomethylhydrazine and MON3. In these examples, nickel is additively manufactured and used for regeneratively cooled propellant thrusters. The engine can operate with propellant temperatures as low as −40° C. and perform long duration burns, making it ideal for the deep space and multi-mission applications such as those of Peregrine-B.

An exemplary 667 N engine has thrust of 667 N, MMH/MON-3 propellant compatibility, 1.6 equal volume mixture ratio, >320 seconds specific impulse, throttling from 70-100%, 300 psia inlet pressure, 0.875 kg/L MMII density, and 1.4 kg/L MON3 density.

In embodiments, smooth throttling can limit the shock and vibration environment during engine operations for hosted payloads. In embodiments, mass efficiencies can be used to improve hosted payload capacity and spacecraft impulsive capabilities. In embodiments, regenerative cooling can unlock long duration engine burns for advanced maneuvering. In embodiments, superior performance can be used to provide high Isp that enables diverse mission functions across the space domain.

In embodiments, a hypergolic test facility can acquire simultaneous test data at sample rates of up to 500,000 times per second per channel, and propellant flow measurements resolved to as low as 0.15 μL. In these examples, the data acquisition system and analysis techniques can measure total and specific impulse of thrust events that are only a few milliseconds long. The combination of high-speed data acquisition and refined analysis methods results in accurate and precise per-pulse performance characterization.

CubeSat

In embodiments, system delta V and final acceleration performance increase as a function of tank size and thrust levels. In an example, the thrust level was selected to match the availability of existing propellant valves. For example, the design for a CubeSat propulsion has 40N of thrust (limited by currently available valves), 700 m/s of ΔV, and 1.25 Gs of acceleration, considerably higher than a traditional CubeSat with Electric Propulsion.

In embodiments, sample part evaluation includes evaluation criteria such as flow resistance, injector stream quality, quantitative flow distribution and mixing, permeability, dimensional accuracy, and repeatability of material properties and geometric features. After-print heat and chemical treatments can be applied as required. Process quality control, in-situ monitoring, and process scalability to production will be tracked. In doing so, there can be an evaluation of the thin wall porosity of all parts and significantly, pressure vessels.

In embodiments, an innovative test fixture (using "pucks" and helium gas) to allow permeability evaluation. Several test pucks can be produced during our AM process evaluation to quantify porosity. The sample consists of a small puck, with an integral helium cavity and several test sections. The central cavity can be supplied with helium at high pressure (300-900 psi is standard, depending on the desired test data). Using a helium sniffer, a port hole at the bottom of the test puck can be analyzed to determine the leak rate. This provides a quantitative value for the leak rate of the helium. By varying the thickness of the walls and the orientation of the sample during the printing process, a wide variety of test data on the helium permeability of thin wall features can be obtained inexpensively. This data will be used to anchor material properties and design requirements.

In an example, the dimension of standard 6 U CubeSat volume sets the design parameter for the thrusters. Derived dimensional requirements limit the propulsion system to 300×120 mm diameter cruciform. In embodiments, a spheroid combustion chamber design can meet those limitations with a large Volume and short length compared to a typical cylindrical chamber, maximizing the characteristic length (L*) of the thruster. The shape has low surface area to volume ratio that can minimize heat flux in the chamber.

The unitary thruster produces 40 N of thrust. The bipropellants offer high density impulse. MON-3 was selected because of a combination of corrosion inhibition and low vapor pressure makes it suitable for long-term storage and regenerative cooling efficiency. The thruster cooling jacket can use liquid MON-3 oxidizer for cooling. The cooled thruster can require less film cooling, which can enable a more optimal propellant mixture ratio in the primary flow and higher Isp performance. Preheating the oxidizer in the cooling channels improves mixing efficiency. In embodiments, the cooling channel design baselines Cobalt-Chromium (CoCr) alloy for manufacturing, and eliminates costly alloys of Niobium, Molybdenum, or Carbon-Sic composites, which are also fragile. The low external temperature of the thruster reduces thermal soak back into the structure enabling packaging in a smaller volume and minimizing or eliminating insulation. In embodiments, the selection of CoCr alloy as a baseline material can be due to operational capability of up to 2000° F., its high compatibility with the propellants, a demonstrated capability for printing the ultra-high-resolution features required for fine atomization and mixing of propellants and is suitable for printing thin walls for regen cooling.

In embodiments, the baseline propellant flow rates and pressures can be supported by a design of thirty-six (36) 0.007-inch diameter injection elements. The physical layout of the injection elements in the chamber can be based on even propellant distribution to maximize combustion efficiency (C*). Such a design can result in higher tank and chamber pressure and a larger pressure drop in the cooling channels than in a larger system, but this is manageable in the manifolding. The layout can be adjusted during the design cycle to optimize for propellant manifold and regen circuit layout, pressure drop, and combustion stability margin.

In embodiments, the thrust module includes four propulsion unit thrusters and can be a heavy weight design with the critical characteristics of the flight unit but without the focus of minimizing weight.

In embodiments, the altitude nozzle extensions can complete the flight-like propulsion module. The nozzle extension can make the dimension of the thrust module to be 12 mm (roughly 4.7 inches) as measured from nozzle exit to opposite nozzle exit. The addition of a flight-like nozzle extends the thruster 5:1 area ratio nozzle expansion to a 27:1 area ratio flight nozzle. Flight-like can mean that the final form of the combustion devices (the propellant manifold, injector, chamber, regen circuit, nozzle), and overall weight for the flight prototype is in a near final configuration to what can be integrated into a complete propulsion system. In embodiments, the thruster module with structure, tanks, system and valves can form a complete propulsion system.

Figure 135:
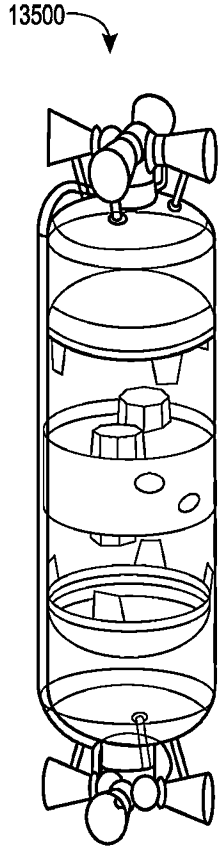

Referring now to FIG. 135, a 3 U size propulsion system 13500 for a CubeSat is illustrated in a cutaway view in accordance with the teachings of the present disclosure. In the example provided, the 3 U size propulsion system 13500 is 300 mm long and 120 mm wide.

Two cruciform propulsion modules 13510 at either end of the tank provide pitch and yaw control and divert capability. Roll control is performed with 4× helium cold-gas thrusters as illustrated. In embodiments, a piston-based expulsion system 13512 is used for the propellant because it offers an extendable range architecture and the best value for the demonstration mission.

The piston positive displacement expulsion can be shown to suffer no issues from propellant slosh during high acceleration maneuvers, is capable of long-term storage, and does not require complicated fabrication techniques to assemble. In these examples, robust PTFE seals provide fast, leak free movement.

Figure 136:
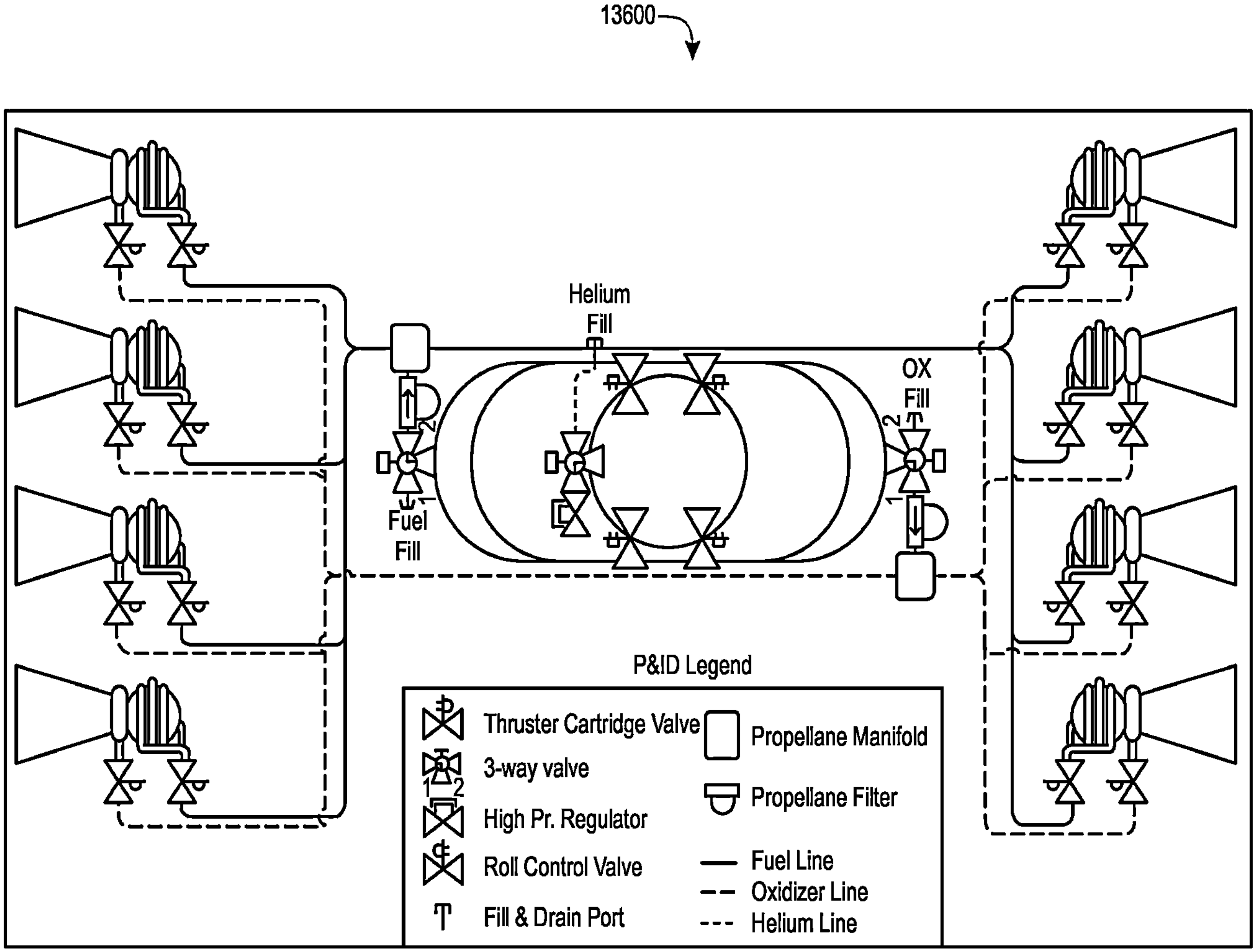

Referring now to FIG. 136, a plumbing and instrumentation diagram 13600 for a CubeSat vehicle is illustrated in accordance with some embodiments. In embodiments, the propulsion system uses 16 individual propellant cartridge valves, 2 per thruster, and 4 helium valves. In embodiments, Additive Manufacturing (AM) process can demonstrate low cost, rapid development methodologies that will ultimately produce high performing propulsion systems and components for flight applications.

Based on requirements. Aluminum, Nickel, Titanium, Inconel 718, 17-4 Stainless Steel, Cobalt Chromium, and Niobium alloys are relevant. In these examples, each test bed element was designed to have a unique geometry based on a fixed vertical element height of 0.125 inch, a diameter measured in thousandths of an inch, and an angle measured in degrees. The diameters ranged from 0.008 inch to 0.020 inch and angles ranged from 20° to 50°. LD(Ratio) elements utilized a fixed 0.012 inch diameter orifice at an angle of 30°, while the element length was determined by the length: diameter (L/D) ratio. These ratios ranged from 6 to 14. Angle elements utilized a fixed 0.010 inch diameter and 0.100 inch length orifice at a given angle measured in degrees. These angles ranged from 10° to 60°. Wall thickness was a fixed 0.010 inch diameter orifice at an angle of 30° and a length of 0.150 inch. Wall thicknesses ranged from 0.010 inch to 0.030 inch. Several orifice elements were duplicated on the test bed to determine printing repeatability.

Concurrently with feature and properties assessments, steps may be taken to explore the process and material development goals. Materials property labs may be used to conduct analyses to determine the mechanical properties of the 3D printed materials' dependencies on parameters such as wall thickness and orthogonality of features relative to the axis of printing. Key measured properties may include porosity, dimensional stability, and fatigue and yield strength. Water flow evaluation was conducted to determine the effect of the aforementioned parameters on the flow coefficient where gaseous and fluid flow will be present.

In order to use additive manufacturing techniques to produce pressure vessels, prototypes may be designed and evaluated for leaks. In order to evaluate new suppliers, materials and processes, it is desirable, in embodiments, to evaluate the yield and fatigue properties and gas-tightness of a vendor's processes without needing to procure full size units of the design in question. In embodiments, a design and process allow for the quantitative evaluation of the leak rate of a pressure vessel as a material test sample.

The additive manufacturing process typically involves a metal powder which is sintered together. This process can result in defects which have significant gas leakage. While spot defects will be caught at a component level during acceptance testing, design or process defects can be caught earlier if an appropriate test method is developed.

In these examples, quantifying the leak rate of additively manufactured pressure vessels so a process has been developed to allow characterization of such suppliers.

In embodiments, the process for testing pucks for leakage consists of two parts, the sample and the test procedure. The sample consists of a small puck, with an integral helium cavity and several test sections.

The central cavity can be supplied with helium at high pressure (300-900 psi is standard, depending on the desired test data). Using a mass spectrometer type helium sniffer, the port hole at the bottom of the test section can be analyzed to determine the leak rate. This can provide a quantitative value for the leak rate of the helium. By varying the thickness of the walls in the test section, and the orientation of the sample during the printing process, a wide variety of test data on the helium permeability of thin wall features can be obtained relatively inexpensively.

After determining the leak rate of helium, the pressure can be increased until the walls of the test sections burst. When a wall bursts, helium flow through the sniffing orifice will choke, allowing the remaining walls to burst as well. This value can then be compared to analysis predictions done on the as-designed model geometry to validate structural properties.

In embodiments, the design of propulsion systems incorporates several thin walls and small features which requires a thorough assessment of material properties with regards to the implementation of the chosen material when fabricated using additive manufacturing. Multiple sub-scale test samples were designed to accomplish this objective by targeting different material and pressure vessel properties.

Stress corrosion testing was conducted on the fracture coupon as per the MSFC-STD-3029-A standard. The test is performed at three levels of strain when the sample is exposed to three different environments; Air, a 3.5% NaCl solution, and Methyl Alcohol. The strain on the test article is applied using a mounting structure.

The vehicle architectures of spacecraft propellant tanks are sensitive to the minimum printing gauge achievable and conventional Direct Metal Laser Sintering (DMLS) technology is currently capable of achieving features of 0.381 mm (0.015 in) thickness. In embodiments, pressure vessel samples with wall thicknesses of 0.381 mm (0.015 in) and 0.254 mm (0.010 in) are fabricated for assessment. They are initially hydrostatic-pressure tested with water and are then pressure cycled 1000 times at a pressure of 4.1 MPa (600 psi). Qualitatively, the sub-scale pressure vessels did not show any plastic deformation or strain hardening. Quantitatively, average change in medium volume per cycle of 9.2×10-5 cc and 2.2×10-5 cc is observed with a wall thickness of 0.381 mm and 0.254 mm, respectively. Thin Wall Pressure Vessel studies and results from Phase I material testing of 3D-printed grade 5 Titanium.

Similar to the porosity testing, this innovation provides a method of producing complex spacecraft with low integration overhead, and excellent structural mass fractions. These tanks are produced using an additive manufacturing process using Titanium or other suitable metal alloys. They contain the necessary mating features to adapt to a payload, launch vehicle, and other components as may be required to complete the vehicle.

In embodiments, the design and analysis of an AM based propulsion system, including all the relevant features of a propulsion system is performed on a single assembled component. This includes, tanks, stiffening structures, valve and regulator manifolds, propellant management devices, fluid lines, and mounting hardpoints for avionics and payloads, and a common-bulkhead satellite tank system with a helium pressurization system. The design elements were then merged into a single component and analyzed to improve their manufacturability via additive manufacturing processes. The resulting design is unprecedented in its completeness as a satellite propulsion component in a single part.

CONCLUSION

The background description is presented simply for context, and is not necessarily-well-understood, routine, or conventional. Further, the background description is not an admission of what does or does not qualify as prior art. In fact, some or all of the background description may be work attributable to the named inventors that is otherwise unknown in the art.

Physical (such as spatial and/or electrical) and functional relationships between elements (for example, between modules, circuit elements, semiconductor layers, etc.) are described using various terms. Unless explicitly described as being "direct," when a relationship between first and second elements is described, that relationship encompasses both (i) a direct relationship where no other intervening elements are present between the first and second elements and (ii) an indirect relationship where one or more intervening elements are present between the first and second elements.

Example relationship terms include "adjoining," "transmitting," "receiving," "connected," "engaged." "coupled," "adjacent," "next to," "on top of," "above," "below," "abutting," and "disposed."

The detailed description includes specific examples for illustration only, and not to limit the disclosure or its applicability. The examples are not intended to be an exhaustive list, but instead simply demonstrate possession by the inventors of the full scope of the currently presented and envisioned future claims. Variations, combinations, and equivalents of the examples are within the scope of the disclosure.

No language in the specification should be construed as indicating that any non-claimed element is essential or critical to the practice of the disclosure.

The term "exemplary" simply means "example" and does not indicate a best or preferred example.

The term "set" does not necessarily exclude the empty set—in other words, in some circumstances a "set" may have zero elements. The term "non-empty set" may be used to indicate exclusion of the empty set—that is, a non-empty set must have one or more elements.

The term 'subset' does not necessarily require a proper subset. In other words, a "subset" of a first set may be coextensive with (equal to) the first set. Further, the term "subset" does not necessarily exclude the empty set—in some circumstances a "subset" may have zero elements.

The phrase "at least one of A, B, and C" should be construed to mean a logical (A OR B OR C), using a non-exclusive logical OR, and should not be construed to mean "at least one of A, at least one of B, and at least one of C."

The use of the terms "a," "an," "the," and similar referents in the context of describing the disclosure and claims encompasses both the singular and the plural, unless contradicted explicitly or by context.

Unless otherwise specified, the terms "comprising," "having," "with," "including," and "containing," and their variants, are open-ended terms, meaning "including, but not limited to."

Each publication referenced in this disclosure, including foreign and domestic patent applications and patents, is hereby incorporated by reference in its entirety.

Although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of multiple embodiments remain within the scope of this disclosure.

One or more elements (for example, steps within a method, instructions, actions, or operations) may be executed in a different order (and/or concurrently) without altering the principles of the present disclosure.

Unless technically infeasible, elements described as being in series may be implemented partially or fully in parallel. Similarly, unless technically infeasible, elements described as being in parallel may be implemented partially or fully in series.

While the disclosure describes structures corresponding to claimed elements, those elements do not necessarily invoke a means plus function interpretation unless they explicitly use the signifier "means for."

While the drawings divide elements of the disclosure into different functional blocks or action blocks, these divisions are for illustration only. According to the principles of the present disclosure, functionality can be combined in other ways such that some or all functionality from multiple separately-depicted blocks can be implemented in a single functional block; similarly, functionality depicted in a single block may be separated into multiple blocks.

Unless explicitly stated as mutually exclusive, features depicted in different drawings can be combined consistent with the principles of the present disclosure.

In the drawings, reference numbers may be reused to identify identical elements or may simply identify elements that implement similar functionality.

Numbering or other labeling of instructions or method steps is done for convenient reference, not to indicate a fixed order.

In the drawings, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. As just one example, for information sent from element A to element B, element B may send requests and/or acknowledgements to element A.

Unless otherwise indicated, recitations of ranges of values are merely intended to serve as a shorthand way of referring individually to each separate value falling within the range, and each separate value is hereby incorporated into the specification as if it were individually recited.

Special-Purpose System

A special-purpose system includes hardware and/or software and may be described in terms of an apparatus, a method, or a computer-readable medium. In various embodiments, functionality may be apportioned differently between software and hardware. For example, some functionality may be implemented by hardware in one embodiment and by software in another embodiment. Further, software may be encoded by hardware structures, and hardware may be defined by software, such as in software-defined networking or software-defined radio.

In this application, including the claims, the term module refers to a special-purpose system. The module may be implemented by one or more special-purpose systems. The one or more special-purpose systems may also implement some or all of the other modules.

In this application, including the claims, the term module may be replaced with the terms controller or circuit.

In this application, including the claims, the term platform refers to one or more modules that offer a set of functions.

In this application, including the claims, the term system may be used interchangeably with module or with the term special-purpose system.

The special-purpose system may be directed or controlled by an operator. The special-purpose system may be hosted by one or more of assets owned by the operator, assets leased by the operator, and third-party assets. The assets may be referred to as a private, community, or hybrid cloud computing network or cloud computing environment.

For example, the special-purpose system may be partially or fully hosted by a third party offering software as a service (SaaS), platform as a service (PaaS), and/or infrastructure as a service (IaaS).

The special-purpose system may be implemented using agile development and operations (DevOps) principles. In embodiments, some or all of the special-purpose system may be implemented in a multiple-environment architecture. For example, the multiple environments may include one or more production environments, one or more integration environments, one or more development environments, etc.

Device Examples

A special-purpose system may be partially or fully implemented using or by a mobile device. Examples of mobile devices include navigation devices, cell phones, smart phones, mobile phones, mobile personal digital assistants, palmtops, netbooks, pagers, electronic book readers, tablets, music players, etc.

A special-purpose system may be partially or fully implemented using or by a network device. Examples of network devices include switches, routers, firewalls, gateways, hubs, base stations, access points, repeaters, head-ends, user equipment, cell sites, antennas, towers, etc.

A special-purpose system may be partially or fully implemented using a computer having a variety of form factors and other characteristics. For example, the computer may be characterized as a personal computer, as a server, etc. The computer may be portable, as in the case of a laptop, netbook, etc. The computer may or may not have any output device, such as a monitor, line printer, liquid crystal display (LCD), light emitting diodes (LEDs), etc. The computer may or may not have any input device, such as a keyboard, mouse, touchpad, trackpad, computer vision system, barcode scanner, button array, etc. The computer may run a general-purpose operating system, such as the WINDOWS operating system from Microsoft Corporation, the MACOS operating system from Apple, Inc., or a variant of the LINUX operating system.

Examples of servers include a file server, punt server, domain server, internet server, intranet server, cloud server, infrastructure-as-a-service server, platform-as-a-service server, web server, secondary server, host server, distributed server, failover server, and backup server.

Hardware

The term hardware encompasses components such as processing hardware, storage hardware, networking hardware, and other general-purpose and special-purpose components. Note that these are not mutually-exclusive categories. For example, processing hardware may integrate storage hardware and vice versa Examples of a component are integrated circuits (ICs), application specific integrated circuit (ASICs), digital circuit elements, analog circuit elements, combinational logic circuits, gate arrays such as field programmable gate arrays (FPGAs), digital signal processors (DSPs), complex programmable logic devices (CPLDs), etc.

Multiple components of the hardware may be integrated, such as on a single die, in a single package, or on a single printed circuit board or logic board. For example, multiple components of the hardware may be implemented as a system-on-chip. A component, or a set of integrated components, may be referred to as a chip, chipset, chiplet, or chip stack.

Examples of a system-on-chip include a radio frequency (RF) system-on-chip, an artificial intelligence (AI) system-on-chip, a video processing system-on-chip, an organ-on-chip, a quantum algorithm system-on-chip, etc.

The hardware may integrate and/or receive signals from sensors. The sensors may allow observation and measurement of conditions including temperature, pressure, wear, light, humidity, deformation, expansion, contraction, deflection, bending, stress, strain, load-bearing, shrinkage, power, energy, mass, location, temperature, humidity, pressure, viscosity, liquid flow, chemical/gas presence, sound, and air quality. A sensor may include image and/or video capture in visible and/or non-visible (such as thermal) wavelengths, such as a charge-coupled device (CCD) or complementary metal-oxide semiconductor (CMOS) sensor.

Processing Hardware

Examples of processing hardware include a central processing unit (CPU), a graphics processing unit (GPU), an approximate computing processor, a quantum computing processor, a parallel computing processor, a neural network processor, a signal processor, a digital processor, a data processor, an embedded processor, a microprocessor, and a co-processor. The co-processor may provide additional processing functions and/or optimizations, such as for speed or power consumption. Examples of a co-processor include a math co-processor, a graphics co-processor, a communication co-processor, a video co-processor, and an artificial intelligence (AI) co processor.

Processor Architecture

The processor may enable execution of multiple threads. These multiple threads may correspond to different programs. In various embodiments, a single program may be implemented as multiple threads by the programmer or may be decomposed into multiple threads by the processing hardware. The threads may be executed simultaneously to enhance the performance of the processor and to facilitate simultaneous operations of the application.

A processor may be implemented as a packaged semiconductor die. The die includes one or more processing cores and may include additional functional blocks, such as cache. In various embodiments, the processor may be implemented by multiple dies, which may be combined in a single package or packaged separately.

Networking Hardware

The networking hardware may include one or more interface circuits. In some examples, the interface circuit(s) may implement wired or wireless interfaces that connect, directly or indirectly, to one or more networks. Examples of networks include a cellular network, a local area network (LAN), a wireless personal area network (WPAN), a metropolitan area network (MAN), and/or a wide area network (WAN). The networks may include one or more of point-to-point and mesh technologies. Data transmitted or received by the networking components may traverse the same or different networks. Networks may be connected to each other over a WAN or point-to-point leased lines using technologies such as Multiprotocol Label Switching (MPLS) and virtual private networks (VPNs).

Examples of cellular networks include GSM, GPRS, 3G, 4G, 5G, LTE, and EVDO. The cellular network may be implemented using frequency division multiple access (FDMA) network or code division multiple access (CDMA) network.

Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard).

Examples of a WPAN include IEEE Standard 802.15.4, including the ZIGBEE standard from the ZigBee Alliance. Further examples of a WPAN include the BLUETOOTH wireless networking standard, including Core Specification versions 3.0, 4.0, 4.1, 4.2, 5.0, and 5.1 from the Bluetooth Special Interest Group (SIG).

A WAN may also be referred to as a distributed communications system (DCS). One example of a WAN is the internet.

Storage Hardware

Storage hardware is or includes a computer-readable medium. The term computer-readable medium, as used in this disclosure, encompasses both nonvolatile storage and volatile storage, such as dynamic random access memory (DRAM). The term computer-readable medium only excludes transitory electrical or electromagnetic signals propagating through a medium (such as on a carrier wave). A computer-readable medium in this disclosure is therefore non-transitory, and may also be considered to be tangible.

EXAMPLES

Examples of storage implemented by the storage hardware include a database (such as a relational database or a NoSQL database), a data store, a data lake, a column store, a data warehouse Example of storage hardware include nonvolatile memory devices, volatile memory devices, magnetic storage media, a storage area network (SAN), network-attached storage (NAS), optical storage media, printed media (such as bar codes and magnetic ink), and paper media (such as punch cards and paper tape). The storage hardware may include cache memory, which may be collocated with or integrated with processing hardware.

Storage hardware may have read-only, write-once, or read/write properties. Storage hardware may be random access or sequential access. Storage hardware may be location-addressable, file-addressable, and/or content-addressable.

Example of nonvolatile memory devices include flash memory (including NAND and NOR technologies), solid state drives (SSDs), an erasable programmable read-only memory device such as an electrically erasable programmable read-only memory (EEPROM) device, and a mask read-only memory device (ROM).

Example of volatile memory devices include processor registers and random access memory (RAM), such as static RAM (SRAM), dynamic RAM (DRAM), synchronous DRAM (SDRAM), synchronous graphics RAM (SGRAM), and video RAM (VRAM).

Example of magnetic storage media include analog magnetic tape, digital magnetic tape, and rotating hard disk drive (HDDs).

Examples of optical storage media include a CD (such as a CD-R, CD-RW, or CD-ROM), a DVD, a Blu-ray disc, and an Ultra HD Blu-ray disc.

Examples of storage implemented by the storage hardware include a distributed ledger, such as a permissioned or permissionless blockchain.

Entities recording transactions, such as in a blockchain, may reach consensus using an algorithm such as proof-of-stake, proof-of-work, and proof-of-storage.

Elements of the present disclosure may be represented by or encoded as non-fungible tokens (NFTs). Ownership rights related to the non-fungible tokens may be recorded in or referenced by a distributed ledger.

Transactions initiated by or relevant to the present disclosure may use one or both of fiat currency and cryptocurrencies, examples of which include bitcoin and ether.

Some or all features of hardware may be defined using a language for hardware description, such as IEEE Standard 1364-2005 (commonly called "Verilog") and IEEE Standard 1076-2008 (commonly called "VHDL"). The hardware description language may be used to manufacture and/or program hardware.

A special-purpose system may be distributed across multiple different software and hardware entities. Communication within a special-purpose system and between special-purpose systems may be performed using networking hardware. The distribution may vary across embodiments and may vary over time. For example, the distribution may vary based on demand, with additional hardware and/or software entities invoked to handle higher demand. In various embodiments, a load balancer may direct requests to one of multiple instantiations of the special purpose system. The hardware and/or software entities may be physically distinct and/or may share some hardware and/or software, such as in a virtualized environment. Multiple hardware entities may be referred to as a server rack, server farm, data center, etc.

Software

Software includes instructions that are machine-readable and/or executable Instructions may be logically grouped into programs, codes, methods, steps, actions, routines, functions, libraries, objects, classes, etc. Software may be stored by storage hardware or encoded in other hardware. Software encompasses (i) descriptive text to be parsed, such as HTML (hypertext markup language), XML (extensible markup language), and JSON (JavaScript Object Notation), (ii) assembly code, (iii) object code generated from source code by a compiler, (iv) source code for execution by an interpreter, (v) bytecode, (vi) source code for compilation and execution by a just-in-time compiler, etc. As examples only, source code may be written using syntax from languages including C, C++. JavaScript, Java. Python, R, etc.

Software also includes data. However, data and instructions are not mutually-exclusive categories. In various embodiments, the instructions may be used as data in one or more operations. As another example, instructions may be derived from data.

The functional blocks and flowchart elements in this disclosure serve as software specifications, which can be translated into software by the routine work of a skilled technician or programmer.

Software may include and/or rely on firmware, processor microcode, an operating system (OS), a basic input/output system (BIOS), application programming interfaces (APIs), libraries such as dynamic-link libraries (DLLs), device drivers, hypervisors, user applications, background services, background applications, etc. Software includes native applications and web applications. For example, a web application may be served to a device through a browser using hypertext markup language 5th revision (HTML5).

Software may include artificial intelligence systems, which may include machine learning or other computational intelligence. For example, artificial intelligence may include one or more models used for one or more problem domains.

When presented with many data features, identification of a subset of features that are relevant to a problem domain may improve prediction accuracy, reduce storage space, and increase processing speed. This identification may be referred to as feature engineering. Feature engineering may be performed by users or may only be guided by users. In various implementations, a machine learning system may computationally identify relevant features, such as by performing singular value decomposition on the contributions of different features to outputs.

Examples of the models include recurrent neural networks (RNNs) such as long short-term memory (LSTM), deep learning models such as transformers, decision trees, support-vector machines, genetic algorithms, Bayesian networks, and regression analysis. Examples of systems based on a transformer model include bidirectional encoder representations from transformers (BERT) and generative pre-trained transformer (GPT).

Training a machine-learning model may include supervised learning (for example, based on labeled input data), unsupervised learning, and reinforcement learning. In various embodiments, a machine-learning model may be pre-trained by their operator or by a third party.

Problem domains include nearly any situation where structured data can be collected, and includes natural language processing (NLP), computer vision (CV), classification, image recognition, etc.

Architectures

Some or all of the software may run in a virtual environment rather than directly on hardware. The virtual environment may include a hypervisor, emulator, sandbox, container engine, etc. The software may be built as a virtual machine, a container, etc. Virtualized resources may be controlled using, for example, a DOCKER container platform, a pivotal cloud foundry (PCF) platform, etc.

In a client-server model, some of the software executes on first hardware identified functionally as a server, while other of the software executes on second hardware identified functionally as a client. The identity of the client and server is not fixed: for some functionality, the first hardware may act as the server while for other functionality, the first hardware may act as the client. In different embodiments and in different scenarios, functionality may be shifted between the client and the server. In one dynamic example, some functionality normally performed by the second hardware is shifted to the first hardware when the second hardware has less capability. In various embodiments, the term "local" may be used in place of "client," and the term "remote" may be used in place of "server."

Some or all of the software may be logically partitioned into microservices. Each microservice offers a reduced subset of functionality. In various embodiments, each microservice may be scaled independently depending on load, either by devoting more resources to the microservice or by instantiating more instances of the microservice. In various embodiments, functionality offered by one or more microservices may be combined with each other and/or with other software not adhering to a microservices model.

Some or all of the software may be arranged logically into layers. In a layered architecture, a second layer may be logically placed between a first layer and a third layer. The first layer and the third layer would then generally interact with the second layer and not with each other. In various embodiments, this is not strictly enforced—that is, some direct communication may occur between the first and third layers.

The invention claimed is:

1. A method of manufacturing a rocket, the method comprising: additively manufacturing a combustion chamber;

- additively manufacturing an injector that is integrally coupled with the combustion chamber; and
- additively manufacturing propellant management structures that are integrally coupled with the injector and the combustion chamber that include additively manufacturing a regenerative jacket around the combustion chamber that includes:
  - additively manufacturing a plurality of ribs that couple with a hot wall of the combustion chamber and a cold wall of the combustion chamber and are oriented to set a propellant flow to impinge upon a plurality of fins; and
  - additively manufacturing the plurality of fins that extend from the hot wall of the combustion chamber towards the cold wall of the combustion chamber and protrude into one or more flow paths between the plurality of ribs, wherein the plurality of ribs and the plurality of fins form a plurality of stages that include:
  - a first stage from the plurality of stages that includes a first plurality of ribs from the plurality of ribs and a first plurality of fins from the plurality of fins; and
  - a second stage from the plurality of stages that includes a second plurality of ribs from the plurality of ribs and a second plurality of fins from the plurality of fins, wherein the second stage follows discontinuously from the first stage in the one or more flow paths between the plurality of ribs.

2. The method of claim 1, further comprising additively manufacturing a nozzle that is integrally coupled with the combustion chamber.

3. The method of claim 1, further comprising additively manufacturing a catalyst that is integrally coupled with a wall of the combustion chamber.

4. The method of claim 3, wherein additively manufacturing the catalyst includes additively manufacturing the catalyst based on maximizing a surface area of the catalyst based on a substantially smooth wall and a feature resolution of a machine used to additively manufacture the catalyst.

5. The method of claim 1, wherein additively manufacturing at least one of the combustion chamber, the injector, and the propellant management structures include additively manufacturing using a nickel alloy.

6. The method of claim 1, wherein additively manufacturing at least one of the combustion chamber, the injector, and the propellant management include additively manufacturing using niobium C103.

7. The method of claim 1, wherein additively manufacturing at least one of the combustion chamber, the injector, and the propellant management structures include additively manufacturing using a cobalt chrome alloy.

8. The method of claim 1, wherein additively manufacturing at least one of the combustion chamber, the injector, and the propellant management structures include additively manufacturing the combustion chamber using a molybdenum alloy.

9. The method of claim 1, wherein additively manufacturing at least one of the combustion chamber, the injector, and the propellant management structures include additively manufacturing the combustion chamber using a rhenium alloy, the method further comprising lining the combustion chamber with at least one layer of iridium.

10. The method of claim 1, further comprising additively manufacturing seals between components of the rocket.

11. The method of claim 10, further comprising additively manufacturing seal glands for the seals.

12. The method of claim 10, further comprising additively manufacturing a hot-gas metal seal between the combustion chamber and injector.

13. The method of claim 1, wherein additively manufacturing at least one of the combustion chamber, the injector, and the propellant management structures include forming fine features having dimensions configured to cause the propellant to transition from a liquid phase to a gas phase prior to combustion to promote propellant mixing under a predetermined standard operation of the rocket.

14. The method of claim 13, further comprising forming fine features for a rocket fuel and forming fine features for an oxidizer, wherein forming fine features for the rocket fuel is based on a phase transition requirement of the rocket fuel and forming fine features for the oxidizer is based on a phase transition requirement of the oxidizer.

15. The method of claim 13, wherein forming fine features includes forming injector elements having an aperture dimension of less than one-hundredth of an inch to improve propellant atomization, reduce local bed loading, restrict quenching in an induction zone and limit hot spots between the injector elements to lower injector face maximum temperatures.

16. The method of claim 1, wherein additively manufacturing the propellant management structures includes forming propellant tubing in a honeycomb shape disposed proximate the combustion chamber to transfer heat from the combustion chamber to the propellant during propellant flow in a predetermined standard operation of the rocket.

17. The method of claim 1, wherein additively manufacturing the propellant management structures includes forming propellant tubing using materials selected to have a thermal effusivity that heats the propellant and cools the combustion chamber to promote transition of the propellant to a gas phase during a predetermined standard operation of the rocket.

18. The method of claim 1, further comprising dispersing ceramic particles in a metal matrix for high temperature strength while additively manufacturing.

19. The method of claim 1, wherein additively manufacturing further includes additively manufacturing with refractory metals.

20. The method of claim 1, further comprising adjusting a porosity of the rocket based on a proximity to a chamber wall of the combustion chamber.

21. The method of claim 20, further comprising additively manufacturing disfavored thermal conduction pathways within at least one of the combustion chamber, the injector, and the propellant management structures, wherein the disfavored thermal conduction pathways have a thermal resistance that is higher than a thermal resistance of a remainder of the at least one of the combustion chamber, the injector, and the propellant management structures that is not part of the disfavored thermal conduction pathways for directing heat transfer in the rocket.

22. The method of claim 1, further comprising additively manufacturing embedded instrumentation that is integrally coupled with the rocket.

23. The method of claim 1, wherein additively manufacturing at least one of the combustion chamber, the injector, and the propellant management structures include integrally forming instrument ports configured to receive instrumentation components.

24. The method of claim 1, wherein additively manufacturing at least one of the combustion chamber, the injector, and the propellant management structures include integrally forming tube stubs configured to receive at least one of Ground Support Equipment (GSE) components and thruster components.

25. The method of claim 1, wherein additively manufacturing the injector includes forming injection elements normal to a face of the injector.

26. The method of claim 1, wherein additively manufacturing the injector includes forming baffles with exits normal to a face of the injector, wherein the baffles are configured to dampen acoustics in the rocket.

27. The method of claim 1, wherein additively manufacturing the injector includes forming injector elements with integral vorticity generators.

28. The method of claim 1, wherein additively manufacturing the injector includes forming the injector in a dome shape, and wherein additively manufacturing the combustion chamber includes forming the combustion chamber in a spherical shape and forming baffles on walls of the combustion chamber.

29. The method of claim 1, wherein:

the first plurality of fins from the plurality of fins includes:

a first group of fins from the first plurality of fins oriented parallel to the first plurality of ribs from the plurality of ribs; and a second group of fins from the first plurality of fins oriented obliquely to the first plurality of ribs from the plurality of ribs; and the second plurality of fins from the plurality of fins includes:

a first group of fins from the second plurality of fins oriented parallel to the second plurality of ribs from the plurality of ribs; and a second group of fins from the second plurality of fins oriented obliquely to the second plurality of ribs from the plurality of ribs.

30. The method of claim 29, further comprising:

additively manufacturing a plurality of channels between the hot wall of the combustion chamber and the cold wall of the combustion chamber that terminate axially below the plurality of ribs and the plurality of fins and that resume axially above the plurality of ribs and the plurality of fins.

* * * * *